United States Patent
Shimada

(10) Patent No.: US 6,753,906 B2
(45) Date of Patent: Jun. 22, 2004

(54) IMAGE SENSING APPARATUS UTILIZING PIXEL-SHIFTING

(75) Inventor: Koichi Shimada, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/140,440

(22) Filed: Aug. 26, 1998

(65) Prior Publication Data

US 2003/0146980 A1 Aug. 7, 2003

(30) Foreign Application Priority Data

Aug. 28, 1997 (JP) ............................................. 9-232521
Sep. 1, 1997 (JP) ............................................. 9-235805
Jul. 10, 1998 (JP) ........................................... 10-195258

(51) Int. Cl.[7] ............................ H04N 5/225; H04N 9/07
(52) U.S. Cl. .................... 348/219.1; 348/340; 348/344; 348/266
(58) Field of Search ............................. 348/36, 37, 38, 348/39, 49, 224.1, 264, 266, 219.1, 333.11, 344, 340, 357, 369; 382/284, 299, 208.8, 208.11, 218.1

(56) References Cited

U.S. PATENT DOCUMENTS

| | | | | |
|---|---|---|---|---|
| 5,363,136 A | * | 11/1994 | Sztanko et al. | 348/207 |
| 5,400,070 A | * | 3/1995 | Johnson et al. | 348/207 |
| 5,557,327 A | * | 9/1996 | Hasegawa et al. | 348/219 |
| 5,877,806 A | * | 3/1999 | Kawano | 348/219 |
| 5,889,553 A | * | 3/1999 | Kino et al. | 348/208 |
| 5,920,342 A | * | 7/1999 | Umeda et al. | 348/211.14 |
| 5,926,216 A | * | 7/1999 | Nobuoka | 348/208 |
| 5,930,405 A | * | 7/1999 | Chida | 382/299 |
| 5,969,757 A | * | 10/1999 | Okada et al. | 348/219 |
| 6,091,448 A | | 7/2000 | Washisu et al. | 348/208 |

(List continued on next page.)

FOREIGN PATENT DOCUMENTS

| | | | |
|---|---|---|---|
| EP | 0 853 425 A1 | 7/1988 | |
| EP | 0 483 530 A2 | 5/1992 | |
| EP | 483530 A2 * | 5/1992 | ............ H04N/3/15 |
| EP | 669757 A2 * | 8/1995 | .......... H04N/5/232 |
| EP | 0 689 349 A1 | 12/1995 | |
| EP | 689349 A1 * | 12/1995 | .......... H04N/5/225 |
| JP | 61251380 A * | 11/1986 | .......... H04N/5/225 |
| JP | 09083877 A * | 3/1997 | ........... G02B/26/08 |

OTHER PUBLICATIONS

Translation of European Patent Publ. No. 0483530 A2, Apr. 2003, FLS, Inc.*
Patent Abstracts of Japan, vol. 097, No. 007, Jul. 31, 1997 & JP 09 083877 A (Toshiba Corp.), Mar. 28, 1997.
Patent Abstracts of Japan, vol. 010, No. 038 (P–428), Feb. 14, 1986 & JP 60 185923 A (Matsushita Densou KK), Sep. 21, 1985.
U.S. application No. 09/054,996.
U.S. patent application Ser. No. 09/054,996, filed Apr. 3, 1998, pending.
U.S. patent application Ser. No. 08/902,575, filed Jul. 29, 1997, pending.

Primary Examiner—Wendy R. Garber
Assistant Examiner—John M Villecco
(74) Attorney, Agent, or Firm—Morgan & Finnegan, LLP

(57) ABSTRACT

Two plane parallel plates, orthogonally intersecting each other, are provided in front of a CCD device. The plane parallel plate is supported by its two ends which are deviated from an optical path. Each end of the plane parallel plate includes an armature made of soft electromagnetic iron, and two electromagnets are provided in the optical axis direction, while sandwiching each armature. By the on/off state of the two electromagnets, the armature can control the optical device in three angled positions, thus the optical device can have three shift positions with respect to the optical axis. Therefore, by virtue of the optical devices, an optical path can be determined by selecting a shift position of said optical device from nine shift positions (3×3).

57 Claims, 96 Drawing Sheets

U.S. PATENT DOCUMENTS

| | | | |
|---|---|---|---|
| 6,195,125 B1 * | 2/2001 | Udagawa et al. | 348/218 |
| 6,211,910 B1 * | 4/2001 | Kino et al. | 348/208 |
| 6,233,009 B1 | 5/2001 | Morofuji et al. | 348/208 |
| 6,266,086 B1 * | 7/2001 | Okada et al. | 348/208 |
| 6,359,648 B1 * | 3/2002 | Fukasaka | 348/208 |
| 6,473,121 B1 * | 10/2002 | Shimada | 348/335 |
| 2002/0057346 A1 * | 5/2002 | Hirasawa et al. | 348/208 |

* cited by examiner

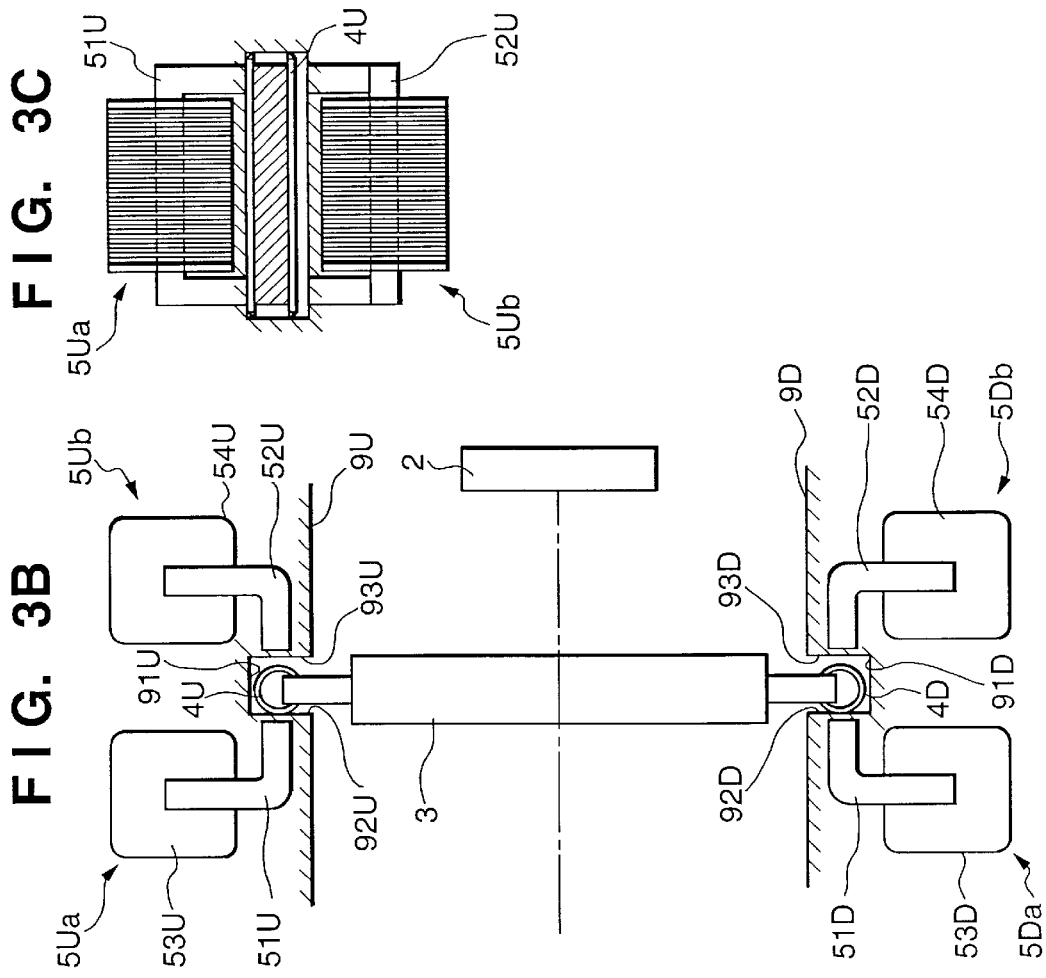

F I G. 12
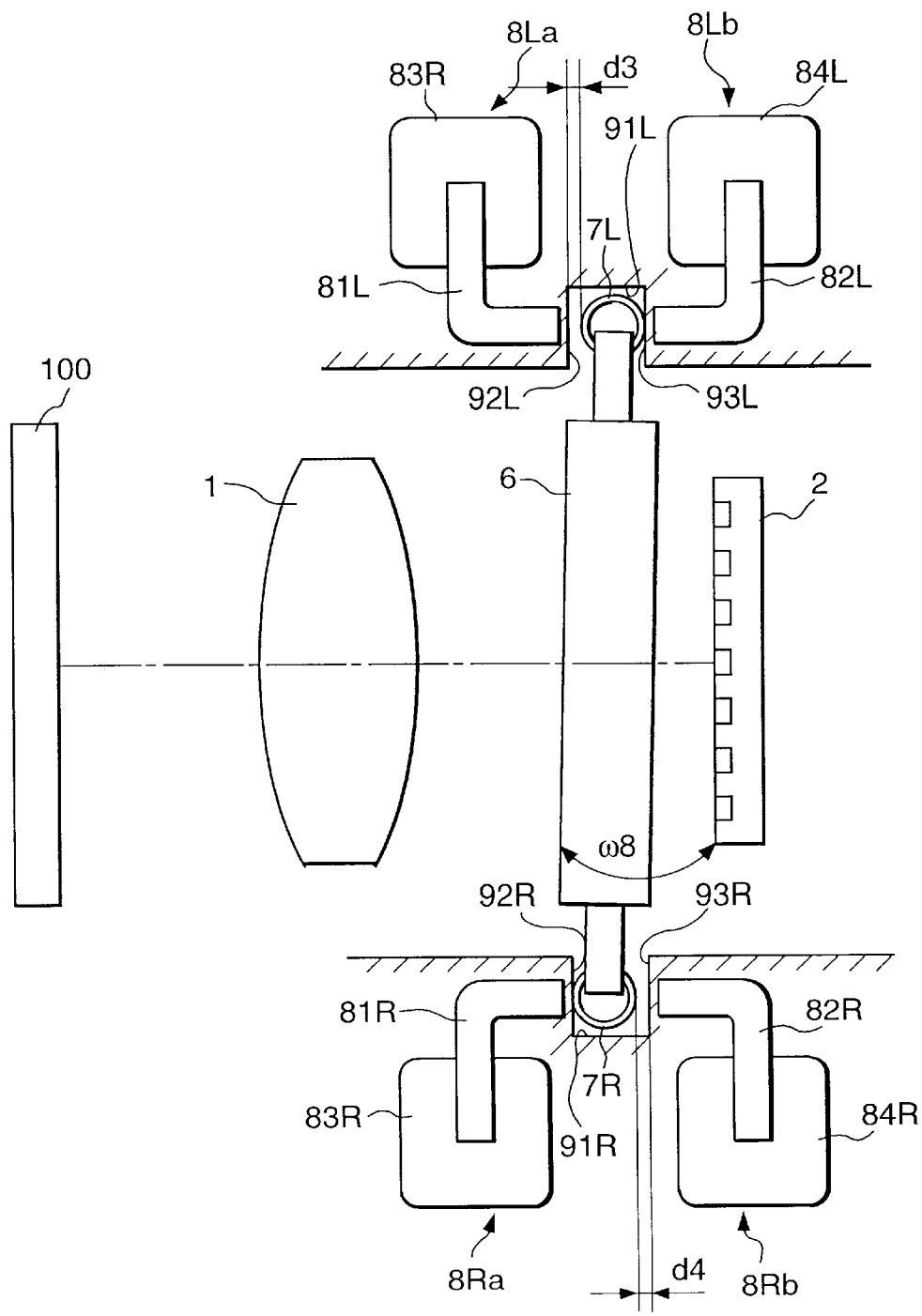

FIG. 13B

F I G. 20A
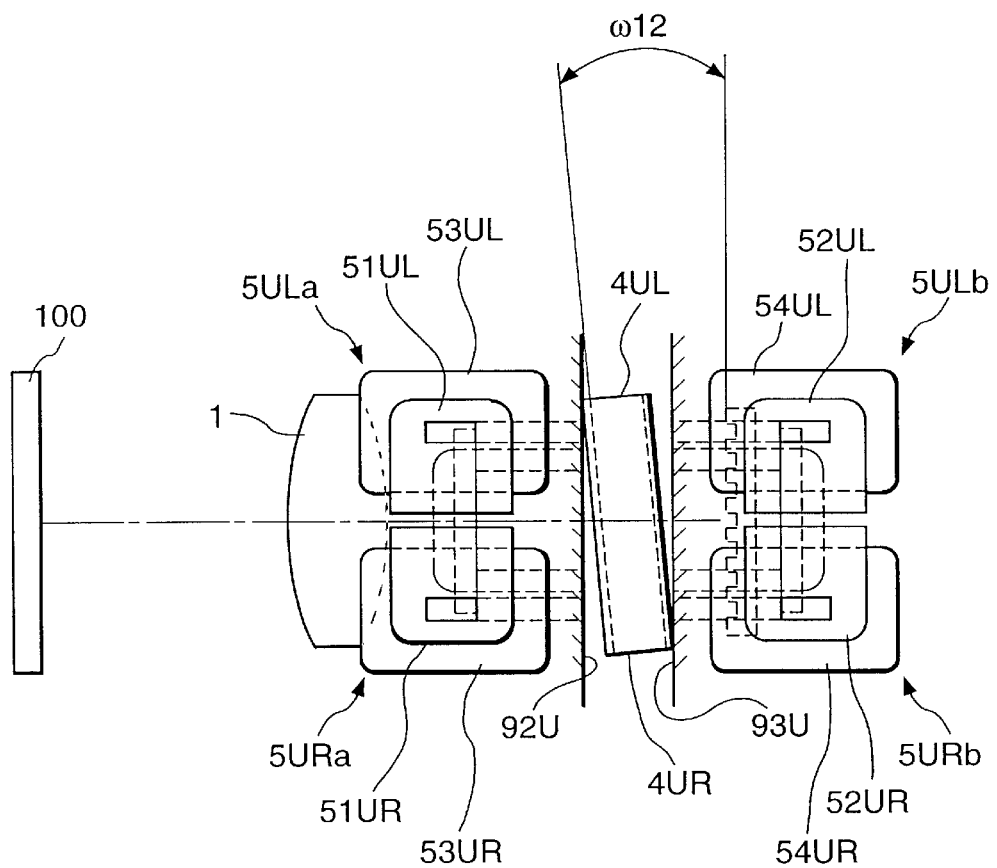

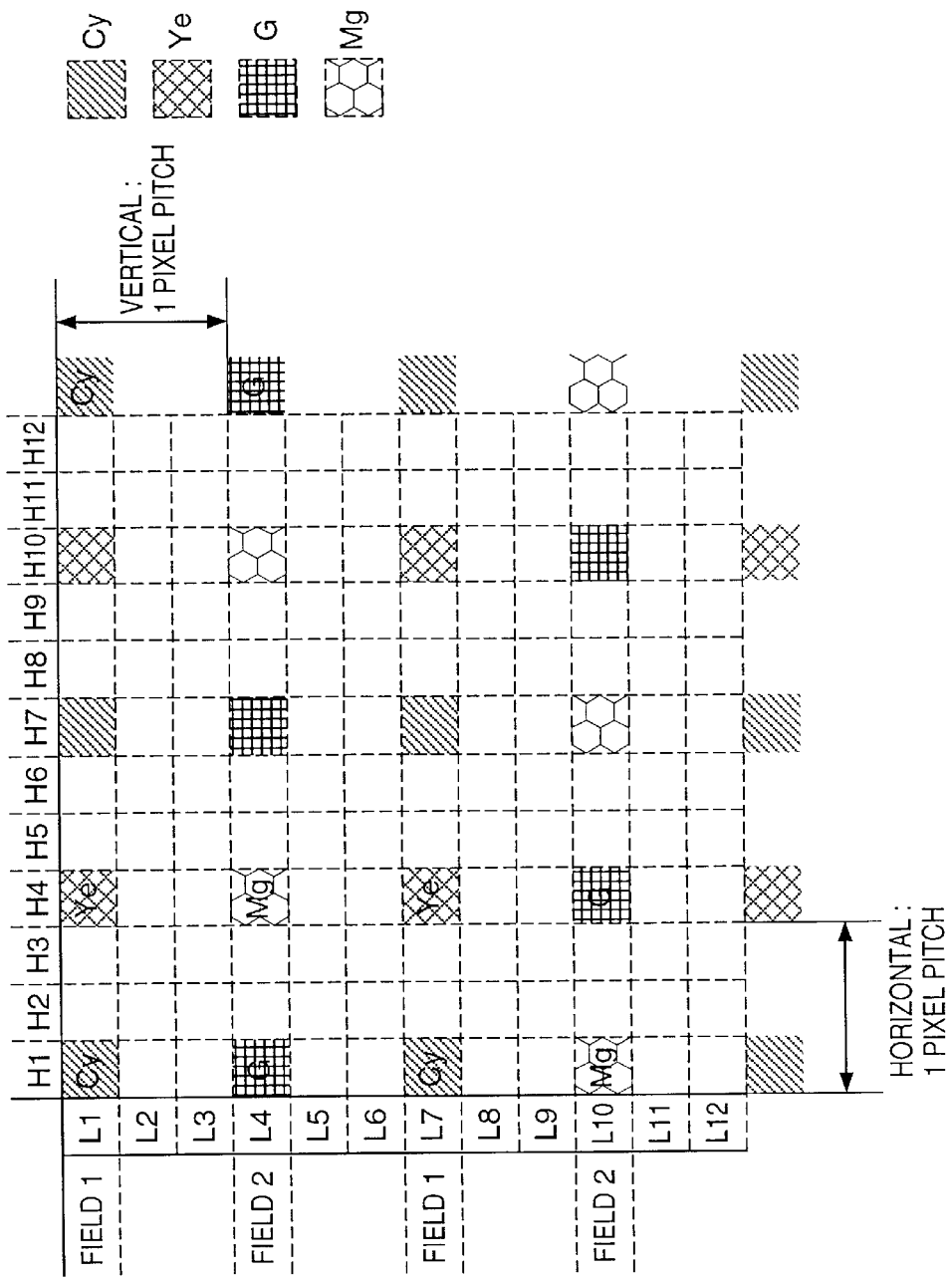

FIG. 32

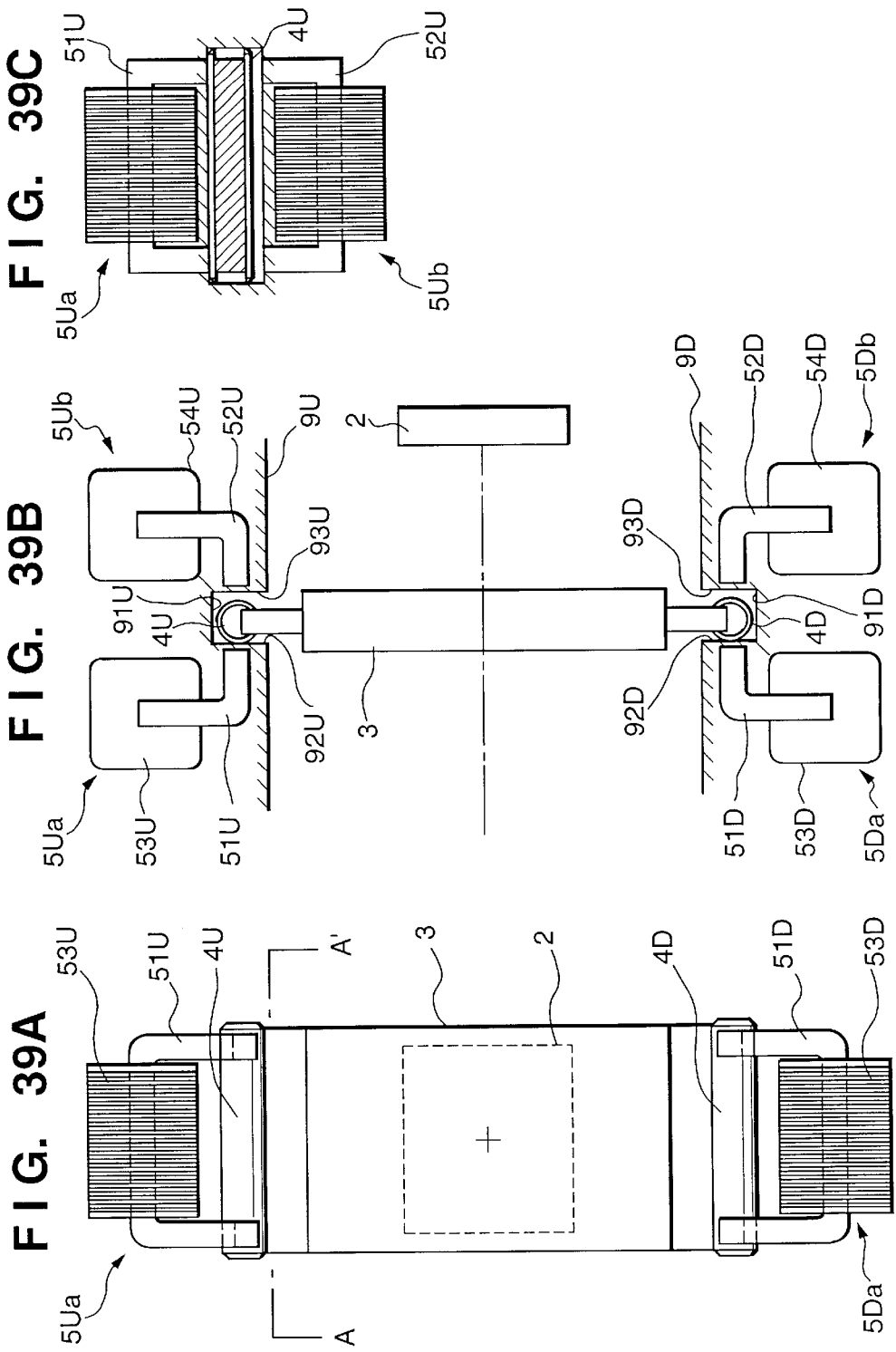

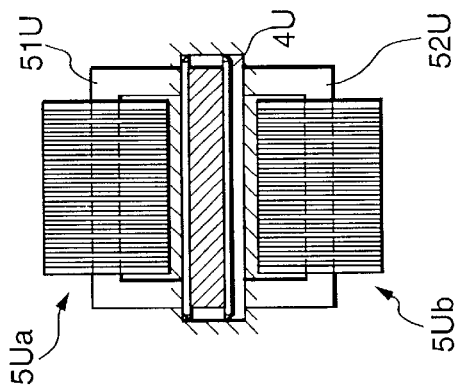
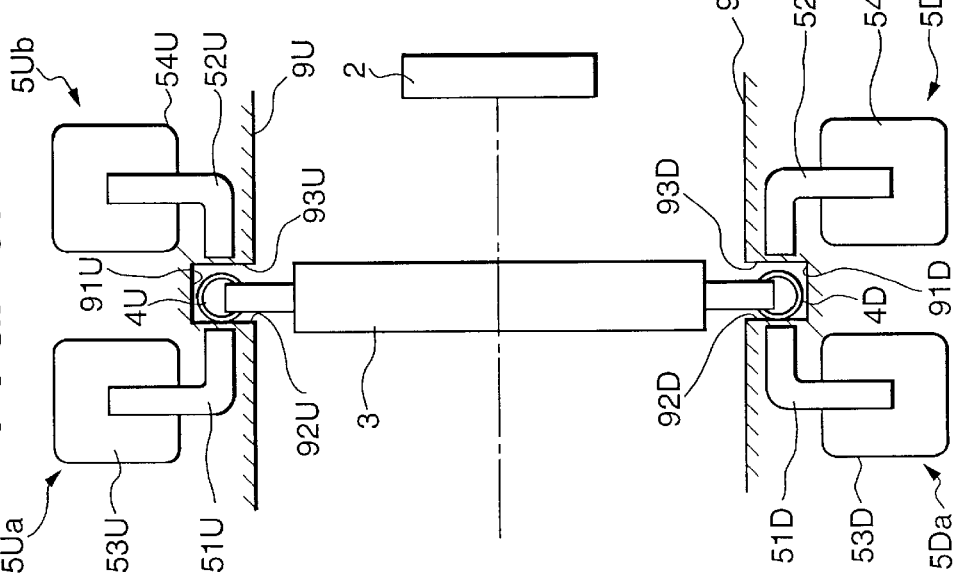
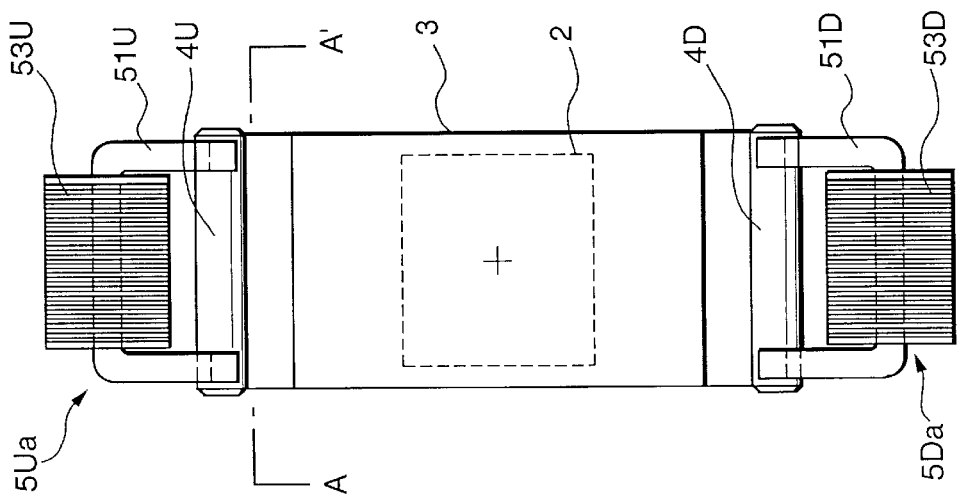

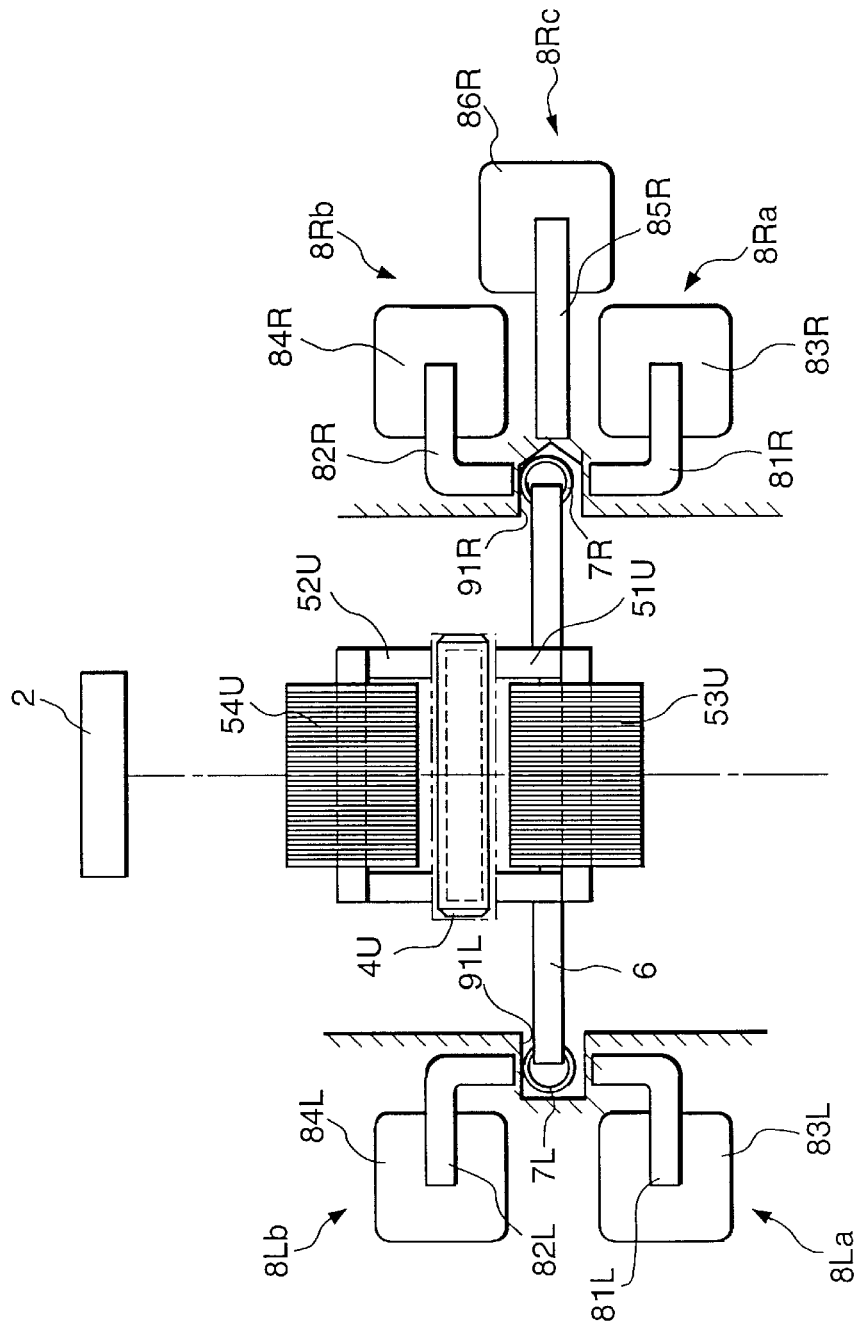

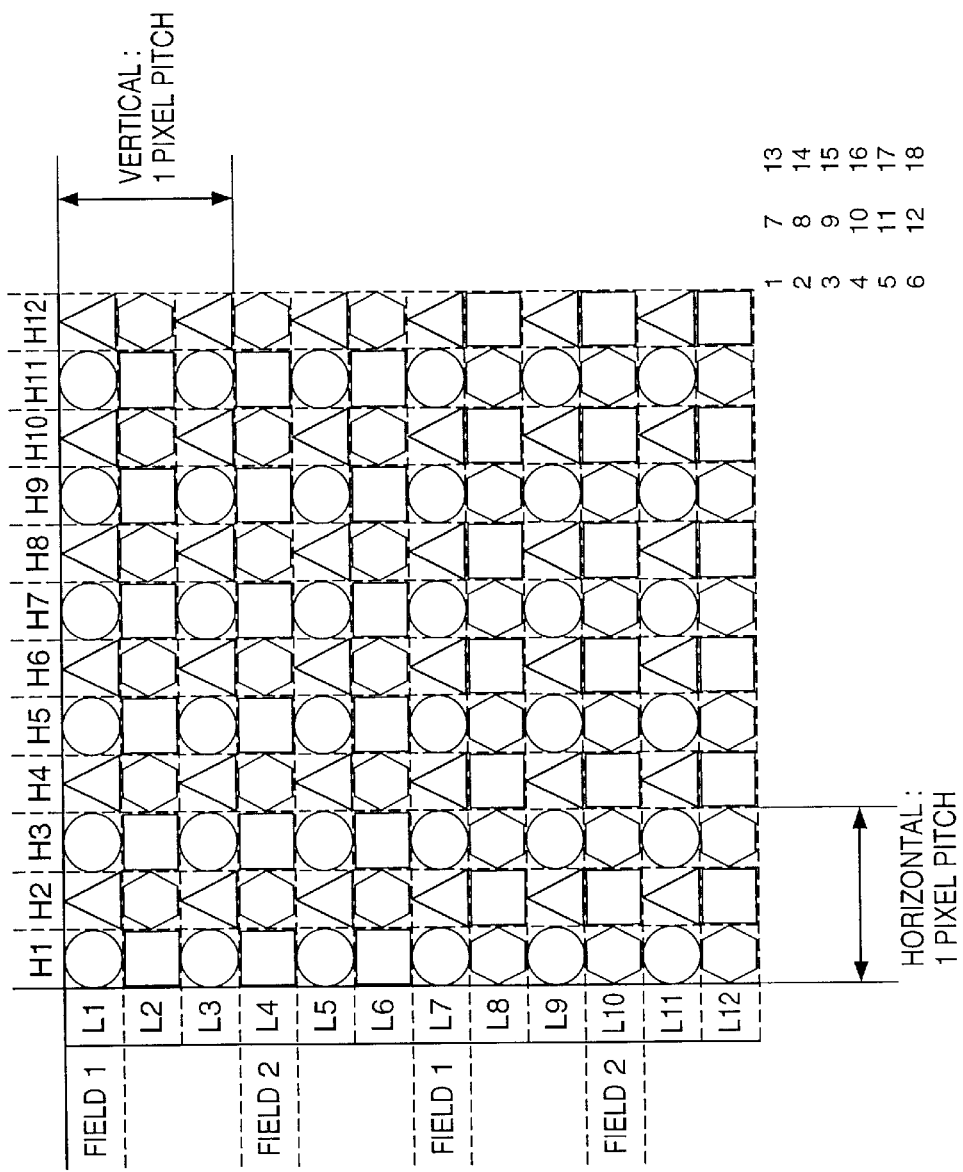

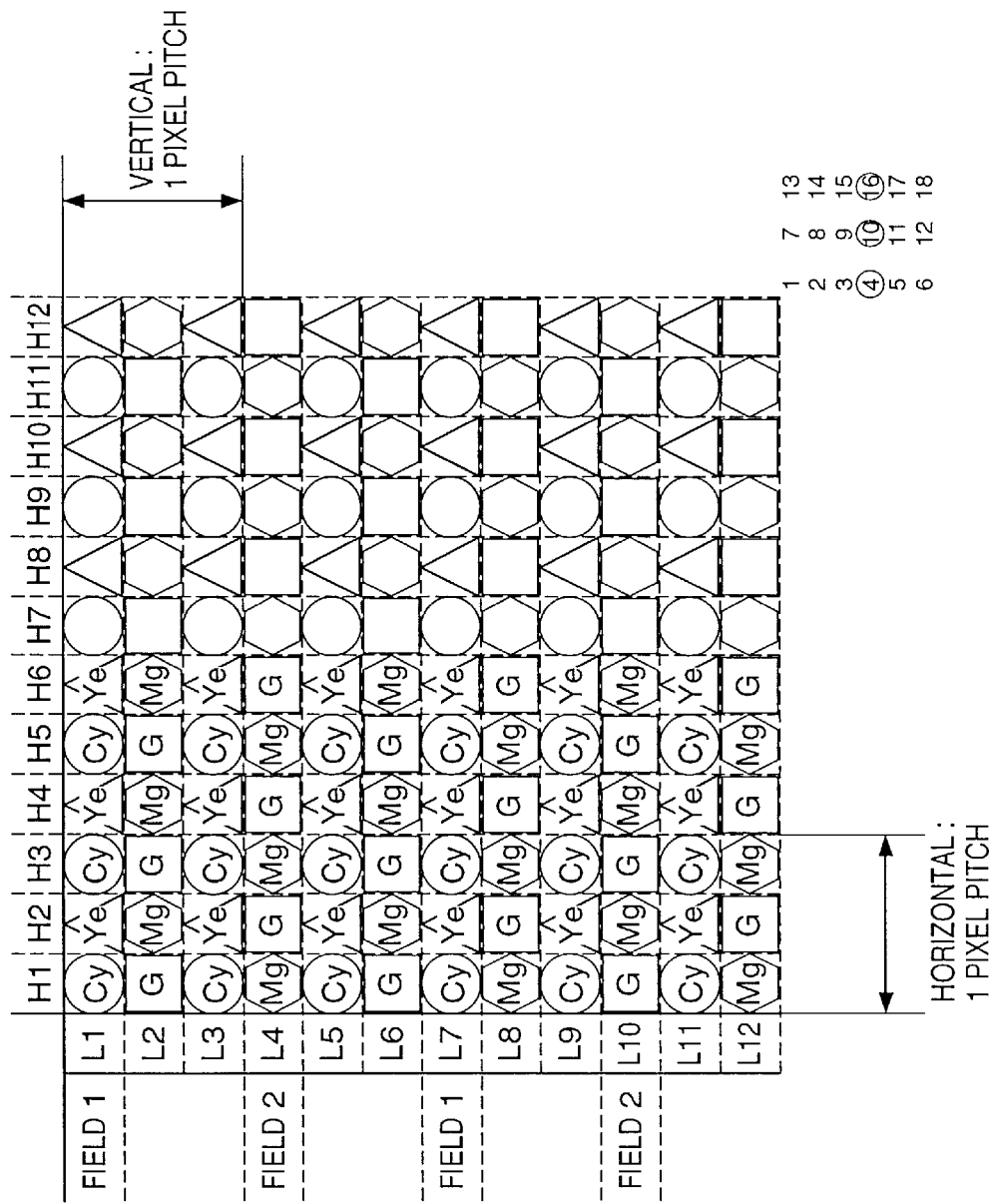

FIG. 62

| No. | | FRAME 1 | | FRAME 2 | | FRAME 3 | | FRAME 4 | | FRAME 5 | | FRAME 6 | | FRAME 7 | | FRAME 8 | | FRAME 9 | |
|---|---|---|---|---|---|---|---|---|---|---|---|---|---|---|---|---|---|---|---|
| SEQ | | 1 | 2 | 3 | ④ | 5 | 6 | 7 | 8 | 9 | ⑩ | 11 | 12 | 13 | 14 | 15 | ⑯ | 17 | 18 |
| FLD | | 1 2 | 1 2 | 1 2 | 1 2 | 1 2 | 1 2 | 1 2 | 1 2 | 1 2 | 1 2 | 1 2 | 1 2 | 1 2 | 1 2 | 1 2 | 1 2 | 1 2 | 1 2 |

Table continues with rows: 8Ra, 8La, TIMING, 8Rb, 8Lb, 8Rc, HPP (X,Y), VPP, 5Ua, 5Da, TIMING, 5Ub, 5Db

IMAGE SENSING APPARATUS UTILIZING PIXEL-SHIFTING

BACKGROUND OF THE INVENTION

The present invention relates to an image sensing apparatus or an optical apparatus which enables to input a high quality image, by slightly changing the optical angle of a plane-parallel-plate glass or mirror provided in the optical path of an image sensing system.

Recently, as considerable progress has been made in image input apparatuses e.g., video cameras, scanners and the like, there are increasing demands for higher image quality and higher resolution in these apparatuses. However, increasing the number of pixels in an image sensing apparatus raises many problems, e.g., problems related to performance such as deteriorated sensitivity or reduced S/N ratio, high cost in manufacturing due to reduced yield, increased price in quartz crystal or low-pass filter or the like for preventing false signals or the like.

To cope with such problems, so-called "pixel-shifting" is known as a technique to achieve high quality and high resolution in an image sensing apparatus, without increasing the number of pixels of the image sensing device. Pixel-shifting enables to obtain a high-quality image substantially equivalent to a case of using an image sensing device having increased number of pixels. This is realized by providing a reflection mirror in the optical path within the optical relaying space between lenses and image sensing device and changing the reflection angle, or providing a plane parallel plate made of light-transmitting glass in the optical path and changing the angle of light incident upon the light-transmitting glass or the optical path length of the glass by making use of light refraction, or by slightly vibrating the image sensing device, thereby making it possible to guide optical image data, which was normally received by a light-insensitive zone between photoreceptive portions of the image sensing device, to the photosensitive portion and sequentially obtain the optical image data.

According to the pixel-shifting technique, a high quality image sensing can be performed without increasing the number of pixels of the image sensing device. Therefore, it is an extremely useful technique to realize higher resolution in image input apparatuses.

Examples of pixel-shifting utilizing the aforementioned principle are found in Japanese Patent Application Laid-Open No. 59-15378 where a plane parallel plate is rotated on an axis parallel to pixel array, or Japanese Patent Application Laid-Open No. 1-1218160 where a plane parallel plate surface is inclined and shifted in the optical-axis direction, or Japanese Utility Model Application Laid-Open No. 6-8937 where X and Y axes are provided and an inclination of plane parallel plate surface is changed by driving a cam with a motor.

However, the above-described conventional mechanism, utilizing a plane-parallel-plate glass, employs a motor as a driving source to change the optical position, and adopts a complicated and expensive mechanism, e.g., position control by cam. Because of this, it is difficult to ensure precision in positioning the plane-parallel-plate glass, and difficult to increase the driving speed.

Moreover, in addition to the necessity of a motor, a cam and a mechanism for transferring driving force of the motor, these mechanisms must be provided for horizontal and vertical directions. Naturally, the size of apparatus increases, and it becomes difficult to place the image-sensing apparatus in the space between lenses and image sensing device.

SUMMARY OF THE INVENTION

The present invention is made to solve the foregoing problems and has as its object to provide an image sensing apparatus or an optical apparatus comprising pixel-shifting system capable of high-speed driving in a simple structure.

In order to solve the above-described problems and attain the objects, the present invention provides an image sensing apparatus comprising: image sensing means for photoelectrically converting an optical image formed on an image sensing surface and outputting a sensed image signal; an optical device for shifting an incident position of light incident upon the image sensing surface of said image sensing means; a plurality of regulating members, abutting against a plurality of ends of said optical device, for regulating a position of each of the ends in respective optical axis directions, thereby controlling a first inclination angle of said optical device in a first direction with respect to an optical axis of said optical device and a second inclination angle of said optical device in a second direction which is perpendicular to the first direction; and optical device shifting means for shifting said optical device in order to have each of the plurality of ends of said optical device abut against each of said plurality of regulating members and holding each of the ends, wherein the incident position of light incident upon the image sensing surface is shifted in vertical direction of the image sensing surface by changing the first inclination angle of said optical device, and the incident position of light incident upon the image sensing surface is shifted in horizontal direction of the image sensing surface by changing the second inclination angle of said optical device.

According to the image sensing apparatus having the above construction, the optical device shifts an incident position incident upon an image sensing surface. An inclination position of both ends of the optical device with respect to the optical axis direction is regulated by a plurality of regulating members. Each of the regulating members abuts against each end of the optical device, thus making it possible to control the inclination position of the optical device in a plurality of directions. In other words, by having a simple structure where the optical device simply abuts against the regulating member, pixel-shifting operation can be performed at high precision.

According to an aspect of the present invention, it is preferable that the optical device is a plane parallel plate provided on an optical path of the image sensing means. When an inclination angle of said plane parallel plate with respect to the optical axis of said plane parallel plate is defined by said regulating members, the incident position of light incident upon the image sensing surface is shifted by an amount corresponding to the defined inclination angle.

It is preferable that each of the regulating members comprises regulating surfaces. Therefore, according to an aspect of the present invention, each of said regulating members comprises respective regulating surfaces, regulating surfaces provided for each of the ends of said optical device being formed at positions different from each other with respect to the front and back of the optical axis direction. The optical device can be controlled in a plurality of inclination angles by changing a combination of an end of said optical device and the regulating surface being abutted thereto.

Furthermore, according to an aspect of the present invention, said optical device has a shift range defined by a regulating surface, the shift range including a first shift range with respect to the optical axis direction of said optical device at one end of said optical device and a second shift range with respect to the optical axis direction of said optical device at the other end of said optical device, the first and second shift ranges having 1:1 relationship so that the inclination angle of said optical device can be equally divided between a maximum inclination position and a minimum inclination position.

Note that the end of the optical device and regulating surface contact each other by a line or point. Therefore, according to an aspect of the present invention, the first and second ends of said optical device, each of which abuts against a regulating surface of a regulating member, respectively include engaging portions each contacting the regulating surface of the corresponding regulating member by a line or point.

According to an aspect of the present invention, the engaging portion is a cylindrical member linearly contacting the regulating surface. By virtue of the contacting surface being a cylindrical shape, the image sensing apparatus is not influenced by an inclination angle no matter how the engaging portion linearly contacts the surface.

It is preferable that the optical device shifting means comprises a plurality of electromagnets provided for each regulating surface. According to an aspect of the present invention, an inclination angle of said optical device is changed by controlling turning on/off each of the electromagnets by said optical device shifting means and determining a regulating surface to which said optical device abuts.

According to an aspect of the present invention, said optical device shifting means includes: a resilient member for urging said optical device to the direction substantially parallel to the optical axis direction; and an electromagnet for urging said optical device to a direction opposite to said urging direction against said resilient member.

According to an aspect of the present invention, said optical device is supported while having gaps formed by the regulating surfaces of said plurality of regulating members, and an inclination angle of said optical device is determined and maintained by abutting each of the ends of said optical device against an opposing regulating surface.

According to an aspect of the present invention, shifting said optical device in the first direction enables to shift the incident light in three positions on the image sensing surface in the vertical direction, and at a predetermined position of the three positions, said optical device can shift the incident light in three positions in the horizontal direction.

According to an aspect of the present invention, said optical device comprises: a vertical optical device for mainly shifting an incident position of light incident upon the image sensing surface in the vertical direction on the image sensing surface; and a horizontal optical device for mainly shifting an incident position of light incident upon the image sensing surface in the horizontal direction on the image sensing surface, wherein said vertical optical device includes one to three inclination angle positions in the horizontal direction at an inclination angle position in a vertical direction, and said horizontal optical device includes one to three inclination angle positions in the vertical direction at an inclination angle position in the horizontal direction.

The above-described problem can also be solved by an optical apparatus comprising: an optical device for shifting an incident position of light incident upon an image sensing surface; a plurality of regulating members, abutting against a plurality of ends of said optical device, for regulating a position of each of the ends in respective optical axis directions, thereby controlling a first inclination angle of said optical device in a first direction with respect to an optical axis of said optical device and a second inclination angle of said optical device in a second direction which is perpendicular to the first direction; and optical device shifting means for shifting said optical device in order to have each of the plurality of ends of said optical device abut against each of said plurality of regulating members and holding each of the ends.

According to the above optical apparatus, the inclination of optical device can be controlled in a plurality of angles by changing the combination of the regulating surfaces to which the end portions of the optical device is abutted. Therefore, pixel-shifting operation can be performed with an extremely simple structure, at high speed and high precision. In addition, the inclination angle can be controlled in the first and second directions with respect to the optical device. Thus, high-speed pixel-shifting can be performed in both vertical and horizontal directions on the image sensing surface.

Moreover, one end of the optical device and the other end of the optical device have the same range of movement, allowed by the regulating surface, with respect to the optical-axis direction. Therefore, the inclination angle of the optical device can be controlled in three stages with respect to the vertical or horizontal direction. For instance, a plane parallel plate provided primarily to perform pixel-shifting in the vertical (horizontal) direction can be utilized for pixel-shifting in the horizontal (vertical) direction. Thus, for one vertical (or horizontal) position of the plate, pixel-shifting steps twice as many pixel-shifting steps as in the horizontal (or vertical) direction are attained. Vice versa, a plane parallel plate provided primarily to perform pixel-shifting in the horizontal direction can be utilized for pixel-shifting in the vertical direction. Thus, for one horizontal position of the plate, pixel-shifting steps twice as many pixel-shifting steps as in the vertical direction are attained.

According to an aspect of the present invention, the incident position of light incident upon the image sensing surface is shifted in vertical direction of the image sensing surface by changing the first inclination angle of said optical device, and the incident position of light incident upon the image sensing surface is shifted in horizontal direction of the image sensing surface by changing the second inclination angle of said optical device.

According to an aspect of the present invention, each of said plurality of regulating members is provided such that a permitted shift amount of said optical device at one of the ends of said optical device is set same as a permitted shift amount of said optical device at the other end of said optical device.

According to an aspect of the present invention, each of said regulating members comprises a plurality of regulating surfaces for regulating a shift position of two ends of said optical device on the front and back of the optical axis direction, the regulating surfaces in one end and the other end being formed at substantially the same position with respect to the optical axis direction, and said optical device can be controlled in a plurality of inclination angles by changing a combination of the regulating surfaces to which the ends of said optical device are abutted.

According to an aspect of the present invention, when an inclination angle of said plane parallel plate with respect to the optical axis of said plane parallel plate is defined by said regulating members, the incident position of light incident upon the image sensing surface is shifted by an amount corresponding to the defined inclination angle.

According to an aspect of the present invention, first and second ends of said optical device, each of which abuts against a regulating surface of a regulating member, respectively include engaging portions each contacting the regulating surface of the corresponding regulating member by a line or point.

According to an aspect of the present invention, the engaging portion is a cylindrical member linearly contacting the regulating surface.

According to an aspect of the present invention, said optical device shifting means comprises a plurality of electromagnets which pull the plane parallel plate forward and backward of the optical axis direction.

According to an aspect of the present invention, the plurality of electromagnets are provided for each of the regulating surfaces, and are constructed such that controlling turning on/off each of the electromagnets enables to change a regulating surface to which said optical device abuts.

According to an aspect of the present invention, shifting said optical device in the first direction enables to shift the incident light in three positions on the image sensing surface in the vertical direction, and at a predetermined position of the three positions, said optical device can shift the incident light in three positions in the horizontal direction.

According to an aspect of the present invention, said optical device comprises: a vertical optical device for mainly shifting an incident position of light incident upon the image sensing surface in the vertical direction on the image sensing surface; and a horizontal optical device for mainly shifting an incident position of light incident upon the image sensing surface in the horizontal direction on the image sensing surface, wherein said vertical optical device includes one to three inclination angle positions in the horizontal direction at an inclination angle position in a vertical direction, and said horizontal optical device includes one to three inclination angle positions in the vertical direction at an inclination angle position in the horizontal direction.

The above-described problem can also be solved by an optical apparatus comprising: an optical device for shifting an incident position of light incident upon an image sensing surface; a plurality of recesses for supporting said optical device while leaving at least a predetermined shift range in an optical axis direction of said optical device, by having a plurality of ends of said optical device respectively inserted with a play; a plurality of regulating surfaces, formed respectively in said plurality of recesses and abutting against the plurality of ends of said optical device respectively, for regulating a position of each of the ends in respective optical axis directions, thereby controlling a first inclination angle of said optical device in a first direction with respect to the optical axis of said optical device and a second inclination angle of said optical device in a second direction which is perpendicular to the first direction; and driving means for driving the ends of said optical device so that the ends abut against respective regulating surfaces in each of said recesses, wherein the incident position of light incident upon the image sensing surface is shifted in vertical direction of the image sensing surface by changing the first inclination angle of said optical device with respect to the first direction, and the incident position of light incident upon the image sensing surface is shifted in horizontal direction of the image sensing surface by changing the second inclination angle of said optical device with respect to the second direction.

According to the optical apparatus having the above construction, driving means is constructed by a plurality of electromagnets which drive the plane parallel plate forward or backward with respect to the optical-axis direction, and the regulating surface against which the optical device abuts is changed by controlling the turning ON/OFF the electromagnets. By virtue of this, pixel-shifting is realized at high speed and high precision with a simple structure.

It is preferable to regulate the end of the optical device by a recess portion. According to an aspect of the present invention, a length of recess for one end of said optical device with respect to the optical axis direction is set substantially the same as a length of recess for the other end of said optical device with respect to the optical axis direction, thereby enabling to substantially equalize a shift amount of one of said optical device at one end with a shift amount at the other end.

According to an aspect of the present invention, each of said regulating surfaces comprises a plurality of regulating surfaces for regulating a shift position of two ends of said optical device on the front and back of the optical axis direction, the regulating surfaces in one end and the other end being formed at substantially the same position with respect to the optical axis direction, and said optical device can be controlled in a plurality of inclination angles by changing a combination of the regulating surfaces to which the ends of said optical device are abutted.

According to an aspect of the present invention, said optical device is a plane parallel plate, and said optical device shifting means comprises a plurality of electromagnets for driving the plane parallel plate in the optical axis direction.

According to an aspect of the present invention, wherein the plurality of electromagnets are provided in two positions, having different optical axis directions, in the neighborhood of a recess, and the plurality of electromagnets are constructed such that controlling turning on/off each of the electromagnets enables to change a regulating surface to which said optical device abuts.

According to an aspect of the present invention, said optical device comprises: a vertical plane parallel plate for mainly shifting an incident position of light incident upon the image sensing surface in the vertical direction on the image sensing surface; and a horizontal plane parallel plate for mainly shifting an incident position of light incident upon the image sensing surface in the horizontal direction on the image sensing surface, wherein said vertical plane parallel plate includes one to three inclination angle positions in the horizontal direction at an inclination angle position in a vertical direction, and said horizontal plane parallel plate includes one to three inclination angle positions in the vertical direction at an inclination angle position in the horizontal direction.

According to an aspect of the present invention, said plurality of regulating members are arranged such that the ends of said optical device respectively abut against the regulating members in a plurality of abutting manners, said optical device shifting means shifts and holds said optical device so as to determine one of the abutting manners, and determining an arbitrary abutting manner sets at least one of the first inclination angle or the second inclination angle in a desired value.

The number of regulating members need not be the same for all the ends of the optical device. Therefore, the present invention provides an optical apparatus comprising: an optical device for shifting an incident position of light incident upon an image sensing surface; a plurality of regulating members, abutting against a plurality of ends of said optical device, for regulating a position of each of the ends in respective optical axis directions, thereby controlling an inclination position of said optical device; and driving means for driving said optical device in order to have said optical device abut against said plurality of regulating members; wherein said plurality of regulating members comprise a plurality of regulating surfaces which abut against respective ends to regulate a position of the ends, an inclination position of said optical device is determined by changing a combination of an end of said optical device and a regulating surface being abutted thereto, thereby controlling said optical device in a plurality of inclination angles, and a number of regulating surfaces provided in one end of the plurality of ends of said optical device is different from that provided in the other end of said optical device.

According to the optical apparatus having the above construction, a plurality of regulating members for regulating a shifting position with respect to an optical-axis direction are formed on both ends of an optical device provided for shifting the position of incident light on an image sensing surface, and the optical device is positioned to abut against each of the regulating portions, making it possible to control the inclination of the optical device in a plurality of directions. By virtue of this configuration, pixel-shifting operation with extremely precise positioning is realized by a simple structure in which the optical device abuts against the regulating portions.

Furthermore, the inclination of optical device can be controlled in a plurality of angles by changing the combination of the regulating surfaces to which the end portions of the optical device is abutted. Therefore, pixel-shifting operation can be performed with an extremely simple structure, at high speed and high precision.

According to an aspect of the present invention, said optical device is constructed such that a shift range with respect to the optical axis direction at one end of said optical device is different from a shift range with respect to the optical axis direction at the other end of said optical device, and a number of regulating surfaces of a second regulating member having a large shift range is set larger than a number of regulating surfaces of a first regulating member having a small shift range.

According to an aspect of the present invention, the second regulating member having a large shift range has at least three regulating surfaces, so that an inclination angle of said optical device can be equally divided between a maximum inclination position and a minimum inclination position.

According to an aspect of the present invention, the first regulating member having a small shift range has a pair of first and second position regulating surfaces formed in different positions along the optical axis, while sandwiching one end of said optical device, said first and second position regulating surfaces controlling an inclination position of said optical device in two steps, and the second regulating member having a large shift range has a pair of third and fourth position regulating surfaces formed in different positions along the optical axis, while sandwiching the other end of said optical device, and a fifth position regulating surface formed between the third and fourth position regulating surfaces, said third, fourth and fifth position regulating surfaces controlling an inclination position of said optical device in three steps, thereby enabling said plurality of regulating members to control an inclination position of said optical device in six steps in total.

According to an aspect of the present invention, a ratio of a shift range of the first regulating member having a small shift range to a shift range of the second regulating member having a large shift range has 1:4 relationship.

According to an aspect of the present invention, said optical device is a plane parallel plate oriented in horizontal direction for performing pixel-shifting in horizontal direction of the image sensing surface.

According to an aspect of the present invention, said optical device is a plane parallel plate oriented in vertical direction for performing pixel-shifting in vertical direction of the image sensing surface.

The above-described problem can also be solved by an optical apparatus comprising: an optical device for shifting an incident position of light incident upon an image sensing surface; a regulating member for controlling an inclination position of said optical device by abutting against an end of said optical device and regulating a position of the end in an optical axis direction; and shifting means for shifting said optical device in order to have said optical device abut against the regulating member, wherein said shifting means comprises: first driving means for reciprocally driving an end of said optical device in the optical axis direction; and second driving means for driving the other end of said optical device in a direction substantially perpendicular to the optical axis direction, and said regulating member comprises: a first position regulating surface for regulating a shift position of the end of said optical device by abutting against the end, when the end is driven by said first driving means in the optical axis direction; and a second position regulating surface for regulating a position of the end of said optical device with respect to the optical direction by abutting against the end, when the end is driven by said second driving means in a direction perpendicular to the optical axis direction.

According to an aspect of the present invention, said regulating member has a recess into which an end of said optical device can be inserted with a play, said first position regulating surface being formed on an inner surface of the recess and said second position regulating surface being formed on a bottom surface of the recess.

According to an aspect of the present invention, said second position regulating surface is a recess groove which regulates shifting the end of said optical device in the optical axis direction by latching the end of said optical device.

According to an aspect of the present invention, said regulating member is provided at both end sides of said optical device, and a shift range at one end side of said optical device with respect to the optical axis direction is different from a shift range at the other end side of said optical device with respect to the optical axis direction.

According to an aspect of the present invention, a pair of said first position regulating surface is formed in two positions having different optical axis directions, while sandwiching an end of said optical device; said second position regulating surface is formed between the pair of first position regulating surfaces provided in two positions; and an inclination position of said optical device can be controlled in three steps by determining a regulating surface to which the end of said optical device abuts.

According to an aspect of the present invention, said regulating member comprises: a regulating surface formed at one end of said optical device; and a pair of said first regulating surfaces, formed at the other end of said optical device, and formed at two different positions having different optical axis directions at the other end, wherein said regulating member can set an inclination position of said optical device in two steps, enabling these regulating surfaces to control an inclination position of said optical device in six steps.

According to an aspect of the present invention, the shift range of said optical device with respect to the optical axis direction at one end side and the shift range of said optical device with respect to the optical axis direction at the other end side are set at 1:4 relationship.

According to an aspect of the present invention, said optical device is a plane parallel plate provided on an optical path of the image sensing means, and shifts an incident position of light incident upon the image sensing surface by utilizing said regulating member to control an inclination angle of said plane parallel plate with respect to the optical axis.

According to an aspect of the present invention, both ends of said optical device respectively include engaging portions, each of which contacts the respective position regulating surfaces by a line or point. The engaging portion abuts against the regulating surface.

According to an aspect of the present invention, the engaging portion is a cylindrical member linearly contacting the regulating surface.

According to an aspect of the present invention, said driving means comprises a plurality of electromagnets provided for each of the regulating surfaces, and an inclination position of said optical device is changed by controlling turning on/off each of the electromagnets and determining a regulating surface to which said optical device abuts.

According to an aspect of the present invention, said optical device comprises: a vertical optical device for shifting an incident position of light incident upon the image sensing surface in the vertical direction on the image sensing surface; and a horizontal optical device for shifting an incident position of light incident upon the image sensing surface in the horizontal direction on the image sensing surface.

The above-described problem can also be solved by an optical apparatus comprising: a horizontally shifting optical device for shifting an incident position of light incident upon an image sensing surface in horizontal direction of the image sensing surface; a vertically shifting optical device for shifting an incident position of light incident upon an image sensing surface in vertical direction of the image sensing surface; a plurality of regulating members, abutting against each of a plurality of ends of said horizontally shifting optical device and vertically shifting optical device, for regulating a position of each of the ends in respective optical axis directions, thereby controlling an inclination position of said optical device; and driving means for driving said horizontally shifting optical device and said vertically shifting optical device so that said horizontally shifting optical device and vertically shifting optical device abut against said plurality of regulating members, wherein said plurality of regulating members regulate an inclination position of said horizontally shifting optical device in six steps in the horizontal direction, and regulate an inclination position of said vertically shifting optical device in three steps in the vertical direction.

According to the optical apparatus having the above construction, by having a simple positioning mechanism where the optical device is merely abutted against regulating surfaces which regulate inclination positions of the optical device in the optical-axis direction, it is possible to attain various inclination positions, obtain a high-quality image, and change direction and distance of pixel-shifting in various manner.

According to an aspect of the present invention, by changing an inclination of each of said optical devices, said regulating members shift an incident position of light incident upon the image sensing surface at ⅔ pixel pitch, 1 pixel pitch being equivalent to a pixel pitch of the image sensing surface.

According to an aspect of the present invention, the optical apparatus further comprises: image sensing means for photoelectrically converting an image formed on the image sensing surface into an image signal; a memory for storing image signals, obtained when the image signal outputted by said image sensing means is sensed at each of eighteen steps of regulated pixel shifting positions determined by a combination of the six steps of regulated inclination positions of said optical device with respect to the horizontal direction and the three steps of regulated inclination positions of said optical device with respect to the vertical direction; and control means for combining respective image signals stored in said memory and outputting a high-quality image signal.

According to an aspect of the present invention, each of said horizontally shifting optical device and said vertically shifting optical device is a plane parallel plate provided on an optical path of the image sensing means, and shifts an incident position of light incident upon the image sensing surface by utilizing said regulating member to control an inclination angle of said plane parallel plate with respect to the optical axis.

According to an aspect of the present invention, both ends of each of said horizontally shifting optical device and vertically shifting optical device, abutting against the plurality of regulating members, respectively include engaging portions respectively contacting the plurality of regulating members by a line or point.

According to an aspect of the present invention, each of said plurality of regulating members comprises a plurality of regulating surfaces; said driving means comprises a plurality of electromagnets provided for each of the plurality of regulating members; and an inclination position of said optical device is changed by controlling turning on/off each of the electromagnets and determining a regulating surface to which said optical device abuts.

In order to attain the above problems, the present invention provides an optical apparatus comprising: an optical device for shifting an incident position of light incident upon an image sensing surface; a plurality of regulating members, abutting against said optical device, for regulating a position with respect to the optical axis direction, thereby controlling an inclination position of said optical device with respect to an optical axis direction; and driving means for driving said optical device to regulate said optical device at a position of said regulating members, said plurality of regulating members comprising: first and second regulating members for positioning said optical device by engaging with said optical device in the optical axis direction; and a third regulating member, situated between the first and second regulating members, for positioning said optical device by engaging with said optical device in a direction substantially perpendicular to said optical axis direction, wherein said optical device is regulated in the optical axis direction at least in three inclination positions.

According to the optical apparatus having the above construction, an engaging portion which contacts with the regulating surfaces by point or line is provided on both ends of the optical device abutting against the regulating surfaces. By virtue of this, even if the engaging position on the regulating surface within the engaging portion of the optical device changes, causing position deviation on the plane parallel to the image sensing surface, the inclination angle of the plate can be kept constant. As a result, the amount of pixel-shifting is kept uninfluenced.

Moreover, driving means is constructed by a plurality of electromagnets which drive the plate forward or backward with respect to the optical-axis direction, and the regulating surface against which the optical device abuts is changed by controlling the turning ON/OFF the electromagnets. By virtue of this, pixel-shifting is realized at high speed and high precision with a simple structure.

According to an aspect of the present invention, the third regulating member equally divides an inclination angle of said optical device, between an inclination position formed by the first regulating member and an inclination position formed by the second regulating member.

According to an aspect of the present invention, each of said plurality of regulating members has a recess into which an end of said optical device is inserted with a play, and the first and second regulating members are formed on an inner surface of the recess, and the third regulating member is formed on a bottom surface of the recess.

According to an aspect of the present invention, said driving means comprises an electromagnet provided for each of the regulating members, and an armature, serving as a magnetic engaging portion which can be pulled by the electromagnet, is provided in the optical device side.

According to an aspect of the present invention, said optical apparatus is incorporated as a unit.

According to an aspect of the present invention, said optical device is a plane parallel plate provided on an optical path of the image sensing means, and shifts an incident position of light incident upon the image sensing surface by utilizing said regulating member to control an inclination angle of said plane parallel plate with respect to the optical axis.

According to an aspect of the present invention, both ends of said optical device respectively include engaging portions each contacting the regulating surface by a line or point. The engaging portion abuts against the regulating surface.

According to an aspect of the present invention, said driving means comprises a plurality of electromagnets provided for each of the regulating surfaces, and an inclination position of said optical device is changed by controlling turning on/off each of the electromagnets and determining a regulating surface to which said optical device abuts.

According to an aspect of the present invention, said driving means comprises an electromagnet provided for each of the regulating members, and an armature, serving as a magnetic engaging portion which can be pulled by the electromagnet, is provided in the optical device side.

Using electromagnets to shift the optical device consumes a large amount of current. Therefore, the present invention proposes an optical apparatus which consumes a small amount of current. For this purpose, the present invention provides an optical apparatus comprising: image sensing means for photoelectrically converting an optical image formed on an image sensing surface and outputting a sensed image signal; an optical device for shifting an incident position of light incident upon the image sensing surface; a plurality of regulating members, provided on both ends of said optical device opposite to each other, for regulating a position of each of the ends in an optical axis direction, thereby controlling an inclination angle of said optical device in a first direction with respect to an optical axis of said optical device and an inclination angle of said optical device in a second direction which is perpendicular to the first direction; a plurality of electromagnetic driving means for driving said optical device to have said optical device abut against said plurality of regulating members; and control means for shifting in vertical direction of the image sensing surface an incident position of light by operating said electromagnetic driving means to change an inclination angle of said optical device with respect to the first direction, and shifting in horizontal direction of the image sensing surface an incident position of light by operating said electromagnetic driving means to change an inclination angle of said optical device with respect to the second direction, wherein said control means controls said electromagnetic driving means such that said electromagnetic means generates one magnetic circuit in each of the ends of said optical device, and that regulating surfaces to which the ends abut respectively are determined by the magnetic circuit.

By virtue of forming only one magnetic circuit at each end of the optical device, magnetic lines of force do not cancel each other at each end, achieving operation efficiency. Thus, electrical consumption is reduced.

According to an aspect of the present invention, said optical device is a plane parallel plate provided on an optical path of the image sensing means, and shifts an incident position of light incident upon the image sensing surface by utilizing said regulating member to control an inclination angle of said plane parallel plate with respect to the optical axis.

According to an aspect of the present invention, regulating surfaces for each end of said optical device are formed at back and forth positions in the optical axis direction with respect to the end of said optical device, and said optical device is controlled in a plurality of inclination angles by changing combinations of the regulating surfaces to which the ends of said optical device abut.

According to an aspect of the present invention, a shift range with respect to the optical axis direction at one end of said optical device and a shift range with respect to the optical axis direction at the other end of said optical device have 1:1 relationship so that the inclination angle of said optical device can be equally divided between a maximum inclination position and a minimum inclination position.

According to an aspect of the present invention, the both ends of said optical device, abutting against the regulating surfaces, respectively include engaging portions each contacting a regulating surface by a line or point.

According to an aspect of the present invention, said electromagnetic driving means comprises a plurality of electromagnets provided for each of the regulating surfaces, and an inclination position of said optical device is changed by controlling turning on/off each of the electromagnets and selecting a regulating surface to which said optical device abuts.

According to an aspect of the present invention, a plurality of said electromagnets are provided respectively in the positions having different optical axis directions at each of the ends of said optical device, and two of the electromagnets are turned on to generate one magnetic circuit at each shift position of said optical device.

According to an aspect of the present invention, each of the plurality of electromagnets comprises an electromagnetic coil and an electromagnetic yoke, and only one end of the electromagnetic yoke for an electromagnet is situated opposite to an end of said optical device.

According to an aspect of the present invention, a predetermined current direction supplied to two simultaneouslyturned-on electromagnets of said plurality of electromagnets situated opposite to one end of said optical device, is controlled such that an end of one electromagnetic yoke becomes south pole and an end of the other electromagnetic yoke becomes north pole, thereby forming one magnetic circuit by both electromagnets.

According to an aspect of the present invention, said optical device comprises: a vertically shifting optical device for shifting an incident position of light incident upon the image sensing surface mainly in the vertical direction of the image sensing surface; and a horizontally shifting optical device for shifting an incident position of light incident upon the image sensing surface mainly in the horizontal direction of the image sensing surface, wherein said vertically shifting optical device has one to three horizontal inclination positions for a predetermined vertical inclination position, and said horizontally shifting optical device has one to three vertical inclination positions for a predetermined horizontal inclination position.

According to an aspect of the present invention, said optical device comprises: a vertically shifting optical device for shifting an incident position of light incident upon the image sensing surface mainly in the vertical direction of the image sensing surface; and a horizontally shifting optical device for shifting an incident position of light incident upon the image sensing surface mainly in the horizontal direction of the image sensing surface, wherein said vertically shifting optical device has one to three horizontal inclination positions for a predetermined vertical inclination position, and said horizontally shifting optical device has one to three vertical inclination positions for a predetermined horizontal inclination position.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A to 3C are explanatory views showing a structure and operation of the main portion of the pixel-shifting system according to the first embodiment;

FIG. 12 is an explanatory view for explaining pixel-shifting operation in the horizontal direction performed by the pixel-shifting system according to the first embodiment;

FIGS. 13A and 13B are explanatory views for explaining pixel-shifting operation performed by the pixel-shifting system according to the first embodiment;

FIGS. 20A and 20B are explanatory views for explaining pixel-shifting operation performed by the pixel-shifting system according to the second embodiment;

FIGS. 31A and 31B are examples of pixel-shifting operation performed by the system according to the second embodiment, for explaining pixel data capturing operation on an image sensing surface;

FIG. 32 is a time table showing pixel data capturing operation in an example of the pixel-shifting operation performed by the system according to the second embodiment;

FIG. 38 is a perspective view for explaining a structure and operation principle of a pixel-shifting system according to a fourth embodiment of the present invention;

FIGS. 39A to 39C are explanatory views for explaining an example of a structure and operation of the pixel-shifting system according to the fourth embodiment;

FIGS. 40A and 40B are explanatory views for explaining an example of a structure and operation of the pixel-system according to the fourth embodiment;

FIGS. 51A and 51B are explanatory views for explaining an example of pixel-shifting operation performed by the system according to the fourth embodiment;

FIGS. 61A and 61B are explanatory views of pixel-shifting operation performed by the system according to the fourth embodiment, for explaining pixel data capturing operation on an image sensing surface;

FIG. 62 is a time table showing pixel data capturing operation in pixel-shifting operation performed by the system according to the fourth embodiment;

FIGS. 68A and 68B are explanatory views for explaining an example of pixel-shifting operation in the vertical direction performed by the pixel-shifting system according to the fifth embodiment;

DETAILED DESCRIPTION OF THE PREFERRED EMBODIMENTS

Preferred embodiments of the present invention will be described in detail in accordance with the accompanying drawings.

Principle of Pixel-Shifting

First described is an operation principle of so-called "pixel-shifting" which enables to sense a high-quality image by shifting, in unit of a pixel, a light-incident position on the image sensing surface of an image sensing device.

Figure 1A:
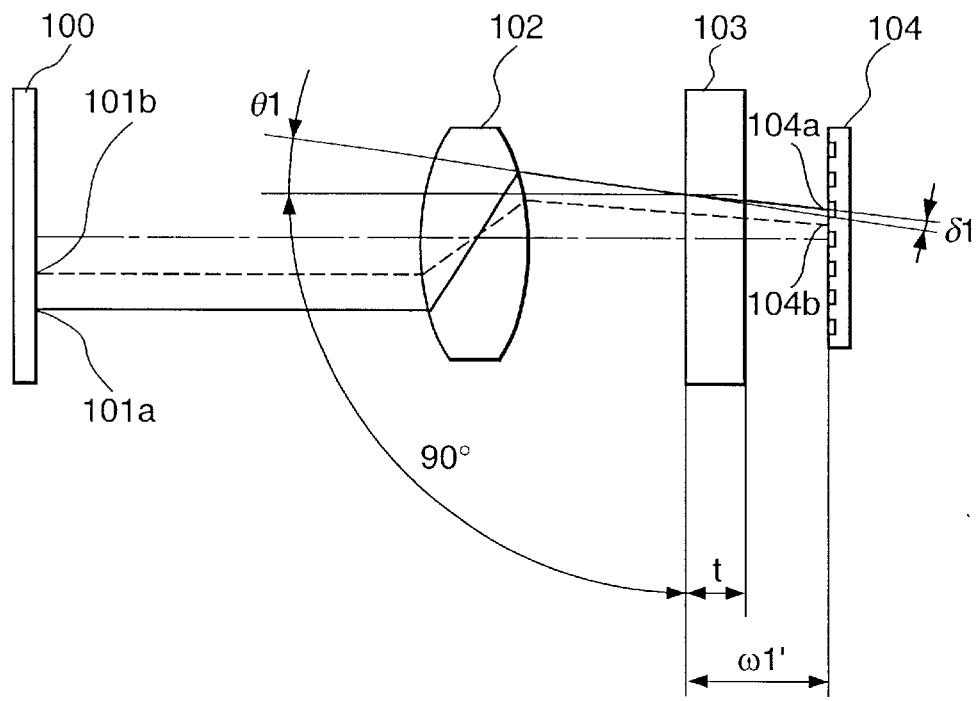
FIGS. 1A and 1B are explanatory views for explaining the principle of pixel-shifting applied to an image sensing apparatus according to the present embodiment.

The principle of shifting an optical path by making use of refraction of light in a light-transmitting plane-parallel-plate glass is described below with reference to FIGS. 1A and 1B. FIG. 1A shows the state before shifting the optical path; and FIG. 1B shows the state after shifting the optical path.

Figure 1B:
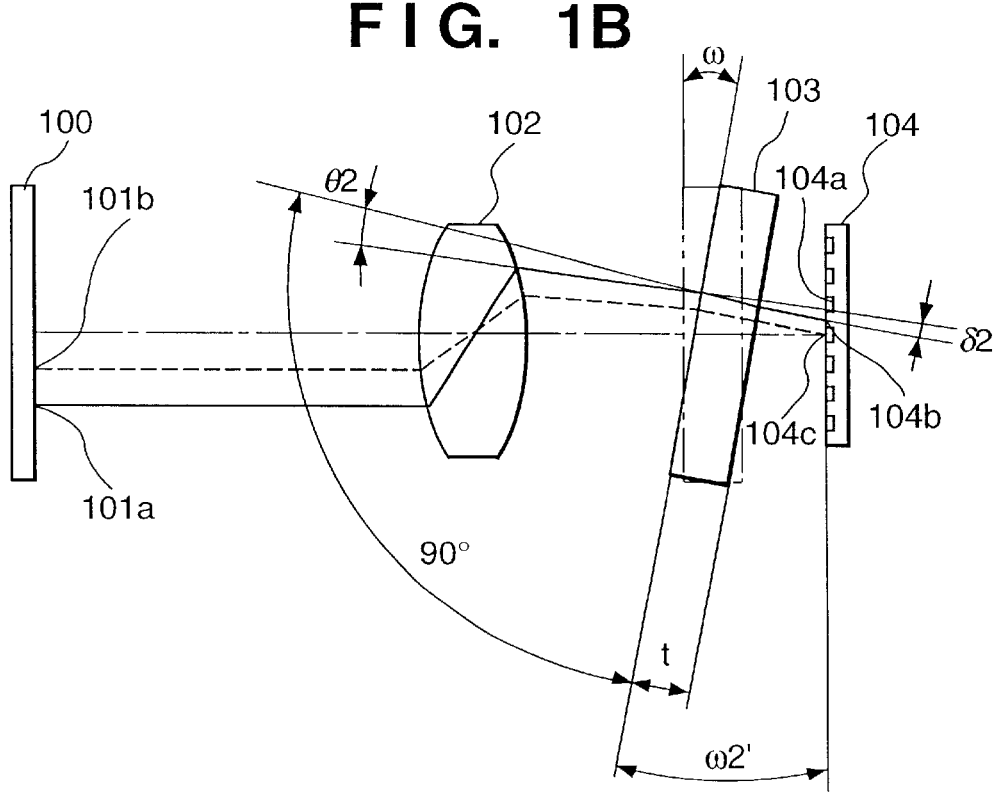

Referring to FIGS. 1A and 1B, reference numeral 100 denotes an object to be sensed, e.g., an original document or the like; 102, image sensing lenses; 103, an optical device serving as light flux moving means, consisting of a parallel-plate-like light-transmitting material having a uniform refractive index; and 104, an image sensing device, such as a CCD or the like, serving as image sensing means for photoelectrically converting incident light from the object 100 formed by the lenses 102 and outputting sensed image signals.

In FIG. 1A, light from one point 101a of the object 100 is transmitted through the lenses 102 and optical device 103, and incident upon the photoreceptive portion 104a of the image sensing device 104, where the light is photoelectrically converted as valid data.

Meanwhile, light from another point 101b of the object 100 is transmitted through the lenses 102 and optical device 103, and incident upon a light-insensitive zone 104b. As a result, the light is not photoelectrically converted, thus becomes invalid data.

Herein, defining that a deviated shift amount of light, generated between the direction of light incident on the optical device 103 and the refraction direction of the light exiting from the optical device 103, is $\delta_1$; an angle formed between the incident light and the normal of the incident surface of the optical device 103 is $\theta_1$; thickness of the optical device 103 is t; and a refractive index of the optical device 103 is N, the following equation holds:

$$\delta_1 = \left(1 - \frac{1}{N}\right) \infty t \infty \theta_1 \tag{1}$$

An angle made by the image-sensing surface of the image sensing device and the plate at this stage is defined as $\omega_1$ for the descriptive convenience.

FIG. 1B shows the state where the angle of the optical device 103 is changed by an angle of $\omega=(\omega_2-\omega_1)$.

In FIG. 1B, defining that a deviated shift amount of light, generated between the direction of light incident on the optical device 103 and the refraction direction of the light exiting from the optical device 103, is $\delta_2$ an angle formed between the incident light and the normal of the incident surface of the optical device 103 is $\theta_2$; thickness of the optical device 103 is t; and a refractive index of the optical device 103 is N, the following equation holds:

$$\delta_2 = \left(1 - \frac{1}{N}\right) \infty t \infty \theta_2 \tag{2}$$

Herein, when the state changes from FIG. 1A to FIG. 1B, deviation $\delta$ of the optical path exiting to the image sensing device 104 is:

$$\delta = \delta_1 + \delta_2$$

$$= \left(1 - \frac{1}{N}\right) \infty t \infty (\theta_1 + \theta_2)$$

$$= \left(1 - \frac{1}{N}\right) \infty t \infty (\omega_2 - \omega_1)$$

Thus, the following equation holds:

$$\delta = \left(1 - \frac{1}{N}\right) \infty t \infty \omega$$

Herein, the light data from the one point 101b of the object 1 subjected to image sensing, which previously was incident upon the light-insensitive zone 104b of the image sensing device 104 and become invalid data, can be utilized as valid data by changing the state of optical device to that shown in FIG. 1B where light data from the point 101b of the object 100 is now incident upon the photoreceptive portion 104c of the image sensing device 104.

The sensed data captured in the state shown in FIG. 1A and the sensed data captured in the state shown in 1B are collected in a memory and these data are combined upon correction of the phase of the data. As a result, it is possible to obtain an amount of data equivalent to twice as many pixel numbers as the unshifted data.

Making use of the above-described principle, the optical device 103 is kept in stationary state for each of the several steps of inclined angle positions, and light data received by the image sensing device 104 is captured each time. As a result, the size of image data several times larger than the actual number of image-sensing elements can be obtained.

The basic principle of "pixel-shifting" is as described above. Next, description will be provided on a case of actually realizing the above-described principle. The construction is the prerequisite for explaining the embodiment of the present invention.

First Embodiment

Image Sensing Apparatus

An image sensing apparatus according to the present embodiment comprises, between an objective lens and image sensing devices (CCD), a horizontal shift mechanism and a vertical shift mechanism respectively including plane-parallel-plate glasses for horizontally and vertically shifting the light flux, which is incident through the objective lens, onto the image sensing surface of the image sensing devices.

Figure 2:
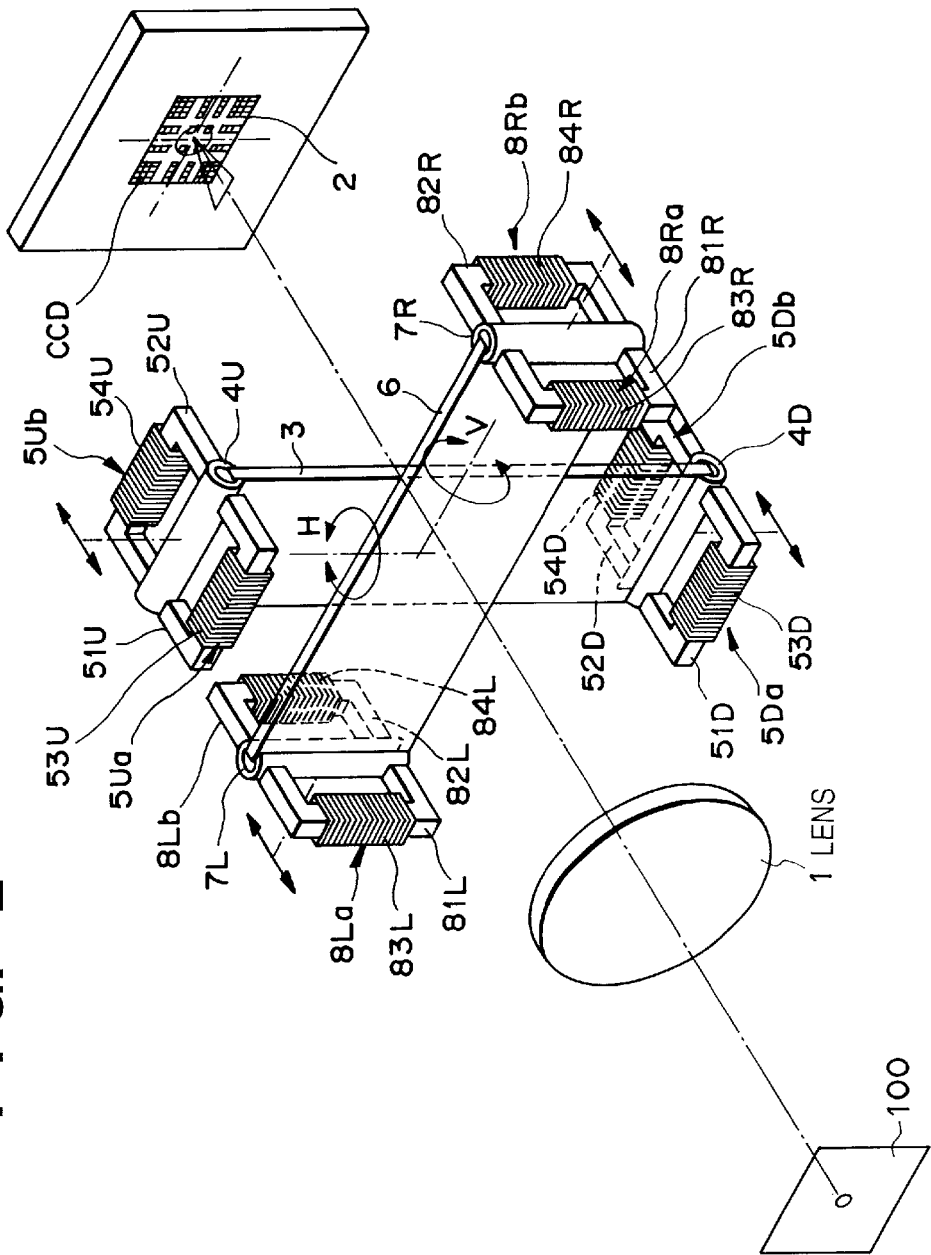
FIG. 2 is a perspective view for explaining a structure and operation of a pixel-shifting system according to a first embodiment.

FIG. 2 is a perspective view showing a perspective structure of a pixel-shifting system in an image sensing apparatus according to the first embodiment. Referring to FIG. 2, reference numeral 1 denotes an image-sensing lens unit serving as an optical system; and 2, image sensing devices serving as image sensing means, e.g., CCD or the like. Reference numeral 3 denotes a light-transmitting plane parallel plate formed with a glass (or may be formed with plastic), serving as a (vertical) optical device which shifts, in the vertical direction on the image-sensing surfaces of the image sensing devices 2, light flux incident through the objective lens unit 1. At both ends of the plate 3, armatures 4U and 4D made of soft electromagnetic iron are provided as engaging portions. Electromagnets 5Ua, 5Ub, 5Da and 5Db, serving as driving means for driving the optical device, are provided at front and back of each of the armatures 4U and 4D in the optical axis direction. By controlling the driving state of these electromagnets, the inclination of the plate 3 is controlled. By rotating the plate 3 in the direction indicated by arrow V, it is possible to vertically shift the incident position of the light flux on the image-sensing surface.

Note that the electromagnet 5Ua comprises yoke 51U and coil 53U, while the electromagnet 5Ub comprises yoke 52U and coil 54U. Controlling the electric current, supplied to the coil of these electromagnets, realizes (electromagnetic) driving means which shifts the upper-end armature 4U of the plate 3 in the forward or backward direction along the main optical axis.

The electromagnet 5Da comprises yoke 51D and coil 53D, while the electromagnet 5Db comprises yoke 52D and coil 54D. Controlling electric current, supplied to the coil of these electromagnets, realizes electromagnetic driving means which shifts the lower-end armature 4D of the plate 3 in the forward or backward direction.

Controlling ON/OFF of the electromagnets 5Ua, 5Ub, 5Da and 5Db shifts the top and bottom portions of the plate 3 forward or backward in the direction of the optical axis, and changes the inclination angle of the plate 3. As a result, it is possible to shift, in the vertical direction (top and bottom) with respect to the optical axis, the incident position of light which is transmitted through the plate 3 and incident upon the image sensing surface of the image sensing device, in accordance with the inclination angle of the plate 3.

Meanwhile, reference numeral 6 denotes a plane-parallel-plate glass for shifting light flux incident through the objective lens unit 1, in the horizontal direction on the image-sensing surface. At both ends of the plate 6, armatures 7L and 7R made of soft electromagnetic iron are provided respectively. Electromagnets 8La, 8Lb, 8Ra and 8Rb are provided at front and back of each of the armatures 7L and 7R in the optical axis direction. By controlling the driving state of these electromagnets, the inclination of the plate 6 is controlled. By rotating the plate 6 in the direction indicated by arrow H, it is possible to horizontally shift the incident position of light flux on the image-sensing surface.

Note that the electromagnet 8La comprises yoke 81L and coil 83L, while the electromagnet 8Lb comprises yoke 82L and coil 84L. Controlling the electric current, supplied to the coil of these electromagnets, realizes electromagnetic driving means which shifts the left-end armature 7L of the plate 6 in the forward or backward direction.

The electromagnet 8Ra comprises yoke 81R and coil 83R, while the electromagnet 8Rb comprises yoke 82R and coil 84R. Controlling the electric current, supplied to the coil of these electromagnets, realizes electromagnetic driving means which shifts the right-end armature 7R of the plate 6 in the forward or backward direction.

Controlling ON/OFF of the electromagnets 8La, 8Lb, 8Ra and 8Rb shifts the left and right portions of the plate 6 forward or backward in the direction of the optical axis and changes the inclination angle of the plate 6. As a result, it is possible to shift, in the horizontal direction (left and right) with respect to the optical axis, the incident position of light which is transmitted through the plate 6 and incident upon the image sensing surface of the image sensing device, in accordance with the inclination angle of the plate 6.

As described above, the two plates 3 and 6 provided in the vertical and horizontal directions are inclined respectively in the top-and-bottom direction and left-and-right direction in a space between the objective lens 1 and image sensing devices 2, and the incident position of light flux transmitted through the objective lens and incident upon the image-sensing surface is shifted in the vertical and horizontal directions at a pitch smaller than a pixel space of the image sensing device. As a result, it is possible to sense an image between the pixels of the image sensing device. Accordingly, it is possible to sense a high quality image which is equivalent to an image sensed by an image sensing device having a larger number of pixels than the actual number of pixels.

Hereinafter, the detailed arrangement and operation of the pixel-shifting system according to the first embodiment will be described with reference to FIGS. 3 to 7.

FIGS. 3A to 3C are views showing an arrangement of the plate 3 which performs pixel-shifting in the vertical direction.

The pixel-shifting system is provided between the objective lens unit 1 and image sensing device 2. Thus, taking a camera as an example, the system is provided inside the lens unit or camera main body.

FIGS. 3A and 3B show respectively, the plate 3 seen from the front, i.e., the direction of incident light, and the plate 3 seen from the right side. As shown in FIG. 3A, the plate 3 is positioned in front of the image sensing surface of the image sensing device 2, and has a size large enough to cover the entire image sensing surface.

Moreover, the plate 3 is constructed such that the armatures 4U and 4D provided at the top and bottom of the plate 3 are formed respectively on the side of the lens unit or the body of the camera main body.

Referring to FIG. 3B, the plate 3 is held such that the soft electromagnetic iron provided in both ends of the plate are inserted with a play in recesses 91U and 91D of the main body. In other words, it is held in the recess with a predetermined clearance in its front, back, top and bottom directions.

The recesses 91U and 91D have the length substantially the same as the width of the plate 3 in the direction vertical to the paper surface. The armatures 4U and 4D made of soft electromagnetic iron provided on both ends of the plate 3 have a cylindrical shape, formed along the internal surfaces 92U, 93U, 92D and 93D of the recess. When the armatures 4U and 4D abut against the regulating surface of recess, the armatures linearly contact the regulating surface. By virtue of the foregoing configuration, it is possible to regulate an inclination of plate 3 around a vertical axis perpendicular to a horizontal plane. Note that, to attain the same effect as that obtained by the linear contact realized by the cylindrical shape, a plurality of point contact portions may be formed on the linear contact line.

These recesses 91U and 91D serve as a regulating portion for positioning the optical device 3. The surface which abuts against the armature 4, serving as an engaging portion of the plate 3 which serves as an optical member, functions as a regulating surface for positioning.

The armatures 4U and 4D abut against the internal wall surfaces 92U, 93U, 92D and 93D of the respective recesses 91U and 91D in the respective optical axis directions (i.e., lateral direction in the drawing). The abutting of the armatures against the internal wall surfaces determines the inclination angle position of the plate 3 with respect to the optical axis and the position of the plate 3 in the optical-axis direction. Moreover, in accordance with the width of each of the recesses in the optical-axis direction, the amount of movement of the armatures 4U and 4D, provided on both ends of the plate 3, is determined with respect to the optical-axis direction, and as a result, the recesses are designed such that the amount of inclination of the plate or the position of the plate in the optical-axis direction are changed.

The pixel-shifting system according to the present embodiment comprises a plane parallel plate, having the above-described arrangement, also in the horizontal direction. The positional relationship thereof is shown in FIGS. 4A and 4B.

Figure 4A:
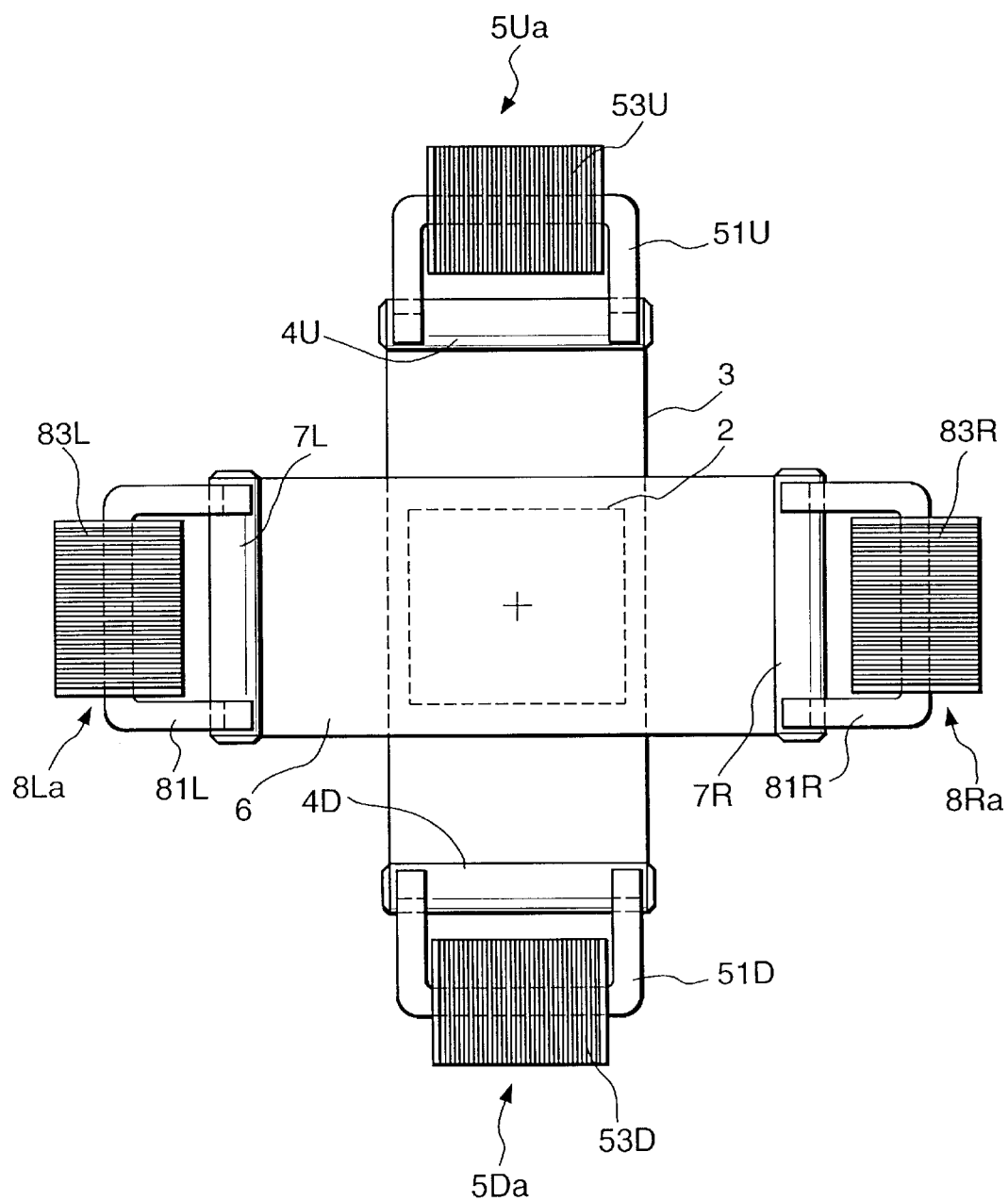
FIGS. 4A and 4B are explanatory views showing a structure and operation of the main portion of the pixel-shifting system according to the first embodiment.
Figure 4B:
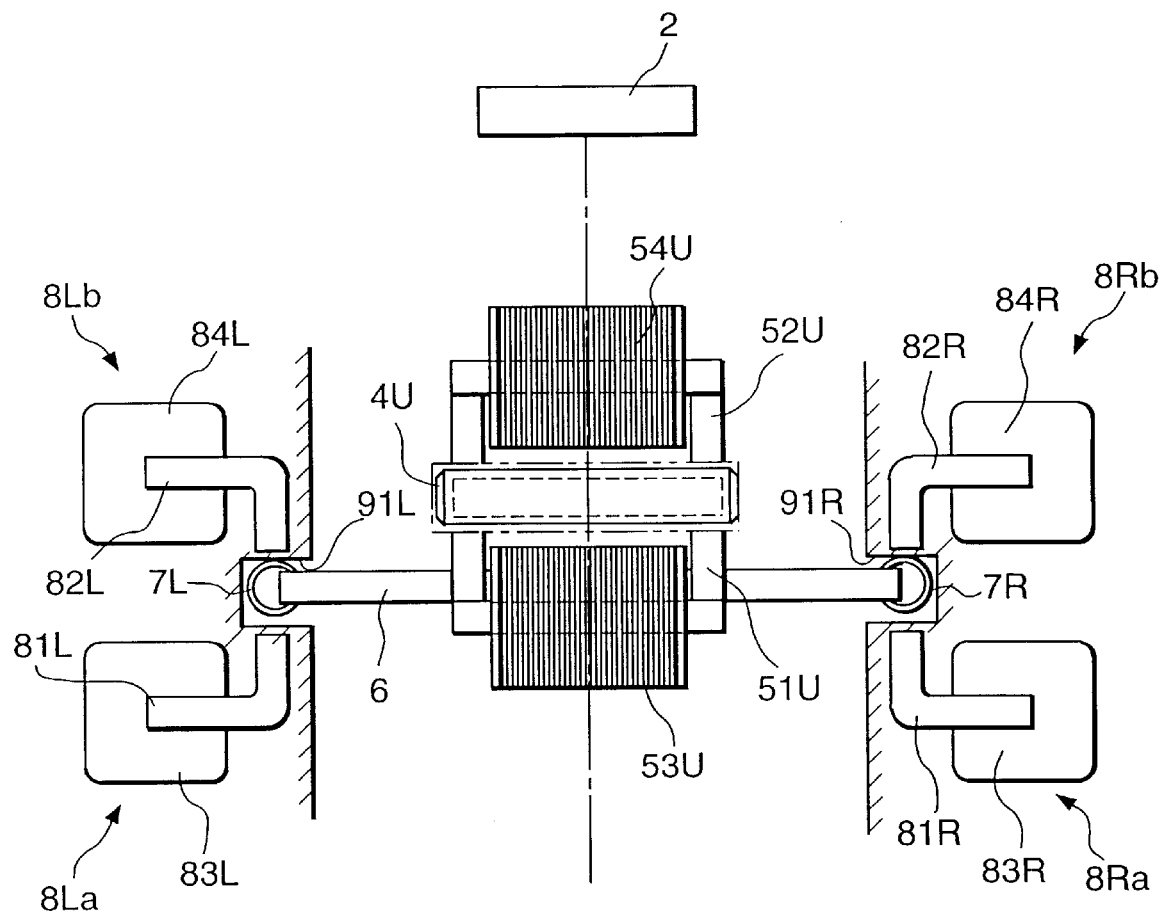

FIG. 4A is a view seen from the front (object side) of the optical axis and FIG. 4B is a top view. As can be seen from FIG. 2, the plate 6 provided in the horizontal direction and plate 3 in the vertical direction are provided with an orthogonal relation, between the image-sensing lens unit 1 and image sensing device 2.

The important characteristics in the pixel-shifting system according to the present embodiment are in that many inclined positions of the plate can be attained by regulating the inclination angle position of the plate or the position of the plate in the optical-axis direction by making use of the armatures (4U and 4D or 7L and 7R) provided on both ends and recesses (91U and 91D or 91L and 91R). Moreover, the pixel-shifting system is constructed such that electromagnets are employed as the driving source and the plates 3 and 6 are fixed merely by inserting, with a predetermined play, the armatures provided on both ends into the recesses. By virtue of this construction, during operation, position regulation is realized by the electromagnetic force of the electromagnets, and when the electromagnets are not energized, no special structure is necessary to support the plates 3 and 6. The above-described supporting structure enables to eliminate gimbals mechanism or the like having rotation axes in the horizontal and vertical directions, as provided conventionally.

Since the plates 3 and 6 are inserted in the recesses with a predetermined play, supporting mechanism such as gimbals mechanism or the like is unnecessary. Also, since electromagnetic force is directly applied as a driving source, the mechanism for transmitting driving force is unnecessary. Therefore, not only the structure is made simple, but also high speed driving and highly precise position regulation are possible.

Hereinafter, the arrangement of the pixel-shifting system and control for the plane parallel plate according to the first embodiment will be described in detail with reference to FIGS. 5 to 8.

FIGS. 5 to 8 are explanatory views for explaining the inclination angle control of the plate 3 for performing pixel-shifting in the vertical direction. The characteristic arrangement is the relative position relation of the recesses 91U and 91D and setting of the width of the recess.

FIGS. 5 to 8 show respectively the inclination angle positions of the plate 3 for gradually shifting downward the incident position of light from a point of the object, incident upon the image sensing surface of the image sensing device 2.

Figure 5:
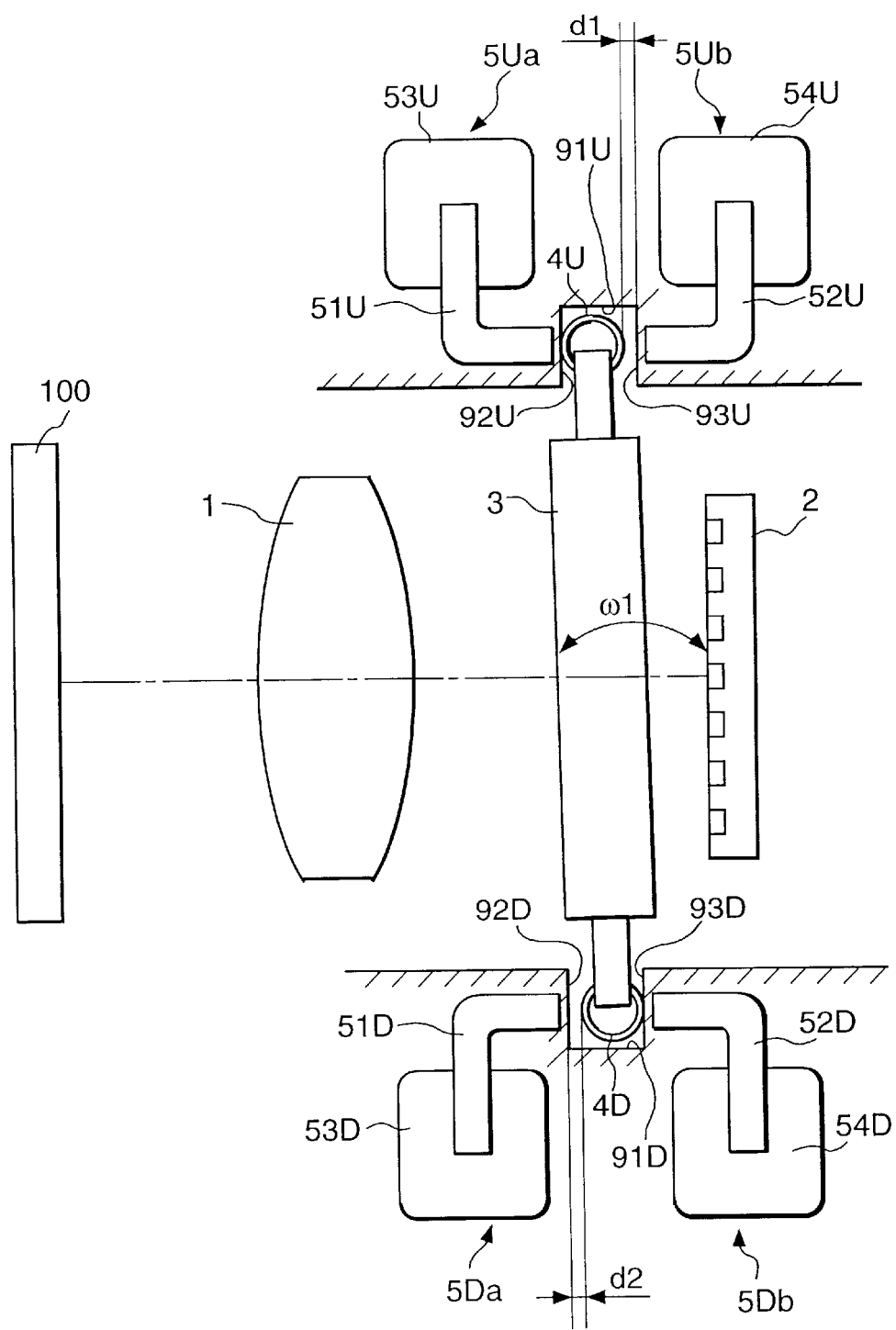
FIG. 5 is an explanatory view for explaining pixel-shifting operation in the vertical direction performed by the pixel-shifting system according to the first embodiment.

In FIG. 5, the recess 91U (where the armature 4U provided on top end of the plate 3 is inserted with a predetermined play) and the recess 91D (where the armature 4D provided on bottom end of the plate 3 is inserted with a predetermined play) have substantially the same widths, i.e., the length in the optical-axis direction, and set at substantially the same position.

In FIG. 5, the electromagnet 5Ua situated in the upper portion of the drawing is turned ON, the electromagnet 5Ub is turned OFF, the armature 4U is pulled toward the yoke 51U of the electromagnet 5Ua in the recess 91U, and is abutted against the regulating surface 92U, which is at the front (object side) of the optical-axis direction. Meanwhile, the electromagnet 5Da in the lower portion of FIG. 4 is turned OFF, the electromagnet 5Db is turned ON, the armature 4D is pulled toward the yoke 52D of the electromagnet 5Db and is abutted against the regulating surface 93D, which is at the end (image sensor side) of the optical-axis direction.

In the first embodiment, although the plate 3 is set to perform pixel-shifting in the upward direction with respect to the optical axis in the state shown in FIG. 5, the inclination states shown in FIGS. 5 to 8 are not limited to this arrangement. The pixel-shifting according to the present embodiment enables sensing an image whose light is not normally incident, in accordance with the inclination angle of the plate. Therefore, in the state shown in FIGS. 5 to 8, the plate does not need to be particularly perpendicular to the optical axis.

Herein, assuming that the clearance between the armature 4U and the width of the recess 91U, i.e., the gap between the armature 4U and the regulating surface 93U of the recess 91U is defined as $d_1$, the clearance between the armature 4D and the width of the recess 91D, i.e., the gap between the armature 4D and the regulating surface 92D of the recess 91D is defined as $d_2$, the gaps have relationship $d_2=d_1$. More specifically, the gap $d_2$ is set equal to the size of the gap $d_1$.

Further, an angle $\omega_1$ indicates an angle made by the image sensing surface of the image sensing device 2 and the plate 3. Note that the gaps $d_1$ and $d_2$ are of high precision.

In the state shown in FIG. 5, if the electromagnet 5Ua is turned OFF and the electromagnet 5Ub is turned ON and energized, the armature 4U on the upper end of the plate 3 separates from the regulating surface 92U of the upper recess 91U, and is pulled to the side of the regulating surface 93U to abut thereto and positioned. As a result, the state shown in FIG. 6 is made.

Accordingly, as the armatures 4U and 4D, provided on both ends of the plate 3, is regulated by the regulating surface 93U of the recess 91U and the regulating surface 93D of the recess 91D, the inclination angle of the plate 3 is regulated. In other words, from the state shown in FIG. 5, the plate 3 rotates by one increment in the clockwise direction so as to shift the entire plate to the right in the drawing; and as a result, the position where incident light is received on the image sensing surface of the image sensing devices 2 is shifted downward on the image sensing surface. Note that in this state, an angle made by the image sensing surface and the plate is defined as $\omega_2$.

Figure 6:
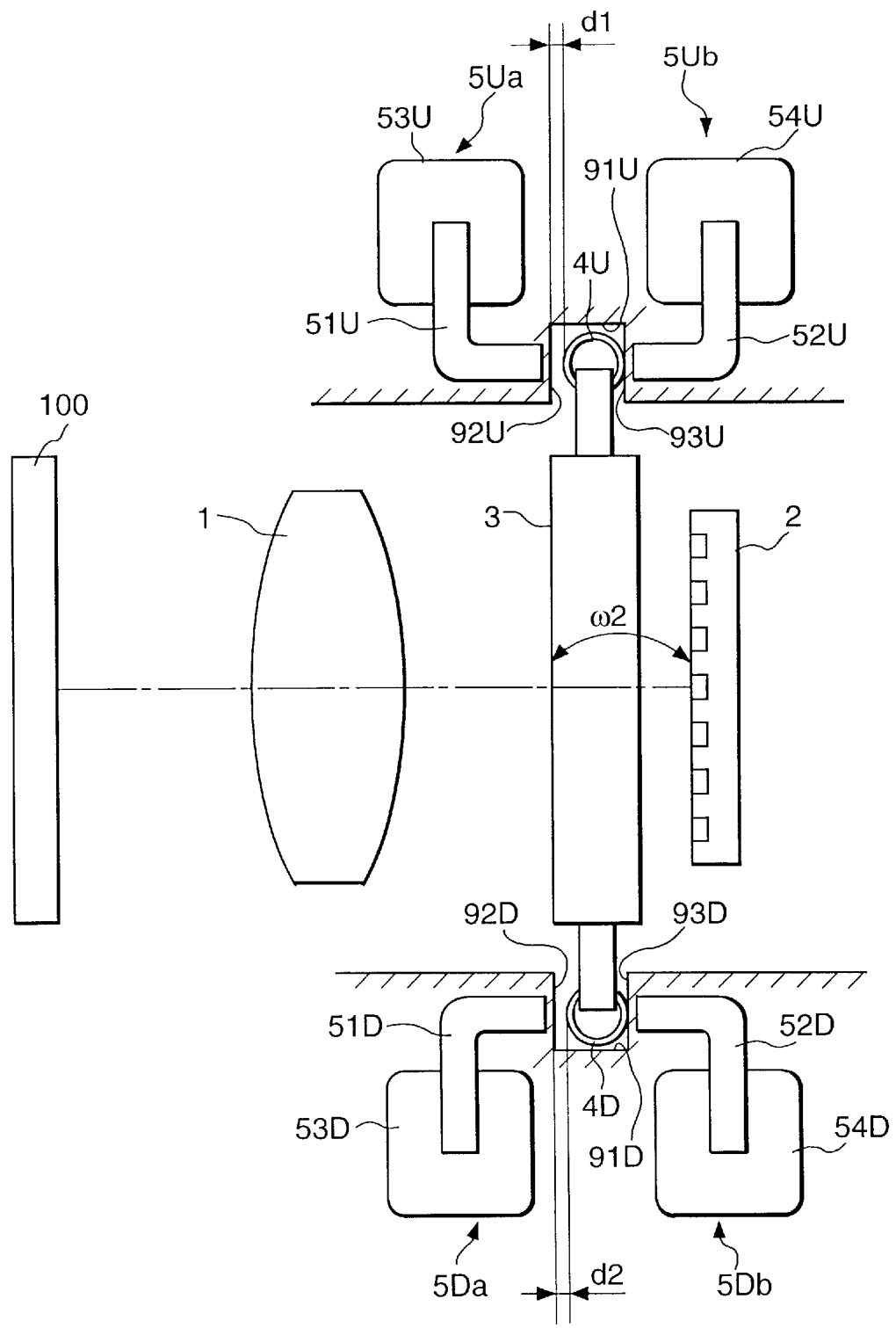
FIG. 6 is an explanatory view for explaining pixel-shifting operation in the vertical direction performed by the pixel-shifting system according to the first embodiment.

In the state shown in FIG. 6, if the electromagnet 5Ub in the upper recess 91U is turned OFF and the electromagnet 5Ua is turned ON, the armature 4U separates from the regulating surface 93U of the recess 91U, and is pulled toward the regulating surface 92U to abut thereto and positioned.

Figure 7:
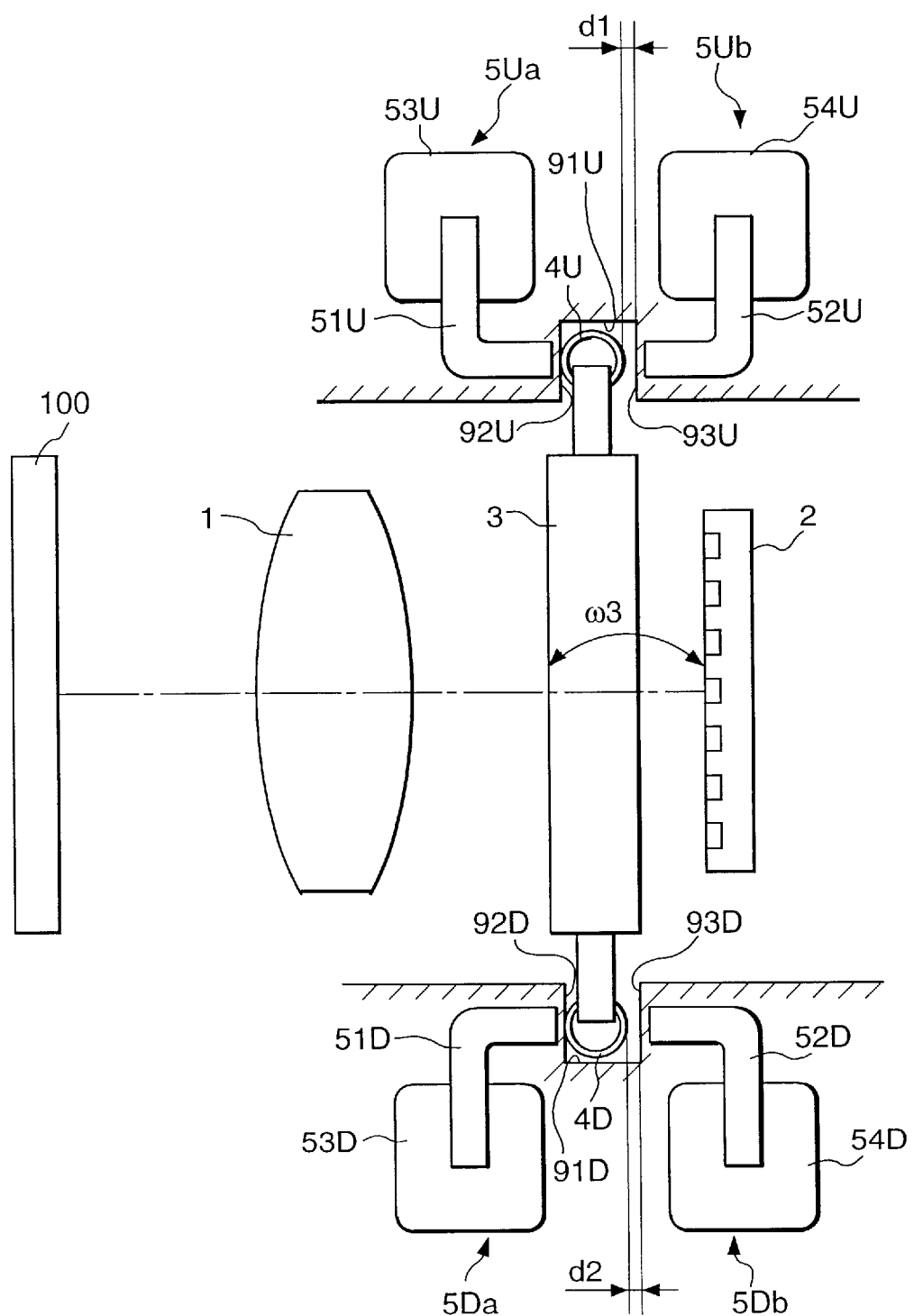
FIG. 7 is an explanatory view for explaining pixel-shifting operation in the vertical direction performed by the pixel-shifting system according to the first embodiment.

When the electromagnet 5Db in the lower recess 91D is turned OFF, and the electromagnet 5Da is turned ON, the armature 4D provided in the lower end of the plate 3 separates from the regulating surface 93D of the lower recess 91D, is pulled toward the regulating surface 92D to abut thereto and positioned. As a result, the state shown in FIG. 7 is made.

Accordingly, as the armatures 4U and 4D, provided on both ends of the plate 3, is regulated by the regulating surface 92U of the recess 91U and the regulating surface 92D of the recess 91D, the inclination angle of the plate 3 is regulated. In other words, as compared to the state shown in FIG. 6, the plate 3 shifts toward the left of the drawing in the optical-axis direction with substantially the same inclination as that of FIG. 6 (strictly speaking, the inclination differs because the armatures abut against different regulating surfaces). Therefore, the position where incident light is received on the image sensing surface of the image sensing device 2 is substantially the same as that of FIG. 6. Note that in this state, assuming that an angle made by the image sensing surface and the plate 3 is $\omega_3$, $\omega_2 \approx \omega_3$ holds. Since the effect of pixel-shifting is the same in the state shown in FIG. 6 and the state shown in FIG. 7, either state may be selected. Description of the present embodiment is continued hereinafter with the assumption that the state in FIG. 6 is selected.

Figure 8:
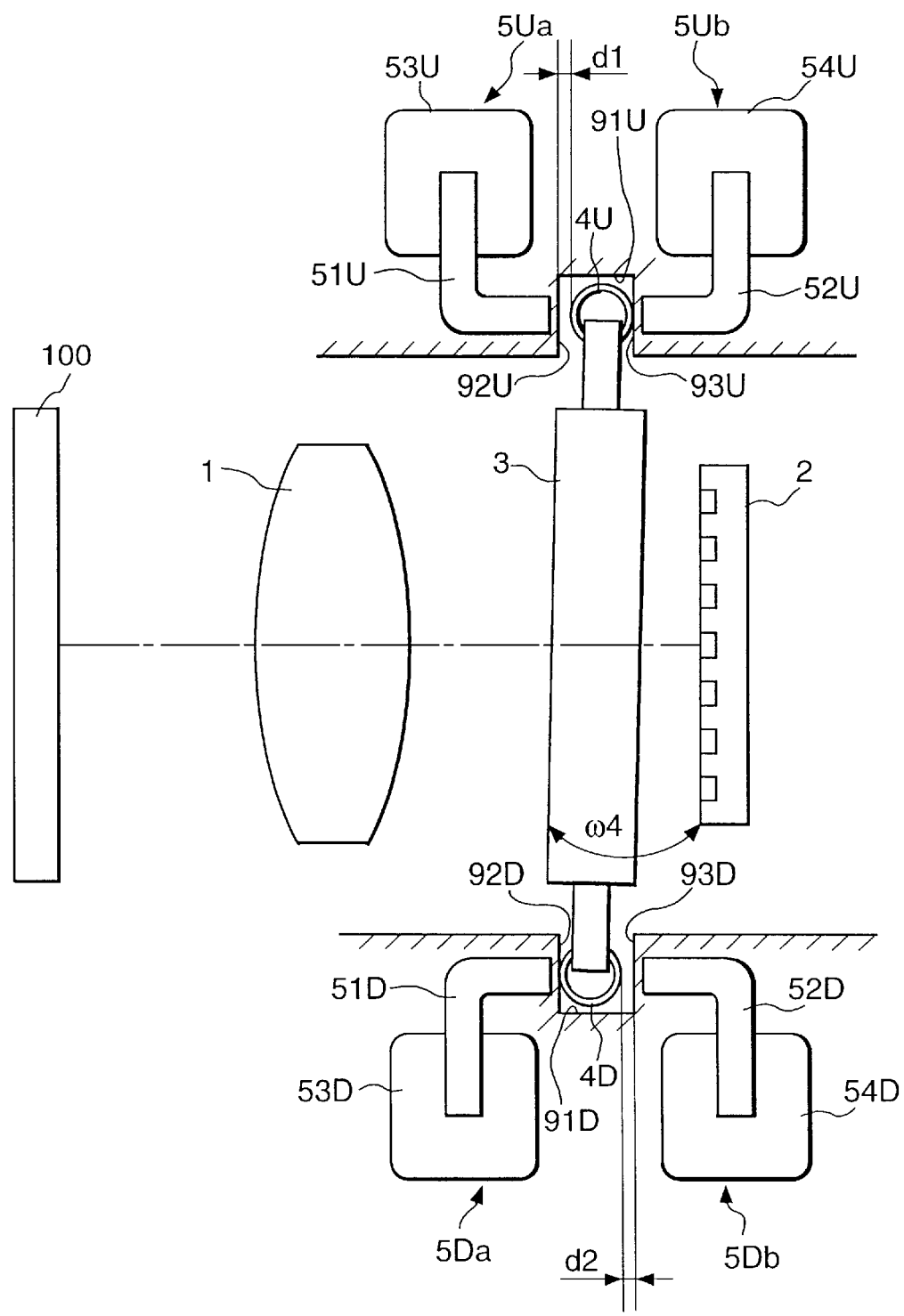
FIG. 8 is an explanatory view for explaining pixel-shifting operation in the vertical direction performed by the pixel-shifting system according to the first embodiment.

Referring to the state shown in FIG. 6, if the electromagnet 5Db is turned OFF and the electromagnet 5Da is turned ON, the armature 4D provided on the lower end of the plate 3 separates from the regulating surface 93D of the lower recess 91D, and is pulled toward the regulating surface 92D to abut thereto and positioned. Meanwhile, the armature 4U, provided on the upper end of the plate 3, is positioned on the regulating surface 93U of the recess 91U and positioned. As a result, the state shown in FIG. 8 is made.

Accordingly, from the state shown in FIG. 6, the plate 3 inclines further in the clockwise direction of the drawing, making the largest inclination angle. In this stage, the angle made by the image sensing surface and the plate is defined as $\omega_4$.

As shown in FIGS. 5 to 8, gradually changing the inclination of the plate 3 from $\omega_1$ to $\omega_4$ enables to control the inclination angles in three steps. By this, the light from the object, incident upon the image sensing surface, is shifted vertically in three steps.

Note that it is so set that angles $\omega_1$ to $\omega_4$ maintain the relationship as follows:

$$(\omega_2-\omega_1)=(\omega_4-\omega_2)=(\omega_4-\omega_3)=\text{constant}$$

This indicates that the position of incident light on the image sensing surface, changing according to the inclination of the plate 3, is shifted with an equal space on the image sensing surface.

In the first embodiment, the clearances $d_1$ and $d_2$ are set between the armatures and each surface of the recesses 91U and 91D so that the amount of shift at the first step equals to two-thirds of a pixel space of the image sensing device 2. The clearances $d_1$ and $d_2$ determine the inclination angle of the plate 3, and are changed in accordance with the pixel space of the image sensing device or the amount of shift.

As apparent from the foregoing description, the plate 3 is supported with a play, by virtue of the structure where the armatures (4U and 4D) provided on both ends of the plate 3 are inserted in the respective recesses 91U and 91D with a predetermined play. Meanwhile, the inclination angle of the plate 3 is determined by energizing the electromagnets and having the armatures abut against the regulating surfaces of the recesses. By virtue of the cylindrical shape of the armatures (4U and 4D) which abut against the regulating surfaces, the inclination angle of the plate does not change even if the abutting position of the cylindrical armatures (4U and 4D) is deviated in the longitudinal direction of the plate 3 on the regulating surface. Thus, the position of light incident upon the image sensing surface of the image sensing device does not change. This is the advantage of the cylindrical shape.

So long as the position of each of the recesses 91U and 91D in the optical-axis direction is set identical, the center of the plate 3 in the optical-axis direction does not change greatly even when the inclination angle of the plate 3 changes. Therefore, it is possible to always perform accurate pixel-shifting.

Note that by virtue of the armatures 4U and 4D having a cylindrical shape, when the armature is pulled by the electromagnetic force of the electromagnet, the armature contacts with the regulating surface by a point (in reality, line). Therefore, the plate is centered in a position determined by the armature of the electromagnet, causing substantially no position deviation.

The inclination of the plate is set such that the position of incident light upon the image sensing surface is shifted for each inclination angle by two-thirds of a pixel space of the image sensing surface, i.e., at a pitch of $\frac{2}{3}$ of a pixel. By virtue of this, it is possible to obtain a number of pixels substantially three times larger than the actual number of pixels in the vertical direction of the image sensing device.

Three images sensed by the image sensing devices 2 for each of the inclination angle positions of the plate 3, are sequentially stored in a memory. When the image data is read out of the memory, the order of reading out each pixel of the three images is controlled. As a result, a high-quality image, a combination of the three images, can be obtained.

The foregoing description explains the pixel-shifting on the image sensing surface in the vertical direction. The pixel-shifting system according to the first embodiment comprises the above-described pixel-shifting mechanism in the horizontal direction. Thus, it is possible to perform pixel-shifting in the horizontal direction and obtain a number of pixels substantially three times larger than the actual number of pixels in the image sensing device. As a result, the number of pixels nine times greater in total can be obtained.

Figure 9:
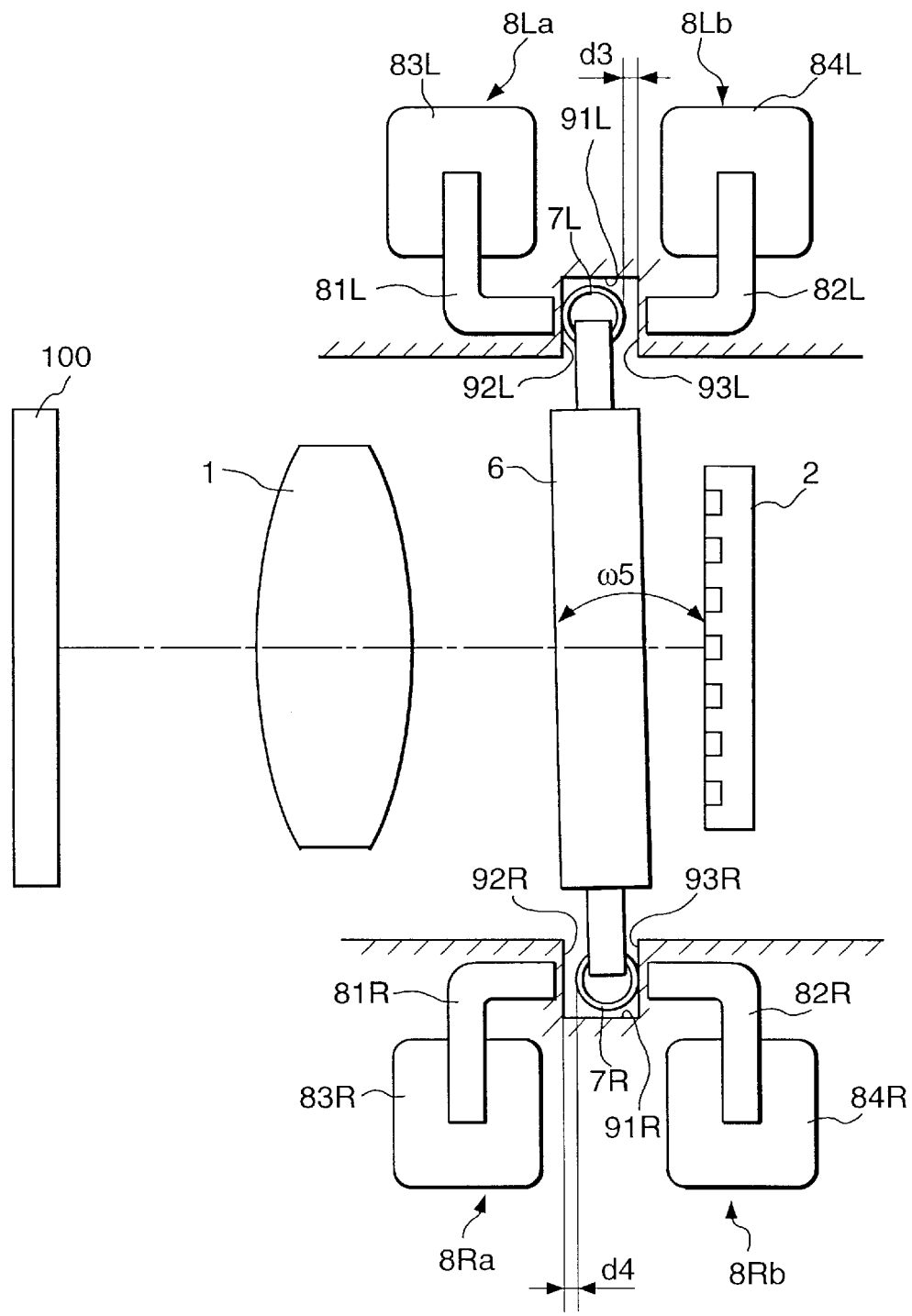
FIG. 9 is an explanatory view for explaining pixel-shifting operation in the horizontal direction performed by the pixel-shifting system according to the first embodiment.
Figure 10:
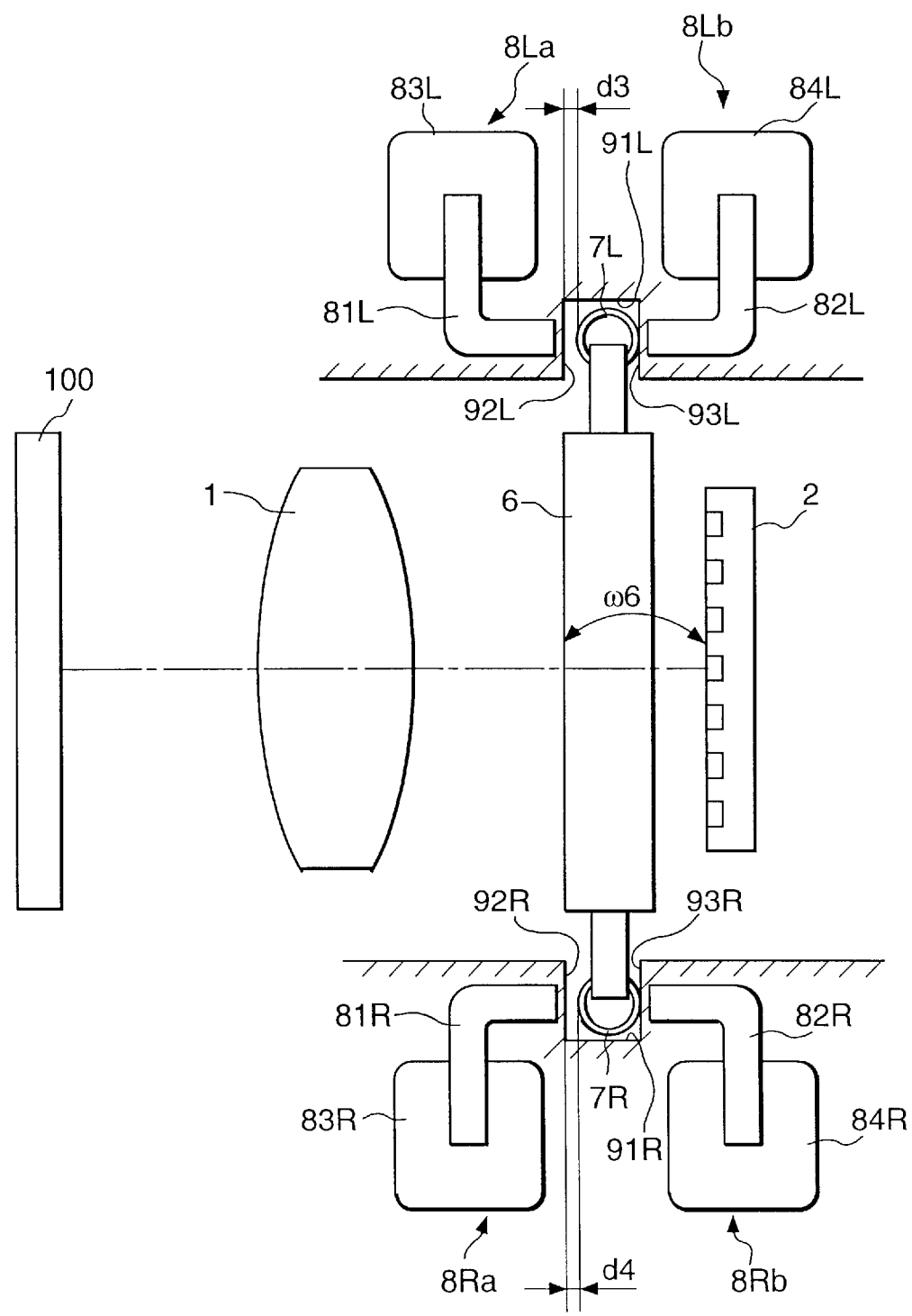
FIG. 10 is an explanatory view for explaining pixel-shifting operation in the horizontal direction performed by the pixel-shifting system according to the first embodiment.

FIGS. 9 and 10 explain pixel-shifting in the horizontal direction, performed by gradually changing the inclination angle of the plate 6 in the horizontal direction.

The construction of the pixel-shifting mechanism in the horizontal direction and its operational principle are identical to the pixel-shifting mechanism in the vertical direction shown in FIGS. 5 to 8. Therefore, details description thereof will be omitted.

The inclination angle of the plate 6 is determined by the regulating surfaces 92L, 93L, 92R and 93R of the recesses 91L and 91R where armatures 7L and 7R provided on the left and right ends of the plate 6 are inserted with a predetermined play. Assuming that the clearance between the armature 7L and the width of the recess is defined as $d_3$, and the clearance between the armature 7R and the width of the recess 91R is defined as $d_4$, the gaps have relationship $d_4 = d_3$.

As the inclination angle of the plate 6 is enlarged in each step, in the order of FIGS. 9, 10, 11 and 12, the angle made by the image sensing surface 2 and the plate 6 changes (enlarges) in steps, $\omega_5$, $\omega_6$, $\omega_7$ and $\omega_8$. By this, pixel-shifting is realized in the horizontal direction with equal space on the image sensing surface.

Note that the horizontal plate is set so that angles $\omega_5$ to $\omega_8$ maintain the relationship as follows:

$$(\omega_6 - \omega_5) = (\omega_8 - \omega_6) = (\omega_8 - \omega_7) = \text{constant}$$

In the first embodiment, the clearances $d_3$ and $d_4$ are set between the armatures and each surface of the recesses 91L and 91R so that the amount of shift at the first step equals to two-thirds of a pixel space in the horizontal direction of the image sensing device 2. The clearances $d_3$ and $d_4$ determine the inclination angle of the plate 6, and are changed in accordance with the necessary pixel space of the image sensing device or the amount of shift.

Note that in both of the above-described FIGS. 5 to 8 and FIGS. 9 to 12, the inclination angle of the plate is gradually increased. However, since an image is sensed for each of the inclination angle position, stored in a memory and combined in the later processing, the inclination angle of the plate may be changed in any order. In other words, the order of FIGS. 5 to 8 and FIGS. 9 to 12 does not have to be in the order as shown, but may be in an arbitrary order. As long as each of the electromagnets is controlled to sense three images for the vertical direction and three images for the horizontal direction, i.e., the total of nine images, the order is arbitrary.

Moreover, since the pixel-shifting mechanism in the vertical direction and pixel-shifting mechanism in the horizontal direction are provided independently, the direction and order of pixel-shifting of the control performed by both mechanisms may be arbitrary. It should be noted that the plate 3 or 6 must stand still during image sensing (during charge storing) at each position of the pixel shifting.

Figure 13A:
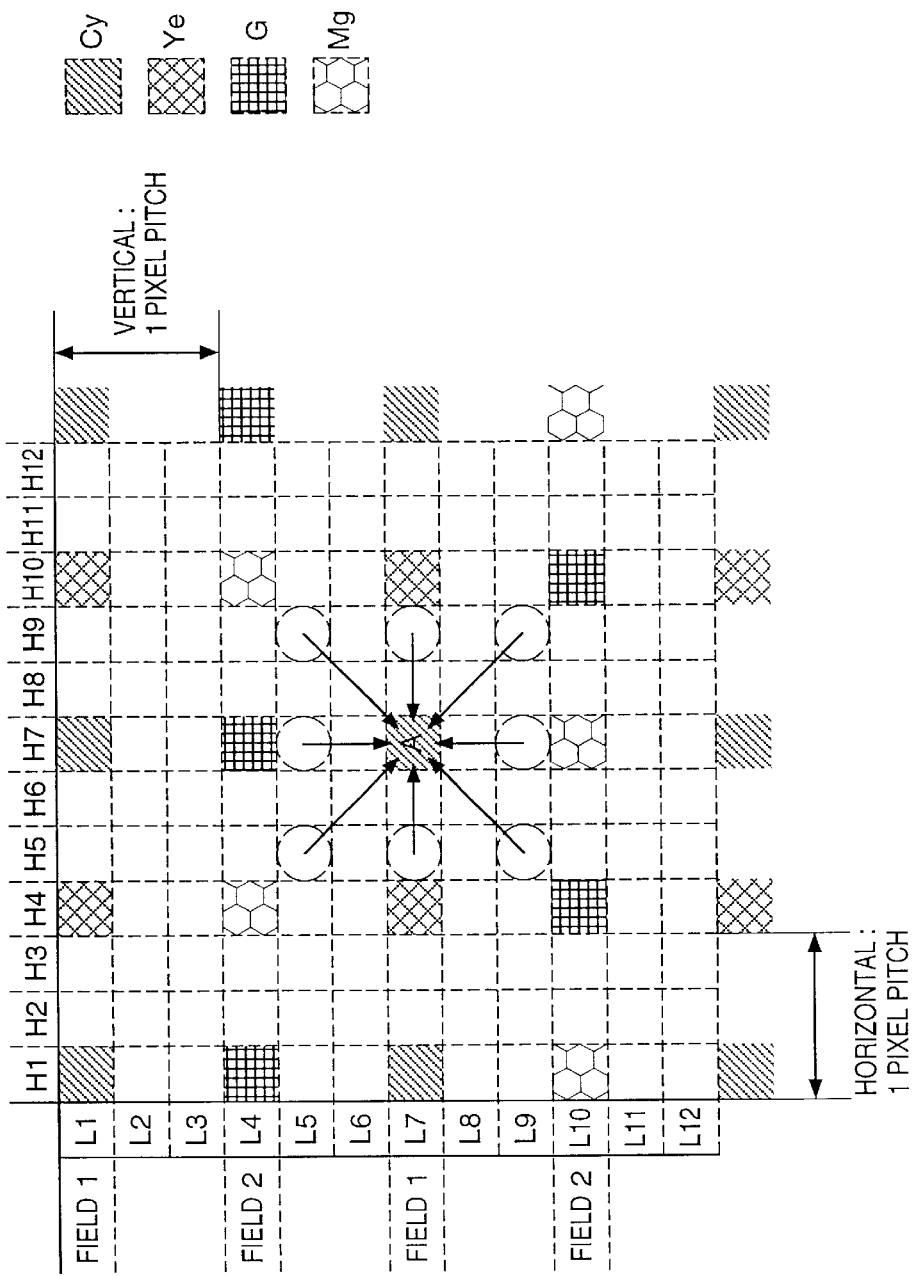
Figure 13B:
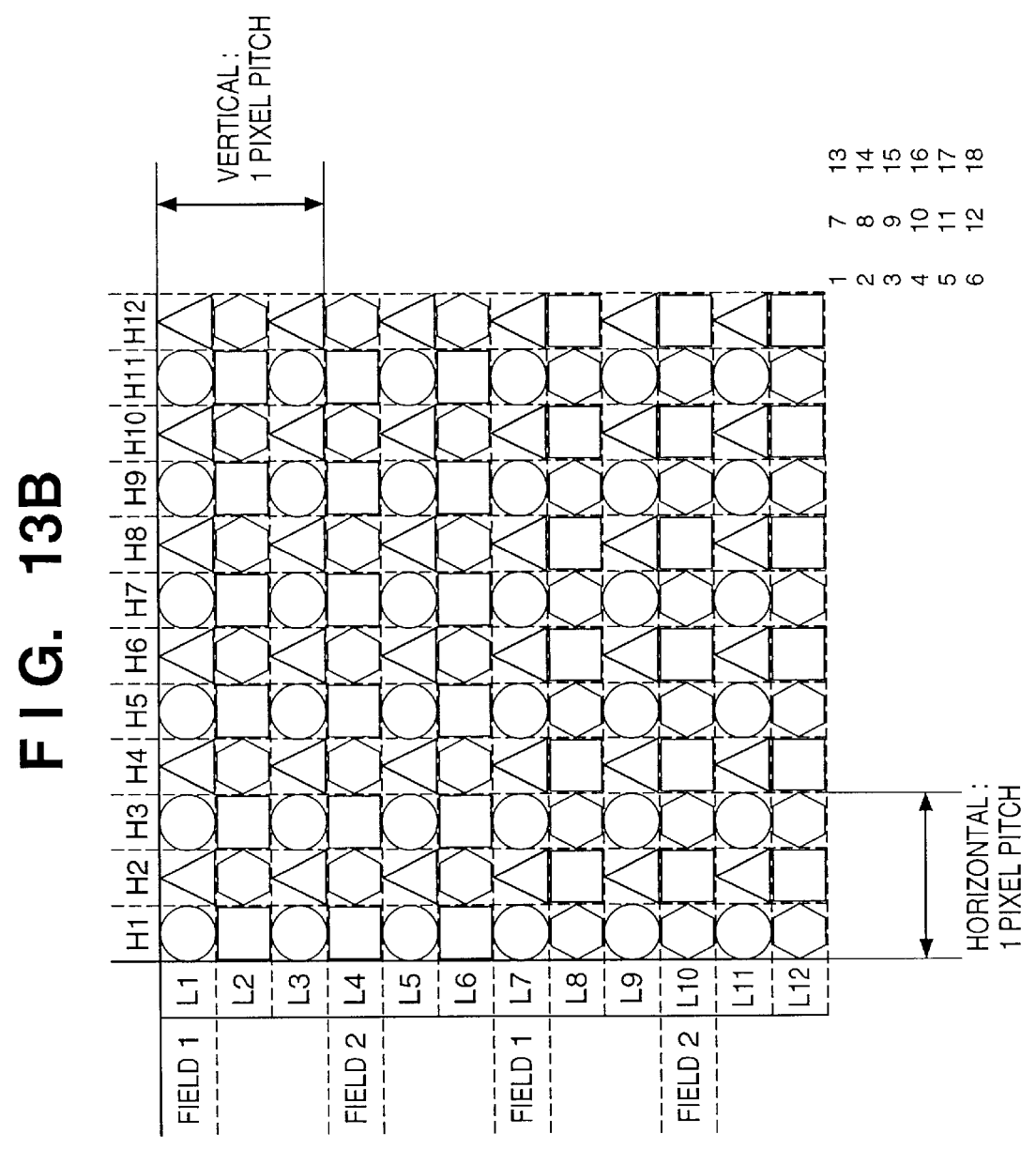

FIGS. 13A and 13B are schematic views showing spatial positions of pixels in a case where pixel-shifting is performed by combining the three states of plate 3 shown in FIGS. 5 to 8 in vertical pixel-shifting and the three states of plate 6 shown in FIGS. 9 to 12 in horizontal pixel-shifting.

Description will be provided on how light flux is shifted to derive data, with reference to FIGS. 13A and 13B.

Referring to FIGS. 13A and 13B, the hatched portion (including four types of hatching such as crossed hatch etc.) indicates positions of pixel (photoreceptive portion) on an image sensing device such as an interline-transfer-type CCD or the like. The portion other than the hatched portion indicates light-insensitive zone. The light-insensitive zone is divided into two fields, and the pixel pitch is divided by three. The entire pixels (image) are divided in a checked pattern.

According to FIG. 13A, when the plate 3 is shifted in the three states shown in FIGS. 5 to 8 for vertical pixel-shifting and the plate 6 is shifted in the three states shown in FIGS. 9 to 12 for horizontal pixel-shifting, light flux captured by a photoreceptive portion, e.g., portion indicated by A, is incident upon nine positions, i.e., the coordinates (H5, L5), (H5, L7), (H5, L9), (H7, L5), (H7, L7), (H7, L9), (H9, L5), (H9, L7) and (H9, L9). The light flux incident upon each of the nine positions is guided one by one to the photoreceptive portion A (performing pixel-shifting), and the data (a charge stored in the photoreceptive portion) is read at the time of reading the field of the photoreceptive portion A. The similar operation is performed when reading fields of all the photoreceptive portions. As a result, as shown in FIG. 13B, data indicative of light flux, which was conventionally unable to capture because the light is incident upon the light-insensitive zone in peripheries of each photoreceptive portion, can be captured by pixel-shifting operation.

In other words, image data for light, incident upon other pixels or light-insensitive zones between pixels of the image sensing surface, can be received. As a result, it is possible to achieve an effect equivalent to the case where the number of pixels of the image sensing device is increased.

Second Embodiment

Next, the second embodiment of the pixel-shifting system according to the present invention will be described.

In comparison with the above-described configuration, the second embodiment is characterized by increased pixel-shifting steps and realization of pixel-shifting that enables high-speed image processing for processing a color image (pixel array).

Figure 14:
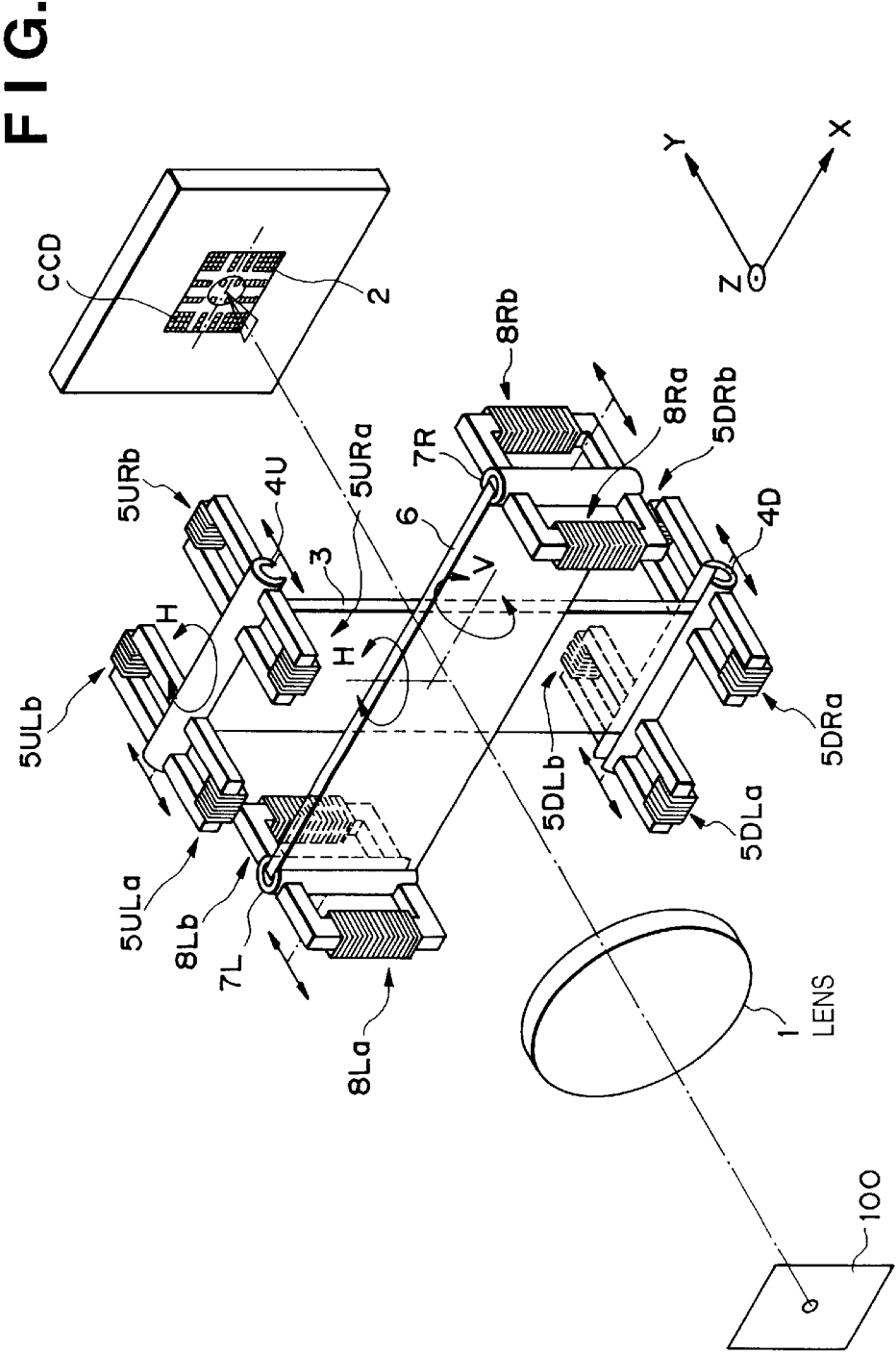
FIG. 14 is a perspective view showing a structure of the second embodiment of the present invention.
Figure 15A:
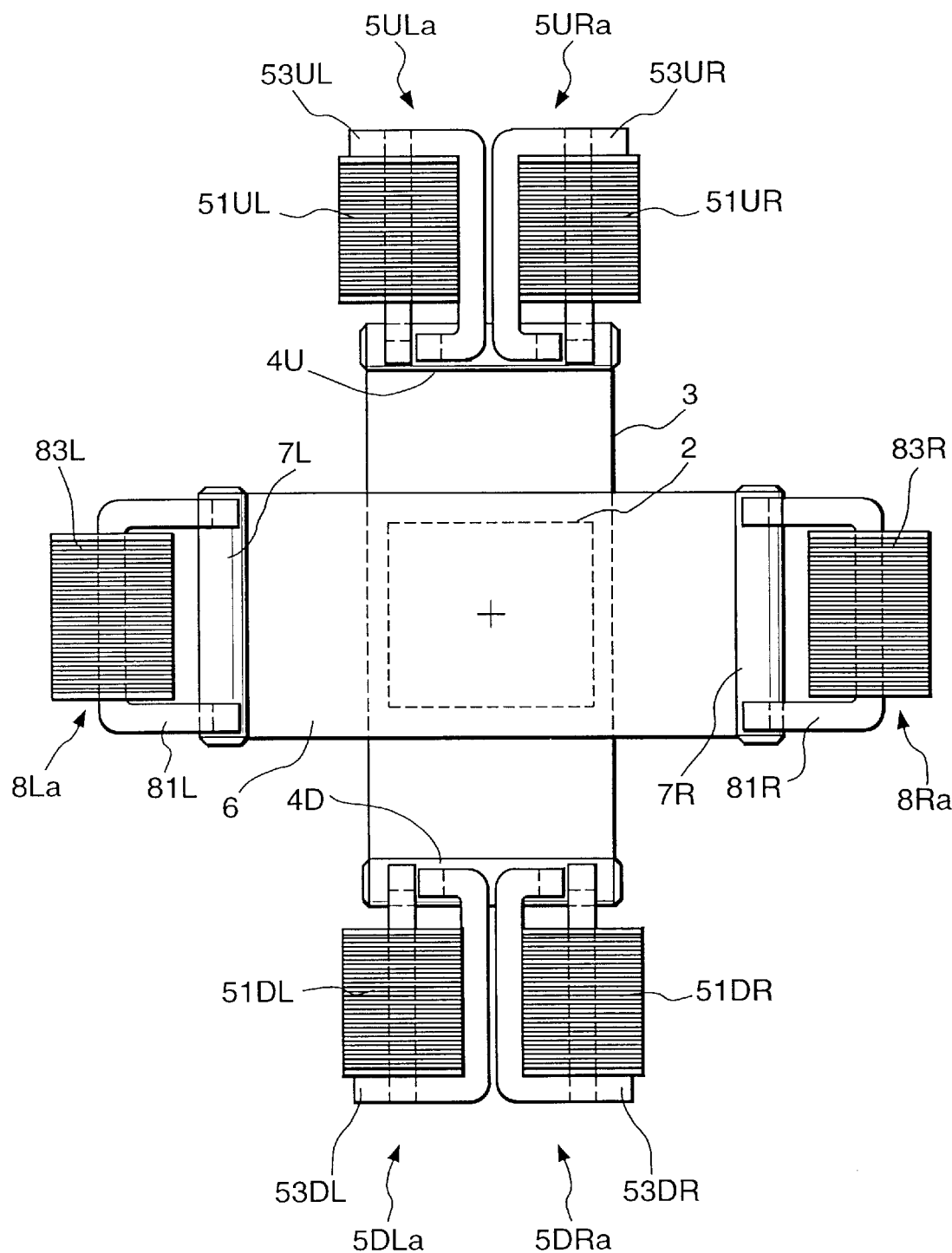
FIG. 15A, a front view and 15B, a top view of a pixel-shifting system according to the second embodiment.

FIG. 14 is a perspective view of a pixel-shifting unit according to the second embodiment. FIGS. 15A, 15B, 16A and 16B show the main portion of the second embodiment. FIG. 15A is a front view of the pixel-shifting unit, seen from the front (object side) of the optical axis; 15B, a top view; FIG. 16A, a side view seen from the right side of the unit; and FIG. 16B, a side view seen from the left side of the unit.

Each of the above drawings differs from that of the first embodiment in that a part of the electromagnet is divided. In FIGS. 14 to 16, components having the same structure as that of the above-described basic structure will be referred to by the same reference numerals and description thereof will be omitted.

Referring to FIGS. 14 to 16, the electromagnets 5Ua, 5Ub, 5Da and 5Db for controlling the plate 3, provided in the vertical direction, are divided into lateral two portions, respectively providing 5ULa and 5URa, 5ULb and 5URb, 5DLa and 5DRa, 5DLb and 5DRb.

These electromagnets 5ULa and 5URa, 5ULb and 5URb, 5DLa and 5DRa, 5DLb and 5DRb are provided so that the plate 3 originally performing pixel shifting in the vertical direction is made rotatable in the horizontal direction in addition to the vertical direction, performing pixel-shifting in the horizontal direction.

By virtue of this, the maximum of six steps of pixel shifting can be added to the total of nine steps of pixel shifting according to the above-described first embodiment, realized by combining three steps of pixel shifting in the vertical direction performed by the plate 3 with three steps of pixel shifting in the horizontal direction performed by the plate 6. This is realized because the horizontal rotation (twist) of the plate 3, provided for vertical pixel-shifting, enables to further increase the amount of pixel-shifting in the horizontal direction by a maximum of six steps for one position of the plate 3 in the vertical direction.

Description of the second embodiment explains the case where the plate 3, which primarily performs pixel-shifting in the vertical direction, is provided with the function of horizontal pixel-shifting for performing rotation (twist) operation in the horizontal direction. However, with respect to the plate 6 which performs horizontal pixel-shifting, the same operation is possible by substituting "vertical" with "horizontal."

Hereinafter, the structure of the pixel-shifting system according to the second embodiment and control of the plate will be described in detail with reference to FIGS. 17 to 21. FIGS. 17A, 18A, 19A, 20A and 21A are top views of the pixel-shifting unit shown in FIGS. 15 and 16, where length in the optical-axis direction is enlarged. FIGS. 17B, 18B, 19B, 20B and 21B are side views of the pixel-shifting unit shown in FIGS. 15 and 16 seen from the right side, where length in the optical-axis direction is enlarged.

FIGS. 17 to 21 are provided for explaining the control of the inclination angle of the plate which primarily performs pixel-shifting in the vertical direction. The characteristic points are the relative positional relationship of the recesses 91U and 91D, the width of the recesses 91U and 91D, and four driving means provided for a single armature 4U (or 4D).

Since the control of the inclination angle of the plate 6, which primarily performs pixel-shifting in the horizontal direction, is the same as that in the first embodiment, description will not be provided herein.

FIGS. 17 to 21 show the inclined positions of the plate 3 for gradually shifting the incident position of light, corresponding to one point of the object 100, incident upon the image sensing surface of the image sensing device 2.

Figure 17A:
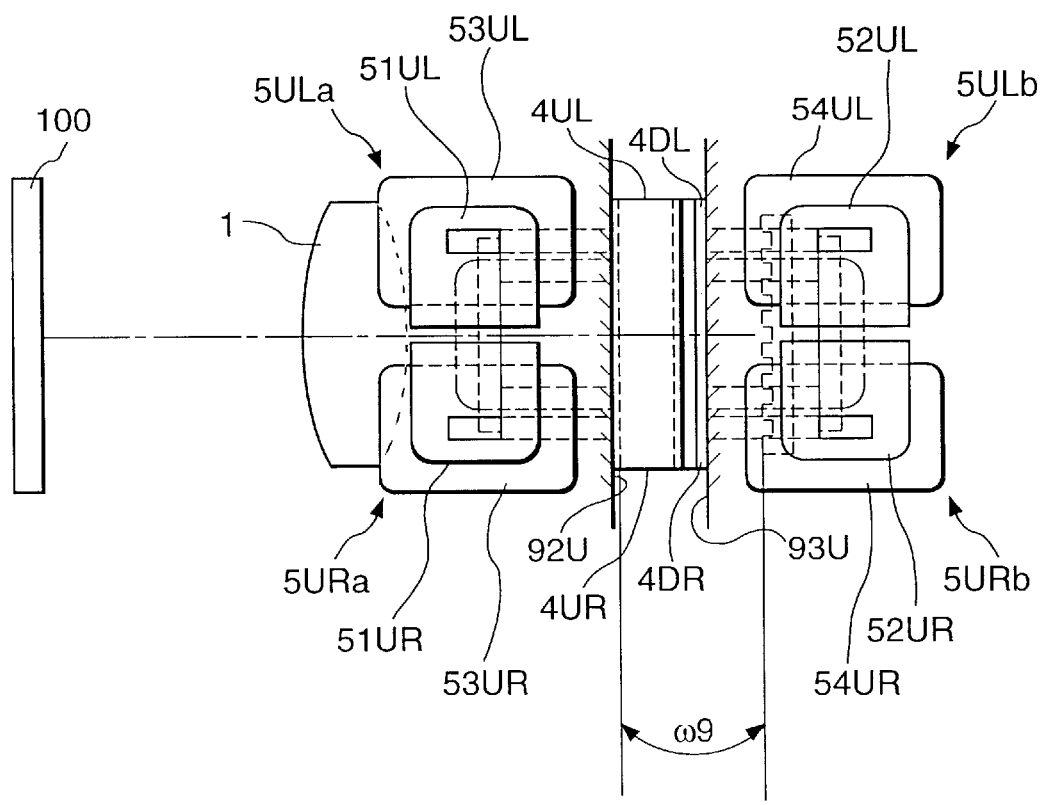
FIGS. 17A and 17B are explanatory views for explaining pixel-shifting operation performed by the pixel-shifting system according to the second embodiment.
Figure 17B:
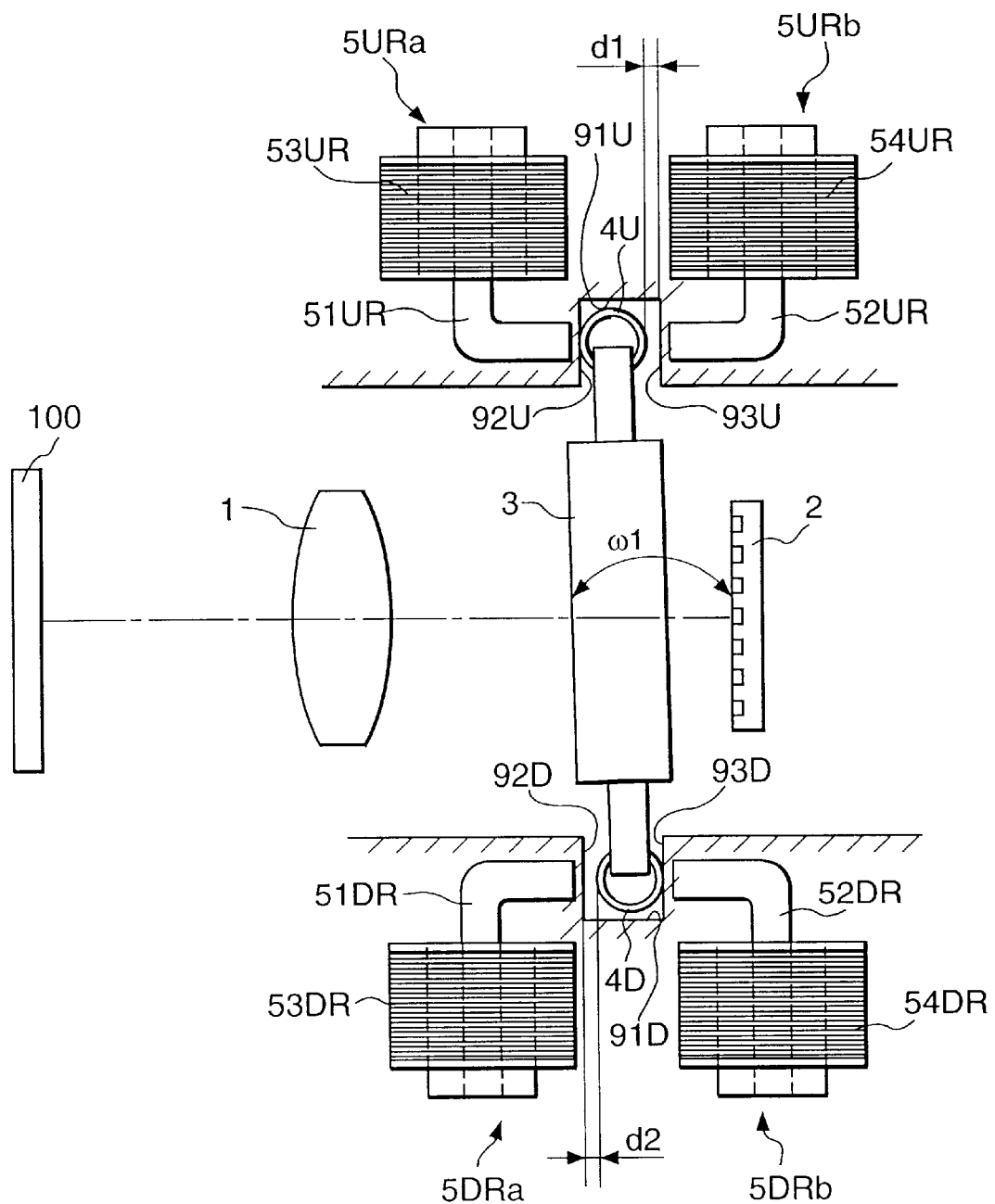

Referring to FIG. 17B, it is so set that the recess 91U, into which the armature 4U provided on the upper end of the plate 3 is inserted with a predetermined play, and the recess 91D, into which the armature 4D provided on the lower end of the plate 3 is inserted with a predetermined play, have substantially the same position and width, i.e., length in the optical-axis direction.

In the example shown in FIGS. 17A and 17B, the electromagnets 5URa and 5ULa are turned ON while the electromagnets 5URb and 5ULb are turned OFF. Thus, the armature 4U in the recess 91U is pulled toward the yokes 51UR and 51UL of the respective electromagnets 5URa and 5ULa, and is abutted against the regulating surface 92U, which is at the front (object side) of the optical-axis direction, and positioned. Meanwhile, the electromagnets 5DRa and 5DLa (shown in FIG. 16B) are turned ON while the electromagnets 5DRb and 5DLb (shown in FIG. 16B) are turned OFF. Thus, the armature 4D in the recess 91D is pulled toward the yokes 52DR and 52DL of the respective electromagnets 5DRb and 5DLb, and is abutted against the regulating surface 93D, which is at the end (image sensor side) of the optical-axis direction, and positioned.

In the second embodiment, although the plate 3 is set to perform pixel-shifting in the upward direction with respect to the optical axis in the state shown in FIG. 17B, the inclination states shown in FIGS. 17B, 18B, 19B and 21B are not limited to this arrangement. The pixel-shifting according to the present embodiment enables to pick up an image whose light is not normally incident, in accordance with an inclination angle of the plate. Therefore, in the state shown in FIGS. 17B, 18B, 19B and 21B, the plate does not need to particularly be perpendicular to the optical axis; however, it is preferable in the state shown in FIG. 18B that it is substantially perpendicular to the optical axis.

Herein, assuming that the clearance between the armature 4U and the width of the recess 91U (i.e., the gap between the armature 4U and the regulating surface 93U of the recess 91U) is defined as $d_1$, the clearance between the armature 4D and the width of the recess 91D (i.e., the gap between the armature 4D and the regulating surface 92D of the recess 91D) is defined as $d_2$ the gaps have relationship $d_2=d_1$. More specifically, the gap $d_2$ is set equal to the size of the gap $d_1$.

Referring to FIG. 17B, the angle $\omega_1$ indicates, as similar to $\omega_1$ in the first embodiment, an angle made by the image sensing surface of the image sensing device 2 and the plate 3 with respect to a vertical plane. An angle $\omega_9$ indicates an angle made by the image sensing surface and plate 3 with respect to a horizontal plane. Note that the gaps $d_1$ and $d_2$ are of high precision.

In the state shown in FIGS. 17A and 17B, when the electromagnets 5URa and 5ULa are turned OFF and electromagnets 5URb and 5ULb are turned ON and energized, the armature 4U of the plate 3 separates from the regulating surface 92U of the recess 91U, and is pulled to the side of the regulating surface 93U to abut thereto and positioned. As a result, the state shown in FIGS. 18A and 18B are made.

Accordingly, as the armatures 4U and 4D, provided on both ends of the plate 3, is regulated by the regulating surface 93U of the recess 91U and the regulating surface 93D of the recess 91D, the inclination angle of the plate 3 is regulated. In other words, from the state shown in FIG. 17B, the plate 3 rotates by one increment in the clockwise direction so as to shift the entire plate to the right in the drawing; and as a result, the position where incident light is received on the image sensing surface of the image sensing devices 2 is shifted downward on the image sensing surface.

Note that in this state, an angle made by the image sensing surface and the plate 3 with respect to a vertical plane is defined as $\omega_2$, and an angle made by the image sensing surface and the plate 3 with respect to a horizontal plane is defined as $\omega_{10}$.

Figure 18A:
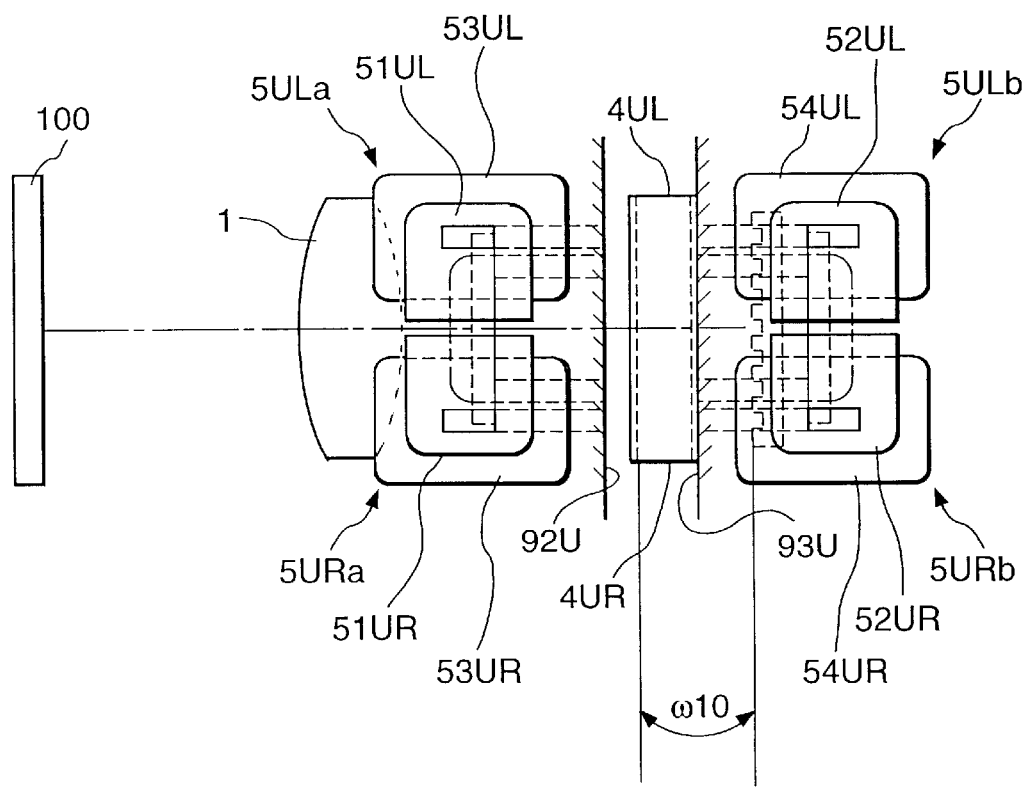
FIGS. 18A and 18B are explanatory views for explaining pixel-shifting operation performed by the pixel-shifting system according to the second embodiment.
Figure 18B:
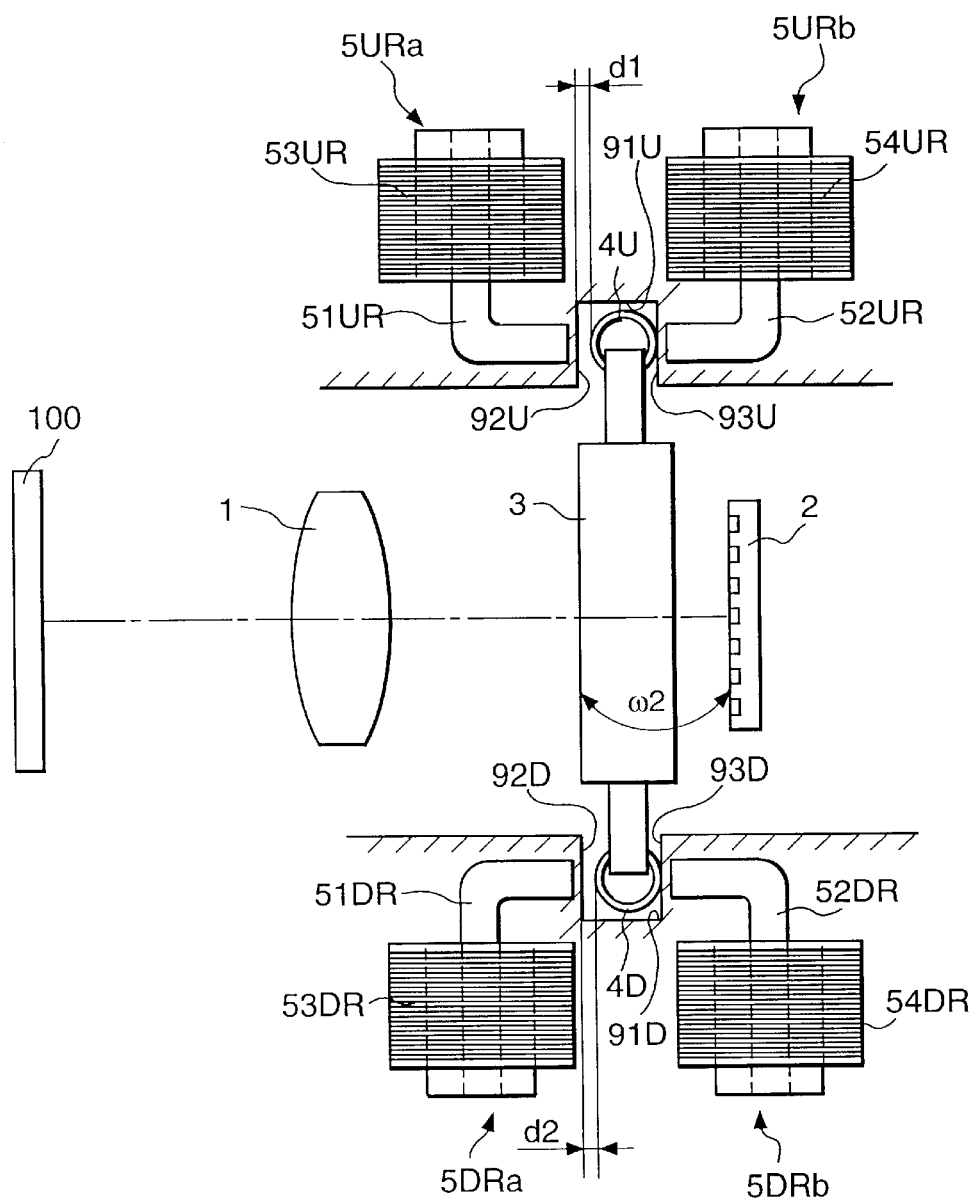

In the state shown in FIGS. 18A and 18B, when the electromagnet 5URb of the recess 91U is turned OFF and the electromagnet 5URa is turned ON, a left-side abut portion 4UL of the armature 4U separates from the regulating surface 93U of the recess 91U, and is pulled toward the regulating surface 92U to abut thereto and positioned.

When the electromagnet 5DRb of the recess 91D is turned OFF, and the electromagnet 5DRa is turned ON, a left-side abut portion 4DL of the armature 4D of the plate 3 separates from the regulating surface 93D of the recess 91D, is pulled toward the regulating surface 92D to abut thereto and positioned. As a result, the state shown in FIGS. 19A and 19B is made, where the plate 3 is twisted in the horizontal direction, i.e., clockwise direction when seen from the top.

Accordingly, as the armatures 4U and 4D, provided on both ends of the plate 3, are regulated by the regulating surfaces 92U and 93U of the recess 91U and the regulating surfaces 92D and 93D of the recess 91D, the inclination angle of the plate 3 is regulated. In other words, as compared to the state shown in FIGS. 18A and 18B, the plate 3 has no change with respect to the vertical direction, thus has substantially the same inclination. Meanwhile with respect to the horizontal direction, the plate 3 is shifted. Therefore, the position where incident light is received on the image sensing surface of the image sensing device 2 is substantially the same as that of FIGS. 18A and 18B with respect to the vertical direction, but is shifted with respect to the horizontal direction.

Note that in this state, an angle made by the image sensing surface and the plate 3 with respect to a vertical plane is $\omega_2$, and an angle made by the image sensing surface and the plate 3 with respect to a horizontal plane is $\omega_{11}$.

Figure 19A:
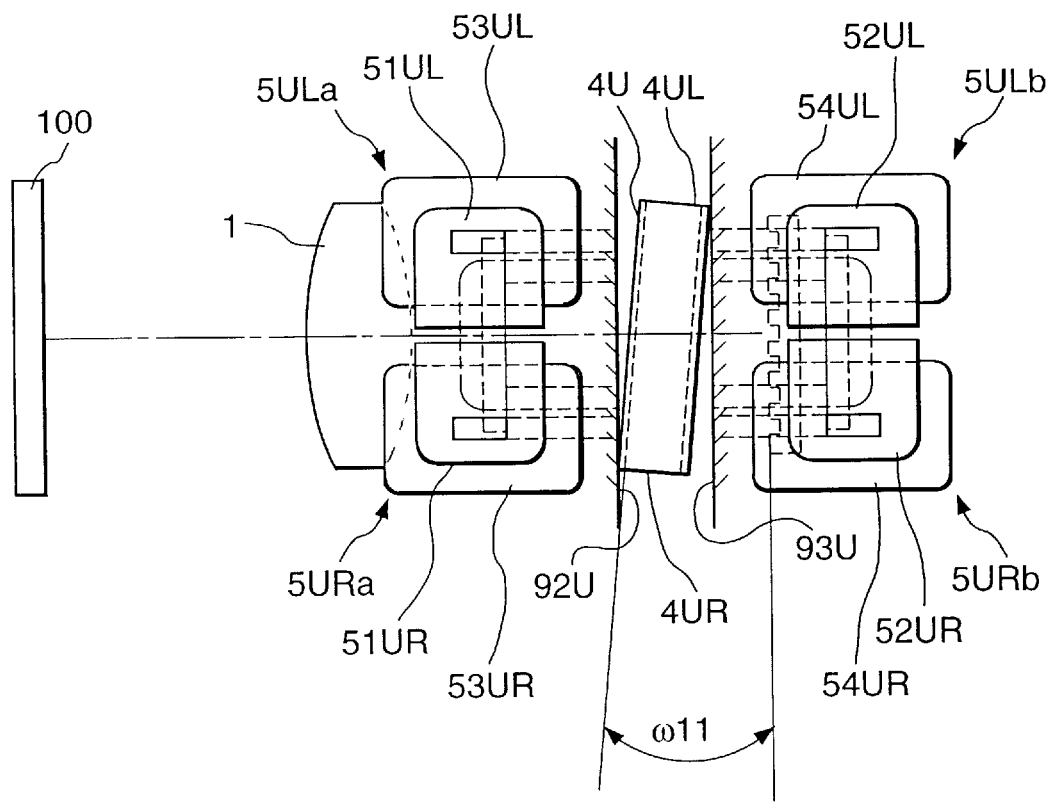
FIGS. 19A and 19B are explanatory views for explaining pixel-shifting operation performed by the pixel-shifting system according to the second embodiment.
Figure 19B:
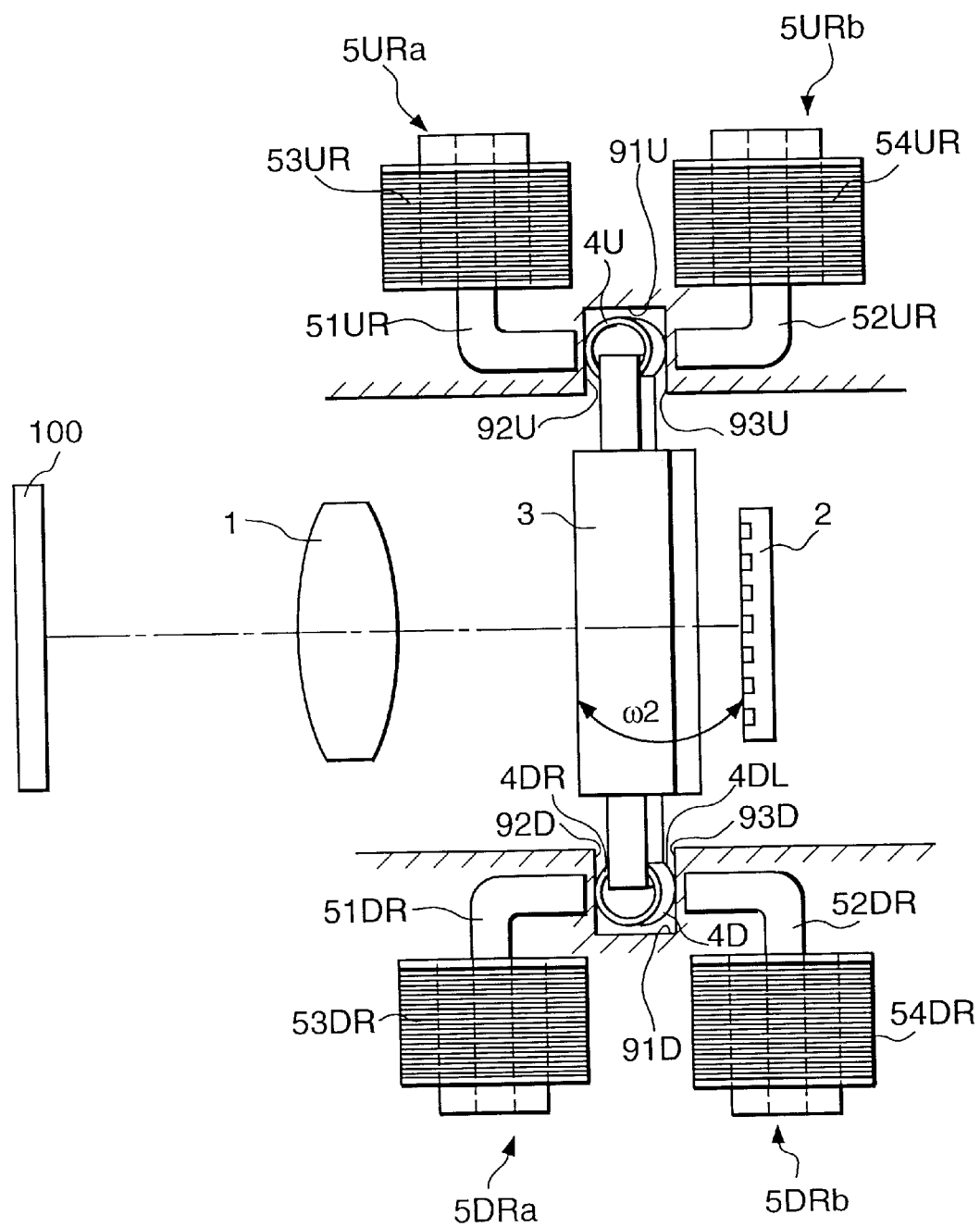
Figure 20B:
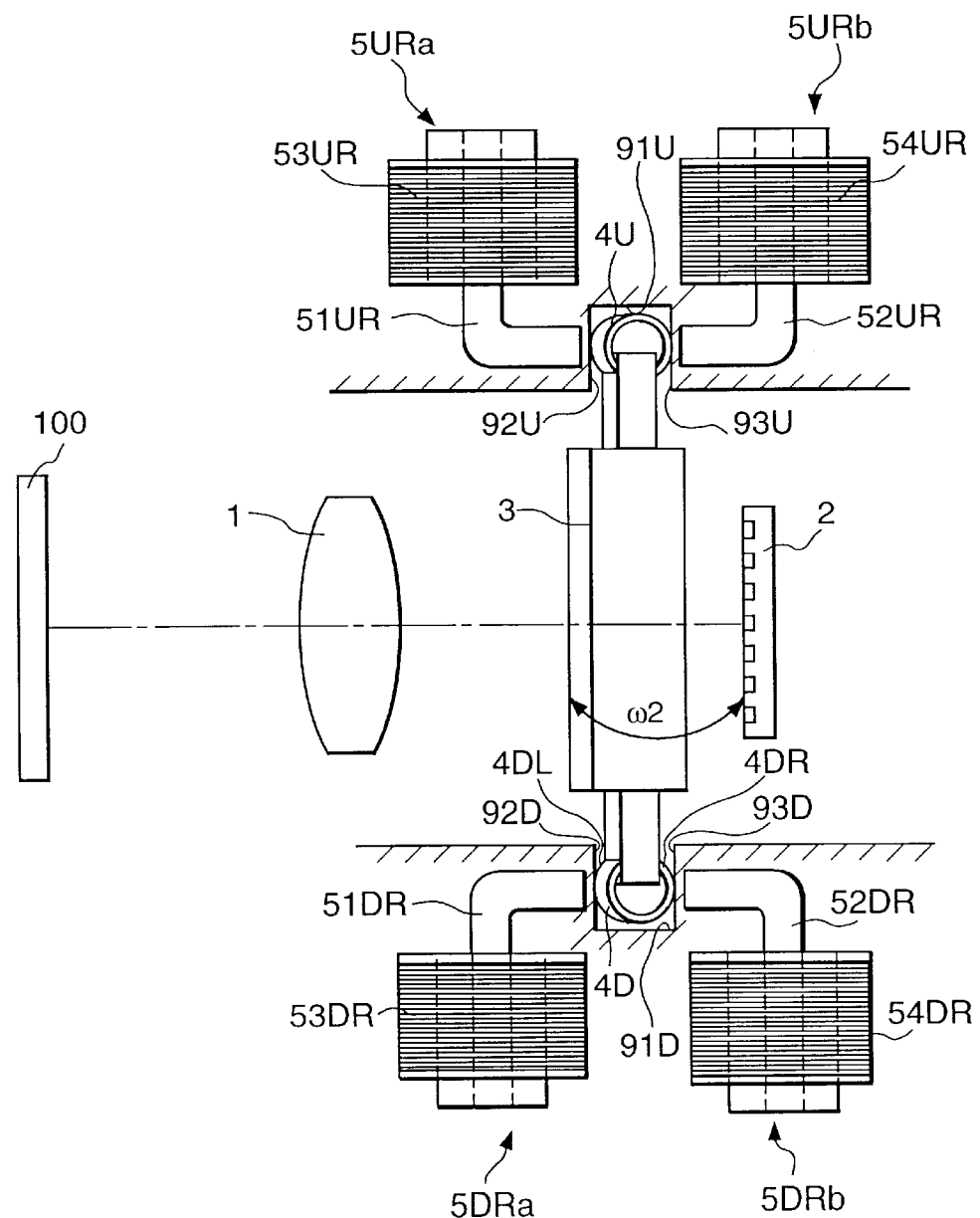

Referring to the state shown in FIGS. 19A and 19B, when the electromagnet 5ULb of the recess 91U and the electromagnet 5DLb of the recess 91D are turned OFF and the electromagnet 5ULa of the recess 91U and the electromagnet 5DLa of the recess 91D are turned ON, the abut portion 4UL of the armature 4U separates from the regulating surface 93U of the recess 91U, and is pulled toward the regulating surface 92U to abut thereto and positioned. Meanwhile, the abut portion 4DL of the armature 4D separates from the regulating surface 93D of the recess 91D, and is pulled toward the regulating surface 92D and positioned. As a result, the state shown in FIGS. 20A and 20B is made.

Accordingly, as the armatures 4U and 4D, provided on both ends of the plate 3, are regulated by the regulating surfaces 92U and 93U of the recess 91U and the regulating surfaces 92D and 93D of the recess 91D, the inclination angle of the plate 3 with respect to the horizontal direction is regulated.

In other words, as compared to the state shown in FIGS. 18A and 18B, the plate 3 has substantially the same inclination, thus the position where incident light is received on the image sensing surface of the image sensing device 2 is substantially the same as that of FIGS. 18A and 18B with respect to the vertical direction, but is shifted with respect to the horizontal direction.

Note that in this state, an angle made by the image sensing surface and the plate 3 with respect to a vertical plane is $\omega_2$, and an angle made by the image sensing surface and the plate 3 with respect to a horizontal plane is $\omega_{12}$.

When the state changes from FIG. 18 to FIG. 19 and to FIG. 20, the effect of pixel-shifting is extremely small in the vertical direction, but in the horizontal direction, a large effect is attained.

The second embodiment employs the plate identical to the plate 6 in the first embodiment, provided for pixel-shifting in the horizontal direction. The length of the armatures 4U and 4D and relative positions of the armatures 4U and 4D are so set that the angles $\omega_{11}$ and $\omega_{12}$ in FIGS. 19 and 20 determine the amount of shift at a single-pixel pitch (or one-third pitch) in the horizontal direction, based on a relative difference between one of the inclination angles $\omega_5$, $\omega_6$, $\omega_7$ and $\omega_8$ of the plate 6 with respect to the horizontal direction and $\omega_{11}$ or $\omega_{12}$.

In the state shown in FIGS. 20A and 20B, when the electromagnet 5ULa is turned OFF, 5ULb turned ON, 5DRb turned OFF, and 5DRa turned ON, the abut portion 4UL of the armature 4U of the plate 3 separates from the regulating surface 92U of the recess 91U, and is pulled toward the regulating surface 93U to abut thereto and positioned. Meanwhile, the abut portion 4DR of the armature 4D separates from the regulating surface 93D of the recess 91D, and is pulled toward the regulating surface 92D and positioned. As a result, the state shown in FIGS. 21A and 21B is made.

The plate 3 changes its state from the state shown in FIGS. 18A and 18B, inclining further in the vertical direction toward the right in the drawing, taking a largest inclination angle from the angle $\omega_1$. In this state, an angle made by the image sensing surface and the plate 3 with respect to a vertical plane is $\omega_4$ (same as the first embodiment), and an angle made by the image sensing surface and the plate 3 with respect to a horizontal plane is $\omega_{13}$.

As described above with reference to FIGS. 17 to 21, the inclination angle of the plate 3 with respect to the vertical direction can be controlled in three steps by gradually changing the inclination angle from $\omega_1$ to $\omega_2$ to $\omega_4$. Furthermore, pixel-shifting in the horizontal direction can be increased by a maximum of six steps for one position (in the second embodiment, $\omega_2$) of the plate 3 in the vertical direction.

Figure 21A:
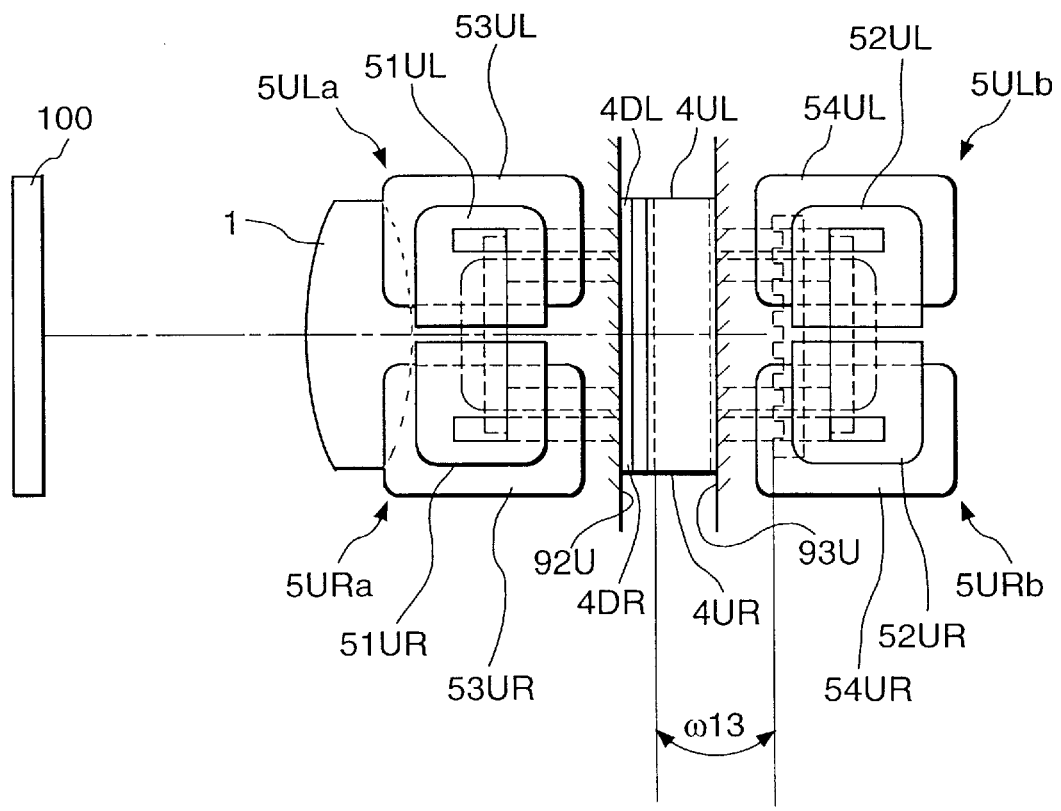
FIGS. 21A and 21B are explanatory views for explaining pixel-shifting operation performed by the pixel-shifting system according to the second embodiment.
Figure 21B:
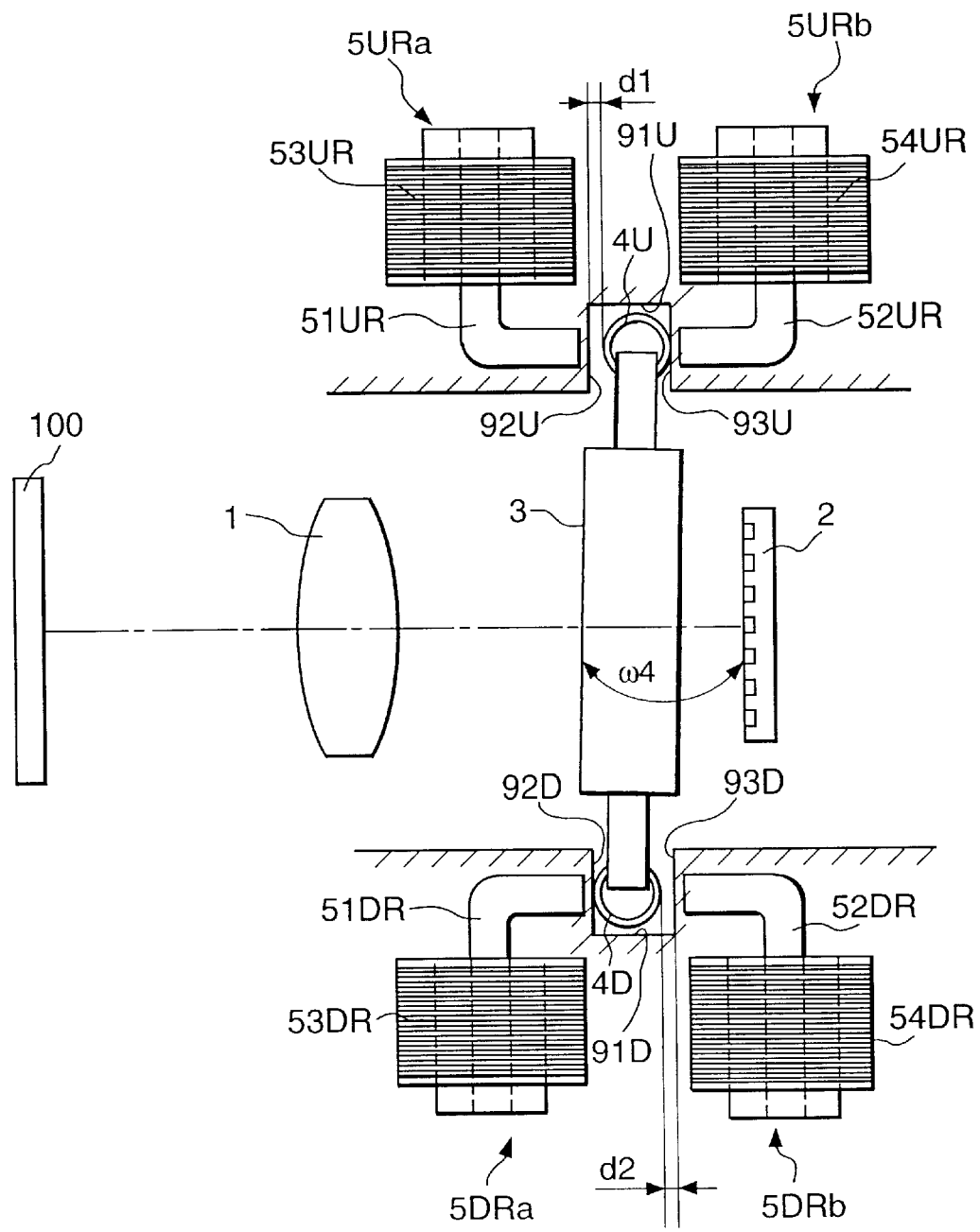

In a case where the armature 4U or 4D linearly contacts the regulating surface 92 or 93, an angle $\omega$ made by the image-sensing surface of the image sensing device 2 and the plate 3 with respect to a horizontal plane is $\omega_9$, $\omega_{10}$ or $\omega_{13}$ as shown in FIGS. 17A, 18A and 21A. Meanwhile, in a case where the armature 4U or 4D contacts the regulating surface 92 or 93 by a point and the plate 3 is twisted, an angle $\omega$ made by the image-sensing surface and the plate 3 with respect to a horizontal plane is $\omega_{11}$ or $\omega_{12}$ as shown in FIGS. 19A and 20A. In the pixel-shifting mechanism of the second embodiment, it is so set that the following relationship holds:

$$\omega_{13} \approx \omega_{10} \approx \omega_9$$

$$(\omega_{11}-\omega_9)=(\omega_{12}-\omega_9)=\text{constant}$$

Maintaining the above relationship guarantees that the position of incident light upon the image sensing surface, which changes in accordance with inclination of the plate 3 with respect to a horizontal plane, is shifted by an equal amount with respect to the horizontal plane.

Note that the "twist" operation of the plate 3 has an effect of shifting the light-incident position with respect to the horizontal direction on the image sensing surface. More specifically, the angles $\omega_{11}$ and $\omega_{12}$ determine the amount of shift of the plate 3 with respect to the horizontal direction. On the other hand, the plate 6 has an effect of shifting the light-incident position with respect to the horizontal direction on the image sensing surface, as similar to the plate 6 in the first embodiment. The shifting of light-incident position using the plate 6 changes in accordance with the values of angles $\omega_5$, $\omega_6$, $\omega_7$ and $\omega_8$, similar to the first embodiment. Therefore, in the second embodiment, the lengths and relative position of armatures are set, based on the relation of clearance between the armatures 4U and 4D and each of the regulating portions 91U and 91D, such that the relative difference between either one of $\omega_{11}$ and $\omega_{12}$, and one of the inclination angles $\omega_5$, $\omega_6$, $\omega_7$ and $\omega_8$, i.e., $|\omega_i-\omega_j|$ (where i=5, 6, 7, 8, and j=11, 12) yields the amount of shift at a single-pixel pitch (or one-third pitch) in the horizontal direction.

In the present embodiment, clearances $d_1$ and $d_2$ between the armatures and the surfaces of the respective recesses 91U and 91D, and clearances $d_3$ and $d_4$ between the armatures and the surfaces of the respective recesses 91L and 91R are set such that the amount of shifting the plates 3 and 6 in one step of pixel shifting in the respective primary directions is two-thirds of a pixel space. Since the clearances $d_1$, $d_2$, $d_3$ and $d_4$ determine the inclination angle of the plate, they are changed in accordance with the pixel space of the image sensing device or the amount of shifting. The inclination angle of the plate 3 in the horizontal direction is changed by precisely adjusting the length of the armatures 4U and 4D with the fixed clearances $d_1$ and $d_2$.

Moreover, as apparent from the above description, the armatures 4U and 4D provided on both ends of the plate 3 are inserted in the respective recesses 91U and 91D with a predetermined play, being supported with a play. The inclination angle of the plate is determined by abutting the armatures 4U and 4D against the regulating surfaces of the recesses 91U and 91D. Similar to the first embodiment, the armature has a cylindrical shape in the portion abutting against the regulating surface in the second embodiment. Therefore, even if the abutting position of the cylindrical armatures (4U and 4D) is deviated in the longitudinal direction of the plate 3 on the regulating surface, the inclination angle of the plate does not change; thus, the position of incident light upon the image sensing surface of the image sensing device does not change.

So long as the position of each of the recesses 91U and 91D in the optical-axis direction is set identical, the center of the plate 3 in the optical-axis direction does not change greatly even when the inclination angle of the plate 3 changes. Therefore, it is possible to always perform accurate pixel-shifting.

In other words, rotation (twisting) of the plate 3 in the horizontal direction, provided for pixel-shifting in the vertical direction, is performed when the plate 3 is substantially perpendicular to the optical axis as shown in FIGS. 18A and 18B. Since the top and bottom ends of the plate 3 have the identical position with respect to the optical-axis, position deviation caused by a twist in the horizontal direction is prevented.

Note that by virtue of the armatures having a cylindrical shape, when the armature is pulled by the electromagnetic force of the electromagnet, the armature contacts with the regulating surface by a point (or line). Therefore, the plate is centered in a position determined by the armature of the electromagnet, causing substantially no position deviation.

Accordingly, each of the inclinations of the plates 3 and 6 is set such that the position of incident light upon the image sensing surface is shifted for each inclination angle in the vertical and horizontal directions respectively, by two-thirds of a pixel space of the image sensing surface, i.e., at a pitch of ⅔ of a pixel. By virtue of this, it is possible to obtain a number of pixels substantially three times larger than the actual number of pixels, respectively in the vertical and horizontal directions of the image sensing device.

At each of the nine positions [three inclined positions of the plate 3]×[three inclined positions of the plate 6], the image is sensed by the image sensing device 2, and the nine images are sequentially stored in a memory. When the image data is read out of the memory, the order of reading out each pixel of the nine images and the phase are controlled. As a result, a high-quality image, a combination of the three images, can be obtained.

By virtue of the horizontal pixel-shifting function of the plate 3 for shifting at a single-pixel (or ⅓ pixel) pitch in the horizontal direction, and combining this function with the plate 6, it is possible to increase, by six steps, the number of pixel-shifting positions in the horizontal pixel array with respect to one vertical position. This can be utilized as effective means in a case of employing, for instance, a color image-sensing device comprising a single-plate inter-transfer-type CCD having a color filter of so-called complementary-color checkers pattern.

For instance, in a case of using a color image-sensing device having a complementary-color checkers pattern or the like, comprising a filter for Cy (cyan), Ye (yellow), G (green) and Mg (magenta), the above advantage enables to keep the arrangement order of filter constant when pixel-shifting operation is performed.

FIGS. 22 to 30 are schematic views showing spatial positions of pixels in a case where pixel-shifting is performed by combining the three states of the plate 3 which primarily performs pixel-shifting in the vertical direction as shown in FIGS. 17 to 21, a state in which the function of pixel-shifting in the horizontal direction is added to the plate 3, and three states of the plate 6 which performs pixel-shifting in the horizontal direction as shown in FIGS. 9 to 12.

Description will be provided on how light flux is shifted to derive data, with reference to FIGS. 22 to 30.

Figure 22:
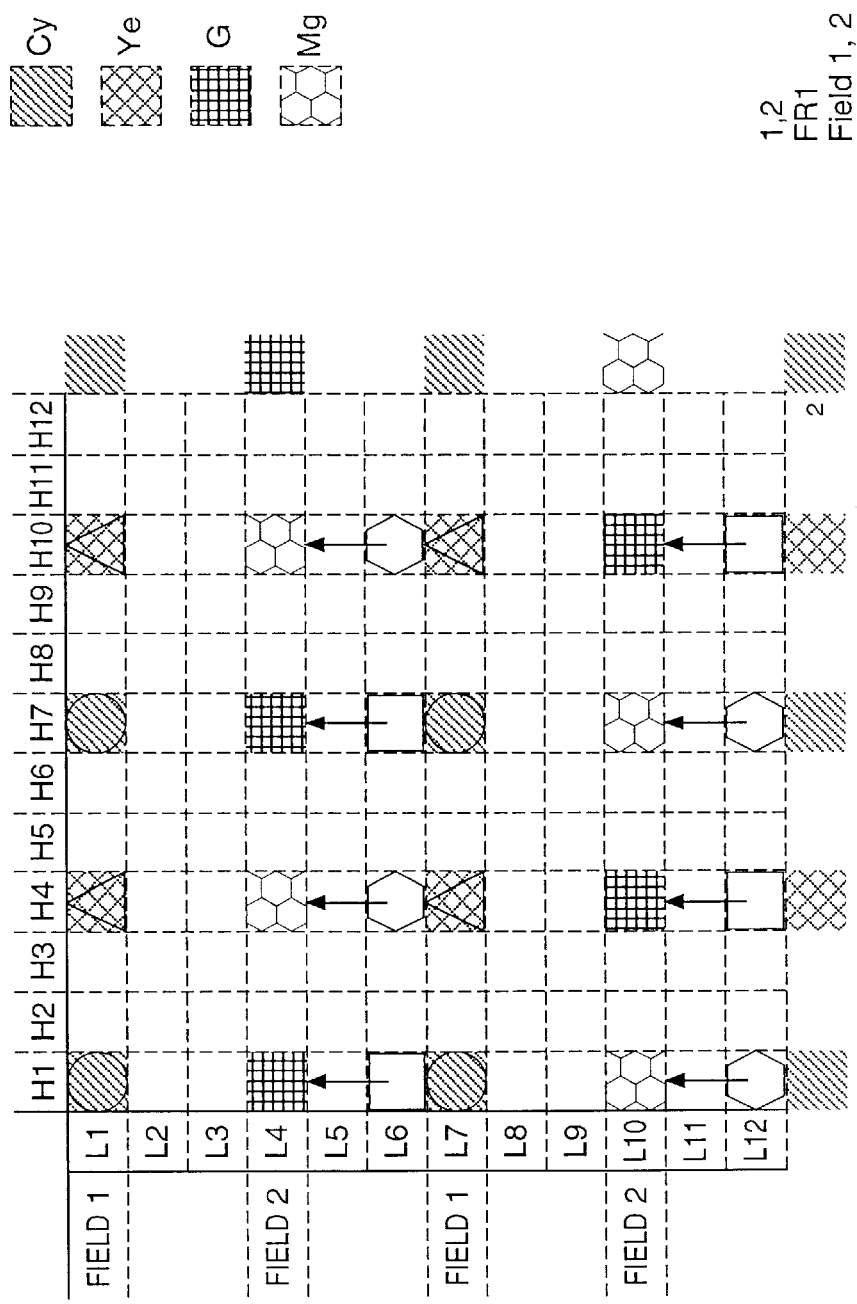
FIG. 22 is an example of pixel-shifting operation performed by the system according to the second embodiment, for explaining pixel data capturing operation on an image sensing surface.
Figure 30:
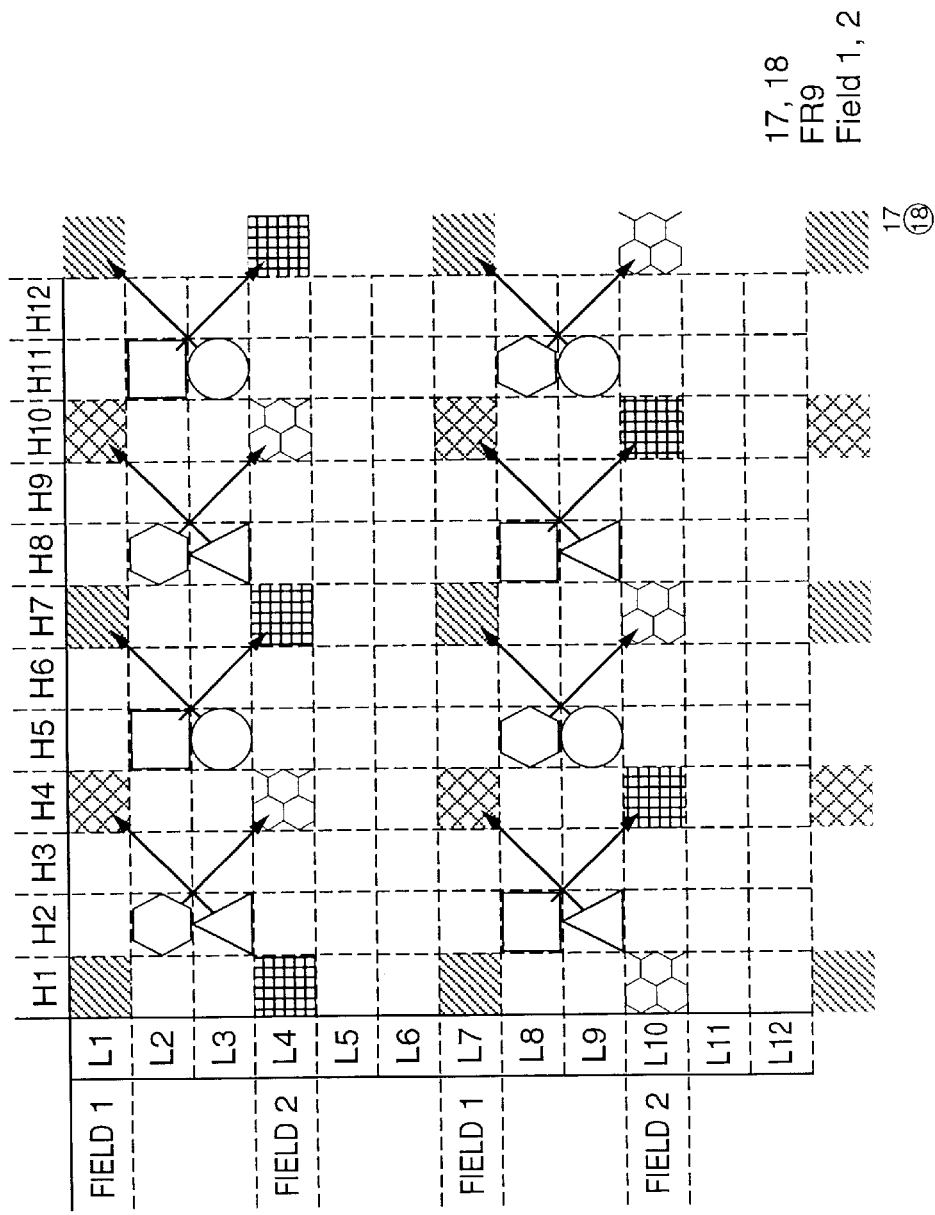
FIG. 30 is an example of pixel-shifting operation performed by the system according to the second embodiment, for explaining pixel data capturing operation on an image sensing surface.

Referring to FIGS. 22 and 30, the hatched portion (including four types of hatching such as crossed hatch etc.) indicates position of pixels (photoreceptive portion) on an image sensing device such as an interline-transfer-type CCD or the like. The portion other than the hatched portion indicates light-insensitive zone. The light-insensitive zone is divided into two fields, and the pixel pitch is divided into three. The entire pixels are divided in a checkers pattern.

For instance, in a case of adopting to the second embodiment, a color image-sensing device having a complementary-color checkers pattern, comprising a filter for Cy (cyan), Ye (yellow), G (green) and Mg (magenta), the provided image sensing apparatus includes a photoreceptive portion having a filter for Cy in the oblique-line hatching positions, filter for Ye in the cross hatching positions, filter for G in the square hatching positions and filter for Mg in the hexagon hatching positions.

Assume that, with the use of the interline-transfer-type CCD, field reading where a charge storage mode can obtain resolution suitable to a video image is used. Defining every other pixel arrays as field 1 and field 2, scanning field 1 is performed for the entire screen, then scanning field 2 is performed for the entire screen. By alternately performing the scanning, the adjacent fields 1 and 2 are read as one frame (one screen).

FIGS. 22 to 30 show how data is derived while changing the combinations (while driving the plates) of the five states of the plate 3 for pixel-shifting in the vertical direction as shown in FIGS. 17 to 21, and the three states of the plate 6 for pixel-shifting in the horizontal direction as shown in FIGS. 9 to 12.

FIG. 22 shows data derived from the frame (screen) 1. More specifically, FIG. 22 shows how image data is derived when the field 1 is scanned while the plates 6 and 3 are set respectively in the state shown in FIGS. 11 and 18, and when the field 2 is scanned while the plates 6 and 3 are set respectively in the state shown in FIGS. 11 and 17.

In the example shown in FIG. 22, when the field 1 is scanned, data in L1 and L7 represented by circle or triangle are read through the filter of the photoreceptive portion. The data in the position represented by circle is derived as data having the color Cy and the data in the position represented by triangle is derived as data having the color Ye. For this, the vertically provided plate 3 has the state shown in FIG. 18, where the electromagnets 5URa and 5ULa are OFF, electromagnets 5URb and 5ULb are ON, electromagnets 5DRa and 5DLa are OFF, and electromagnets 5DRb and 5DLB are ON. Therefore, there is no vertical pixel deviation on the image sensing surface.

Figure 11:
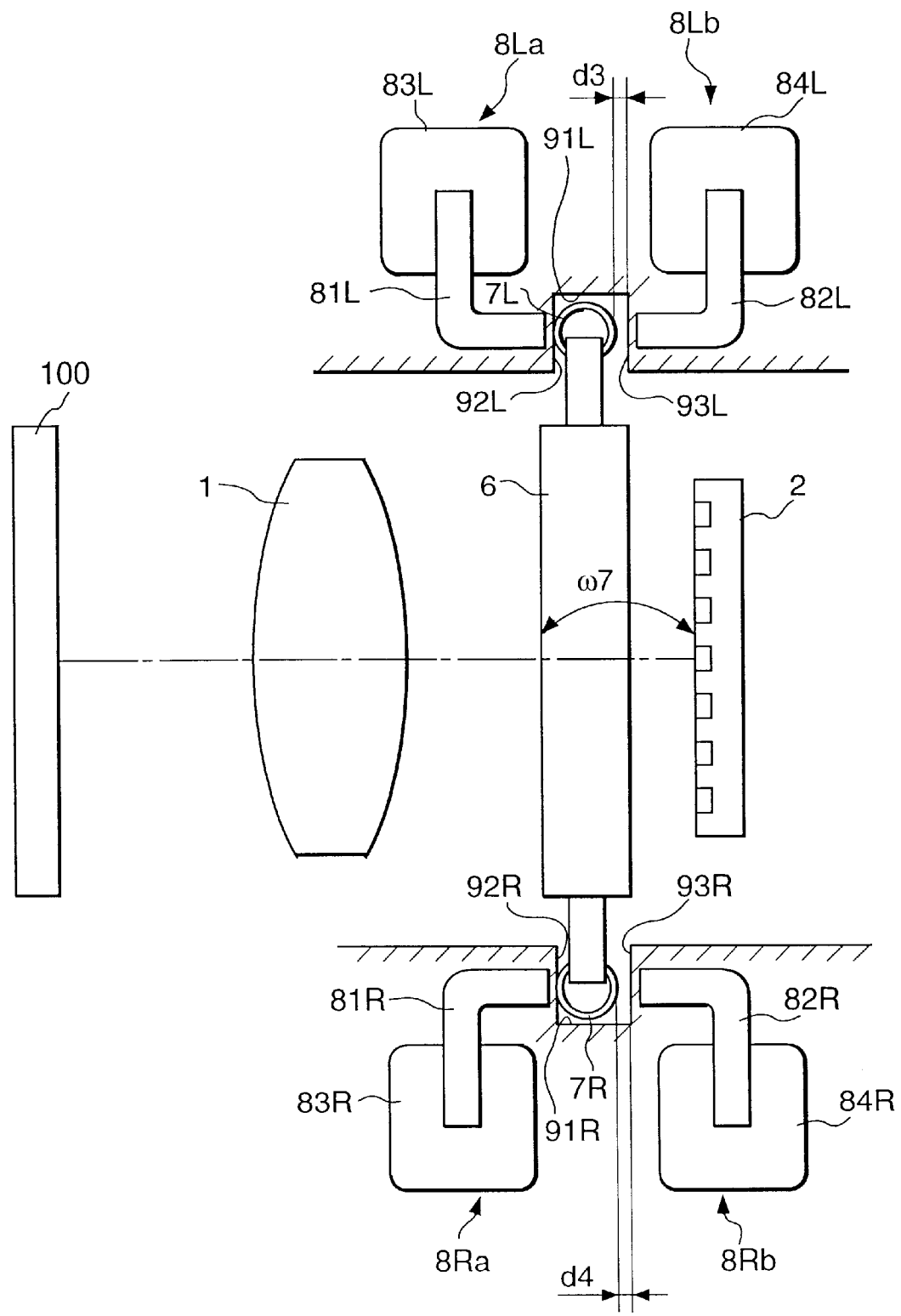
FIG. 11 is an explanatory view for explaining pixel-shifting operation in the horizontal direction performed by the pixel-shifting system according to the first embodiment.

Moreover, the horizontally provided plate 6 has the state shown in FIG. 11, where electromagnets 8Ra and 8La are ON and electromagnets 8Rb and 8Lb are OFF. Therefore, there is no horizontal pixel shifting.

In the example shown in FIG. 22, when the field 2 is scanned, data in L6 and L12 represented by square or hexagon are shifted in the direction indicated by the arrow (upward direction) and read by the photoreceptive portion located in the position indicated by the arrow. In other words, the data in the position represented by the square is derived as data having the color G (square hatching) and the data in the position represented by hexagon is derived as data having the color Mg (hexagon hatching).

Figure 23:
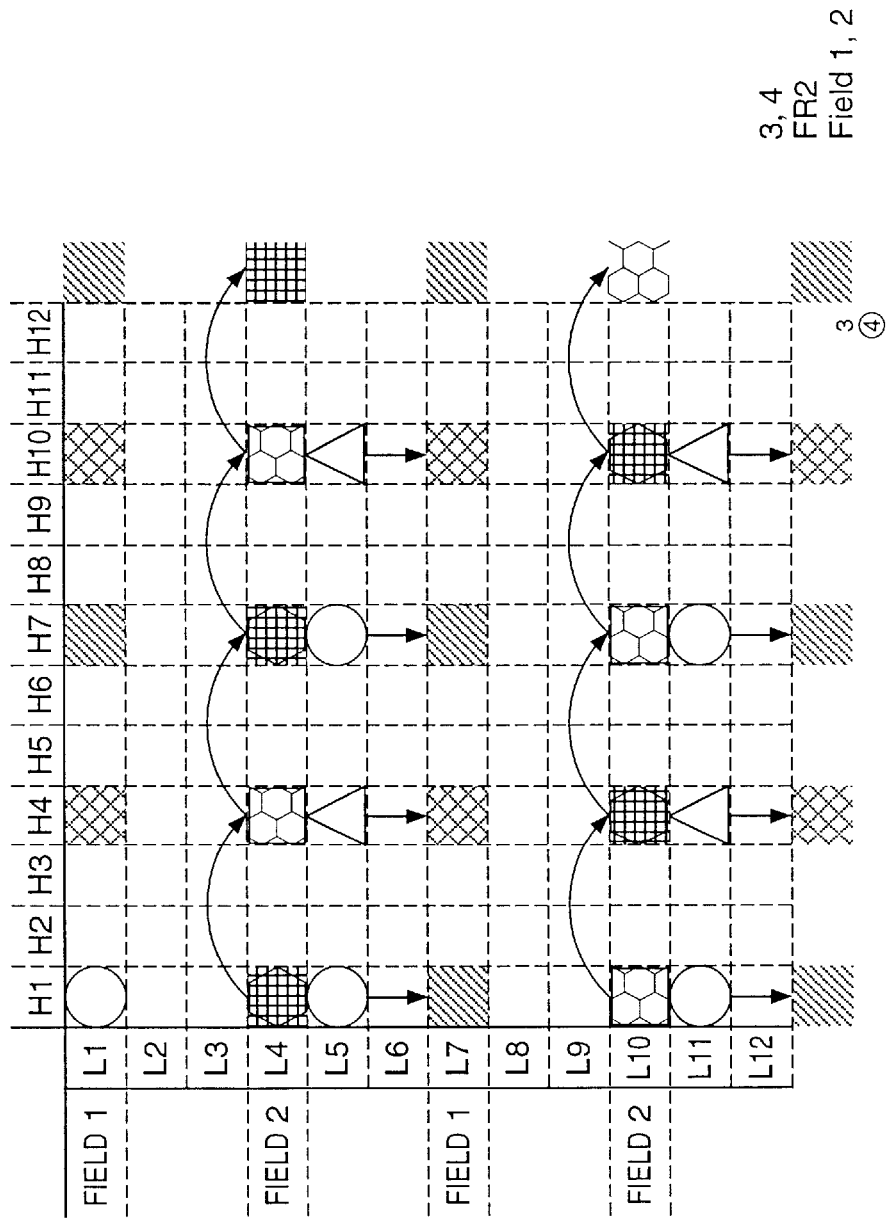
FIG. 23 is an example of pixel-shifting operation performed by the system according to the second embodiment, for explaining pixel data capturing operation on an image sensing surface.

FIG. 23 shows data derived from the frame (screen) 2. More specifically, FIG. 23 shows how image data is derived when the field 1 is scanned in the state shown in FIG. 11 (plate 6) and FIG. 21 (plate 3), and when the field 2 is scanned in the state shown in FIG. 11 (plate 6) and FIGS. 19A/19B (plate 3).

In the example shown in FIG. 23, when the field 1 is scanned, data in L5 and L11 represented by circle or triangle are shifted in the direction indicated by an arrow (downward direction) and read by the photoreceptive portion located in the position indicated by the arrow. The data in the position represented by circle is derived as data having the color Cy, and the data in the position represented by triangle is derived as data having the color Ye.

In the example shown in FIG. 23, when the field 2 is scanned, data in L4 and L10 represented by square or hexagon are shifted in the direction indicated by an arrow (i.e., to the right direction) and read by the photoreceptive portion located in the position indicated by the arrow. The data in the position represented by square is derived as data having the color Mg (hexagon hatching), and the data in the position represented by hexagon is derived as data having the color G (square hatching).

Figure 24:
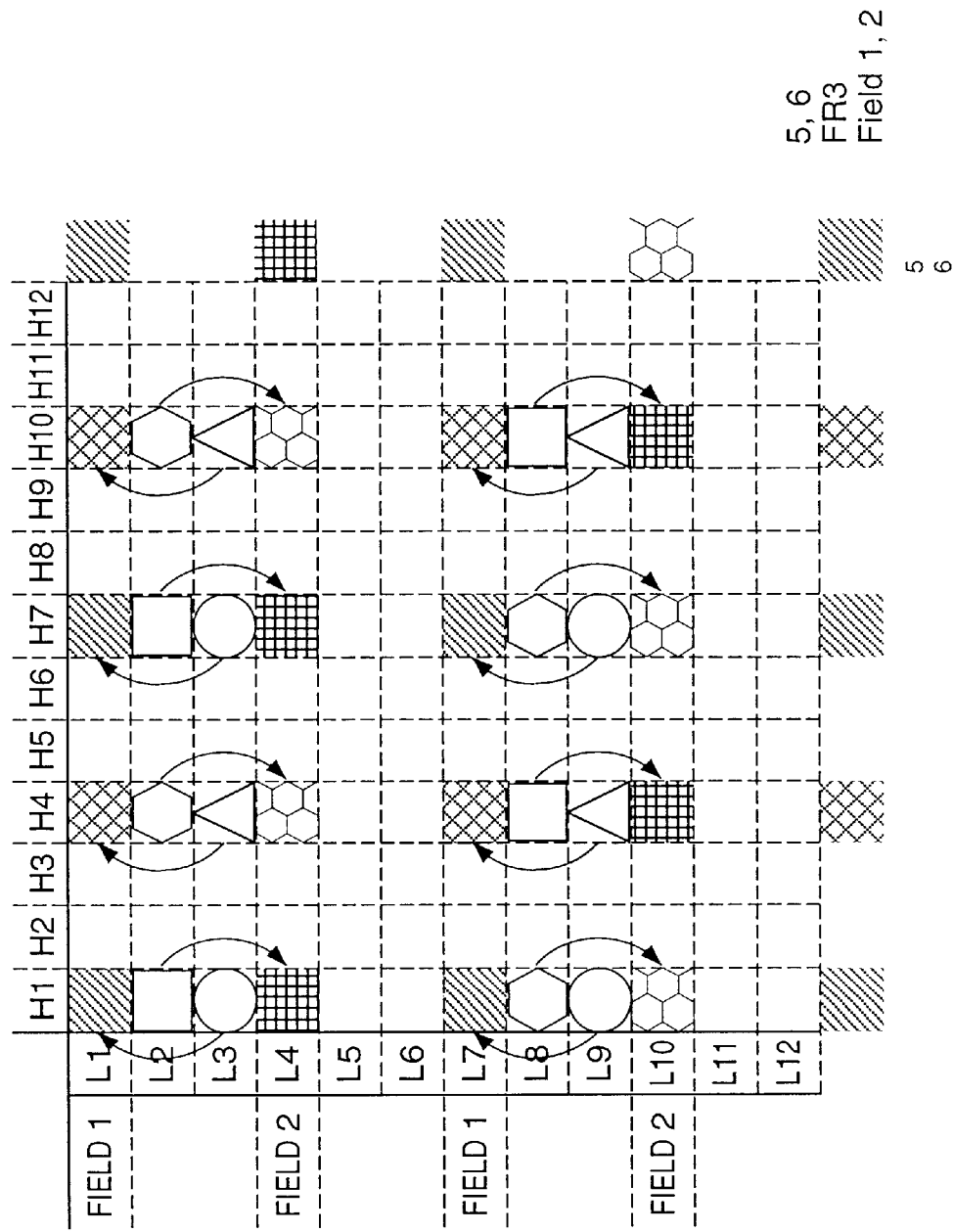
FIG. 24 is an example of pixel-shifting operation performed by the system according to the second embodiment, for explaining pixel data capturing operation on an image sensing surface.

FIG. 24 shows data derived from the frame (screen) 3. More specifically, FIG. 24 shows how image data is derived when the field 1 is scanned while the plates 6 and 3 are set respectively in the state shown in FIGS. 11 and 17, and when the field 2 is scanned while the plates 6 and 3 are set respectively in the state shown in FIGS. 11 and 21.

In the example shown in FIG. 24, when the field 1 is scanned, data in L3 and L9 represented by circle or triangle are shifted in the direction indicated by an arrow and read by the photoreceptive portion located in the position indicated by the arrow. The data in the position represented by circle is derived as data having the color Cy, and the data in the position represented by triangle is derived as data having the color Ye.

In the example shown in FIG. 24, when the field 2 is scanned, data in L2 and L8 represented by square or hexagon are shifted in the direction indicated by an arrow and read by the photoreceptive portion located in the position indicated by the arrow. The data in the position represented by square is derived as data having the color G, and the data in the position represented by hexagon is derived as data having the color Mg.

Figure 25:
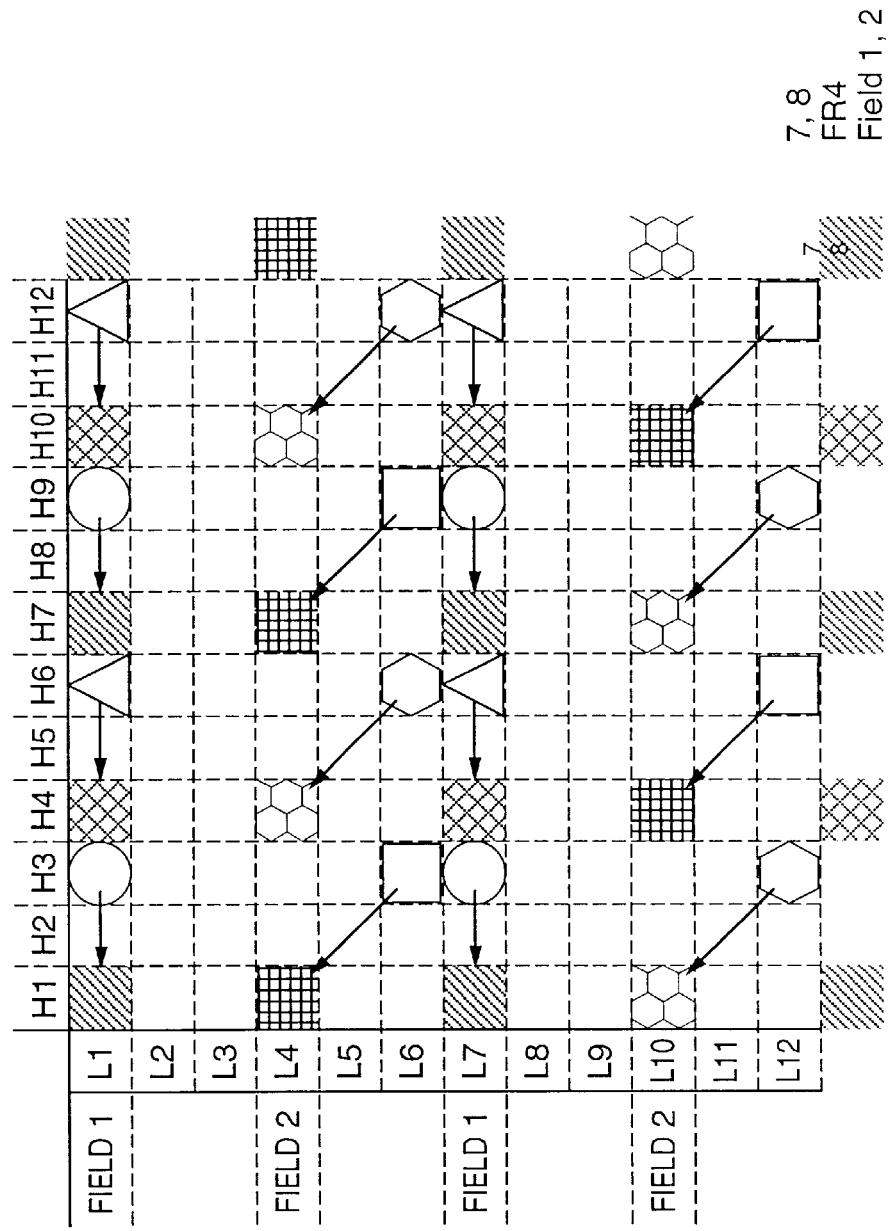
FIG. 25 is an example of pixel-shifting operation performed by the system according to the second embodiment, for explaining pixel data capturing operation on an image sensing surface.

FIG. 25 shows data derived from the frame (screen) 4. More specifically, FIG. 25 shows how image data is derived when the field 1 is scanned while the plates 6 and 3 are set respectively in the state shown in FIGS. 9 and 18, and when the field 2 is scanned while the plates 6 and 3 are set respectively in the state shown in FIGS. 9 and 17.

Figure 26:
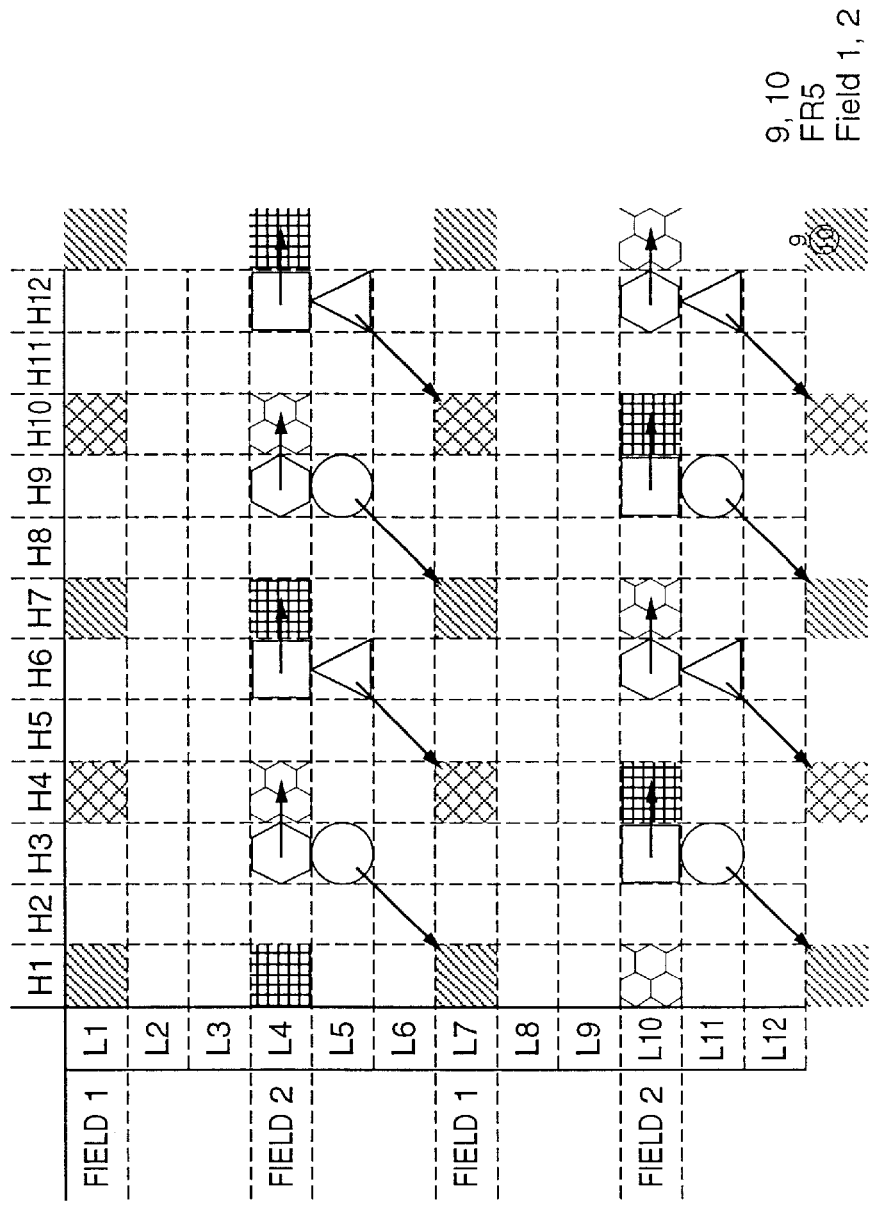
FIG. 26 is an example of pixel-shifting operation performed by the system according to the second embodiment, for explaining pixel data capturing operation on an image sensing surface.

FIG. 26 shows data derived from the frame (screen) 5. More specifically, FIG. 26 shows how image data is derived when the field 1 is scanned while the plates 6 and 3 are set respectively in the state shown in FIGS. 9 and 21, and when the field 2 is scanned while the plates 6 and 3 are set respectively in the state shown in FIGS. 9 and 19A/19B.

Figure 27:
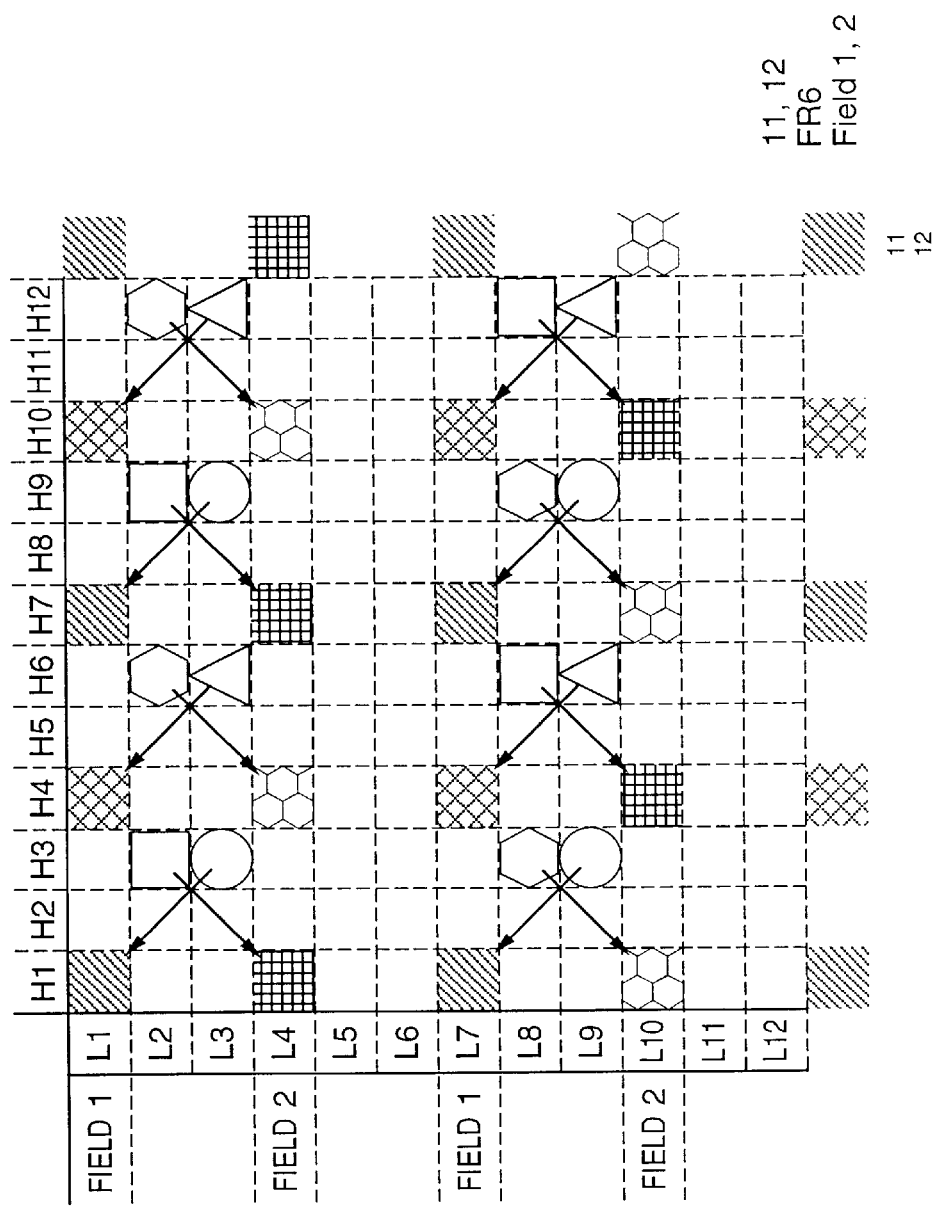
FIG. 27 is an example of pixel-shifting operation performed by the system according to the second embodiment, for explaining pixel data capturing operation on an image sensing surface.

FIG. 27 shows data derived from the frame (screen) 6. More specifically, FIG. 27 shows how image data is derived when the field 1 is scanned while the plates 6 and 3 are set respectively in the state shown in FIGS. 9 and 17, and when the field 2 is scanned while the plates 6 and 3 are set respectively in the state shown in FIGS. 9 and 21.

Figure 28:
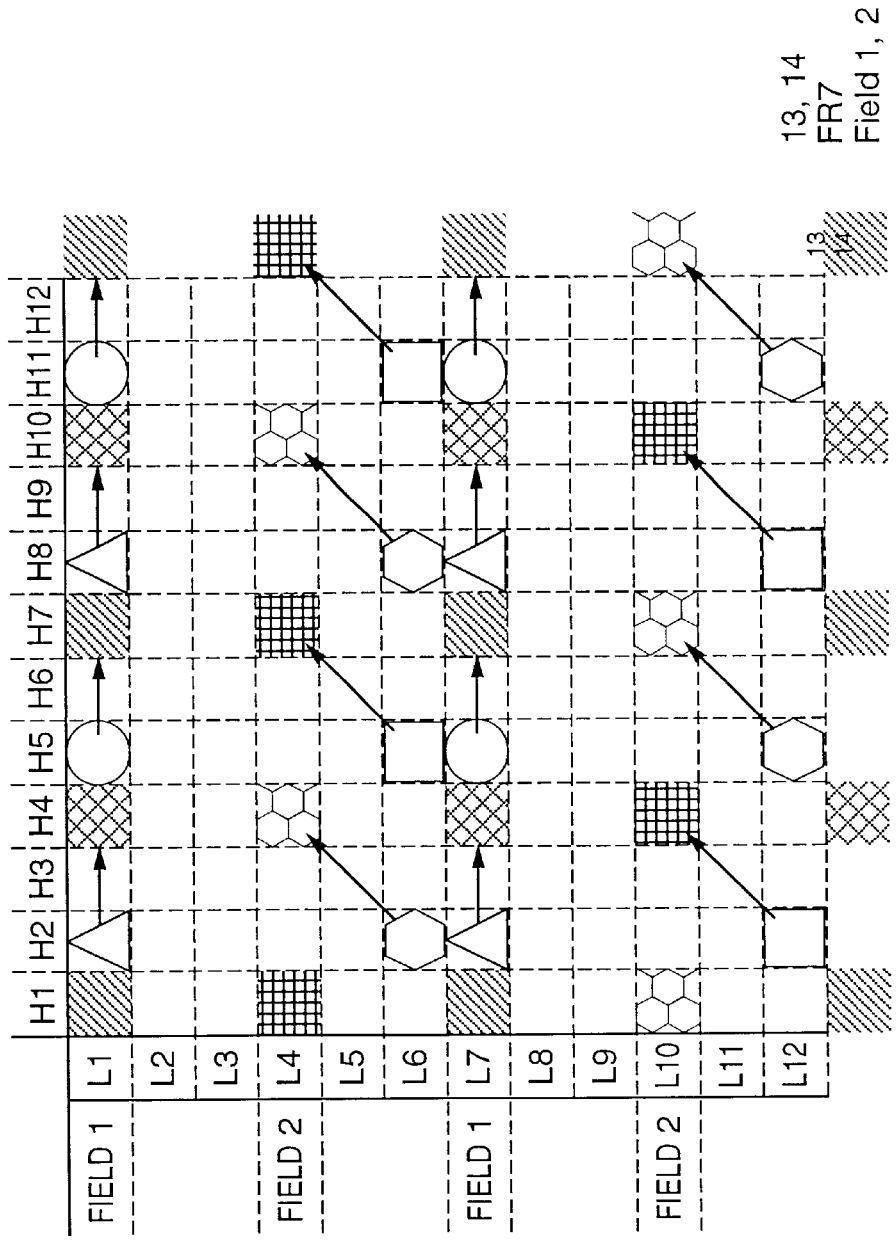
FIG. 28 is an example of pixel-shifting operation performed by the system according to the second embodiment, for explaining pixel data capturing operation on an image sensing surface.

FIG. 28 shows data derived from the frame (screen) 7. More specifically, FIG. 28 shows how image data is derived when the field 1 is scanned while the plates 6 and 3 are set respectively in the state shown in FIGS. 12 and 18, and when the field 2 is scanned while the plates 6 and 3 are set respectively in the state shown in FIGS. 12 and 17.

Figure 29:
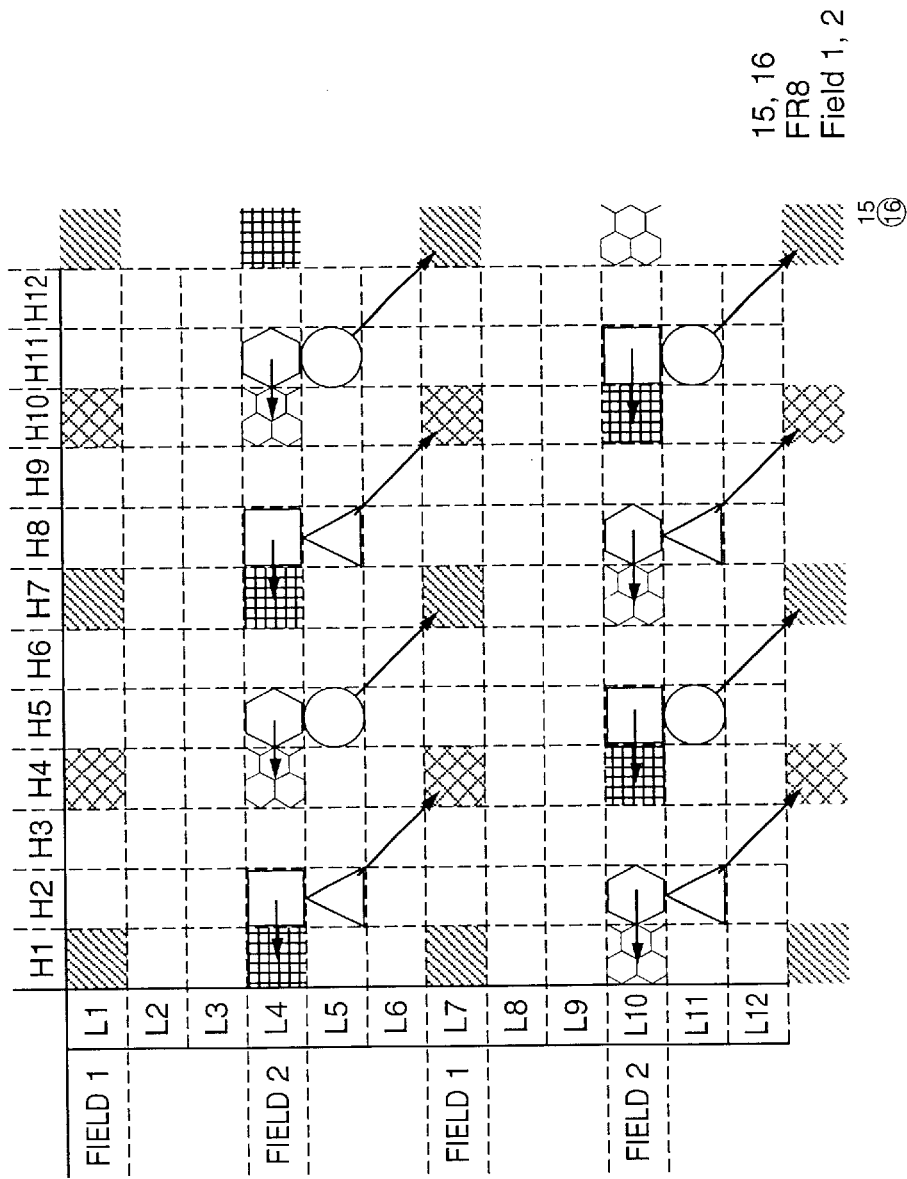
FIG. 29 is an explanatory view for explaining pixel-shifting operation performed by the pixel-shifting system according to the second embodiment.

FIG. 29 shows data derived from the frame (screen) 8. More specifically, FIG. 29 shows how image data is derived when the field 1 is scanned while the plates 6 and 3 are set respectively in the state shown in FIGS. 12 and 21, and when the field 2 is scanned while the plates 6 and 3 are set respectively in the state shown in FIGS. 12 and 20A/20B.

FIG. 30 shows data derived from the frame (screen) 9. More specifically, FIG. 30 shows how image data is derived when the field 1 is scanned while the plates 6 and 3 are set respectively in the state shown in FIGS. 12 and 17, and when the field 2 is scanned while the plates 6 and 3 are set respectively in the state shown in FIGS. 12 and 21.

Figure 32:
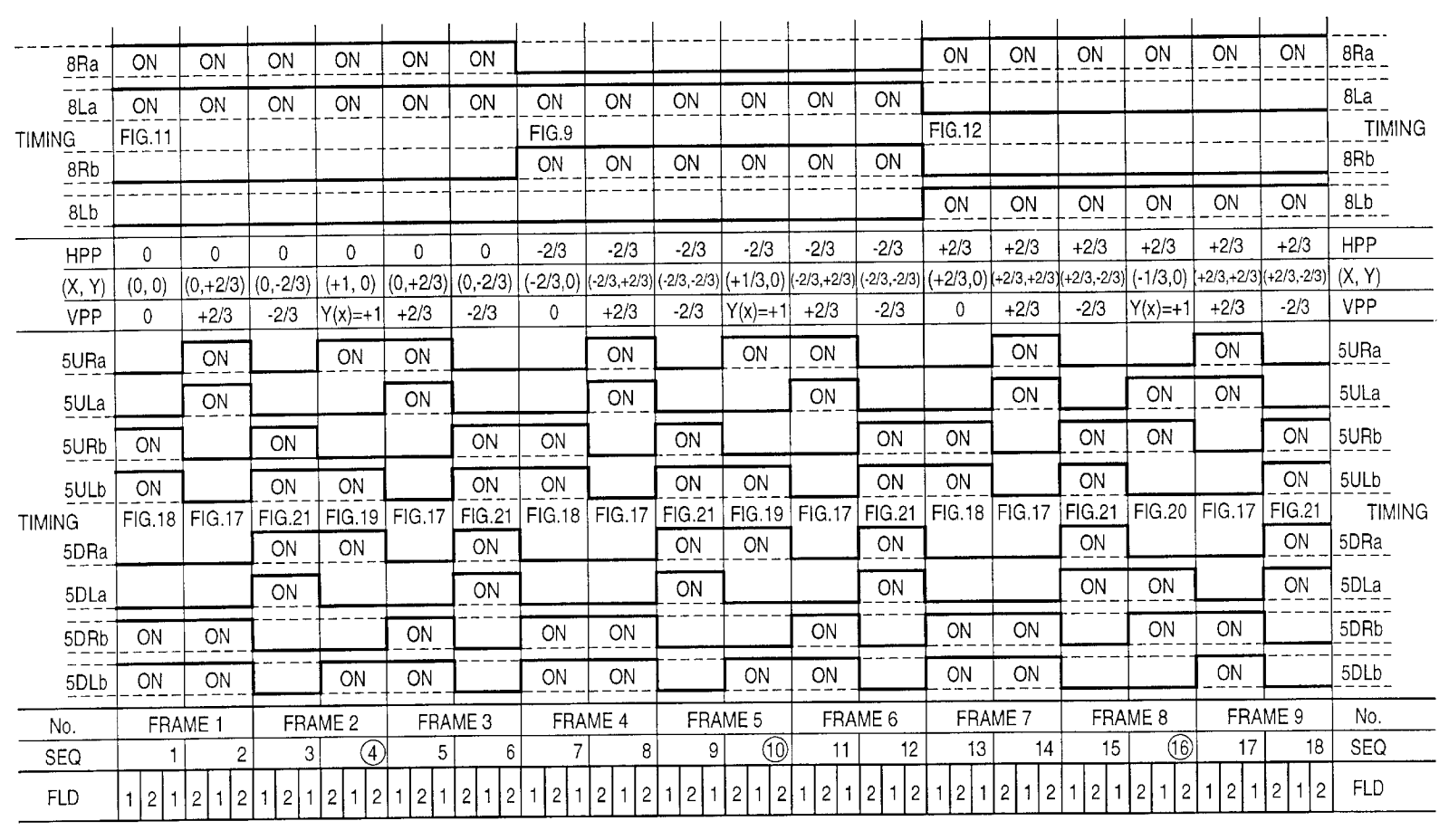

Note that the above-described operational flow is shown in a clear order in FIG. 32. Shown in FIG. 32 is, from the bottom of the drawing, field FLD scanned for deriving image data, sequence of field SEQ, frame number NO, and energizing timing TIMING of each of the electromagnets 5URa, 5ULa, 5URb, 5ULb, 5DRa, 5DLa, 5DRb, 5DLb, controlling the vertical plate 3. In the middle, the number of drawings showing the respective states is indicated.

Referring further to the upper portion of the drawing, the amount of pixel-shifting (VPP) executed by the vertically provided plate 3, and coordinates (x, y) of pixel-shifting expressed with +/− while assuming that the state shown in FIG. 18 is 0.

Shown further in the upper portion of the drawing is energizing timing TIMING of each of the electromagnets 8Ra, 8La, 8Rb and 8Lb, controlling the horizontal plate 6, and the amount of pixel-shifting (HPP).

Figure 31B:
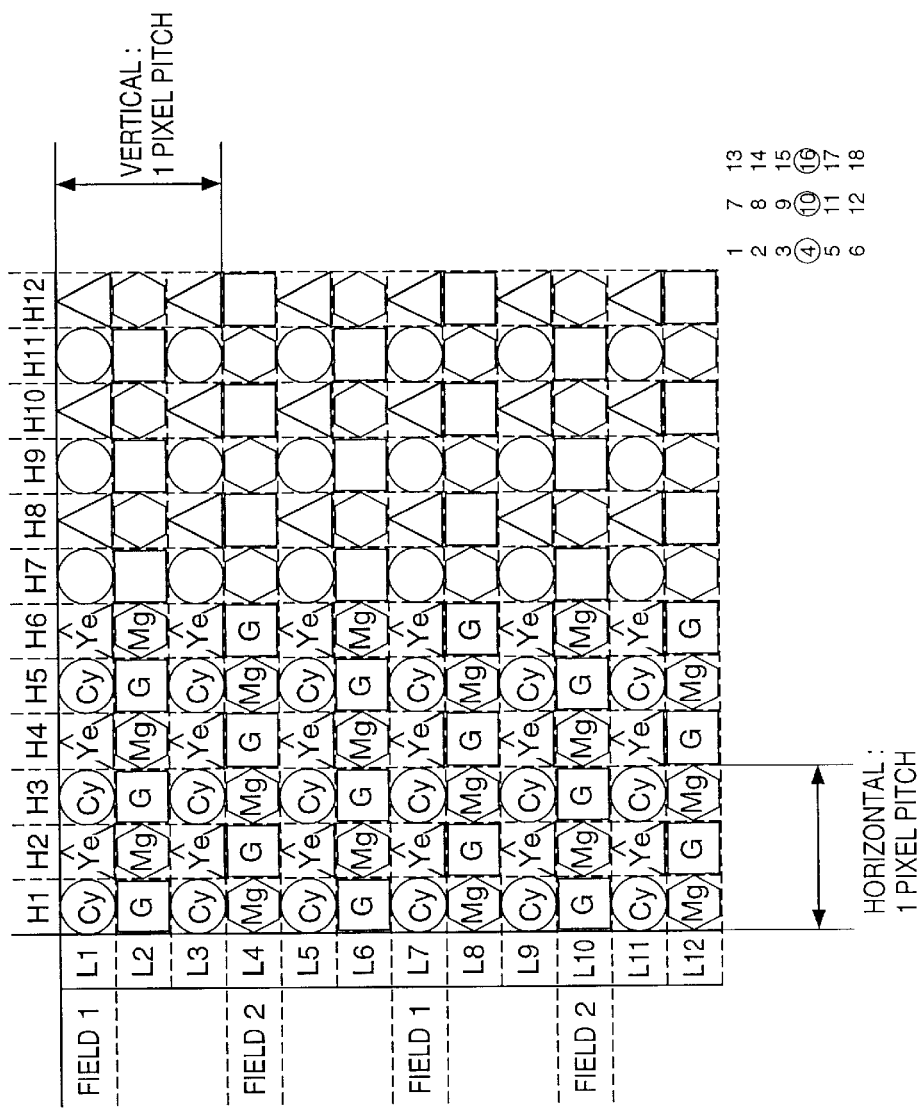

Accordingly, as shown in FIGS. 31A and 31B, it is possible to capture data indicative of light flux, which was conventionally unable to capture because the light is incident upon the light-insensitive zone in peripheries of each photoreceptive portion, can be captured by pixel-shifting operation.

In other words, image data, which is incident upon other pixels or light-insensitive zones between pixels of the image sensing surface, can be received. As a result, it is possible to achieve an effect equivalent to the case where the number of pixels of the image sensing device is increased.

Furthermore, it is possible to attain an effect equivalent to a case where the number of pixels are increased while keeping the same cycle of color filter arrangement as the color cycle of filter arrangement of the CCD, thus achieving three times the resolution in a color image.

Furthermore, since the data is stored in the memory in the aforementioned sequence (sequence of frames 1 to 9) and reproduced in the same order without reversing the sequence, the operation processing of image data is simplified and processing speed largely increases.

Note that the pixel-shifting mechanism, such as the plate 3, may naturally serve as the plate 6 provided for horizontal pixel-shifting. By this modification, it is possible to increase, by a maximum of six steps, the number of pixel-shifting positions in the vertical pixel array with respect to one horizontal position.

It should be further noted in the above-described pixel-shifting processing that, as shown in FIG. 25, the arrangement of pixel data has a so-called complementary-color checkers pattern used in the normal color filter.

This means that image data obtained by the above-described pixel-shifting is used, for instance, in the normal camera process adopting NTSC scheme, without utilizing any special processes. As a result, it can be shared with the normal television image sensing system. Therefore, for instance, it is possible to realize a system capable of moving-image sensing and still-image sensing adopting the pixel-shifting operation.

Accordingly, the second embodiment is greatly advantageous in terms of system efficiency, high speed data processing, and compatibility with other systems.

Third Embodiment

Next, a third embodiment of the pixel-shifting system according to the present invention will be described.

In comparison with the above-described second embodiment, the third embodiment is characterized by a simplified driving system consisting of electromagnets for driving the plates and decreasing the electric consumption.

Figure 33A:
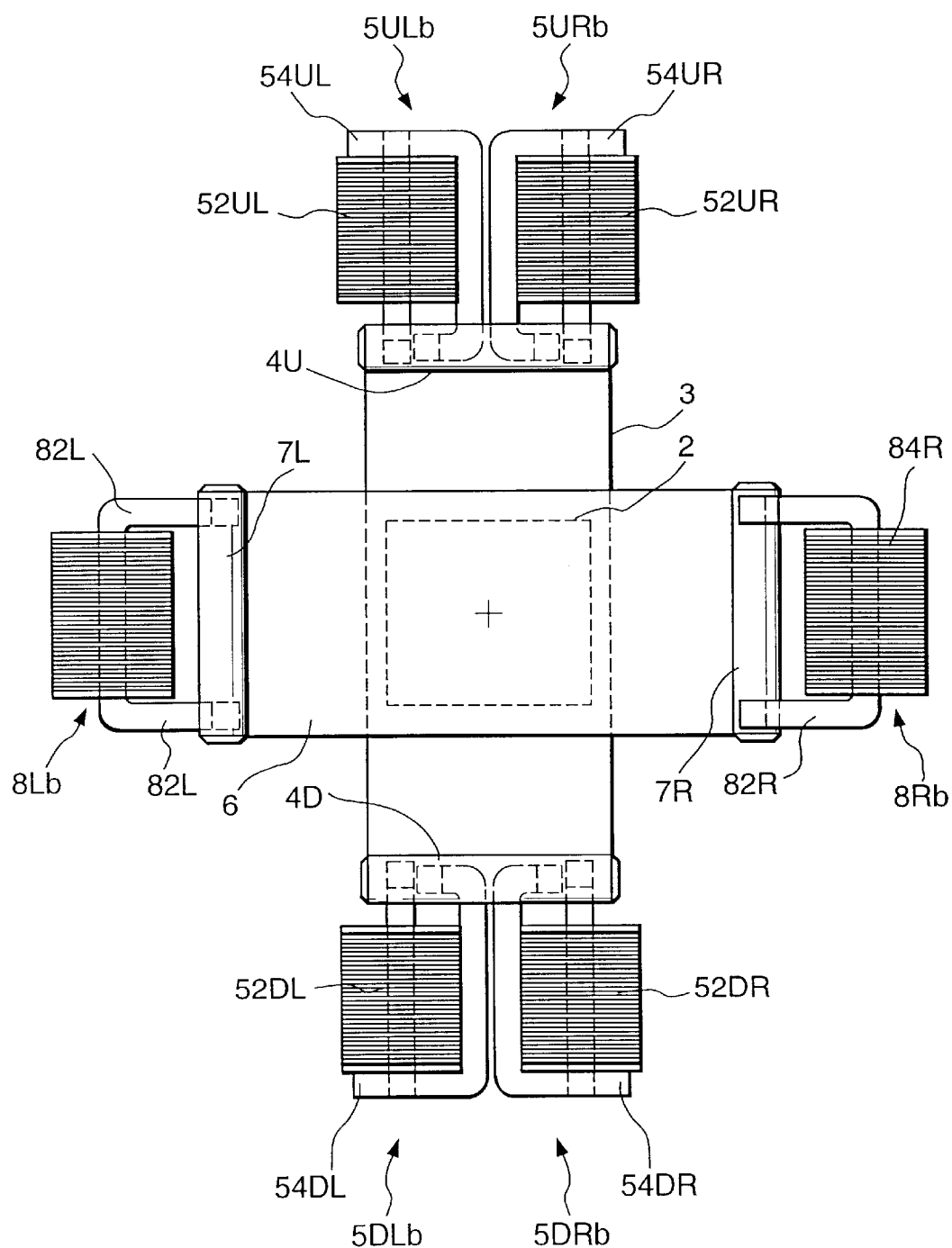
FIGS. 33A, a front view and 33B, a top view of a pixel-shifting system according to a third embodiment of the present invention.
Figure 33B:
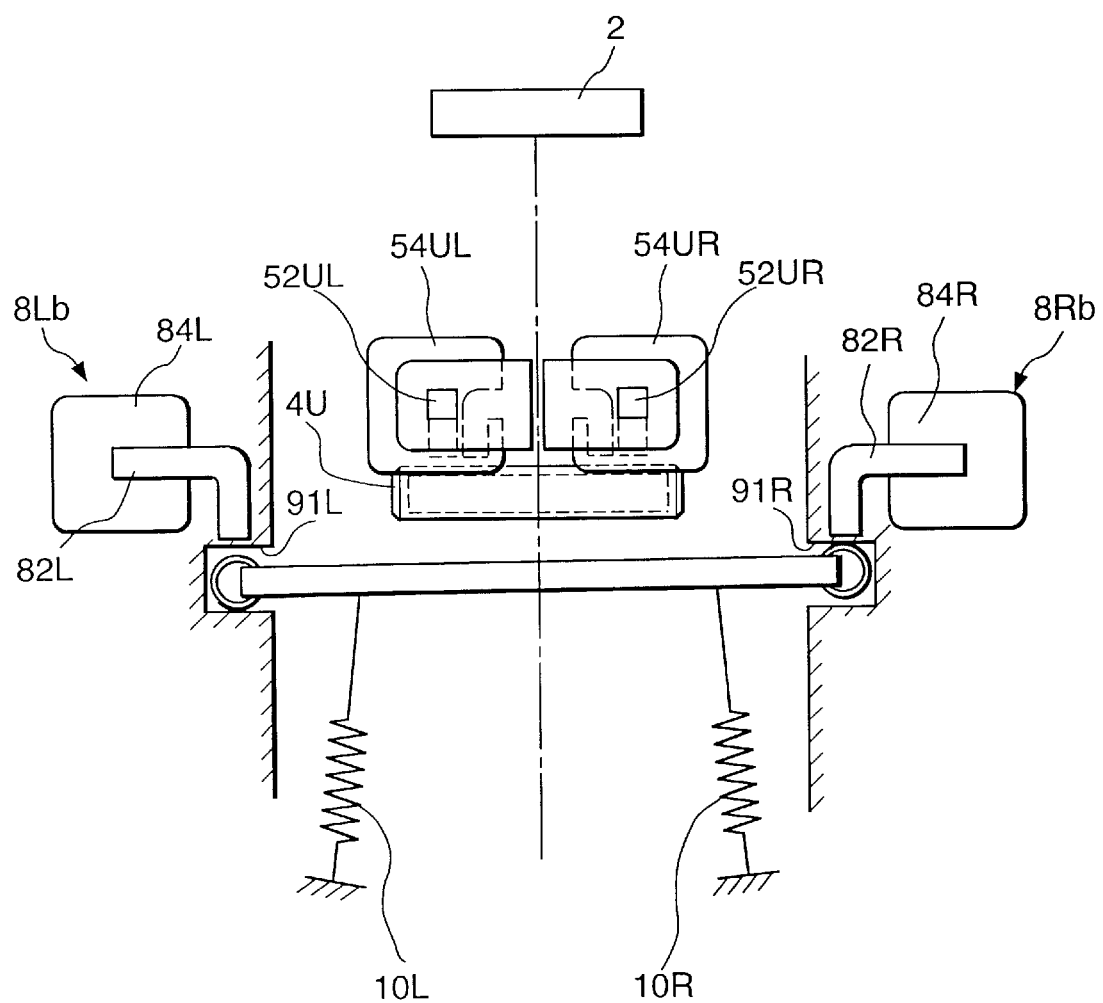
Figure 34A:
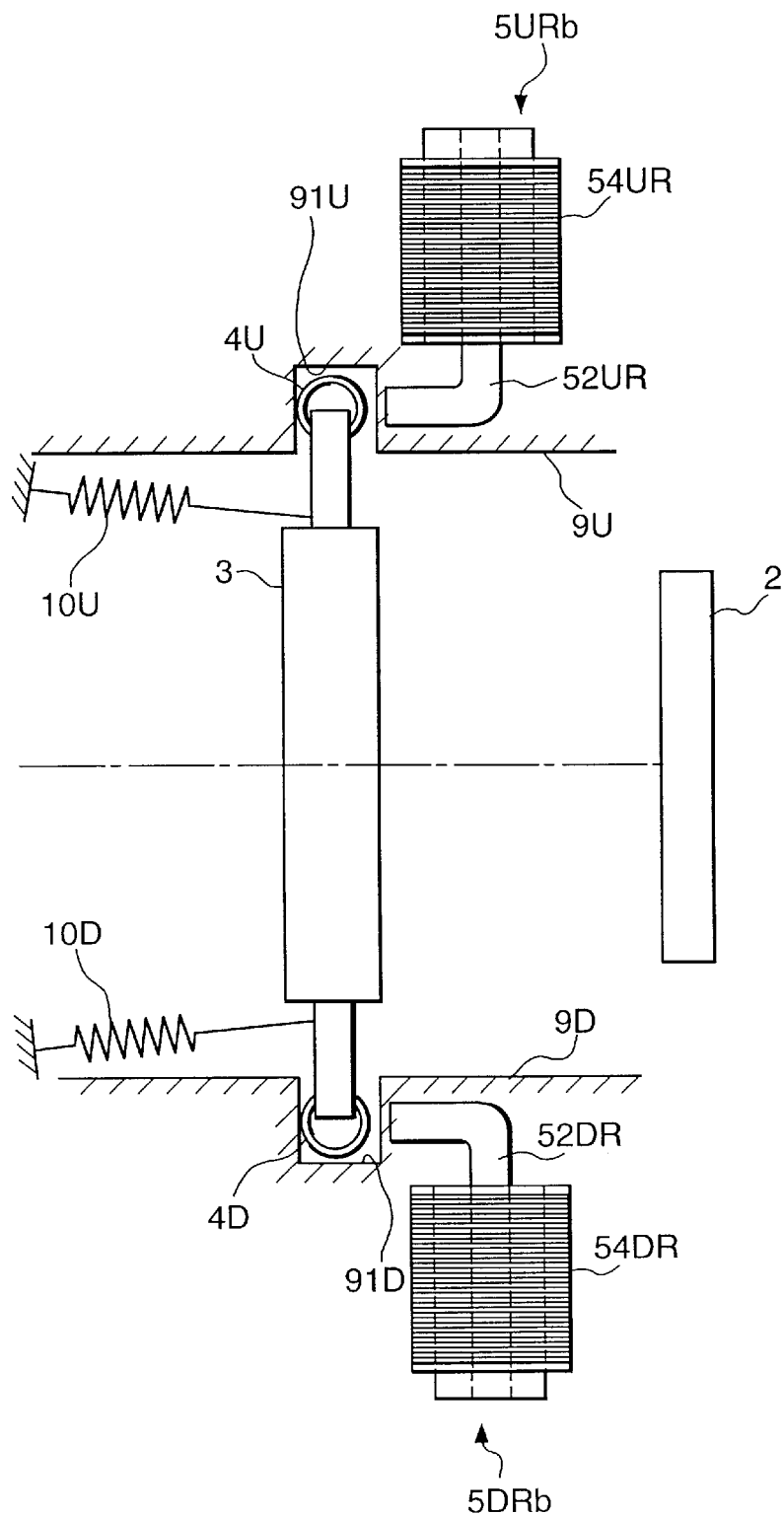
FIGS. 34A and 34B are explanatory views for explaining operation of the pixel-shifting system according to the third embodiment of the present invention.
Figure 34B:
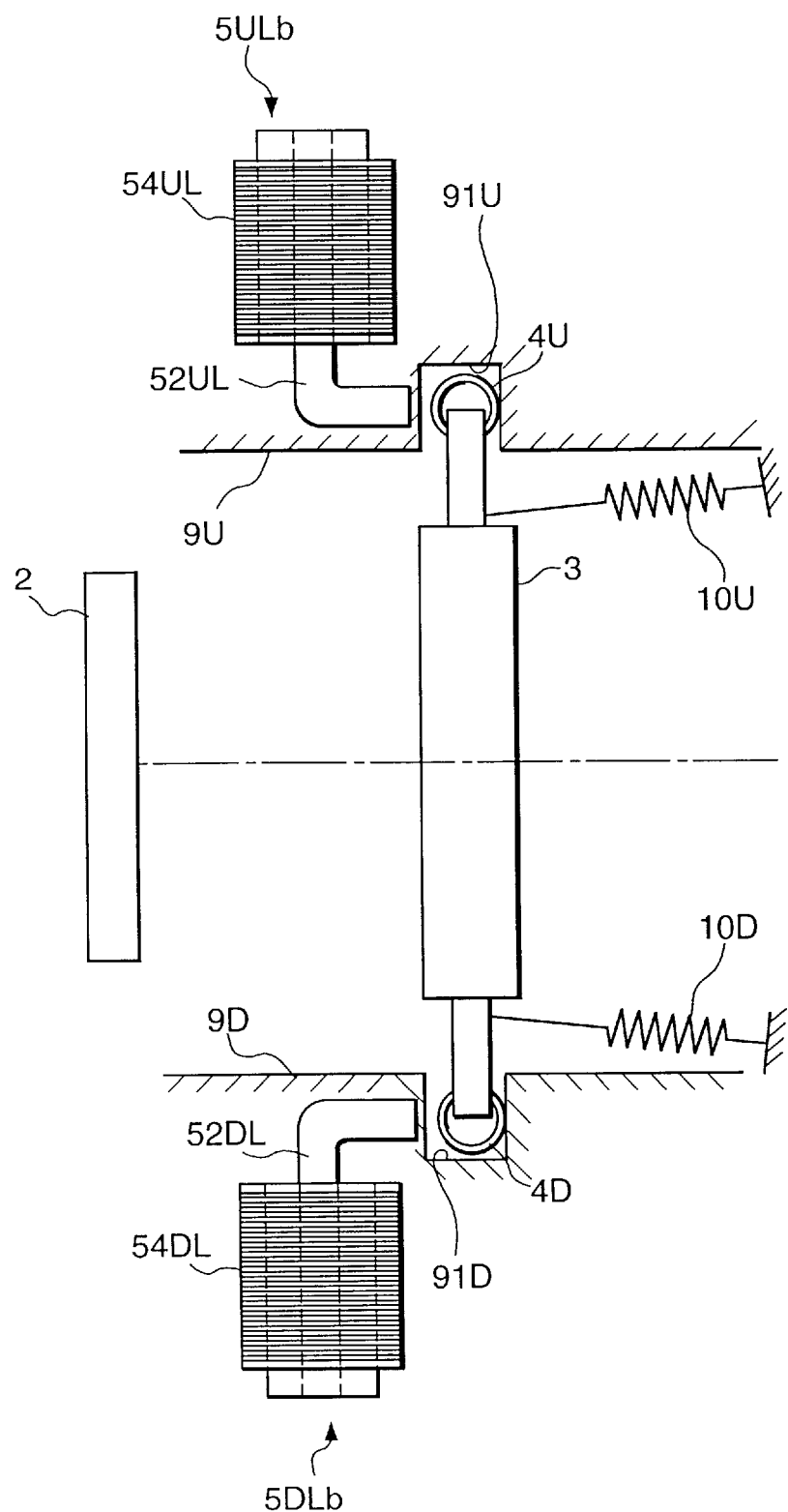

FIGS. 33A, 33B, 34A and 34B show the main portion of the present embodiment. FIG. 33A is a front view of the pixel-shifting unit seen from the front (object side) of the optical axis; FIG. 33B, a top view; FIG. 34A, a side view seen from the right side of the unit; and FIG. 34B, a side view seen from the left side of the unit.

Each of the drawings differs from that of the second embodiment in that some the electromagnets are removed and replaced with a spring. In FIGS. 33 to 34, components having the same structure as that of the above-described second embodiment will be referred to by the same reference numerals and description thereof will be omitted.

More specifically, in comparison with FIGS. 15 and 16, electromagnets 5ULa, 5URa, 5DLa, 5DRa, 8La and 8Ra are removed, and instead, springs are respectively provided, urging the plate to the front (object side) of the optical-axis direction.

In other words, while these springs function as the pulling force of the electromagnets 5ULa, 5URa, 5DLa, 5DRa, 8La and 8Ra, driving of electromagnets 5ULb, 5URb, 5DLb, 5DRb, 8Lb and 8Rb generates electromagnetic pulling force, moving the plate in the direction opposing the spring. By virtue of this, the twelve electromagnets provided in the second embodiment can be reduced by half, six electromagnets.

Referring to FIGS. 33B and 34A, springs 10L and 10R are provided in place of the electromagnets 8La and 8Ra to pull the armatures 7L and 7R of the plate 6 toward the front (object side) of the optical-axis direction, and springs 10U and 10D are provided in place of the electromagnets 5ULa, 5URa, 5DLa and 5DRa to pull the armatures 4U and 4D of the plate 3 toward the front (object side) of the optical-axis direction.

Figure 15B:
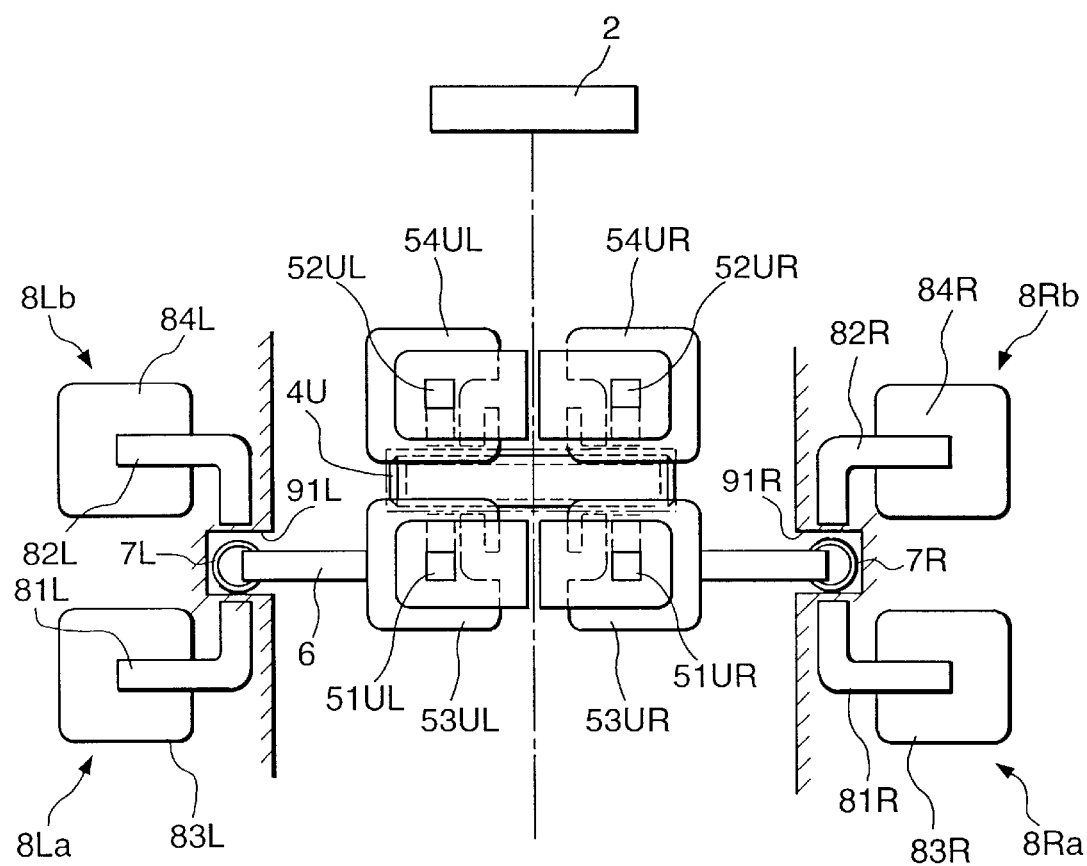
Figure 16A:
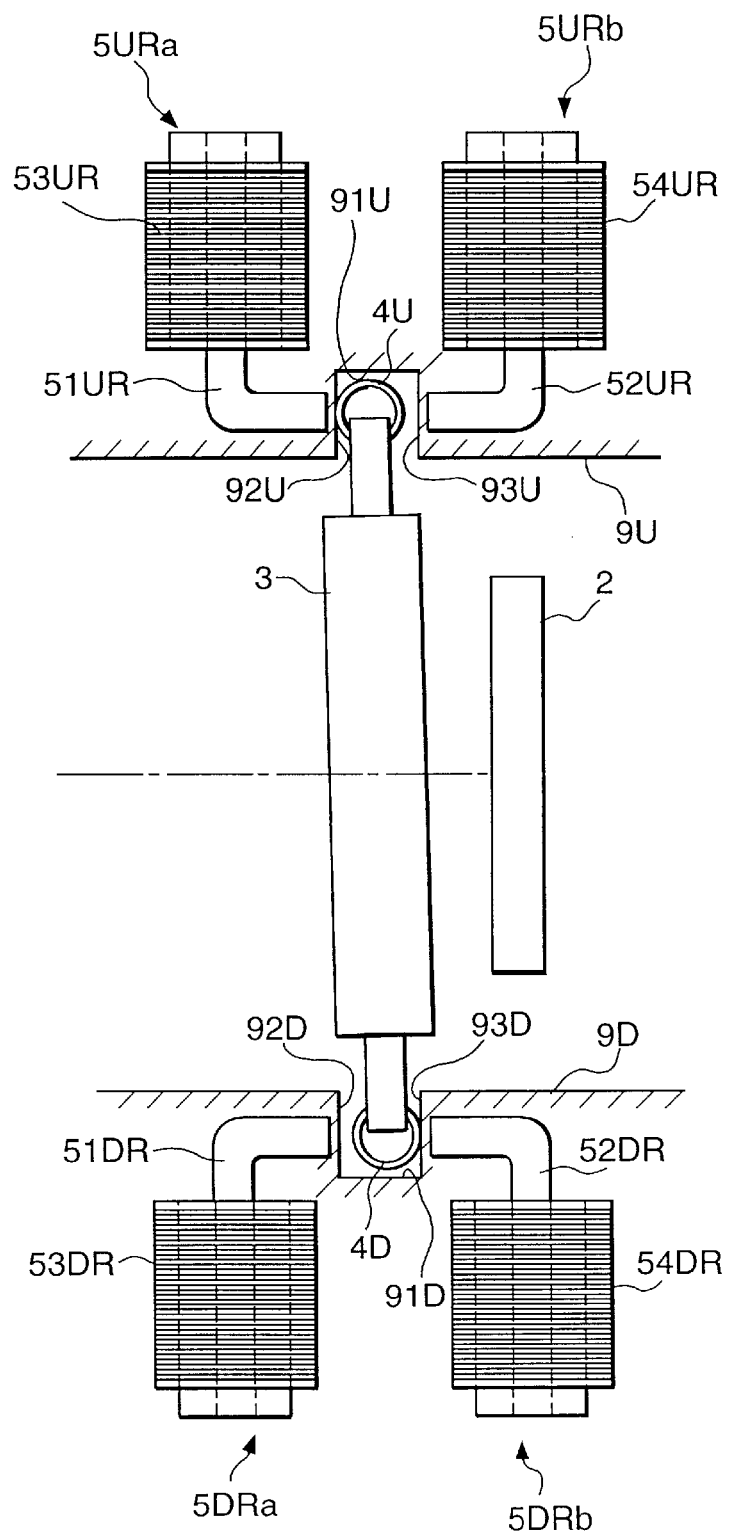
FIGS. 16A and 16B are explanatory views for explaining pixel-shifting operation performed by the pixel-shifting system according to the second embodiment.
Figure 16B:
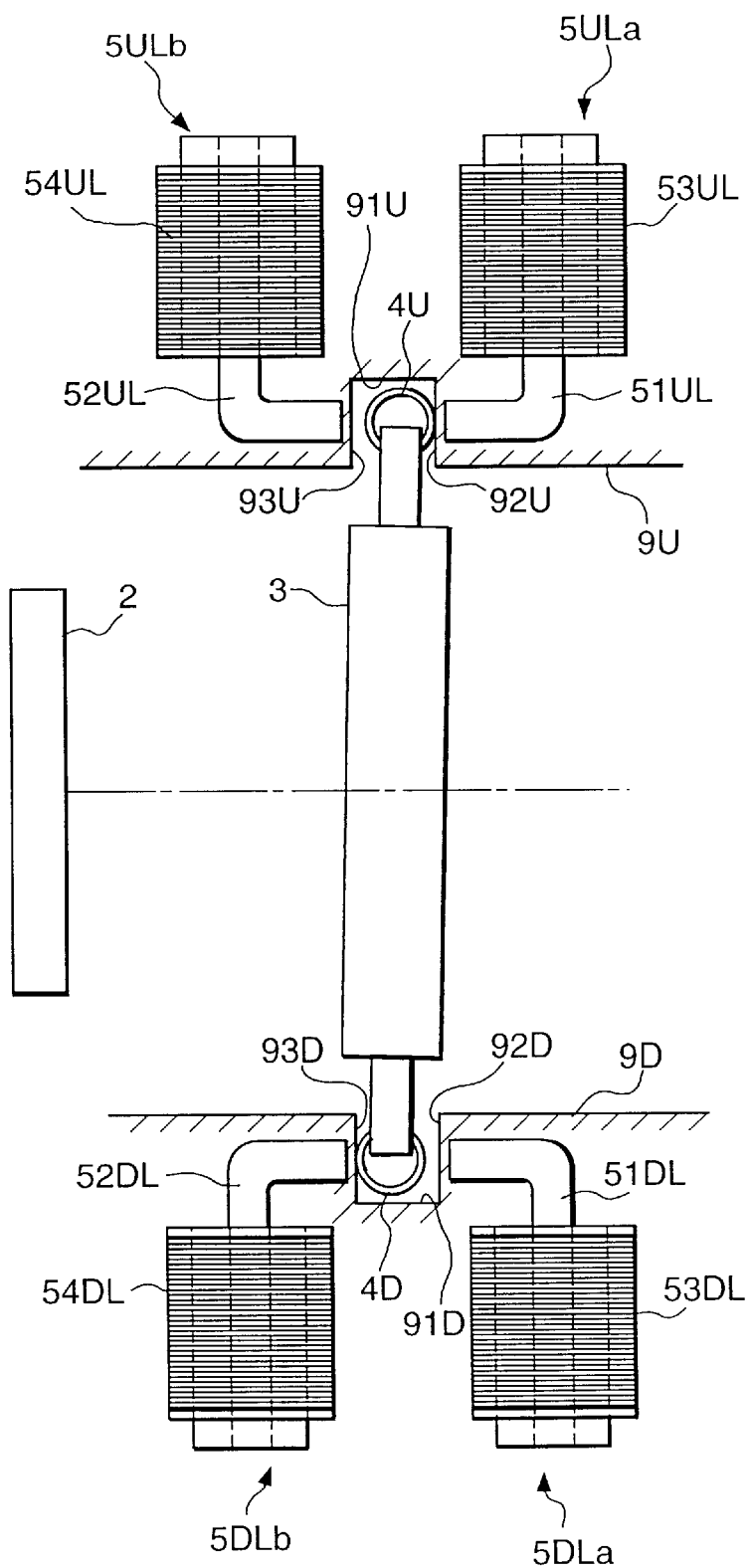

Although other springs are not shown in the drawings, springs are provided in place of the electromagnets 5ULa, 5URa, 5DLa, 5DRa, 8La and 8Ra shown in FIGS. 15A and 15B. The structure thereof should be apparent from the FIGS. 15A and 15B.

Note that pixel-shifting operation in the vertical direction performed by the plate 3 and the pixel-shifting operation in the horizontal direction performed by the plate 6 are identical to the description provided in the first embodiment with reference to FIGS. 17 to 21, and the description provided in the second embodiment with reference to FIGS. 9 to 12. Accordingly, the same description will not be provided herein.

Application to Camera

The pixel-shifting system according to the present invention, which has the above-described configuration and operates in the aforementioned manner, can be incorporated in a lens mirror or camera body. Construction of the system in such case will be described.

Figure 35:
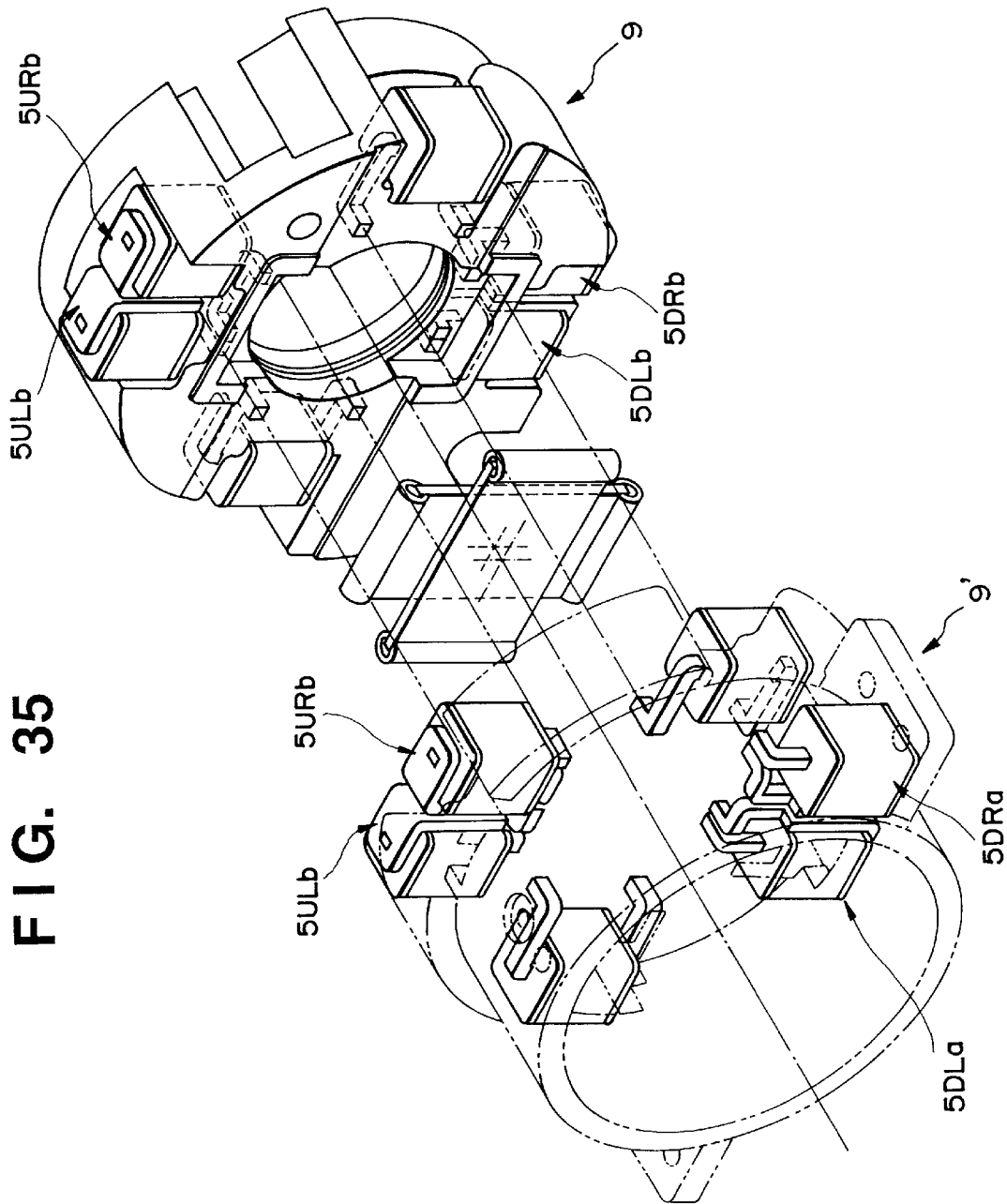
FIG. 35 is a perspective view showing a structure in a case where the pixel-shifting system according to the first embodiment is incorporated as a unit.

FIG. 35 is an exploded perspective view of the pixel-shifting unit incorporating the pixel-shifting mechanism according to the present embodiment.

In FIG. 35, reference numerals 9 and 9' denote a body supporting each electromagnet and plate, divided into the front and back bodies in the optical-axis direction. Along the optical axis, an opening is formed to allow incident light to pass.

Figure 36:
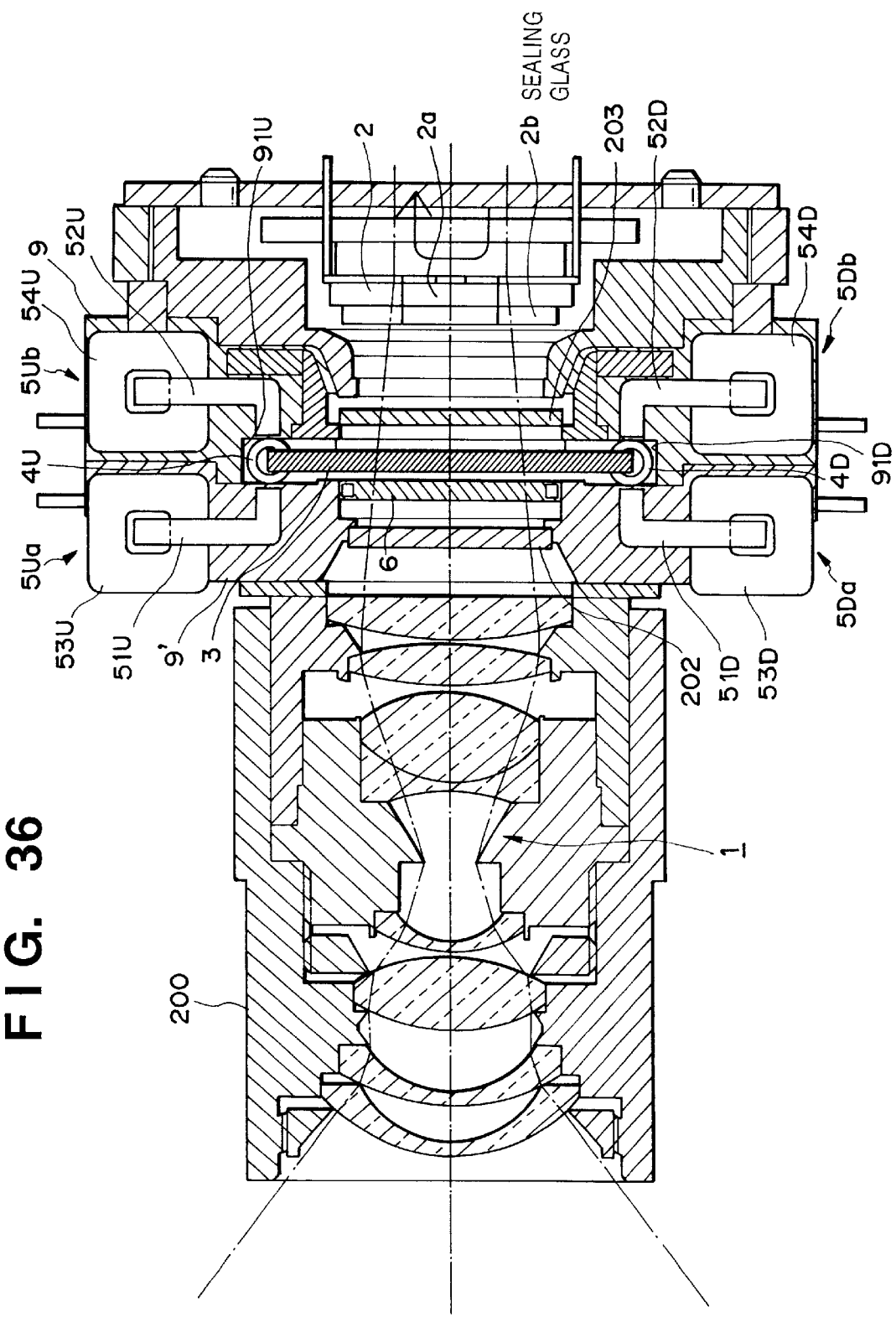
FIG. 36 is structural view of a camera incorporating the unit of pixel-shifting system according to the first embodiment.

Referring to FIGS. 35 and 36, in a predetermined position of the surface where the back body 9 joins the front body 9', in the periphery of an opening 9a of the back body 9, electromagnets 5Ub, 5Db, 8Lb and 8Rb are provided. On the recesses 91U, 91D, 91L and 91R where plates 3 and 6 are respectively inserted for vertical and horizontal pixel-shifting, regulating surfaces 93U, 93D, 93L and 93R are formed respectively.

In the position opposite to the armatures 4U, 4D, 7L and 7R of each of the plates 3 and 6, armatures 52U, 52D, 82L and 82R of the respective electromagnets 5Ub, 5Db, 8Lb and 8Rb are provided in a manner such that the armatures 52U, 52D, 82L and 82R are exposed.

Meanwhile, on the side of the front body 9' opposing the back body 9, electromagnets 5Ua, 5Da, 8La and 8Ra are provided opposite to the electromagnets 5Ub, 5Db, 8Lb and 8Rb. On the recesses 91U, 91D, 91L and 91R, regulating surfaces 92U, 92D, 92L and 92R are formed respectively.

Accordingly, combining the front body 9' and back body 9 enables to support each of the plates 3 and 6 for vertical and horizontal pixel-shifting and the electromagnets for controlling the position of these plates, as indicated in FIGS. 1 to 20 and 32 to 34.

FIG. 36 is a transverse cross section showing a case where the pixel-shifting unit is incorporated in a camera.

In FIG. 36, reference numeral 200 denotes a lens barrel, having an object lens optical system 1 therein. The pixel-shifting unit shown in FIGS. 13 and 14 to 20 is provided in the mounting portion of the lens barrel 200. The pixel-shifting unit includes the front body 9' and back body 9. As apparent from FIG. 36, an LPF (optical low-pass filter) 202 for limiting the spatial frequency of incident light, plate 6 for horizontal pixel-shifting, plate 3 for vertical pixel-shifting, and LPF (optical low-pass filter) 203 are sequentially provided. An image sensing device 2 is provided therebehind. Reference numeral 2a denotes an effective image sensing surface of the image sensing device 2 (image sensing area) and 2b denotes a sealing glass of the image sensing surface.

An infrared ray filter can be provided by coating, e.g. the surface of plate 3 or 6.

Combination of the LPFs 202 and 203 perform band limitation of spatial frequency of incident light to remove moire or the like caused by aliasing distortion. Since the LPF 202 is rotatable, a wavelength of incident light is changed in accordance with the rotation of the LPF 202, canceling the LPF effect.

Accordingly, when the band limitation by the LPF needs to be removed to perform particularly high-quality image sensing, it can be realized without removing the LPF from the camera, but simply by rotating the LPF. Since details thereof are disclosed in Japanese Patent Application Laid-Open NO. 7-245762, description will not be provided herein.

Next, a circuit for driving the above-described pixel-shifting will be described with reference to FIG. 37.

Figure 37:
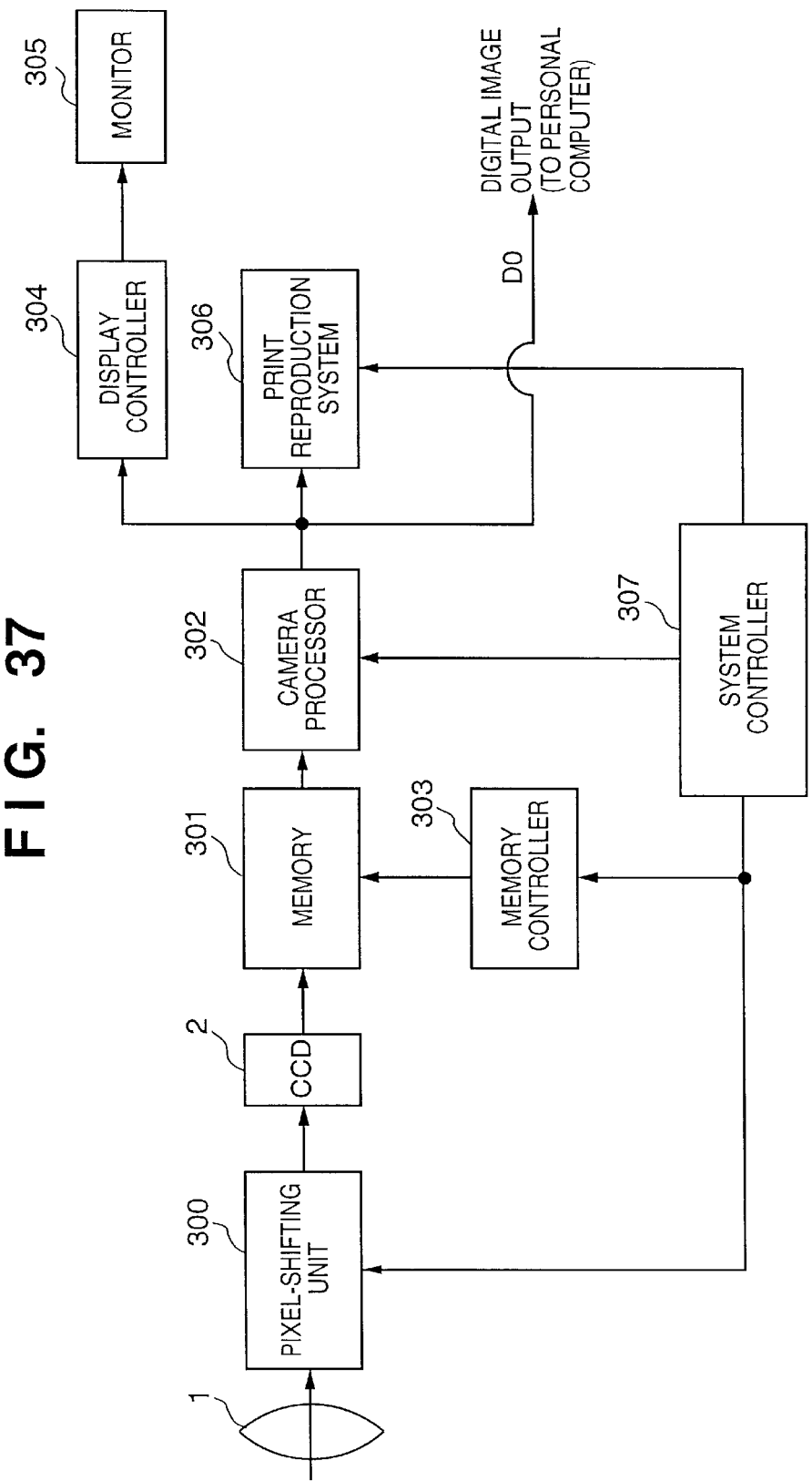
FIG. 37 is a block diagram for performing image sensing utilizing the pixel-shifting system according to the first to third embodiments.

In FIG. 37, reference numeral 1 denotes an image-sensing lens optical system; and 2, an image sensing device. In the space between them, a pixel-shifting unit 300 is provided.

An image sensing signal outputted by the image sensing device 2 is stored in a memory 301. Image data read out of the memory is supplied to a camera processor 302 where luminous signal and color signal are generated, then supplied to a print reproduction system 306 where printing is performed on a print medium (not shown).

Alternatively, the image data is supplied to a display controller 304 where the image data is converted to signals displayable by a monitor, and displayed in a monitor display 305.

Alternatively, a digital image signal without conversion may be outputted to an external apparatus through a digital image output D0 to be supplied to a personal computer or the like.

The image processing circuit constructed as above is controlled by a system controller 307 having a microcomputer.

In other words, the pixel-shifting unit is controlled to control the plates in the vertical and horizontal directions respectively to perform pixel shifting.

In the third embodiment of the present invention, for instance, the system controller 307 controls the plate 3 to perform pixel-shifting in four steps in the vertical direction, and in each of the four steps, controls the plate 6 to perform pixel-shifting in four steps in the horizontal direction. As a result, the total of sixteen images can be derived from the four steps of pixel-shifting in the vertical direction and four steps of pixel-shifting in the horizontal direction.

Each of these images is sequentially stored, as the memory controller 303 controls the memory 301. When all the images are stored in the memory 301, image data is read out of the memory pixel by pixel, while combining these pixels into one image. Then, the read data is supplied to the camera processor 302 where luminous signal processing and color signal processing are performed, and high quality image signal can be obtained.

Note that, image data may be outputted to an external apparatus such as a personal computer or the like without using the camera processor, and various image processing may be performed by the external apparatus.

By the above-described processing, it is possible to perform image-sensing of a high quality image which is equivalent to an image sensed by an image sensing device having a much larger number of pixels than the actual number of pixels.

As described above, according to the pixel-shifting system of each of the above embodiments of the present invention, it is possible to realize the pixel-shifting system which can simplify the control method, which has a mechanism that enables to increase processing speed, and which enables to obtain a number of stable optical positions with a simple mechanism. This is realized by utilizing electromagnetic driving means e.g., an electromagnet, as a driving source of the pixel-shifting system in place of a motor, providing an abutting space as position control means in place of a complicated mechanism such as a cam or the like, controlling an inclination angle of a pixel-shifting optical device e.g., a plane parallel plate or the like, by changing the size of the abutting space for position control, minimizing the members requiring size precision as much as possible, and eliminating a particular supporting axle for controlling an inclination angle of the optical device.

Advantages of First to Third Embodiments

As has been set forth above, according to the present invention, a plurality of regulating portions for regulating a shifting position with respect to an optical-axis direction are formed on both ends of an optical device provided for shifting the position of incident light on an image sensing surface, and the optical device is positioned to abut against each of the regulating portions, making it possible to control the inclination of the optical device in a plurality of directions. By virtue of this configuration, pixel-shifting operation with extremely precise positioning is realized by a simple structure in which the optical device abuts against the regulating portions.

Furthermore, the inclination of optical device can be controlled in a plurality of angles by changing the combination of the regulating surfaces to which the end portions of the optical device is abutted. Therefore, pixel-shifting operation can be performed with an extremely simple structure, at high speed and high precision. In addition, the inclination angle can be controlled in the first and second directions with respect to the optical device. Thus, high-speed pixel-shifting can be performed in both vertical and horizontal directions on the image sensing surface.

Moreover, one end of the optical device and the other end of the optical device have the same range of movement, allowed by the regulating surface, with respect to the optical-axis direction. Therefore, the inclination angle of the optical device can be controlled in three stages with respect to the vertical or horizontal direction. For instance, a plane parallel plate provided primarily to perform pixel-shifting in the vertical (horizontal) direction can be utilized for pixel-shifting in the horizontal (vertical) direction. Thus, for one vertical (or horizontal) position of the plate, pixel-shifting steps twice as many pixel-shifting steps as in the horizontal (or vertical) direction are attained. Vice versa, a plane parallel plate provided primarily to perform pixel-shifting in the horizontal direction can be utilized for pixel-shifting in the vertical direction. Thus, for one horizontal position of the plate, pixel-shifting steps twice as many pixel-shifting steps as in the vertical direction are attained.

Furthermore, on both ends of the optical device abutting against the regulating surfaces, an engaging portion which contacts with the regulating surfaces by point or line is provided. By virtue of this, even if the engaging position on the regulating surface within the engaging portion of the optical device changes, causing position deviation on the plane parallel to the image sensing surface, the inclination angle of the plate can be kept constant. As a result, the amount of pixel-shifting is kept uninfluenced.

Moreover, driving means is constructed by a plurality of electromagnets which drive the plate forward or backward with respect to the optical-axis direction, and the regulating surface against which the optical device abuts is changed by controlling the turning ON/OFF the electromagnets. By virtue of this, pixel-shifting is realized at high speed and high precision with a simple structure.

Fourth Embodiment

An image sensing apparatus according to the fourth embodiment comprises, between an objective lens and image sensing devices (CCD), a horizontal shift mechanism and a vertical shift mechanism respectively including plane-parallel-plate glasses for horizontally and vertically shifting the light flux, which is incident through the objective lens, onto the image sensing surface of the image sensing devices.

FIG. 38 is a perspective view showing a perspective structure of a pixel-shifting system in an image sensing apparatus according to the fourth embodiment. Referring to FIG. 38, reference numeral 1 denotes an image-sensing lens unit serving as an optical system; and 2, image sensing devices serving as image sensing means, e.g., CCD or the like. Reference numeral 3 denotes a light-transmitting plane parallel plate formed with a glass (or may be formed with plastic), serving as a (vertical) optical device which shifts, in the vertical direction on the image-sensing surfaces of the image sensing devices 2, light flux incident through the objective lens unit 1. At both ends of the plate 3, armatures 4U and 4D made of soft electromagnetic iron are provided as engaging portions. Electromagnets 5Ua, 5Ub, 5Da and 5Db, serving as driving means for driving the optical device, are provided at front and back of each of the armatures 4U and 4D in the optical axis direction. By controlling the driving state of these electromagnets, the inclination of the plate 3 is controlled. By rotating the plate 3 in the direction indicated by arrow V, it is possible to vertically shift the incident position of the light flux on the image-sensing surface.

Note that the electromagnet 5Ua comprises yoke 51U and coil 53U, while the electromagnet 5Ub comprises yoke 52U and coil 54U. Controlling the electric current, supplied to the coil of these electromagnets, realizes (electromagnetic) driving means which shifts the upper-end armature 4U of the plate 3 in the forward or backward direction along the main optical axis.

The electromagnet 5Da comprises yoke 51D and coil 53D, while the electromagnet 5Db comprises yoke 52D and coil 54D. Controlling electric current, supplied to the coil of these electromagnets, realizes electromagnetic driving means which shifts the lower-end armature 4D of the plate 3 in the forward or backward direction.

Controlling ON/OFF of the electromagnets 5Ua, 5Ub, 5Da and 5Db shifts the top and bottom portions of the plate 3 forward or backward in the direction of the optical axis, and changes the inclination angle of the plate 3. As a result, it is possible to shift, in the vertical direction (top and bottom) with respect to the optical axis, the position of incident light which is transmitted through the plate 3 and incident upon the image sensing surface of the image sensing device, in accordance with the inclination angle of the plate 3.

Meanwhile, reference numeral 6 denotes a plane-parallel-plate glass for shifting light flux incident through the objective lens unit 1, in the horizontal direction on the image-sensing surface. At both ends of the plate 6, armatures 7L and 7R made of soft electromagnetic iron are provided respectively. Electromagnets 8La, 8Lb, 8Ra and 8Rb are provided at front and back of each of the armatures 7L and 7R in the optical axis direction. By controlling the driving state of these electromagnets, the inclination of the plate 6 is controlled. By rotating the plate 6 in the direction indicated by arrow H, it is possible to horizontally shift the incident position of light flux on the image-sensing surface.

Note that the electromagnet 8La comprises yoke 81L and coil 83L, while the electromagnet 8Lb comprises yoke 82L and coil 84L. Controlling the electric current, supplied to the coil of these electromagnets, realizes electromagnetic driving means which shifts the left-end armature 7L of the plate 6 in the forward or backward direction of the optical axis.

The electromagnet 8Ra comprises yoke 81R and coil 83R; the electromagnet 8Rb comprises yoke 82R and coil 84R; and the electromagnet 8Rc comprises yoke 85R and coil 86R. Controlling the electric current, supplied to the coil of these electromagnets 8La, 8Lb, 8Ra and 8Rb, shifts the right-end armature 7R of the plate 6 in the forward or backward direction of the optical axis. The electromagnet 8Rc realizes driving means for shifting the plate 6 in the longitudinal direction, i.e., direction perpendicular to the aforementioned forward and backward directions.

Controlling ON/OFF of the electromagnets 8La, 8Lb, 8Ra, 8Rb and 8Rc shifts the left portion of the plate 6 in two positions in forward and backward directions of the optical axis, and shifts the right portion of the plate 6 in two positions in forward and backward directions of the optical axis as well as a position between these two positions by further shifting the plate in the direction perpendicular to the aforementioned forward and backward directions. By this, it is possible to variously change the inclination angle of the plate, and shift, in the horizontal direction (left and right) with respect to the optical axis, the incident position of light which is transmitted through the plate 6 and incident upon the image sensing surface of the image sensing device.

In the fourth embodiment, by positioning the right portion of the plate 6 in the two positions with respect to the optical-axis direction and positioning the left portion in three positions with respect to the optical-axis direction, it is possible attain six inclination angles of the plate 6, thereby making it possible to perform pixel-shifting in six steps in the horizontal direction of the image sensing surface. Details of this operation will be described later.

As described above, the two plates 3 and 6 provided in the vertical and horizontal directions are inclined respectively in the top-and-bottom direction and left-and-right direction in a space between the objective lens 1 and image sensing devices 2, and the incident position of light flux transmitted through the objective lens and incident upon the image-sensing surface is shifted in the vertical and horizontal directions at a pitch smaller than a pixel space of the image sensing device. As a result, it is possible to sense an image between the pixels of the image sensing device. Accordingly, it is possible to sense a high quality image which is equivalent to an image sensed by an image sensing device having a larger number of pixels than the actual number of pixels.

Hereinafter, the detailed arrangement and operation of the pixel-shifting system according to the fourth embodiment will be described with reference to FIGS. 39 to 43.

FIGS. 39A to 39C are views showing an arrangement of the plate 3 which performs pixel-shifting in the vertical direction.

The pixel-shifting system is provided between the objective lens unit 1 and image sensing device 2. Thus, taking a camera as an example, the system is provided inside the lens unit or camera main body.

FIGS. 39A and 39B show respectively, the plate 3 seen from the front, i.e., the direction of incident light, and the plate 3 seen from the right side. As shown in FIG. 39A, the plate 3 is positioned in front of the image sensing surface of the image sensing device 2, and has a size large enough to cover the entire image sensing surface.

Moreover, the plate 3 is constructed such that the armatures 4U and 4D provided at the top and bottom of the plate 3 are formed respectively on the side of the lens unit or the body of the camera main body.

Referring to FIG. 39B, the plate 3 is held such that the soft electromagnetic iron provided in both ends of the plate are inserted with a play in recesses 91U and 91D of the main body. In other words, it is held in the recess with a predetermined clearance in its front, back, top and bottom directions.

The recesses 91U and 91D have the length substantially the same as the width of the plate 3 in the direction vertical to the paper surface. The armatures 4U and 4D made of soft electromagnetic iron provided on both ends of the plate 3 have a cylindrical shape, formed along the internal surfaces 92U, 93U, 92D and 93D of the recess. When the armatures 4U and 3D abut against the regulating surface of recess, the armatures linearly contact the regulating surface. By virtue of the foregoing configuration, it is possible to regulate the inclination of plate 3. Note that, to attain the same effect as that obtained by the linear contact realized by the cylindrical shape, a plurality of point contact portions may be formed on the linear contact line.

These recesses 91U and 91D serve as a regulating portion for positioning the optical device 3. The surface which abuts against the armature 4, serving as an engaging portion of the plate 3 which serves as an optical member, functions as a regulating surface for positioning.

The armatures 4U and 4D abut against the internal wall surfaces 92U, 93U, 92D and 93D of the respective recesses 91U and 91D in the respective optical axis directions (i.e., lateral direction in the drawing). The abutting of the armatures against the internal wall surfaces determines the inclination angle position of the plate 3 with respect to the optical axis and the position of the plate 3 in the optical-axis direction. Moreover, in accordance with the width of each of the recesses in the optical-axis direction, the amount of movement of the armatures 4U and 4D, provided on both ends of the plate 3, is determined with respect to the optical-axis direction, and as a result, the recesses are designed such that the amount of inclination of the plate or the position of the plate in the optical-axis direction are changed.

The pixel-shifting system according to the fourth embodiment comprises a plane parallel plate, having the above-described arrangement, also in the horizontal direction. The positional relationship thereof is shown in FIGS. 40A and 40B.

Figure 40A:
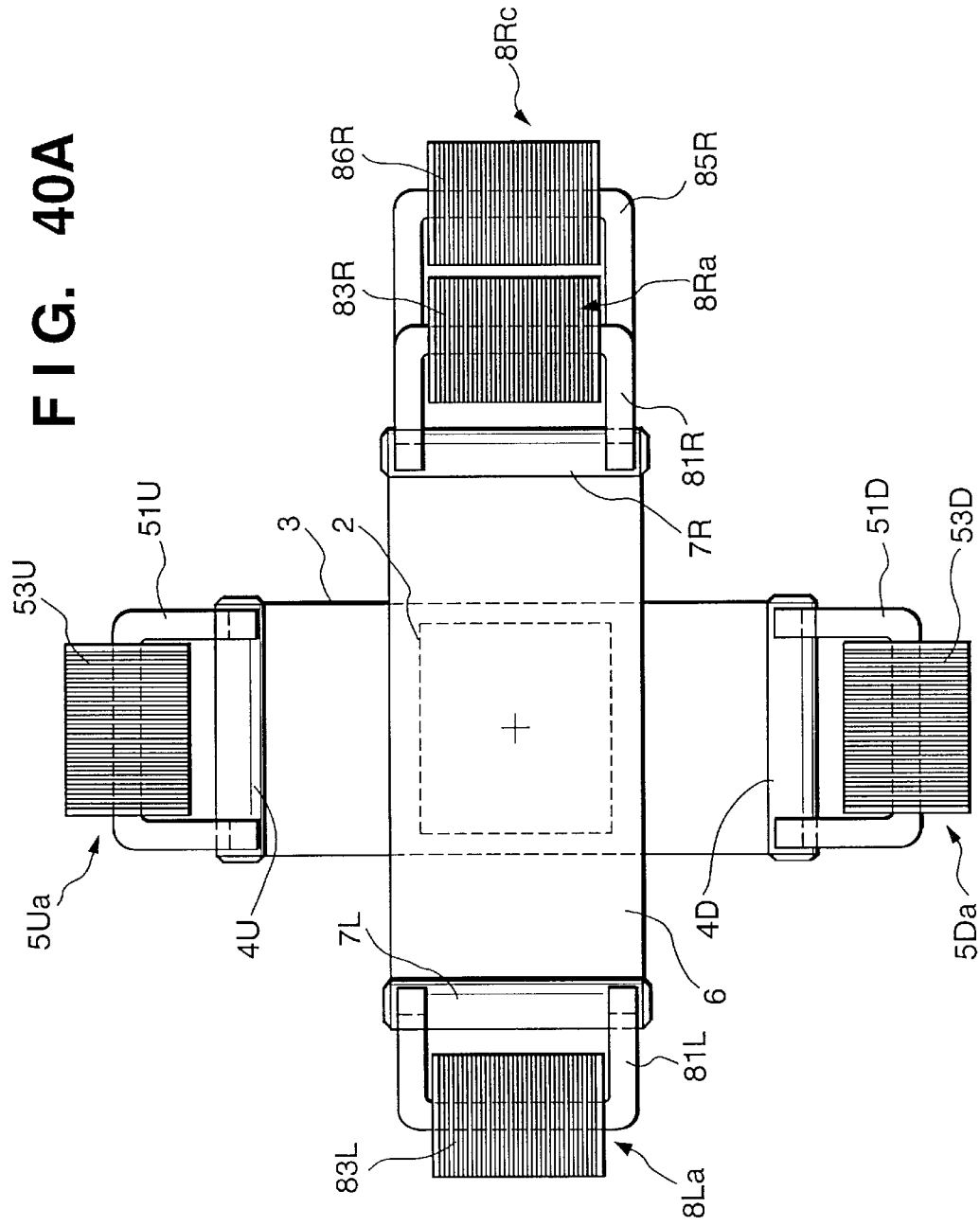

FIG. 40A is a view seen from the front of the optical axis and FIG. 40B is a top view. As can be seen from FIG. 38, the plate 6 provided in the horizontal direction and plate 3 in the vertical direction are provided with an orthogonal relation, between the image-sensing lens unit 1 and image sensing device 2.

The important characteristics in the pixel-shifting system according to the present embodiment are in that many inclined positions of the plate can be attained by regulating the inclination angle position of the plate or the position of the plate in the optical-axis direction by making use of the armatures provided on both ends and recesses. Moreover, the pixel-shifting system is constructed such that electromagnets are employed as the driving source and the plates 3 and 6 are fixed merely by inserting, with a predetermined play, the armatures provided on both ends into the recesses. By virtue of this construction, during operation, position regulation is realized by the electromagnetic force of the electromagnets, and when the electromagnets are not energized, no special structure is necessary to support the plates 3 and 6. The above-described supporting structure enables to eliminate gimbals mechanism or the like having rotation axes in the horizontal and vertical directions, as provided conventionally.

Since the plates 3 and 6 are inserted in the recesses with a predetermined play, supporting mechanism such as gimbals mechanism or the like is unnecessary. Also, since electromagnetic force is directly applied as a driving source, the mechanism for transmitting driving force is unnecessary. Therefore, not only the structure is made simple, but also high speed driving and highly precise position regulation are possible.

Hereinafter, the arrangement of the pixel-shifting system and control for the plane parallel plate according to the fourth embodiment will be described in detail with reference to FIGS. 41 to 44.

FIGS. 41 to 44 are explanatory views for explaining the inclination angle control of the plate 3 for performing pixel-shifting in the vertical direction. The characteristic arrangement is the relative position relation of the recesses 91U and 91D and setting of the width of the recess.

FIGS. 41 to 44 show respectively the inclination angle positions of the plate 3 for gradually shifting downward the incident position of light from a point of the object, incident upon the image sensing surface of the image sensing device 2.

Figure 41:
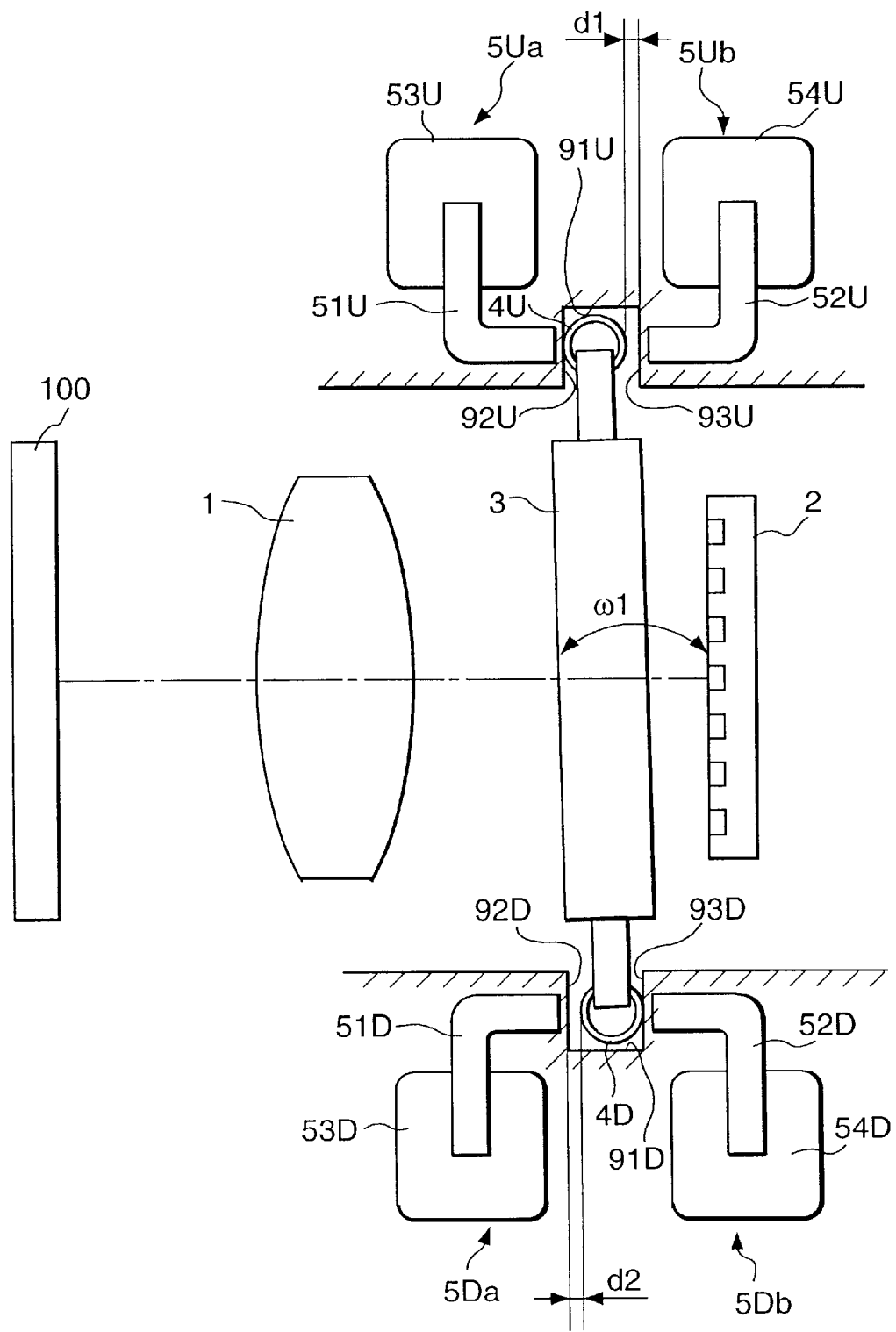
FIG. 41 is an explanatory view for explaining pixel-shifting operation in the vertical direction performed by the pixel-shifting system according to the fourth embodiment.

In FIG. 41, the recess 91U (where the armature 4U provided on top end of the plate 3 is inserted with a predetermined play) and the recess 91D (where the armature 4D provided on bottom end of the plate 3 is inserted with a predetermined play) have substantially the same widths, i.e., the length in the optical-axis direction, and set at substantially the same position.

In FIG. 41, the electromagnet 5Ua situated in the upper portion of the drawing is turned ON, the electromagnet 5Ub is turned OFF, the armature 4U is pulled toward the yoke 51U of the electromagnet 5Ua in the recess 91U, and is abutted against the regulating surface 92U, which is at the front (object side) of the optical-axis direction. Meanwhile, the electromagnet 5Da in the lower portion of FIG. 41 is turned OFF, the electromagnet 5Db is turned ON, the armature 4D is pulled toward the yoke 52D of the electromagnet 5Db and is abutted against the regulating surface 93D, which is at the end (image sensor side) of the optical-axis direction.

In the fourth embodiment, although the plate 3 is set to perform pixel-shifting in the upward direction with respect to the optical axis in the state shown in FIG. 41, the inclination states shown in FIGS. 41 to 44 are not limited to this arrangement. The pixel-shifting according to the present embodiment enables sensing an image whose light is not normally incident, in accordance with the inclination angle of the plate. Therefore, in the state shown in FIGS. 41 to 44, the plate does not need to be particularly perpendicular to the optical axis.

Herein, assuming that the clearance between the armature 4U and the width of the recess 91U, i.e., the gap between the armature 4U and the regulating surface 93U of the recess 91U is defined as $d_1$, the clearance between the armature 4D and the width of the recess 91D, i.e., the gap between the armature 4D and the regulating surface 92D of the recess 91D is defined as $d_2$, the gaps have relationship $d_2=d_1$. More specifically, the gap $d_2$ is set equal to the size of the gap $d_1$.

Further, an angle $\omega_1$ indicates an angle made by the image sensing surface of the image sensing device 2 and the plate 3. Note that the gaps $d_1$ and $d_2$ are of high precision.

In the state shown in FIG. 41, if the electromagnet 5Ua is turned OFF and the electromagnet 5Ub is turned ON and energized, the armature 4U on the upper end of the plate 3 separates from the regulating surface 92U of the upper recess 91U, and is pulled to the side of the regulating surface 93U to abut thereto and positioned. As a result, the state shown in FIG. 42 is made.

Accordingly, as the armatures 4U and 4D, provided on both ends of the plate 3, is regulated by the regulating surface 93U of the recess 91U and the regulating surface 93D of the recess 91D, the inclination angle of the plate 3 is regulated. In other words, from the state shown in FIG. 42, the plate 3 rotates by one increment in the clockwise direction so as to shift the entire plate to the right in the drawing; and as a result, the position where incident light is received on the image sensing surface of the image sensing devices 2 is shifted downward on the image sensing surface. Note that in this state, an angle made by the image sensing surface and the plate is defined as $\omega_2$.

Figure 42:
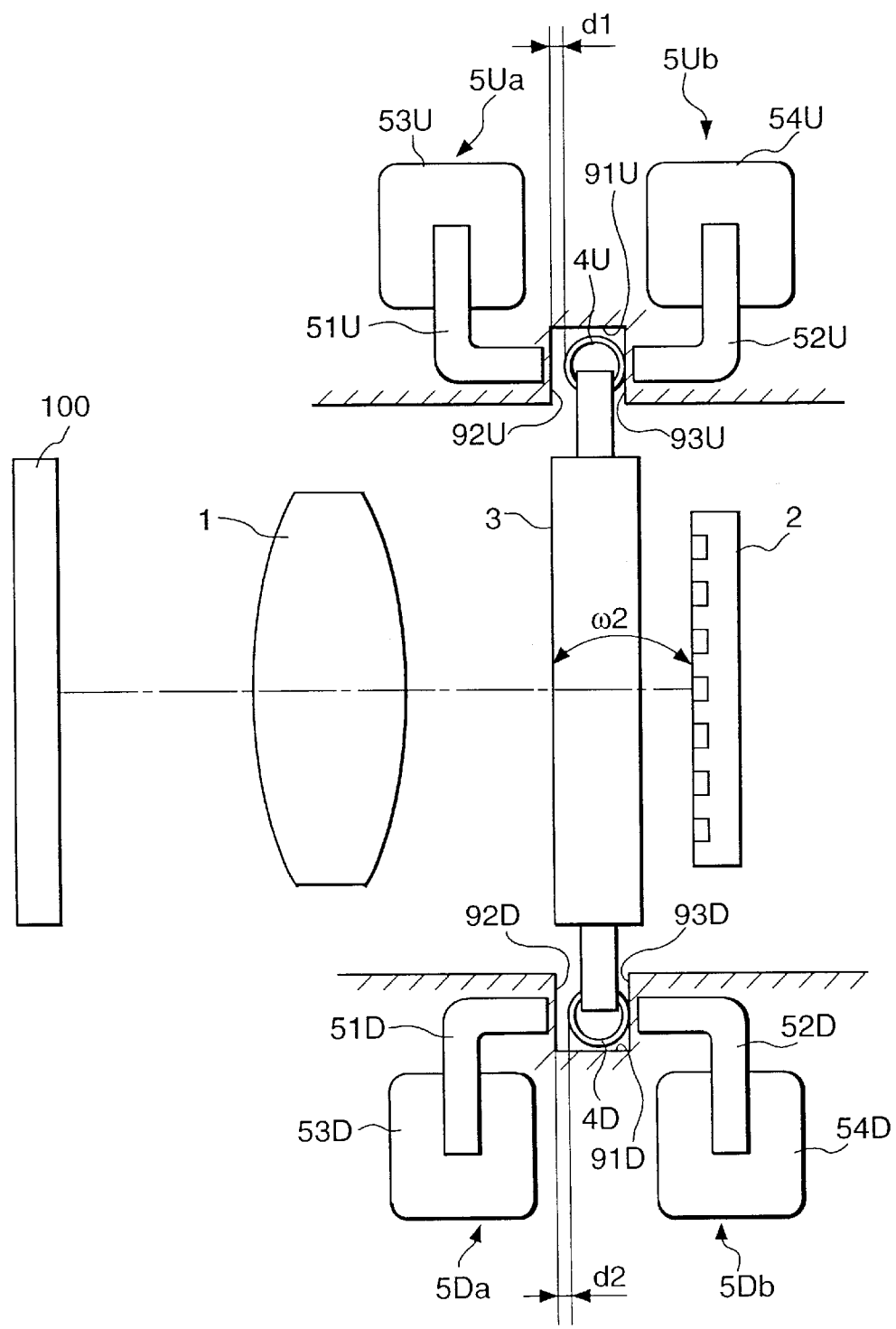
FIG. 42 is an explanatory view for explaining pixel-shifting operation in the vertical direction performed by the pixel-shifting system according to the fourth embodiment.

In the state shown in FIG. 42, if the electromagnet 5Ub in the upper recess 91U is turned OFF and the electromagnet 5Ua is turned ON, the armature 4U separates from the regulating surface 93U of the recess 91U, and is pulled toward the regulating surface 92U to abut thereto and positioned.

When the electromagnet 5Db in the lower recess 91D is turned OFF, and the electromagnet 5Da is turned ON, the armature 4D provided in the lower end of the plate 3 separates from the regulating surface 93D of the lower recess 91D, is pulled toward the regulating surface 92D to abut thereto and positioned. As a result, the state shown in FIG. 43 is made.

Accordingly, as the armatures 4U and 4D, provided on both ends of the plate 3, is regulated by the regulating surface 92U of the recess 91U and the regulating surface 92D of the recess 91D, the inclination angle of the plate 3 is regulated. In other words, as compared to the state shown in FIG. 42, the plate 3 shifts toward the left of the drawing in the optical-axis direction with substantially the same inclination as that of FIG. 42 (strictly speaking, the inclination differs because the armatures abut against different regulating surfaces). Therefore, the position where incident light is received on the image sensing surface of the image sensing device 2 is substantially the same as that of FIG. 42. Note that in this state, assuming that an angle made by the image sensing surface and the plate 3 is $\omega_3$, $\omega_2 \approx \omega_3$ holds. Since the effect of pixel-shifting is the same in the state shown in FIG. 42 and the state shown in FIG. 43, either state may be selected. Description of the present embodiment is continued hereinafter with the assumption that the state in FIG. 42 is selected.

Figure 43:
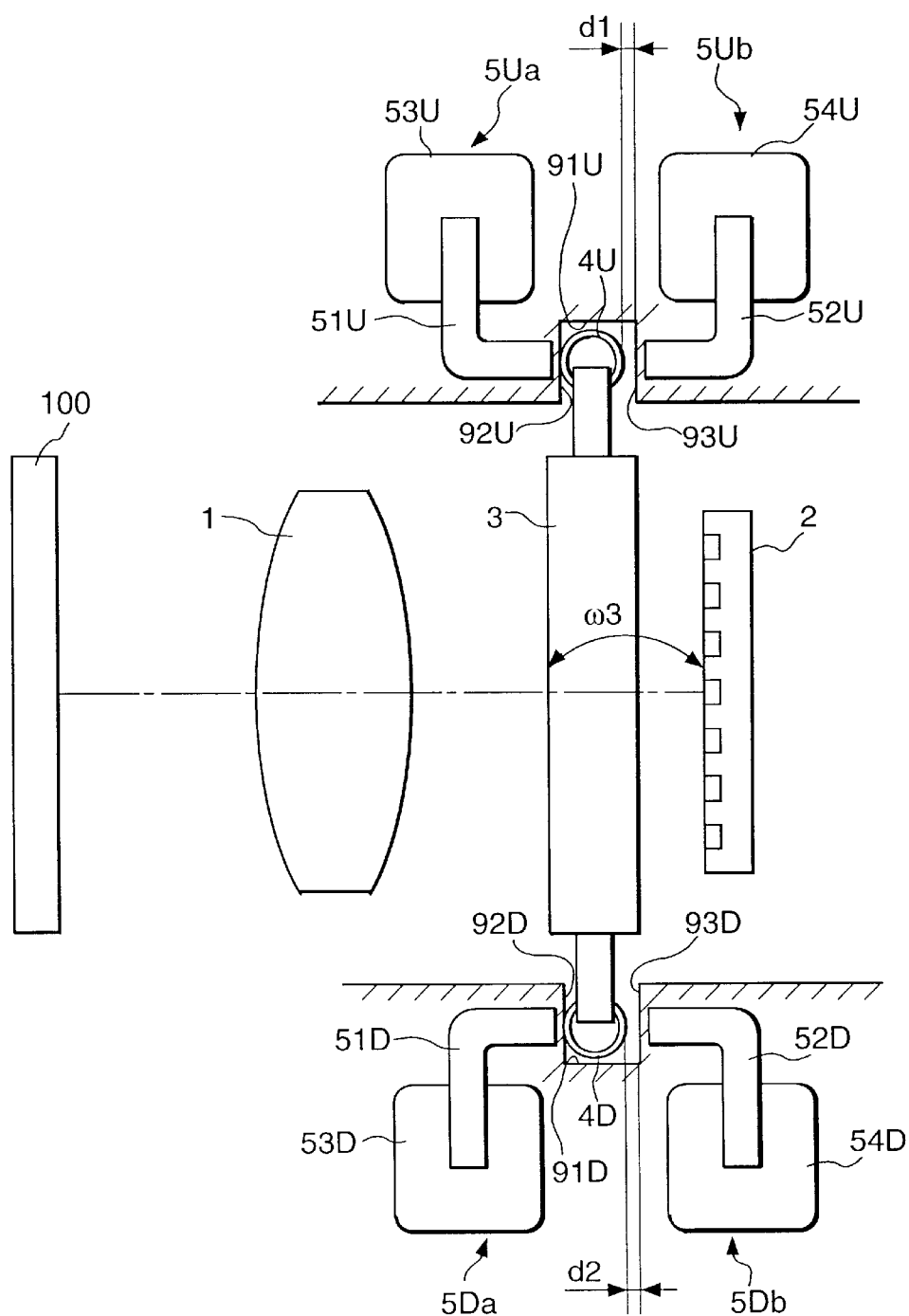
FIG. 43 is an explanatory view for explaining pixel-shifting operation in the vertical direction performed by the pixel-shifting system according to the fourth embodiment.
Figure 44:
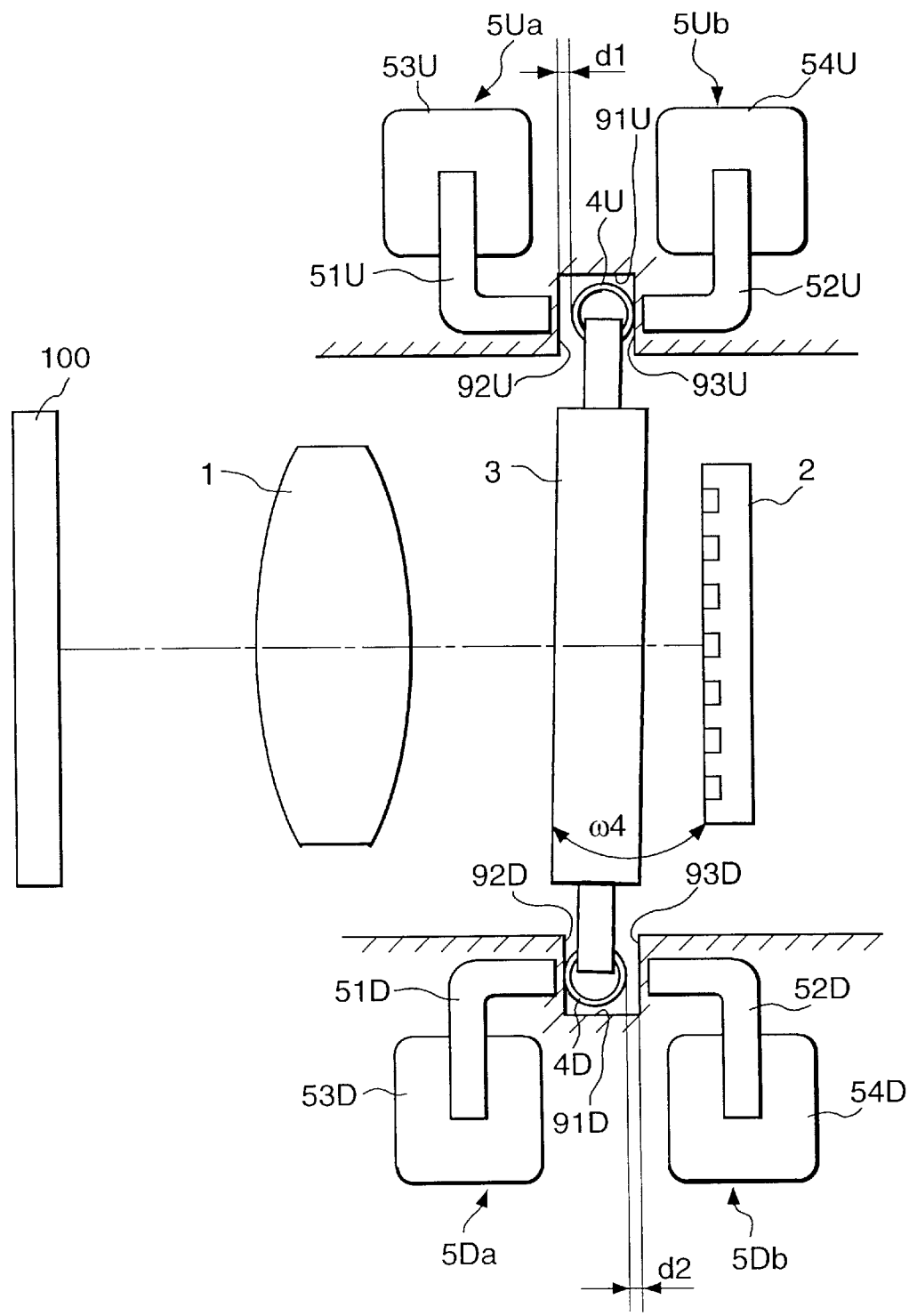
FIG. 44 is an explanatory view for explaining pixel-shifting operation in the vertical direction performed by the pixel-shifting system according to the fourth embodiment.

Referring to the state shown in FIG. 43, if the electromagnet 5Db is turned OFF and the electromagnet 5Da is turned ON, the armature 4D provided on the lower end of the plate 3 separates from the regulating surface 93D of the lower recess 91D, and is pulled toward the regulating surface 92D to abut thereto and positioned. Meanwhile, the armature 4U, provided on the upper end of the plate 3, is positioned on the regulating surface 93U of the recess 91U and positioned. As a result, the state shown in FIG. 44 is made.

Accordingly, from the state shown in FIG. 42, the plate 3 inclines further in the clockwise direction of the drawing, making the largest inclination angle. In this stage, the angle made by the image sensing surface and the plate is defined as $\omega_4$.

As shown in FIGS. 41 to 44, gradually changing the inclination of the plate 3 from $\omega_1$ to $\omega_4$ enables to control the inclination angles in three steps. By this, the light from the object, incident upon the image sensing surface, is shifted vertically in three steps.

Note that it is so set that angles $\omega_1$ to $\omega_4$ maintain the relationship as follows:

$$(\omega_2-\omega_1)=(\omega_4-\omega_2)=(\omega_4-\omega_3)=\text{constant}$$

This indicates that the position of incident light on the image sensing surface, changing according to the inclination of the plate 3, is shifted with an equal space on the image sensing surface.

In the fourth embodiment, the clearances $d_1$ and $d_2$ are set between the armatures and each surface of the recesses 91U and 91D so that the amount of shift at the first step equals to two-thirds of a pixel space of the image sensing device 2. The clearances $d_1$ and $d_2$ determine the inclination angle of the plate 3, and are changed in accordance with the pixel space of the image sensing device or the amount of shift.

As apparent from the foregoing description, the plate 3 is supported with a play, by virtue of the structure where the armatures (4U and 4D) provided on both ends of the plate 3 are inserted in the respective recesses 91U and 91D with a predetermined play. Meanwhile, the inclination angle of the plate 3 is determined by energizing the electromagnets and having the armatures abut against the regulating surfaces of the recesses. By virtue of the cylindrical shape of the armatures (4U and 4D) which abut against the regulating surfaces, the inclination angle of the plate does not change even if the abutting position of the cylindrical armatures (4U and 4D) is deviated in the longitudinal direction of the plate 3 on the regulating surface. Thus, the position of incident light upon the image sensing surface of the image sensing device does not change. This is the advantage of the cylindrical shape.

So long as the position of each of the recesses 91U and 91D in the optical-axis direction is set identical, the center of the plate 3 in the optical-axis direction does not change greatly even when the inclination angle of the plate 3 changes. Therefore, it is possible to always perform accurate pixel-shifting.

Note that by virtue of the armatures 4U and 4D having a cylindrical shape, when the armature is pulled by the electromagnetic force of the electromagnet, the armature contacts with the regulating surface by a point (in reality, line). Therefore, the plate is centered in a position determined by the armature of the electromagnet, causing substantially no position deviation.

The inclination of the plate is set such that the position of incident light upon the image sensing surface is shifted for each inclination angle by two-thirds of a pixel space of the image sensing surface, i.e., at a pitch of ⅔ of a pixel. By virtue of this, it is possible to obtain a number of pixels substantially three times larger than the actual number of pixels in the vertical direction of the image sensing device.

Three images sensed by the image sensing devices 2 for each of the inclination angle positions of the plate 3, are sequentially stored in a memory. When the image data is read out of the memory, the order of reading out each pixel of the three images is controlled. As a result, a high-quality image, a combination of the three images, can be obtained.

The foregoing description explains the pixel-shifting on the image sensing surface in the vertical direction. By providing such pixel-shifting mechanism in the horizontal direction, it is possible to perform pixel-shifting in the horizontal direction and obtain a number of pixels substantially three times larger than the actual number of pixels of the image sensing device; as a result, the number of pixels nine times greater in total can be obtained.

In the fourth embodiment, a mechanism different from the above pixel-shifting mechanism is provided for the horizontal direction.

Hereinafter, the detailed arrangement and operation of the pixel-shifting system in the horizontal direction according to the fourth embodiment will be described with reference to FIGS. 45 to 50.

FIGS. 45 to 50 are top view provided for explaining the control of inclination angle of the plate 6 which performs pixel-shifting in the horizontal direction. The characteristic construction thereof is a shape of the recess 91R, relative positional relationship with the recess 91L and setting of the width of the recess.

FIGS. 45 to 50 respectively show inclined positions of the plate 6 for gradually shifting, to the right, the incident position of light, corresponding to one point of the object 100, incident upon the image sensing surface of the image sensing device 2.

Figure 45:
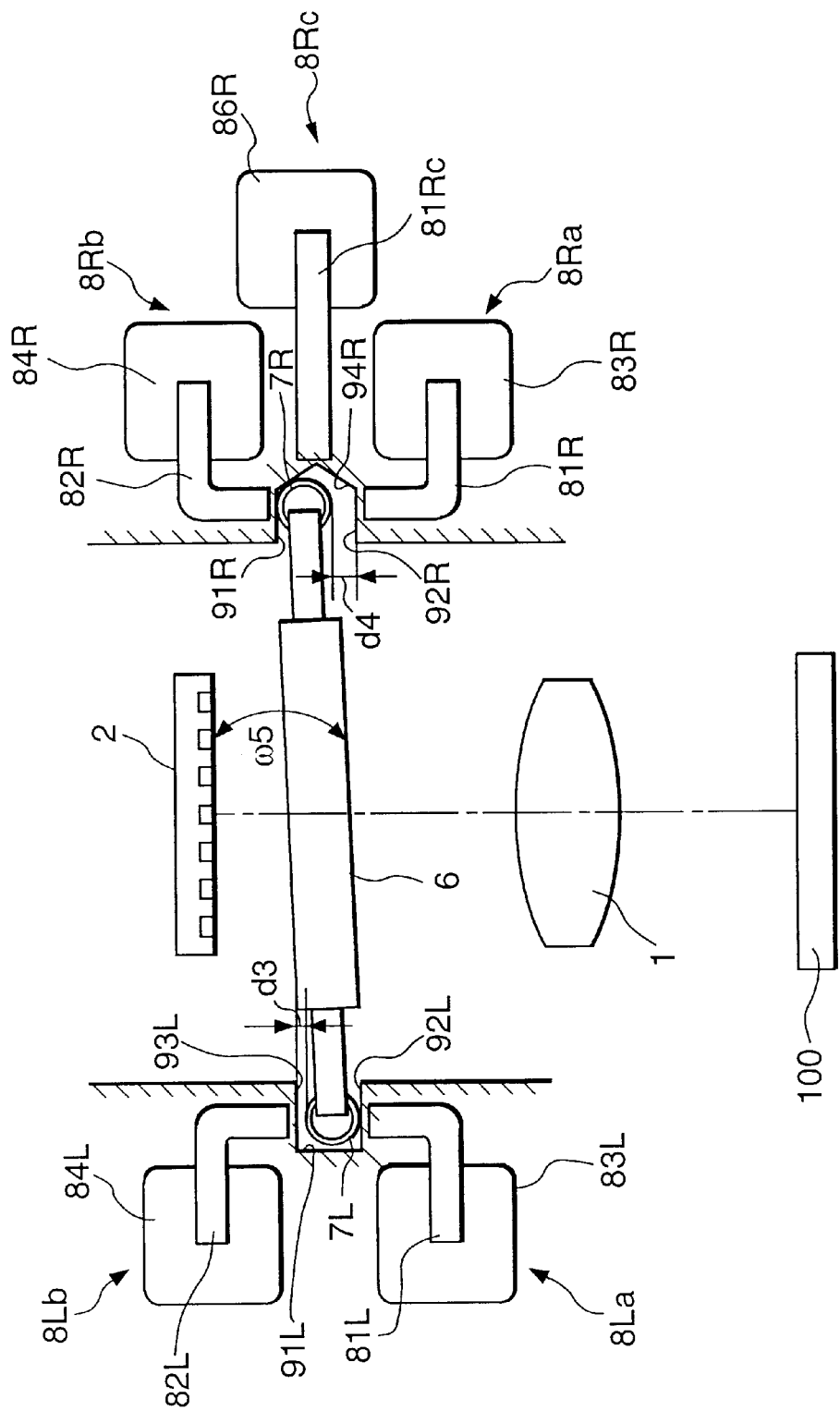
FIG. 45 is an explanatory view for explaining pixel-shifting operation in the horizontal direction performed by the pixel-shifting system according to the fourth embodiment.

In FIG. 45, the recess 91L into which armature 7L on the left end of the plate 6 is inserted with a predetermined play, and the recess 91R into which armature 7R on the right end of the plate 6 is inserted with a predetermined play have different widths, i.e., length with respect to the optical-axis direction, and different positions.

In FIG. 45, since the electromagnet 8La is turned ON and electromagnet 8Lb is turned OFF in the left side of the drawing, the armature 7L is pulled by the yoke 81L of the electromagnet 8La and abutted against the regulating surface 92L which is at the front (object side) of the optical-axis direction. On the right side of the drawing, since the electromagnets 8Ra and 8Rc are turned OFF and electromagnet 8Rb is turned ON, the armature 7R is pulled by the yoke 82R of the electromagnet 8Rb and abutted against the regulating surface 93R which is at the end (image sensor side) of the optical-axis direction.

In the fourth embodiment, although the plate 6 is set to perform pixel-shifting in the left direction with respect to the optical axis in the state shown in FIG. 45, the inclination states shown in FIGS. 45 to 50 are not limited to this arrangement. The pixel-shifting according to the present embodiment enables to pick up an image whose light is not normally incident, in accordance with an inclination angle of the plate. Therefore, in the state shown in FIGS. 45 to 50, the plate does not need to particularly be perpendicular to the optical axis.

Herein, assuming that the clearance between the armature 7L and the width of the recess 91L, i.e., the gap between the armature 7L and the regulating surface 93L of the recess 91L is defined as $d_3$, the clearance between the armature 7R and the width of the recess 91R, i.e., the gap between the armature 7R and the regulating surface 92R of the recess 91R is defined as $d_4$, the gaps have relationship $d_4=4\times d_3$. More specifically, the gap $d_3$ is set four times the size of the gap $d_4$.

Further, an angle $\omega_5$ indicates an angle made by the image sensing surface of the image sensing device 2 and the plate 6. Note that the gaps $d_3$ and $d_4$ are of high precision.

In the state shown in FIG. 45, if the electromagnet 8La is turned OFF and the electromagnet 8Lb is turned ON and energized, the armature 7L on the left end of the plate 6 separates from the regulating surface 92L of the left recess 91L, and is pulled to the side of the regulating surface 93L to abut thereto and positioned. As a result, the state shown in FIG. 46 is made.

Accordingly, as the armatures 7L and 7R, provided on left and right ends of the plate 6, is regulated by the regulating surface 93L of the recess 91L and the regulating surface 93R of the recess 91R, the inclination angle of the plate 6 is regulated. In other words, from the state shown in FIG. 45, the plate 6 inclines for one increment to the right in the drawing; as a result, the position where incident light is received on the image sensing surface of the image sensing devices 2 is shifted to the right. Note that in this state, an angle made by the image sensing surface and the plate is defined as $\omega_6$.

Figure 46:
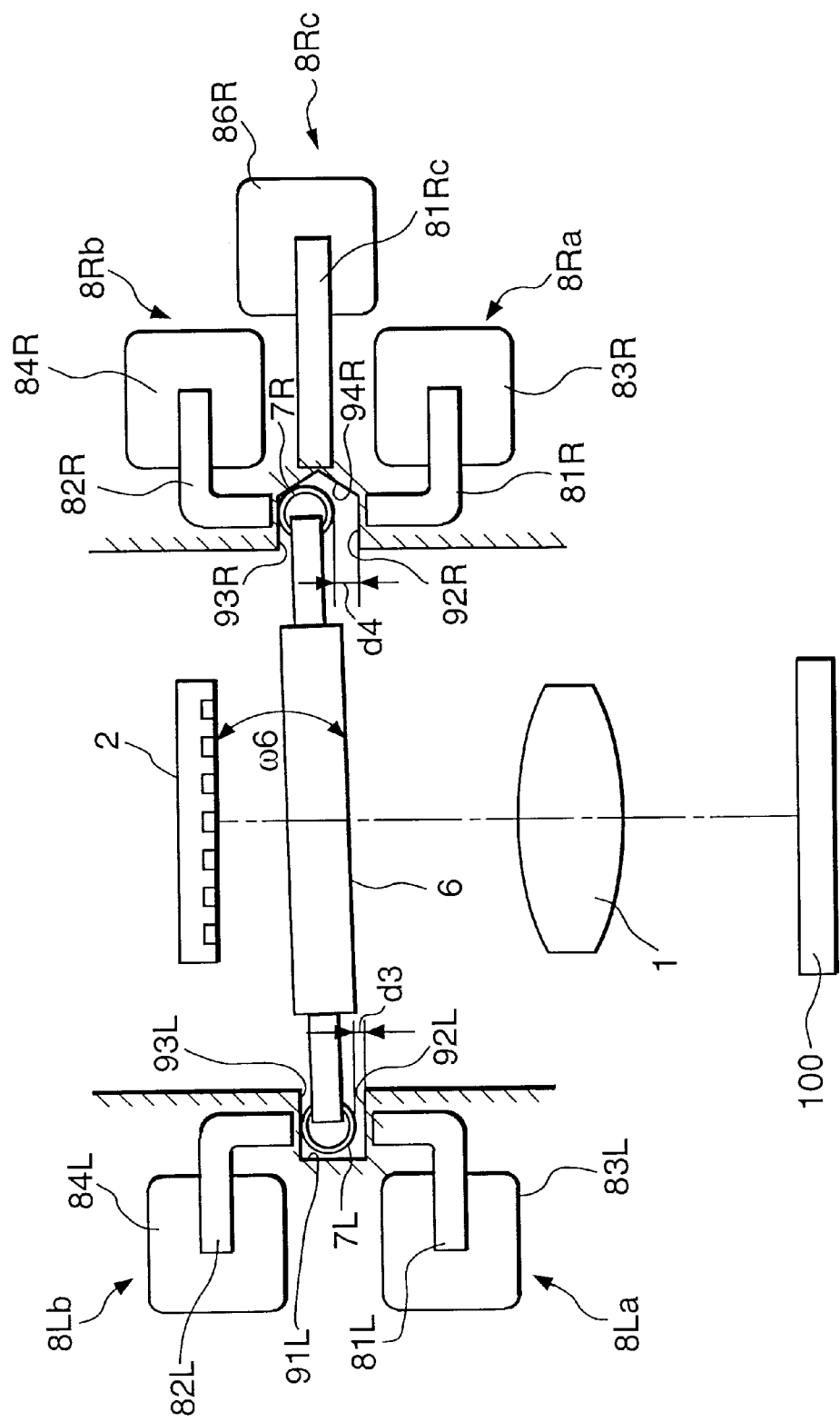
FIG. 46 is an explanatory view for explaining pixel-shifting operation in the horizontal direction performed by the pixel-shifting system according to the fourth embodiment.

In the state shown in FIG. 46, if the electromagnet 8Lb in the left recess 91L is turned OFF and the electromagnet 8La is turned ON, the armature 7L separates from the regulating surface 93L of the recess 91L, and is pulled toward the regulating surface 93L to abut thereto and positioned.

Figure 47:
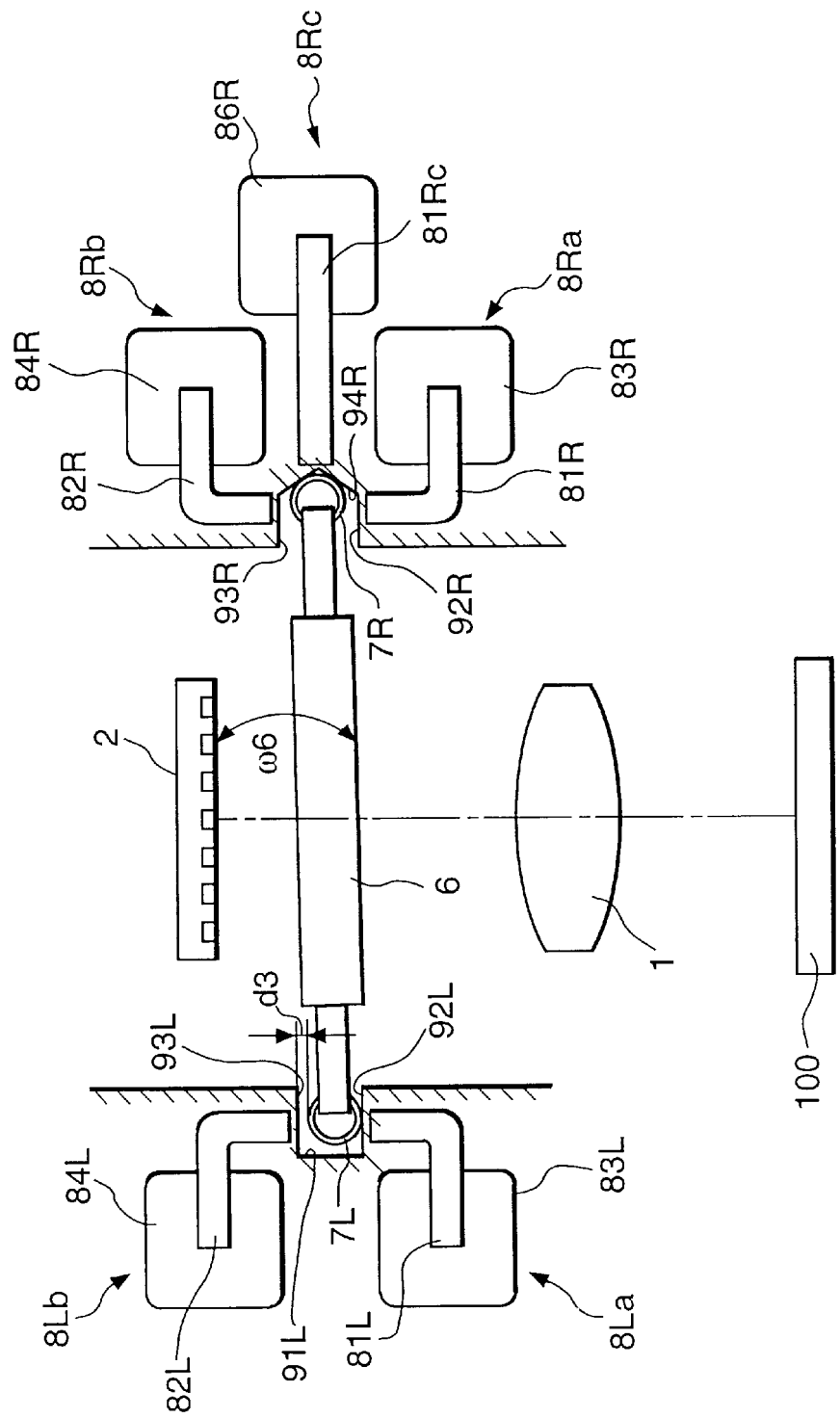
FIG. 47 is an explanatory view for explaining pixel-shifting operation in the horizontal direction performed by the pixel-shifting system according to the fourth embodiment.

When the electromagnet 8Rb on the right recess 91R is turned OFF, and the electromagnet 8Rc is turned ON, the armature 7R provided on the right of the plate 6 separates from the regulating surface 93R of the recess 91R, is pulled toward the regulating surface 94R to abut thereto and positioned. As a result, the state shown in FIG. 47 is made. Note that the regulating surface 94R, where yoke 81Rc of the electromagnet 8Rc is situated, has a recess or V-shaped groove so that the armature 7R can be positioned accurately.

Accordingly, as the armatures 7L and 7R, provided on left and right ends of the plate 6, is regulated by the regulating surface 92L of the recess 91L and the regulating surface 94R of the recess 91R, the inclination angle of the plate 6 is regulated. In other words, as compared to the state shown in FIG. 46, the plate 6 inclines for one increment to the right in the drawing; as a result, the position where incident light is received on the image sensing surface of the image sensing devices 2 is shifted to the right. Note that in this state, an angle made by the image sensing surface and the plate is defined as $\omega_7$.

The regulating surface 94R consists of two slopes having a bottom point (vertex or edge line) equally distanced from the regulating surfaces 92R and 93R. Since the slopes on both sides are symmetry with respect to a line or plane passing the vertex, the armature 7R remains stationary with a clearance that is equally distanced from the regulating surfaces 92R and 93R.

Referring to the state shown in FIG. 47, if the electromagnet 8La is turned OFF and the electromagnet 8Lb is turned ON, the armature 7L provided on the left end of the plate 6 separates from the regulating surface 92L of the left recess 91L, and is pulled toward the regulating surface 93L to abut thereto and positioned. Meanwhile, the armature 7R, provided on the right end of the plate 6, is positioned on the regulating surface 94R of the recess 91R with respect to an optical axis, and the state shown in FIG. 48 is made.

Herein, since the armature 7R is positioned by abutting against the two slopes constructing the regulating surface 94R, the armature has contact points (in reality, contact line) twice as many as compared to a case of abutting other regulating surfaces. Because of this, there is a risk that increased friction causes trouble in pixel-shifting operation. In such case, the electromagnet 8Rc is temporarily turned OFF, then turned ON again. By this, it is possible to ensure the operation without trouble.

Accordingly, as the armatures 7L and 7R, provided on left and right ends of the plate 6, is regulated by the regulating surface 93L of the recess 91L and the regulating surface 94R of the recess 91R, the inclination angle of the plate 6 is regulated. In other words, as compared to the state shown in FIG. 47, the plate 6 inclines for one increment to the right in the drawing; as a result, the position where incident light is received on the image sensing surface of the image sensing devices 2 is shifted to the right. Note that in this state, an angle made by the image sensing surface and the plate is defined as $\omega_8$.

Figure 48:
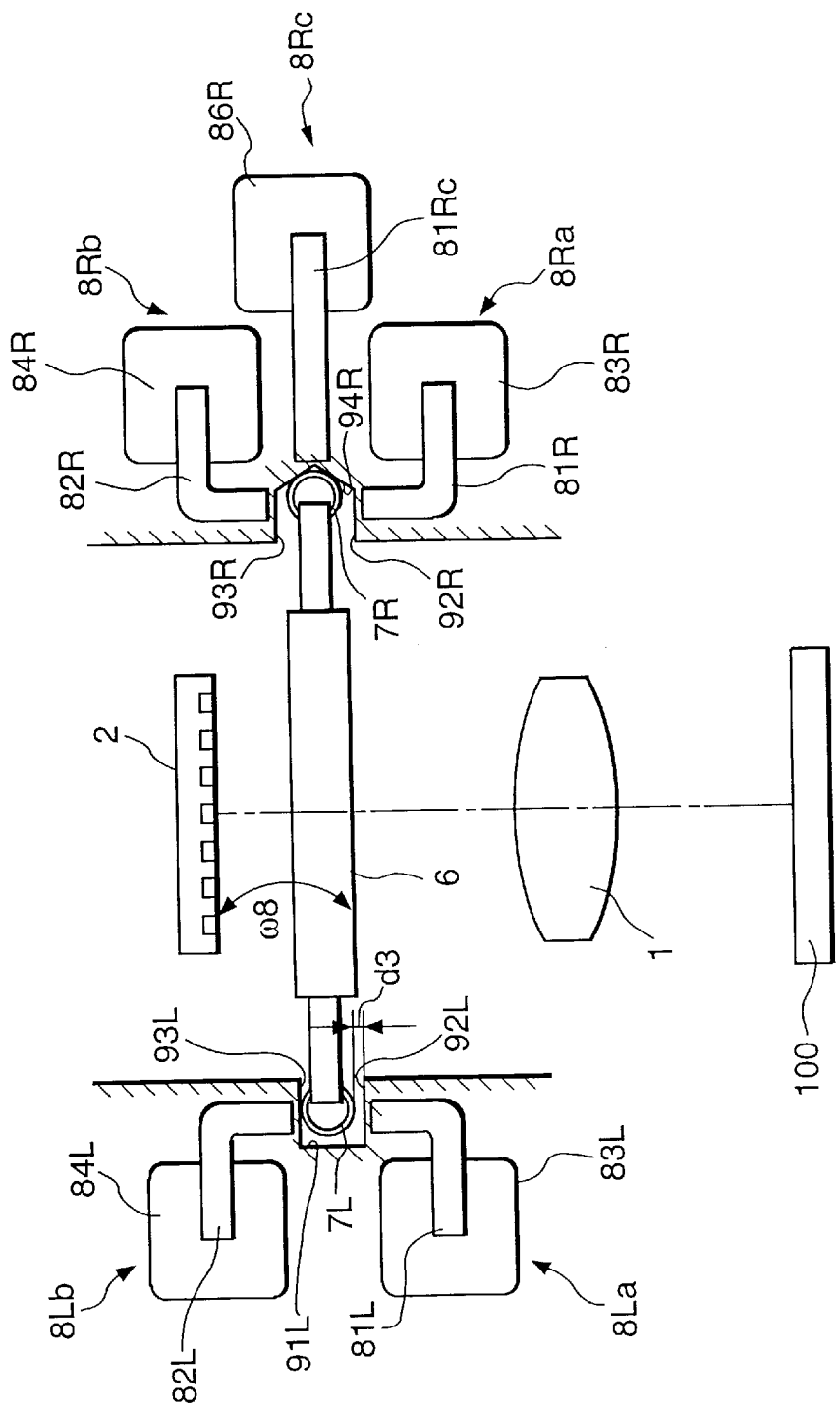
FIG. 48 is an explanatory view for explaining pixel-shifting operation in the horizontal direction performed by the pixel-shifting system according to the fourth embodiment.
Figure 49:
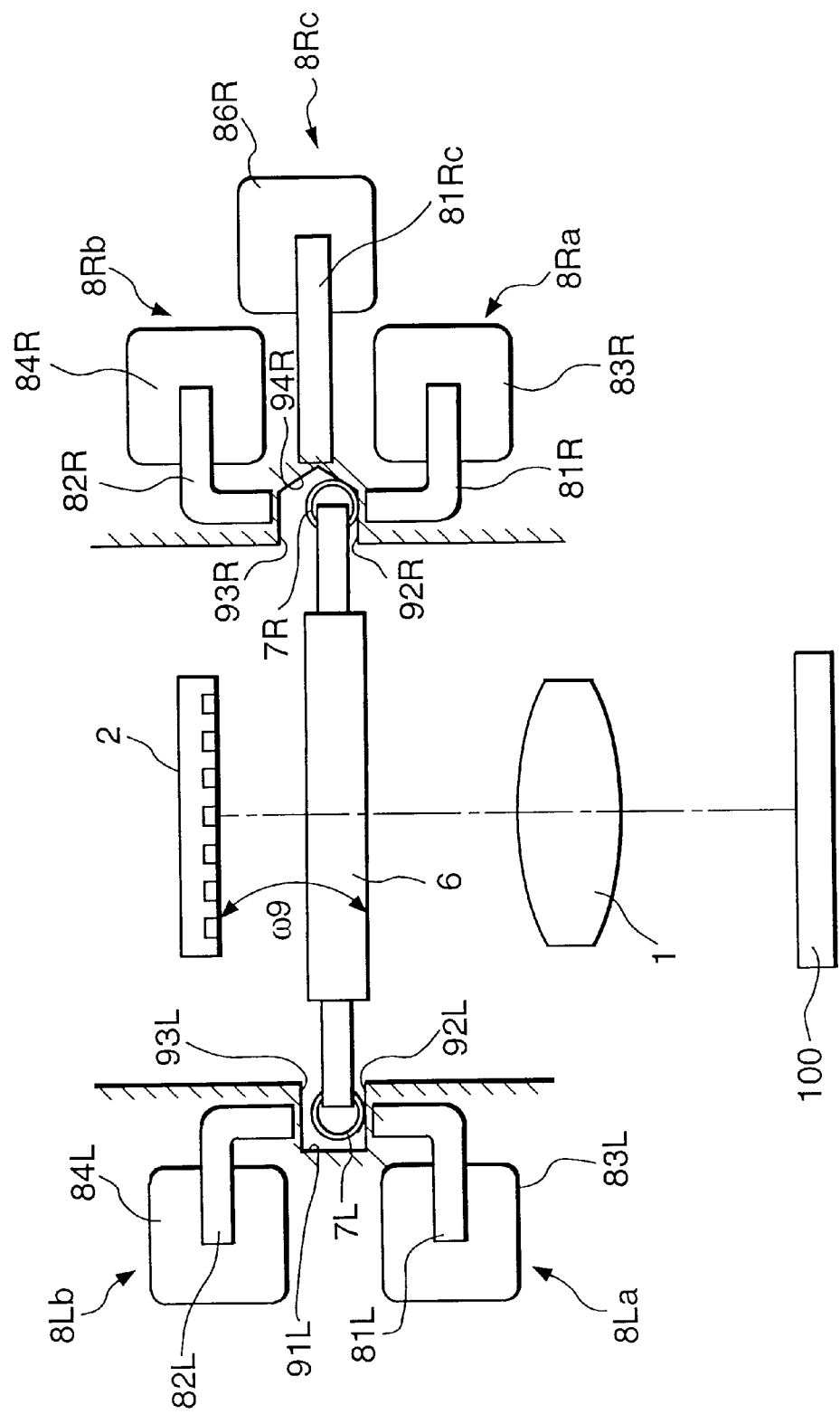
FIG. 49 is an explanatory view for explaining pixel-shifting operation in the horizontal direction performed by the pixel-shifting system according to the fourth embodiment.

Referring to the state shown in FIG. 48, if the electromagnet 8Lb is turned OFF and the electromagnet 8La is turned ON, the armature 7L provided on the left end of the plate 6 separates from the regulating surface 93L of the left recess 91L, and is pulled toward the regulating surface 92L to abut thereto and positioned. Meanwhile, when the electromagnet 8Rc is turned OFF and the electromagnet 8Ra is turned ON, the armature 7R provided on the right end of the plate 6 separates from the regulating surface 94R of the right recess 91R, and is pulled toward the regulating surface 92R to abut thereto and positioned. As a result, the state shown in FIG. 49 is made. Accordingly, as the armatures 7L and 7R, provided on left and right ends of the plate 6, is regulated by the regulating surface 92L of the recess 91L and the regulating surface 92R of the recess 91R, the inclination angle of the plate 6 is regulated. In other words, as compared to the state shown in FIG. 48, the plate 6 inclines for one increment to the right in the drawing; as a result, the position where incident light is received on the image sensing surface of the image sensing devices 2 is shifted to the right. Note that in this state, an angle made by the image sensing surface and the plate is defined as $\omega_9$.

Figure 50:
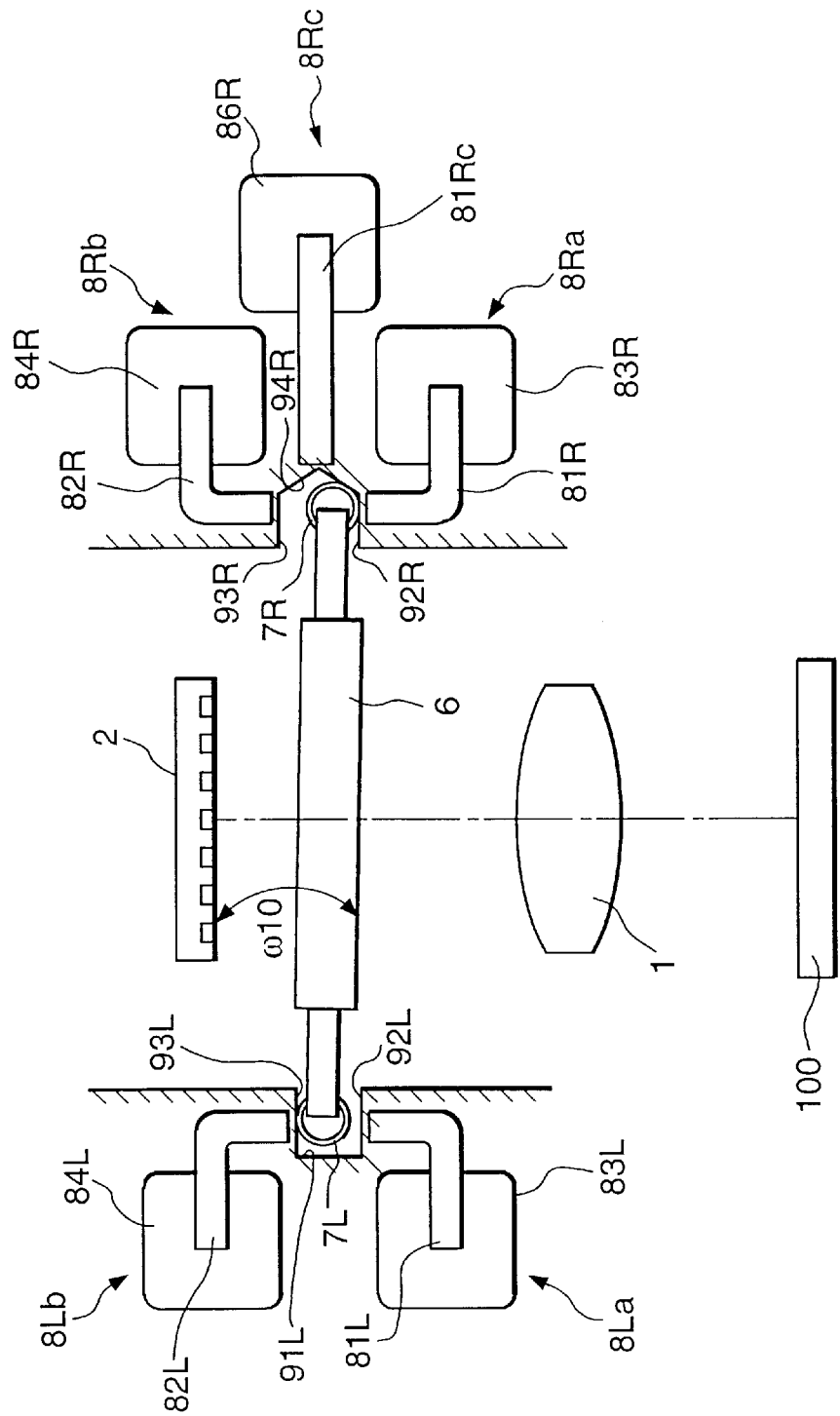
FIG. 50 is an explanatory view for explaining pixel-shifting operation in the horizontal direction performed by the pixel-shifting system according to the fourth embodiment.

Referring to the state shown in FIG. 49, if the electromagnet 8La is turned OFF and the electromagnet 8Lb is turned ON, the armature 7L provided on the left end of the plate 6 separates from the regulating surface 92L of the left recess 91L, and is pulled toward the regulating surface 93L to abut thereto and positioned. Meanwhile, the armature 7R, provided on the right end of the plate 6, is positioned on the regulating surface 94R of the recess 91R, and the state shown in FIG. 50 is made.

Accordingly, as the armatures 7L and 7R, provided on left and right ends of the plate 6, is regulated by the regulating surface 93L of the recess 91L and the regulating surface 92R of the recess 91R, the inclination angle of the plate 6 is regulated. In other words, as compared to the state shown in FIG. 49, the plate 6 inclines for one increment to the right in the drawing; as a result, the position where incident light is received on the image sensing surface of the image sensing devices 2 is shifted to the right. Note that in this state, an angle made by the image sensing surface and the plate is defined as $\omega_{10}$.

As shown in FIGS. 45 to 50, gradually changing the inclination of the plate 6 from $\omega_5$ to $\omega_{10}$ enables to control the inclination angle in six steps. By this, the light from the subject, incident upon the image sensing surface, is shifted horizontally in six steps.

Note that it is so set that angles $\omega_5$ to $\omega_{10}$ maintain the relationship as follows:

$$(\omega_6 - \omega_5) = (\omega_7 - \omega_6) = (\omega_8 - \omega_7) = (\omega_9 - \omega_8) = (\omega_{10} - \omega_9) = \text{constant}$$

This indicates that the position of incident light on the image sensing surface, changing according to the inclination of the plate 6, is shifted with an equal space on the image sensing surface.

In the fourth embodiment, the clearances $d_3$ and $d_4$ are set between the armatures and each surface of the recesses 91L and 91R so that the amount of shift at the first step equals to two-thirds of a pixel space of the image sensing device 2. The clearances $d_3$ and $d_4$ determine the inclination angle of the plate 6, and are changed in accordance with the pixel space of the image sensing device or the amount of shift.

As apparent from the foregoing description, the plate 6 is supported with a play, by virtue of the structure where the armatures (7L and 7R) provided on both ends of the plate 6 are inserted in the respective recesses 91L and 91R with a predetermined play. Meanwhile, the inclination angle of the plate 6 is determined by energizing the electromagnets and having the armatures abut against the regulating surfaces of the recesses. By virtue of the cylindrical shape of the armatures (7L and 7R) which abut against the regulating surfaces, the inclination angle of the plate does not change even if the abutting position of the cylindrical armatures (7L and 7R) is deviated in the longitudinal direction of the plate 6 on the regulating surface (in the state shown in FIGS. 47 and 48, the position in the longitudinal direction is fixed). Thus, the position of light incident upon the image sensing surface of the image sensing device does not change.

So long as the position of each of the recesses 91L and 91R in the optical-axis direction is set identical, the center of the plate 6 in the optical-axis direction does not change greatly even when the inclination angle of the plate 6 changes. Therefore, it is possible to always perform accurate pixel-shifting.

Note that by virtue of the armatures 7L and 7R having a cylindrical shape, when the armature is pulled by the electromagnetic force of the electromagnet, the armature contacts with the regulating surface by a point (in reality, line). Therefore, the plate is centered in a position determined by the armature of the electromagnet, causing substantially no position deviation.

The inclination of the plate is set such that the position of light incident upon the image sensing surface is shifted for each inclination angle by one-third of a pixel space of the image sensing surface, i.e., at a pitch of ⅓ of a pixel. By virtue of this, it is possible to obtain a number of pixels substantially six times larger than the actual number of pixels in the horizontal direction of the image sensing device.

Six images sensed by the image sensing devices 2 for each of the inclination angle positions of the plate 6, are sequentially stored in a memory. When the image data is read out of the memory, the order of reading out each pixel of the six images is controlled. As a result, a high-quality image, a combination of the six images, can be obtained.

Note that in the above-described FIGS. 41 to 44 and FIGS. 45 to 50, the inclination angle of the plate is gradually increased. However, since an image is sensed for each of the inclination angle position, stored in a memory and combined in the later processing, the inclination angle of the plate may be changed in any order.

In other words, the order of FIGS. 41 to 44 and FIGS. 45 to 50 does not have to be in the order as shown, but may be in an arbitrary order. As long as each of the electromagnets is controlled to sense three images for the vertical direction and six images for the horizontal direction, i.e., the total of 18 images, the order is arbitrary.

Moreover, since the pixel-shifting mechanism in the vertical direction and pixel-shifting mechanism in the horizontal direction are provided independently, the direction and order of pixel-shifting of the control performed by both mechanisms may be arbitrary. It should be noted that the plate 3 or 6 must stand still during image sensing (during charge storing) at each position of the pixel shifting.

Figure 51A:
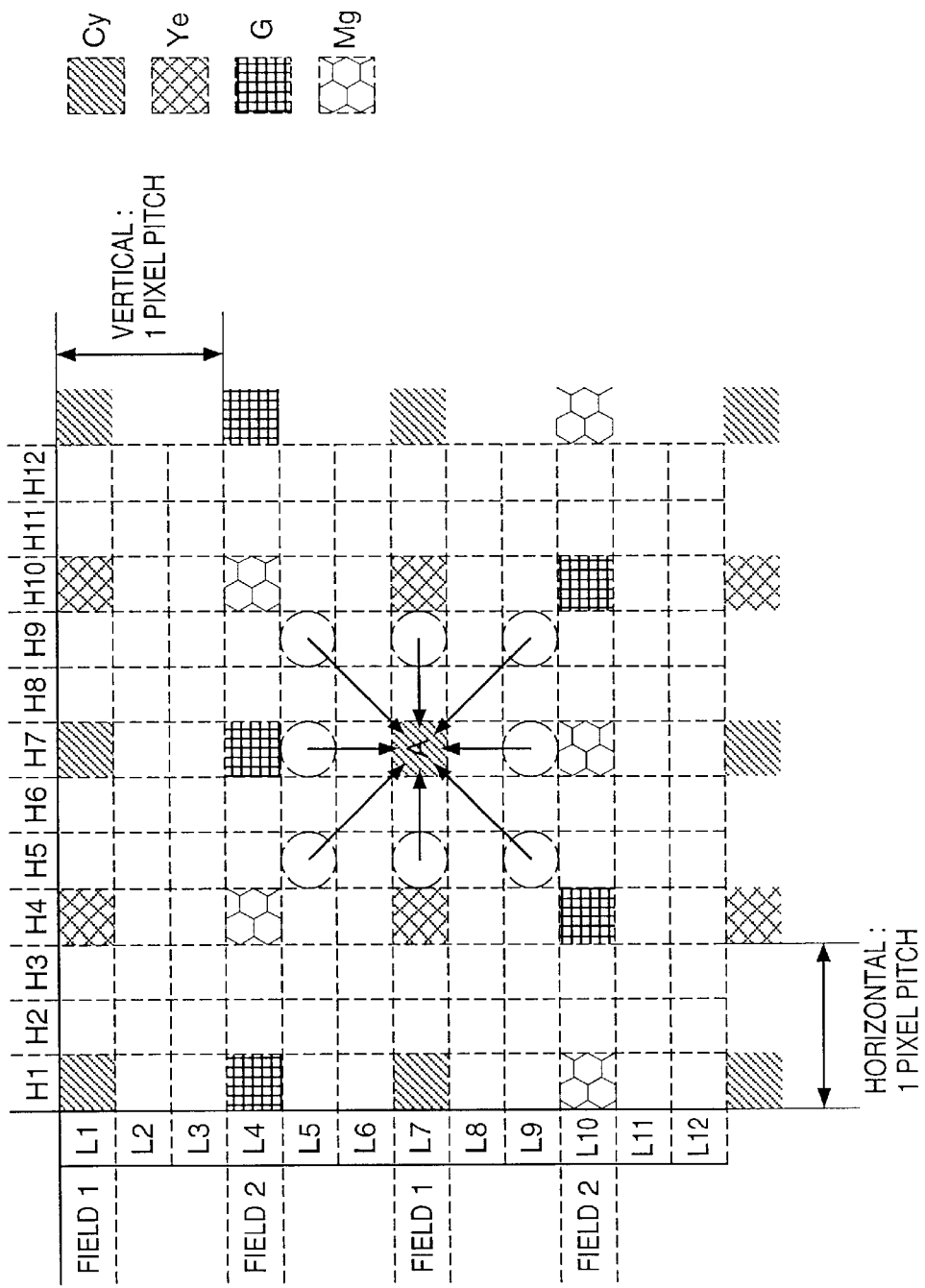

FIGS. 51A and 51B are schematic views showing spatial positions of pixels in a case where pixel-shifting is performed by combining the three states of plate 3 shown in FIGS. 41 to 44 in vertical pixel-shifting and the six states of plate 6 shown in FIGS. 45 to 50 in horizontal pixel-shifting.

Description will be provided on how light flux is shifted to derive data, with reference to FIGS. 51A and 51B.

Referring to FIGS. 51A and 51B, the hatched portion (including four types of hatching such as crossed hatch etc.) indicates positions of pixel (photoreceptive portion) on an image sensing device such as an interline-transfer-type CCD or the like. The portion other than the hatched portion indicates light-insensitive zone. The light-insensitive zone is divided into two fields, and the pixel pitch is divided by three. The entire pixels (image) are divided in a checked pattern. With respect to the position of each pixel, L1 to L12 indicate pixel positions in the vertical direction and H1 to H12 indicate pixel positions in the horizontal direction.

Fields 1 and 2 in FIGS. 51A and 51B respectively represent the first field and second field.

According to FIG. 51A, when the plate 3 is shifted in the three states shown in FIGS. 41 to 44 for vertical pixel-shifting and the plate 6 is shifted in three states shown in FIGS. 45 to 50 for horizontally shifting pixels at two-thirds pitch of a pixel, light flux captured by a photoreceptive portion, e.g., portion indicated by A, is incident upon nine positions, i.e., the coordinates (H5, L5), (H5, L7), (H5, L9), (H7, L5), (H7, L7), (H7, L9), (H9, L5), (H9, L7) and (H9, L9). The light flux incident upon each of the nine positions is guided one by one to the photoreceptive portion A (performing pixel-shifting), and the data (a charge stored in the photoreceptive portion) is read at the time of reading the field of the photoreceptive portion A. The similar operation is performed when reading fields of all the photoreceptive portions. As a result, as shown in FIG. 51B, data indicative of light flux, which was conventionally unable to capture because the light is incident upon the light-insensitive zone in peripheries of each photoreceptive portion, can be captured by pixel-shifting operation.

In other words, image data for light, incident upon other pixels or light-insensitive zones between pixels of the image sensing surface, can be received. As a result, it is possible to achieve an effect equivalent to the case where the number of pixels of the image sensing device is increased.

At each of the nine positions [three inclined positions of the plate 3]×[three inclined positions of the plate 6], the image is sensed by the image sensing device 2, and the nine images are sequentially stored in a memory. When the image data is read out of the memory, the order of reading out each pixel of the nine images and the phase are controlled. As a result, a high-quality image, a combination of the three images, can be obtained.

By virtue of the horizontal pixel-shifting function of the plate 6 for shifting at a single-pixel (or ⅓ pixel) pitch in the horizontal direction, effective means is provided in a case of using, for instance, a color image-sensing device comprising a single-plate inter-transfer-type CCD having a color filter of so-called complementary-color checkers pattern.

For instance, in a case of using a color image-sensing device having a complementary-color checkers pattern or the like, comprising a filter for Cy (cyan), Ye (yellow), G (green) and Mg (magenta), the above advantage enables to keep the arrangement order of filter constant when pixel-shifting operation is performed.

FIGS. 52 to 61 are schematic views showing spatial positions of pixels in a case where pixel-shifting is performed by combining the three states of the plate 3 which performs pixel-shifting in the vertical direction as shown in FIGS. 41, 42 and 44, and six states of the plate 6 which performs pixel-shifting in the horizontal direction as shown in FIGS. 45 to 50.

Description will be provided on how light flux is shifted to derive data, with reference to FIGS. 52 to 60.

Figure 52:
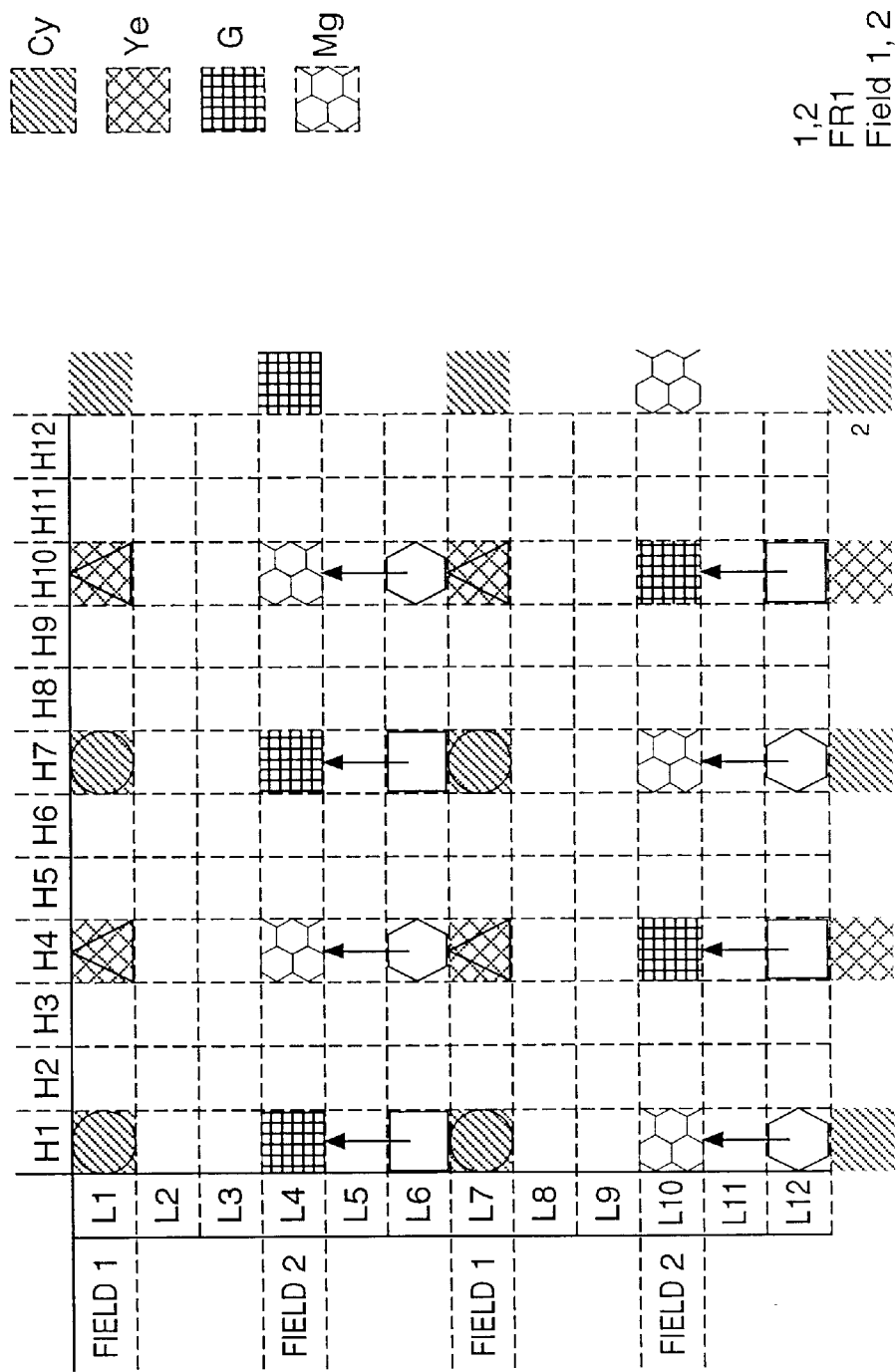
FIG. 52 is an explanatory view of pixel-shifting operation performed by the system according to the fourth embodiment, for explaining pixel data capturing operation on an image sensing surface.
Figure 60:
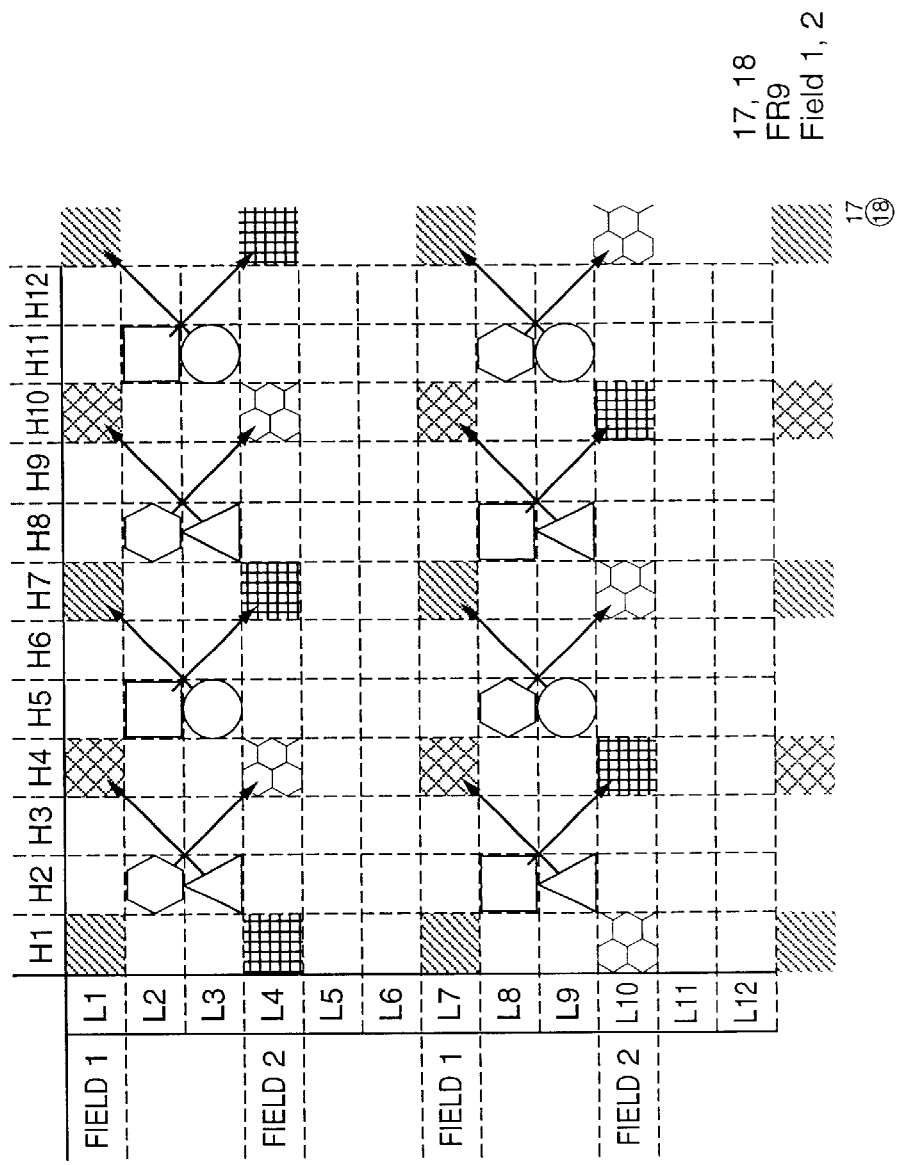
FIG. 60 is an explanatory view of pixel-shifting operation performed by the system according to the fourth embodiment, for explaining pixel data capturing operation on an image sensing surface.

Referring to FIGS. 52 and 60, the hatched portion (including four types of hatching such as crossed hatch etc.) indicates position of pixels (photoreceptive portion) on an image sensing device such as an interline-transfer-type CCD or the like. The portion other than the hatched portion indicates light-insensitive zone. The light-insensitive zone is divided into two fields, and the pixel pitch is divided into three. The entire pixels are divided in a checkers pattern.

For instance, in a case of adopting to the fourth embodiment, a color image-sensing device having a complementary-color checkers pattern, comprising a filter for Cy (cyan), Ye (yellow), G (green) and Mg (magenta), the provided image sensing apparatus includes a photoreceptive portion having a filter for Cy in the oblique-line hatching positions, filter for Ye in the cross hatching positions, filter for G in the square hatching positions and filter for Mg in the hexagon hatching positions.

Assume that, with the use of the interline-transfer-type CCD, field reading where a charge storage mode can obtain resolution suitable to a video image is used. Defining every other pixel arrays as field 1 and field 2, scanning field 1 is performed for the entire screen, then scanning field 2 is performed for the entire screen. By alternately performing the scanning, the adjacent fields 1 and 2 are read as one frame (one screen).

FIGS. 52 to 60 show how data is derived while changing the combinations (while driving the plates) of the three states of the plate 3 for pixel-shifting in the vertical direction as shown in FIGS. 41, 42 and 44, and the six states of the plate 6 for pixel-shifting in the horizontal direction as shown in FIGS. 45 to 50.

FIG. 52 shows data derived from the frame (screen) 1. More specifically, FIG. 52 shows how image data is derived when the field 1 is scanned while the plates 6 and 3 are set respectively in the state shown in FIGS. 47 and 42, and when the field 2 is scanned while the plates 6 and 3 are set respectively in the state shown in FIGS. 47 and 41.

When the field 1 is scanned, data in L1 and L7 represented by circle or triangle are read through the filter of the photoreceptive portion. The data in the position represented by circle is derived as data having the color Cy (oblique-line hatching) and the data in the position represented by triangle is derived as data having the color Ye (cross hatching).

When the field 2 is scanned, data in L6 and L12 represented by square or hexagon are shifted in the direction indicated by the arrow and read by the photoreceptive portion located in the position indicated by the arrow. In other words, the data in the position represented by the square is derived as data having the color G (square hatching) and the data in the position represented by hexagon is derived as data having the color Mg (hexagon hatching).

Figure 53:
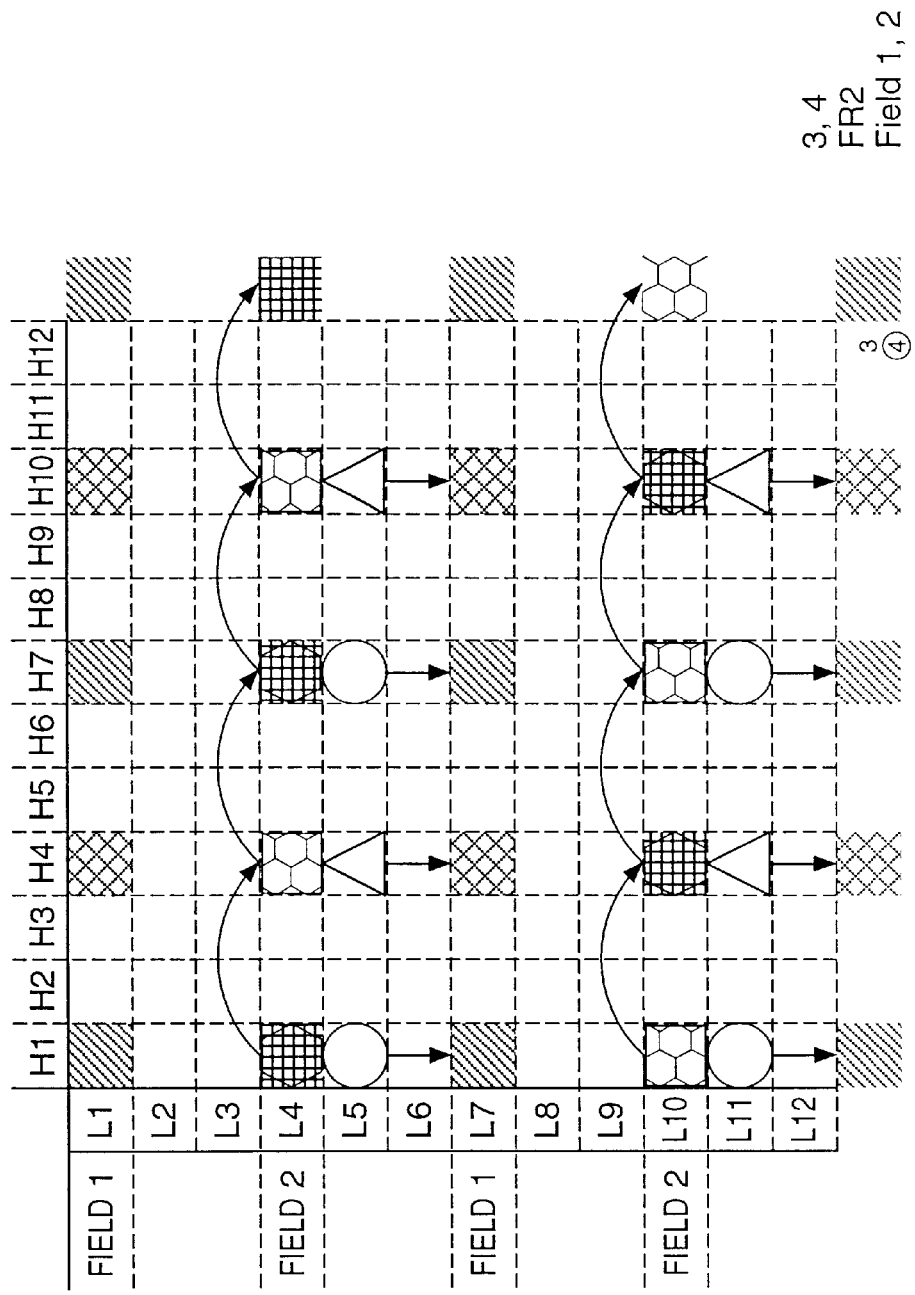
FIG. 53 is an explanatory view of pixel-shifting operation performed by the system according to the fourth embodiment, for explaining pixel data capturing operation on an image sensing surface.

FIG. 53 shows data derived from the frame (screen) 2. More specifically, FIG. 53 shows how image data is derived when the field 1 is scanned in the state shown in FIG. 47 (plate 6) and FIG. 44 (plate 3), and when the field 2 is scanned in the state shown in FIG. 50 (plate 6) and FIG. 42 (plate 3).

When the field 1 is scanned, data in L5 and L11 represented by circle or triangle are shifted in the direction indicated by an arrow and read by the photoreceptive portion located in the position indicated by the arrow. The data in the position represented by circle is derived as data having the color Cy, and the data in the position represented by triangle is derived as data having the color Ye.

When the field 2 is scanned, data in L4 and L10 represented by square or hexagon are shifted in the direction indicated by an arrow and read by the photoreceptive portion located in the position indicated by the arrow. The data in the position represented by square is derived as data having the color Mg (hexagon hatching), and the data in the position represented by hexagon is derived as data having the color G (square hatching).

Figure 54:
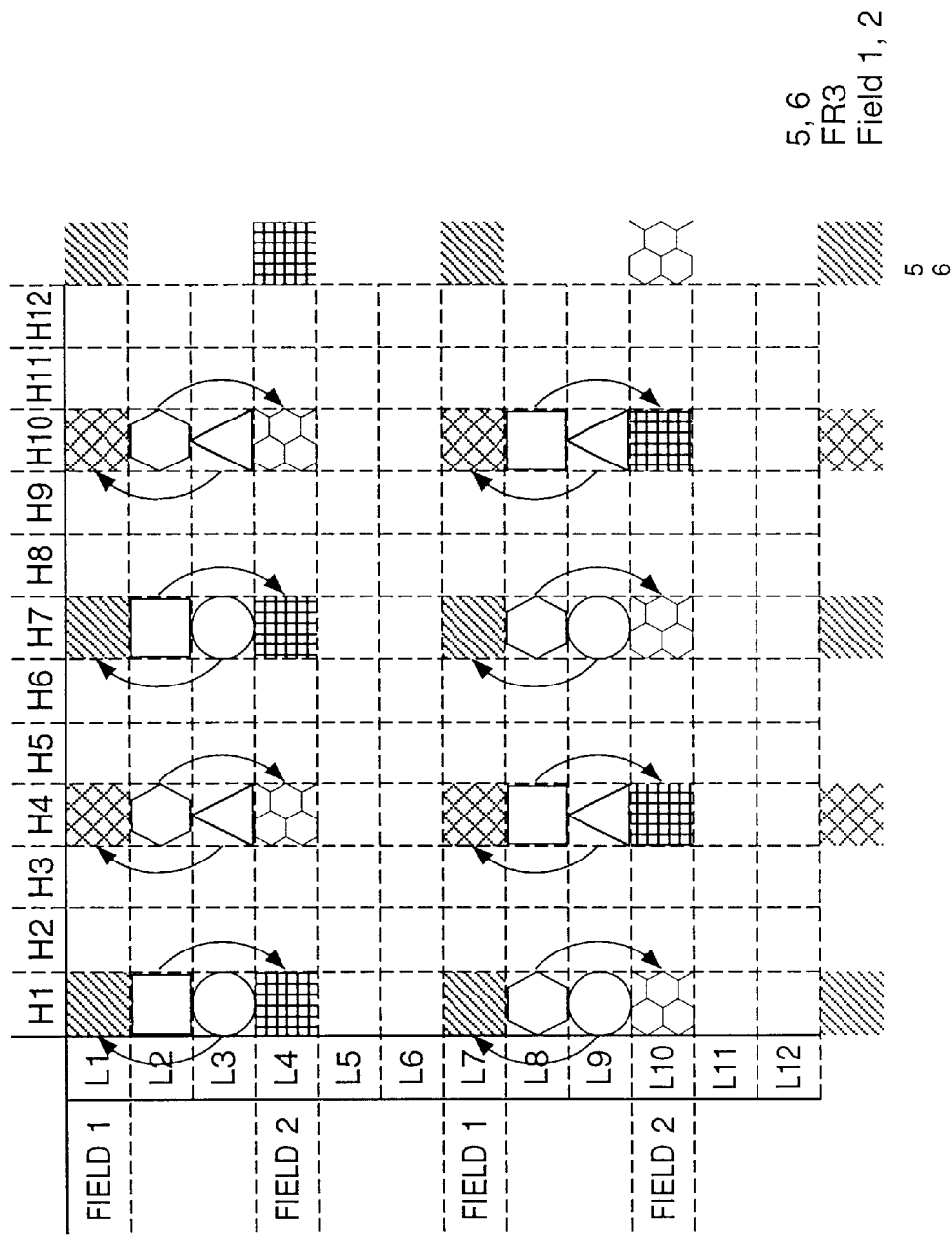
FIG. 54 is an explanatory view of pixel-shifting operation performed by the system according to the fourth embodiment, for explaining pixel data capturing operation on an image sensing surface.

FIG. 54 shows data derived from the frame (screen) 3. More specifically, FIG. 54 shows how image data is derived when the field 1 is scanned while the plates 6 and 3 are set respectively in the state shown in FIGS. 47 and 41, and when the field 2 is scanned while the plates 6 and 3 are set respectively in the state shown in FIGS. 47 and 44.

When the field 1 is scanned, data in L3 and L9 represented by circle or triangle are shifted in the direction indicated by an arrow and read by the photoreceptive portion located in the position indicated by the arrow. The data in the position represented by circle is derived as data having the color Cy, and the data in the position represented by triangle is derived as data having the color Ye.

When the field 2 is scanned, data in L2 and L8 represented by square or hexagon are shifted in the direction indicated by an arrow and read by the photoreceptive portion located in the position indicated by the arrow. The data in the position represented by square is derived as data having the color G, and the data in the position represented by hexagon is derived as data having the color Mg.

Figure 55:
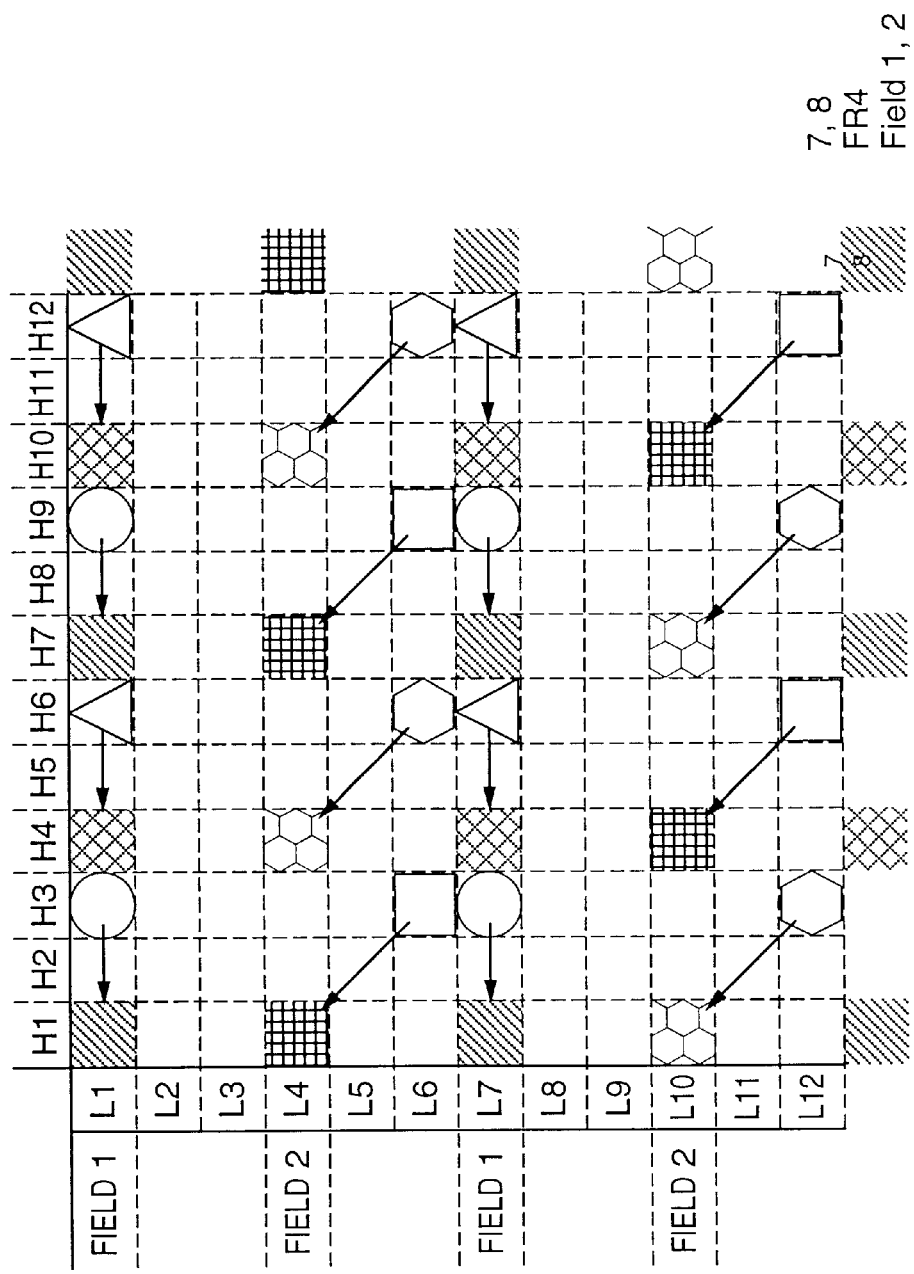
FIG. 55 is an explanatory view of pixel-shifting operation performed by the system according to the fourth embodiment, for explaining pixel data capturing operation on an image sensing surface.

Similar to the above, FIG. 55 shows data derived from the frame (screen) 4. More specifically, FIG. 55 shows how image data is derived when the field 1 is scanned while the plates 6 and 3 are set respectively in the state shown in FIGS. 45 and 42, and when the field 2 is scanned while the plates 6 and 3 are set respectively in the state shown in FIGS. 45 and 41.

Figure 56:
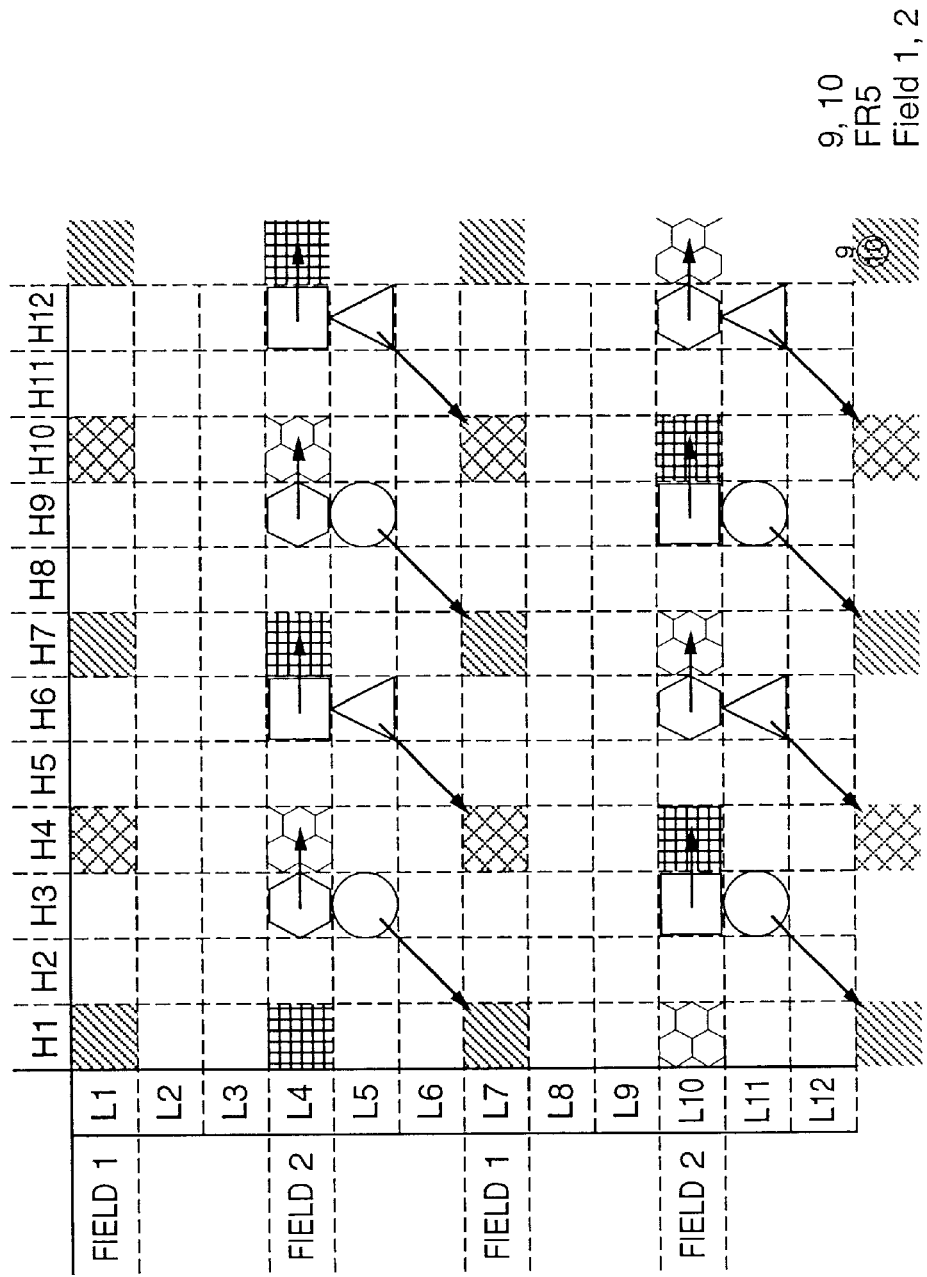
FIG. 56 is an explanatory view of pixel-shifting operation performed by the system according to the fourth embodiment, for explaining pixel data capturing operation on an image sensing surface.

FIG. 56 shows data derived from the frame (screen) 5. More specifically, FIG. 56 shows how image data is derived when the field 1 is scanned while the plates 6 and 3 are set respectively in the state shown in FIGS. 45 and 44, and when the field 2 is scanned while the plates 6 and 3 are set respectively in the state shown in FIGS. 48 and 42.

Figure 57:
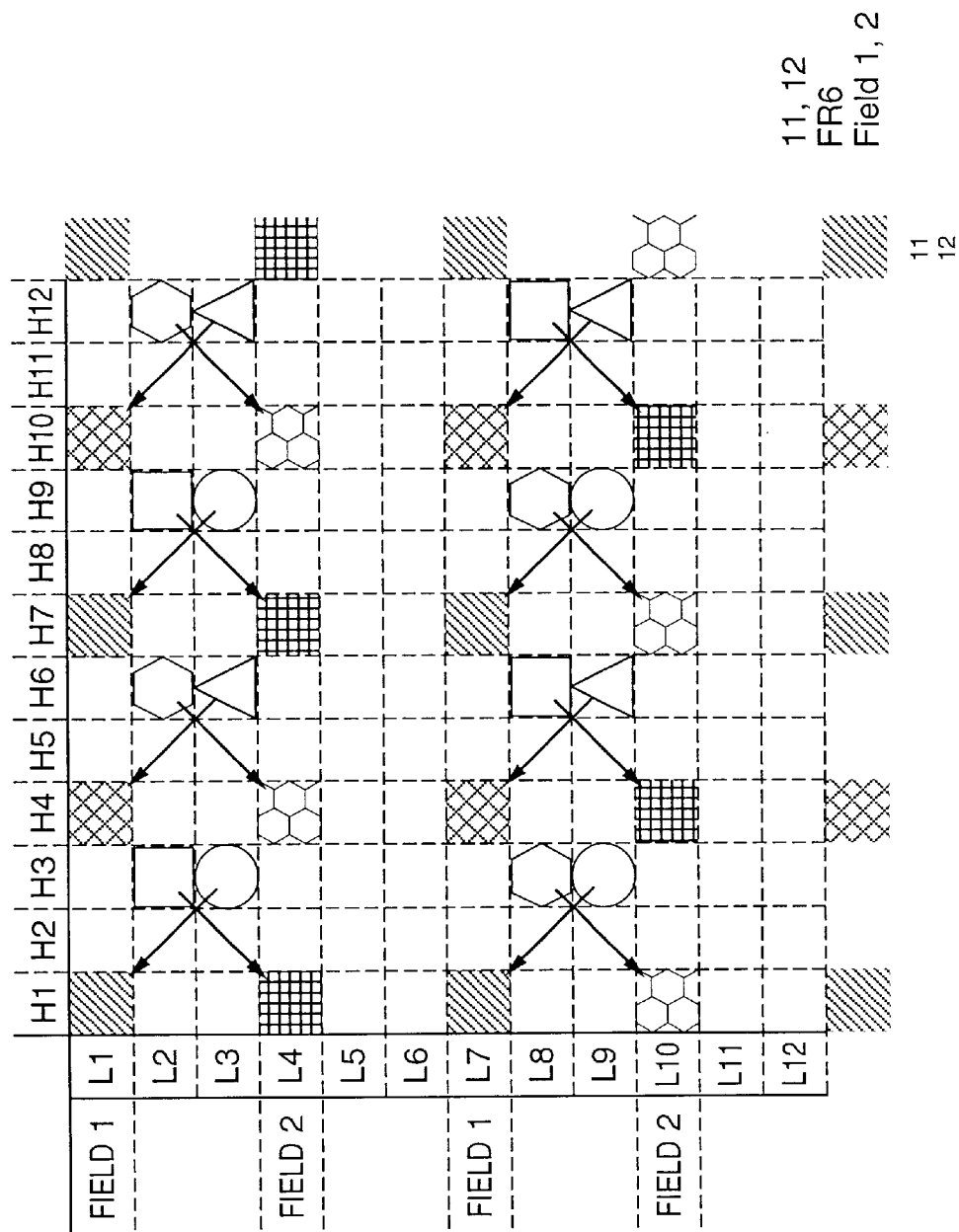
FIG. 57 is an explanatory view of pixel-shifting operation performed by the system according to the fourth embodiment, for explaining pixel data capturing operation on an image sensing surface.

FIG. 57 shows data derived from the frame (screen) 6. More specifically, FIG. 57 shows how image data is derived when the field 1 is scanned while the plates 6 and 3 are set respectively in the state shown in FIGS. 45 and 41, and when the field 2 is scanned while the plates 6 and 3 are set respectively in the state shown in FIGS. 45 and 44.

Figure 58:
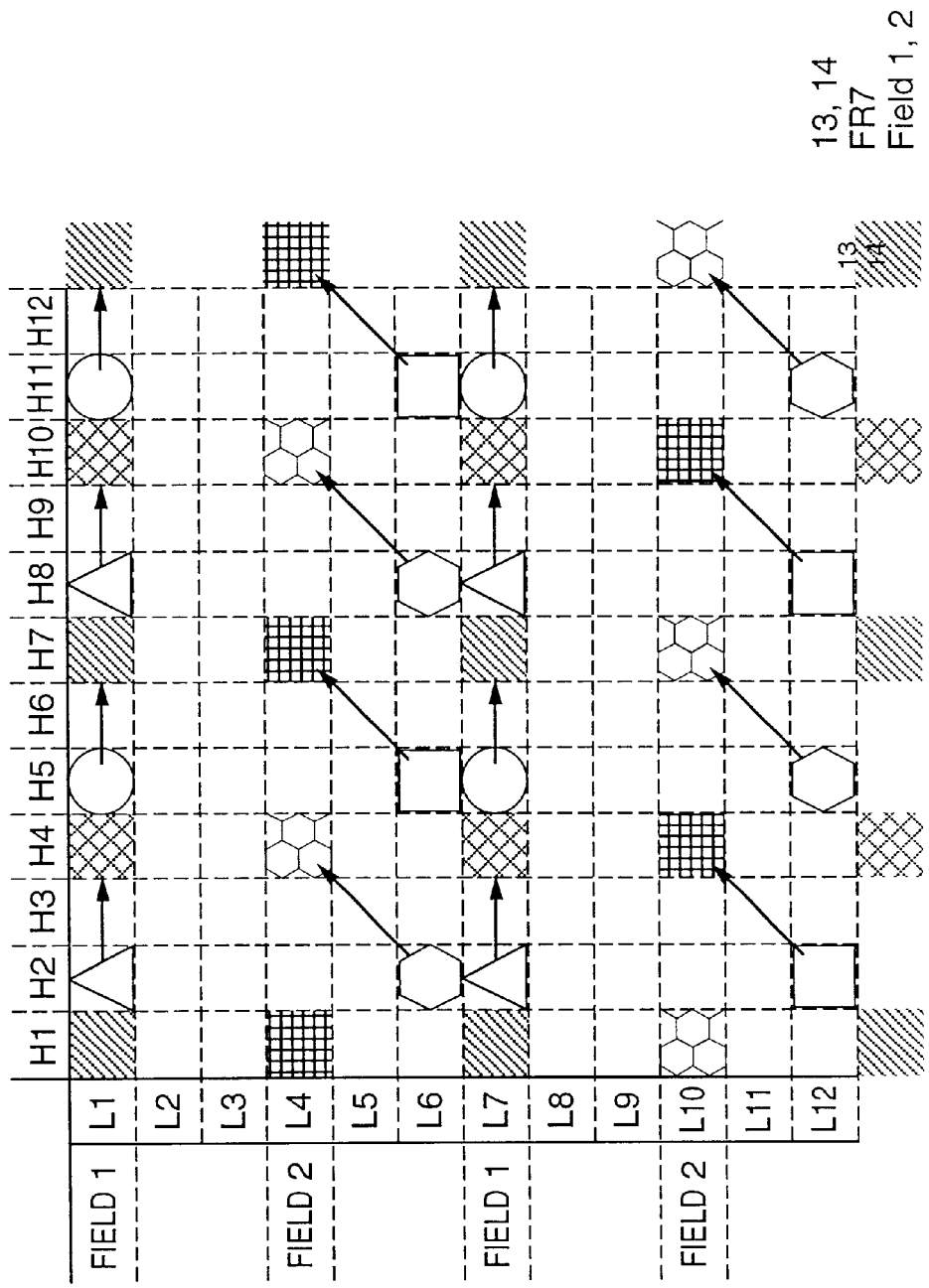
FIG. 58 is an explanatory view of pixel-shifting operation performed by the system according to the fourth embodiment, for explaining pixel data capturing operation on an image sensing surface.

FIG. 58 shows data derived from the frame (screen) 7. More specifically, FIG. 58 shows how image data is derived when the field 1 is scanned while the plates 6 and 3 are set respectively in the state shown in FIGS. 49 and 42, and when the field 2 is scanned while the plates 6 and 3 are set respectively in the state shown in FIGS. 49 and 41.

Figure 59:
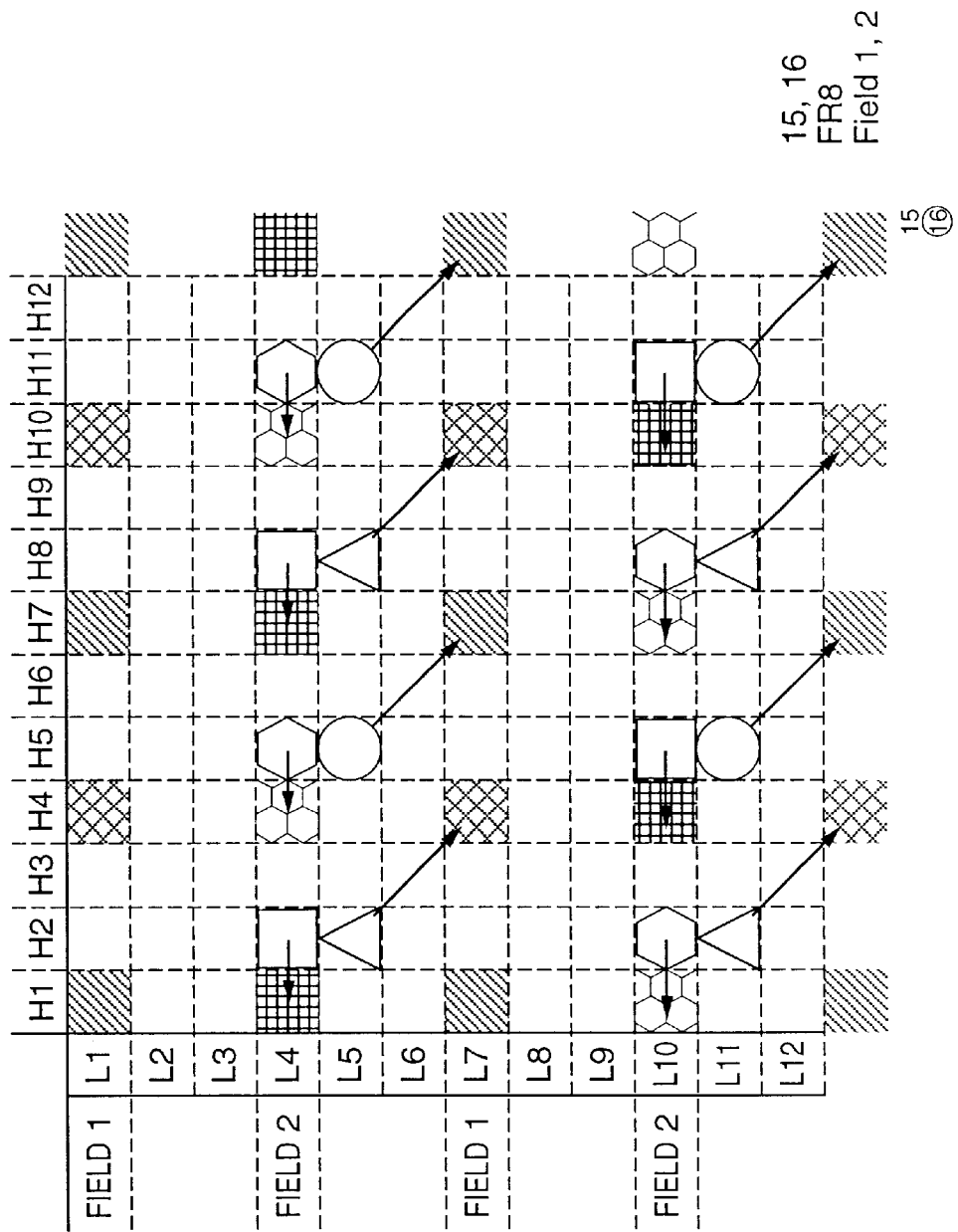
FIG. 59 is an explanatory view of pixel-shifting operation performed by the system according to the fourth embodiment, for explaining pixel data capturing operation on an image sensing surface.

FIG. 59 shows data derived from the frame (screen) 8. More specifically, FIG. 59 shows how image data is derived when the field 1 is scanned while the plates 6 and 3 are set respectively in the state shown in FIGS. 49 and 44, and when the field 2 is scanned while the plates 6 and 3 are set respectively in the state shown in FIGS. 46 and 42.

FIG. 60 shows data derived from the frame (screen) 9. More specifically, FIG. 60 shows how image data is derived when the field 1 is scanned while the plates 6 and 3 are set respectively in the state shown in FIGS. 49 and 41, and when the field 2 is scanned while the plates 6 and 3 are set respectively in the state shown in FIGS. 49 and 44.

Note that the above-described flow of eighteen times of pixel-shifting operation for nine frames (18 field) is shown in a clear order in FIG. 62. Shown in FIG. 62 is, from the bottom of the drawing, field FLD scanned for deriving image data, sequence of field SEQ, frame number NO, and energizing timing TIMING of each of the electromagnets 5Ua, 5Da, 5Ub and 5Db, controlling the vertical plate 3. In the middle, the number of drawings showing the respective states is indicated.

Referring further to the upper portion of the drawing, the amount of pixel-shifting (VPP) executed by the vertically provided plate 3, and coordinates (x, y) of pixel-shifting expressed with +/− while assuming that the state shown in FIG. 42 is 0.

Shown further in the upper portion of the drawing is energizing timing TIMING of each of the electromagnets 8Ra, 8La, 8Rb, 8Lb and 8Rc, controlling the horizontal plate 6, and the amount of pixel-shifting (HPP).

Figure 61A:
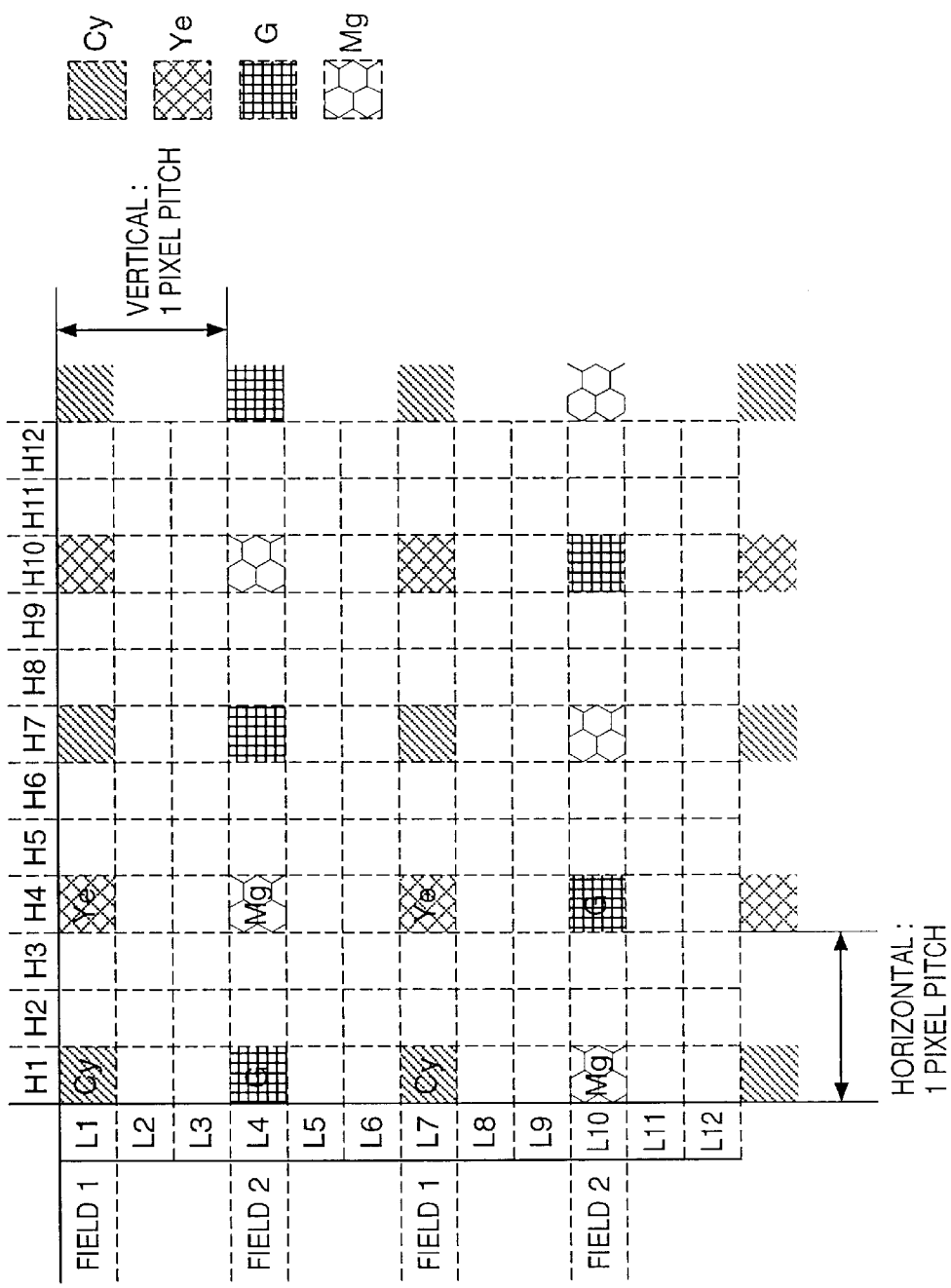

Accordingly, as shown in FIGS. 61A and 61B, it is possible to capture data indicative of light flux, which was conventionally unable to capture because the light is incident upon the light-insensitive zone in peripheries of each photoreceptive portion, can be captured by pixel-shifting operation.

In other words, image data, which is incident upon other pixels or light-insensitive zones between pixels of the image sensing surface, can be received. As a result, it is possible to achieve an effect equivalent to the case where the number of pixels of the image sensing device is increased.

Furthermore, it is possible to attain an effect equivalent to a case where the number of pixels are increased while keeping the same cycle of color filter arrangement as the color cycle of filter arrangement of the CCD, thus achieving three times the resolution in a color image.

Furthermore, since the data is stored in the memory in the aforementioned sequence (sequence of frames 1 to 9) and reproduced in the same order without reversing the sequence, the operation processing of image data is simplified and processing speed largely increases.

It should be further noted in the above-described pixel-shifting processing that, as shown in FIG. 61, the arrangement of pixel data has a so-called complementary-color checkers pattern used in the normal color filter.

This means that image data obtained by the above-described pixel-shifting is used, for instance, in the normal camera process adopting NTSC scheme, without utilizing any special processes. As a result, it can be shared with the normal television image sensing system. Therefore, for instance, it is possible to realize a system capable of moving-image sensing and still-image sensing adopting the pixel-shifting operation.

Accordingly, the second embodiment is greatly advantageous in terms of system efficiency, high speed data processing, and compatibility with other systems.

Note that the pixel-shifting mechanism, such as the plate 6, may naturally serve as the plate 3 provided for vertical pixel-shifting.

At each of the 36 positions [six inclined positions of the plate 3]×[six inclined positions of the plate 6], the image is sensed by the image sensing device 2, and the 36 images are sequentially stored in a memory. When the image data is read out of the memory, the order of reading out each pixel of the 36 images and the phase are controlled. As a result, a high-quality image, a combination of the 36 images, can be obtained.

Accordingly, image data, which is incident upon other pixels or light-insensitive zones between pixels of the image sensing surface, can be received. As a result, it is possible to achieve an effect equivalent to the case where the number of pixels of the image sensing device is increased.

Application to Camera

The pixel-shifting system according to the fourth invention, which has the above-described configuration and operates in the aforementioned manner, can be incorporated in a lens mirror or camera body. Construction of the system in such case will be described.

Figure 63:
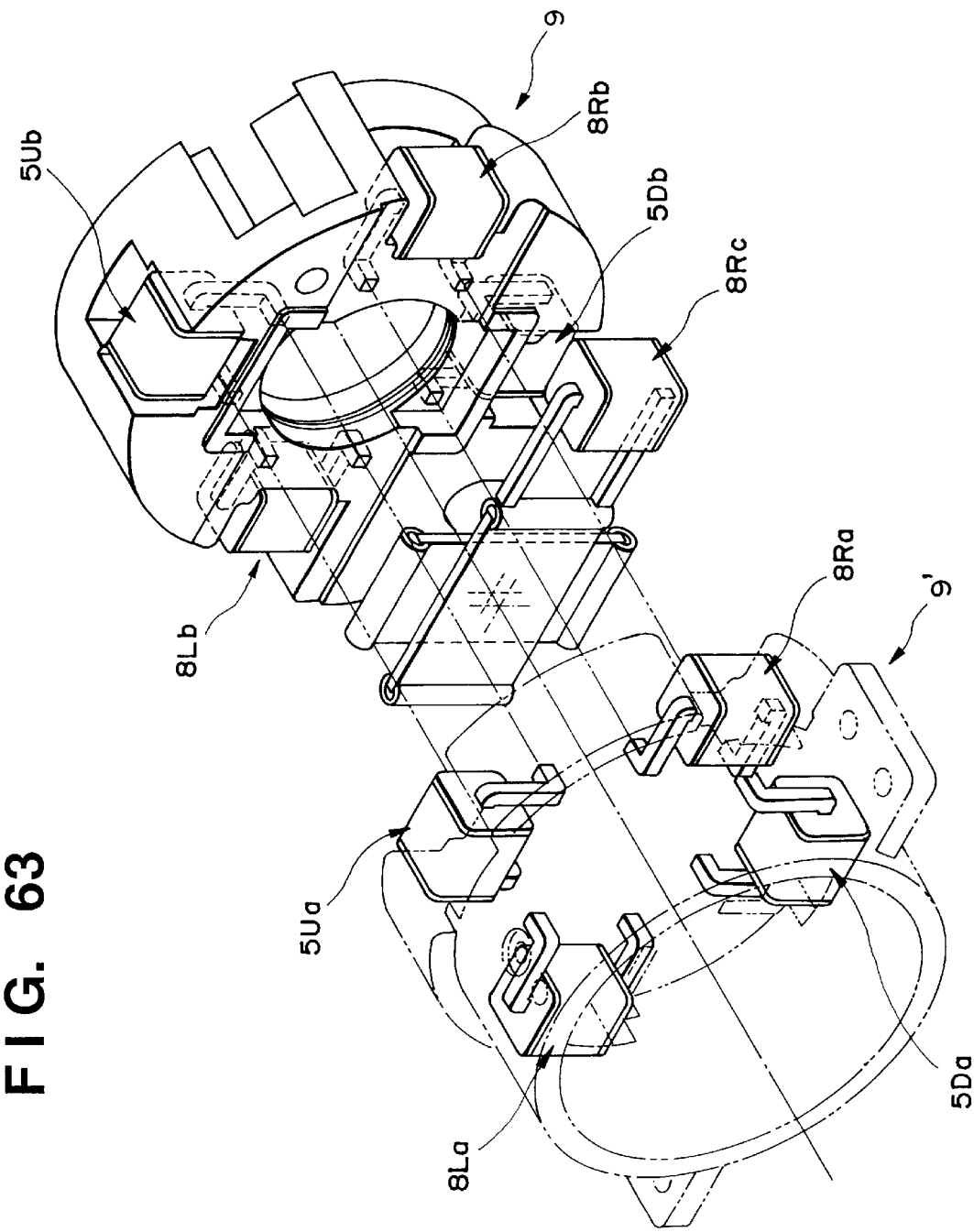
FIG. 63 is a perspective view showing a structure in a case where the pixel-shifting system according to the fourth embodiment is incorporated as a unit.

FIG. 63 is an exploded perspective view of the pixel-shifting unit incorporating the pixel-shifting mechanism according to the present embodiment.

In FIG. 63, reference numerals 9 and 9' denote a body supporting each electromagnet and plate, divided into the front and back bodies in the optical-axis direction. Along the optical axis, an opening is formed to allow incident light to pass.

Figure 64:
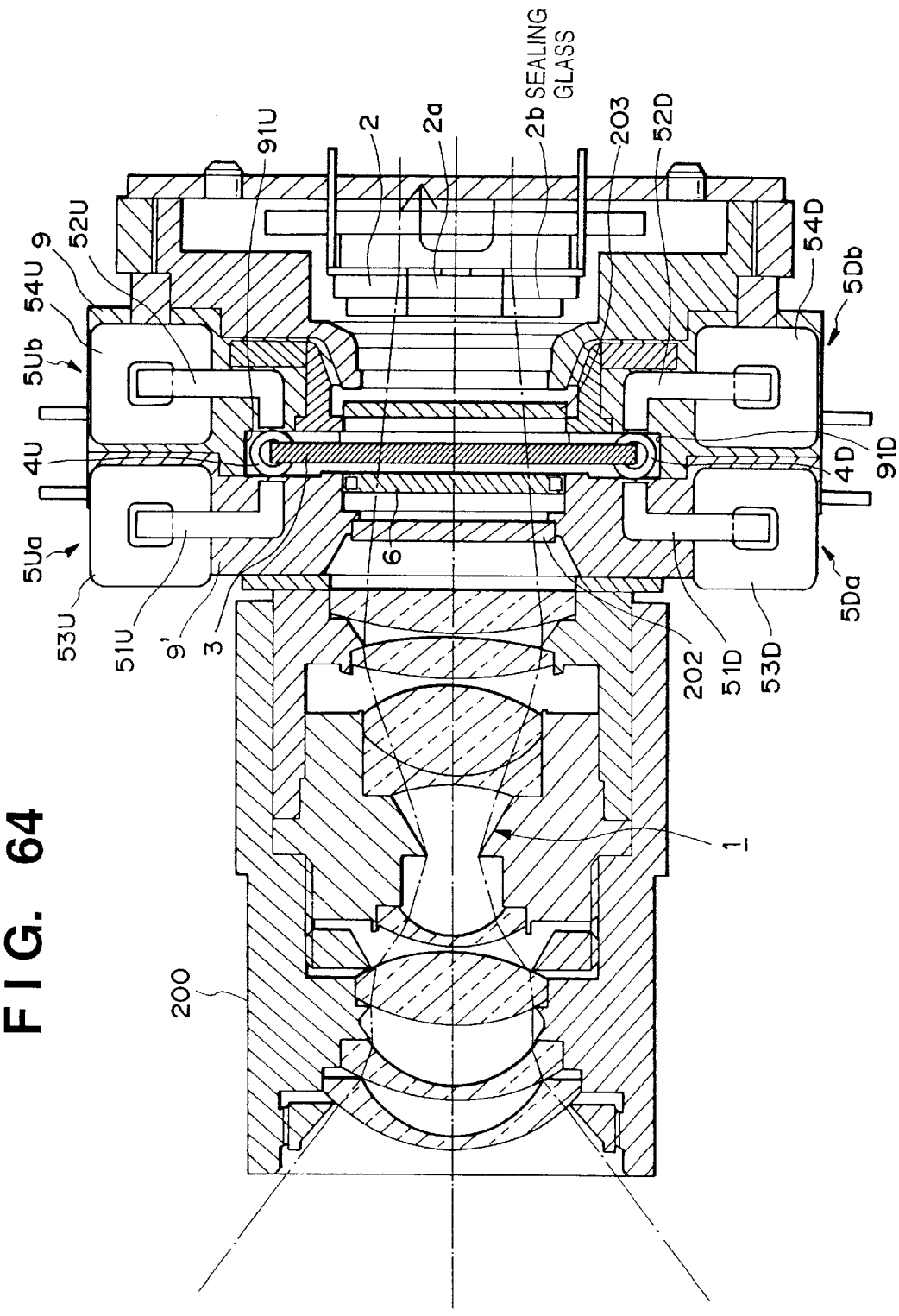
FIG. 64 is a structural view of a camera incorporating the unit of pixel-shifting system according to the fourth embodiment.

Referring to FIGS. 63 and 64, in a predetermined position of the surface where the back body 9 joins the front body 9', in the periphery of an opening 9a of the back body 9, electromagnets 5Ub, 5Db, 8Lb and 8Rb are provided. On the recesses 91U, 91D, 91L and 91R where plates 3 and 6 are respectively inserted for vertical and horizontal pixel-shifting, regulating surfaces 93U, 93D, 93L, 93R and half of 94R are formed respectively.

In the position opposite to the armatures 4U, 4D, 7L and 7R of each of the plates 3 an 6, armatures 52U, 52D, 82L and 82R of the respective electromagnets 5Ub, 5Db, 8Lb and 8Rb are provided in a manner such that the armatures 52U, 52D, 82L and 82R are exposed.

Meanwhile, on the side of the front body 9' opposing the back body 9, electromagnets 5Ua, 5Da, 8La and 8Ra are provided opposite to the electromagnets 5Ub, 5Db, 8Lb and 8Rb. On the recesses 91U, 91D, 91L and 91R, regulating surfaces 92U, 92D, 92L, 92R and half of 94R are formed respectively.

Accordingly, combining the front body 9' and back body 9 enables to support each of the plates 3 and 6 for vertical and horizontal pixel-shifting, and the electromagnet 8Rc as well as electromagnets for controlling the position of these plates, as indicated in FIGS. 38 to 50.

FIG. 64 is a transverse cross section showing a case where the pixel-shifting unit is incorporated in a camera.

In FIG. 64, reference numeral 200 denotes a lens barrel, having an object lens optical system 1 therein. The pixel-shifting unit shown in FIG. 63 is provided in the mounting portion of the lens barrel 200. The pixel-shifting unit includes the front body 9' and back body 9. As apparent from FIG. 64, an LPF (optical low-pass filter) 202 for limiting the spatial frequency of incident light, plate 6 for horizontal pixel-shifting, plate 3 for vertical pixel-shifting, and LPF (optical low-pass filter) 203 are sequentially provided. An image sensing device 2 is provided therebehind. Reference numeral 2a denotes an effective image sensing surface of the image sensing device 2 (image sensing area) and 2b denotes a sealing glass of the image sensing surface.

An infrared ray cut filter can be provided by coating, e.g. the surface of plate 3 or 6.

Combination of the LPFs 202 and 203 perform band limitation of spatial frequency of incident light to remove moire or the like caused by aliasing distortion. Since the LPF 202 is rotatable, a wavelength of incident light is changed in accordance with the rotation of the LPF 202, canceling the LPF effect.

Accordingly, if there is a case where the band limitation by the LPF needs to be removed to perform particularly high-quality image sensing, it can be realized without removing the LPF from the camera, but simply by rotating the LPF. Since details thereof are disclosed in Japanese Patent Application Laid-Open NO. 7-245762, description will not be provided herein.

Next, a circuit for driving the pixel-shifting according to the fourth embodiment will be described with reference to FIG. 37, since it is identical to that of the first embodiment.

In FIG. 37, reference numeral 1 denotes an image-sensing lens optical system; and 2, an image sensing device. In the space between them, a pixel-shifting unit 300 is provided.

An image sensing signal outputted by the image sensing device 2 is stored in a memory 301. Image data read out of the memory is supplied to a camera processor 302 where luminous signal and color signal are generated, then supplied to a print reproduction system 306 where printing is performed on a print medium (not shown).

Alternatively, the image data is supplied to a display controller 304 where the image data is converted to a signal form displayable by a monitor, and displayed in a monitor display 305.

Alternatively, a digital image signal without conversion may be outputted to an external apparatus through a digital image output D0 to be supplied to a personal computer or the like.

The image processing circuit constructed as above is controlled by a system controller 307 having a microcomputer.

In other words, the pixel-shifting unit is controlled to control the plates in the vertical and horizontal directions respectively to perform pixel shifting.

In the fourth embodiment of the present invention, for instance, the system controller 307 controls the plate 3 to perform pixel-shifting in four steps in the vertical direction, and in each of the four steps, controls the plate 6 to perform pixel-shifting in four steps in the horizontal direction. As a result, the total of sixteen images can be derived from the four steps of pixel-shifting in the vertical direction and four steps of pixel-shifting in the horizontal direction.

Each of these images is sequentially stored, as the memory controller 303 controls the memory 301. When all the images are stored in the memory 301, image data is read out of the memory pixel by pixel, while combining these pixels into one image. Then, the read data is supplied to the camera processor 302 where luminous signal processing and color signal processing are performed, and high quality image signal can be obtained.

Note that, image data may be outputted to an external apparatus such as a personal computer or the like without using the camera processor, and various image processing may be performed by the external apparatus.

By the above-described processing, it is possible to sense a high quality image which is equivalent to an image sensed by an image sensing device having a far larger number of pixels than the actual number of pixels.

As described above, according to the pixel-shifting system of the fourth embodiment of the present invention, it is possible to realize the pixel-shifting system which can simplify the control method, which has a mechanism that enables to increase processing speed, and which enables to obtain a number of stable optical positions with a simple mechanism. This is realized by utilizing electromagnetic driving means e.g., an electromagnet, as a driving source of the pixel-shifting system in place of a motor, providing an abutting space as position control means in place of a complicated mechanism such as a cam or the like, controlling an inclination angle of a pixel-shifting optical device e.g., a plane parallel plate or the like, by changing the size of the abutting space for position control, minimizing the members requiring size precision as much as possible, and eliminating a particular supporting axle for controlling an inclination angle of the optical device.

Advantages of Fourth Embodiment

As has been set forth above, according to the fourth invention, a plurality of regulating portions for regulating a shifting position with respect to an optical-axis direction are formed on both ends of an optical device provided for shifting the position of incident light on an image sensing surface, and the optical device is positioned to abut against each of the regulating portions, making it possible to control the inclination of the optical device in a plurality of directions. By virtue of this configuration, pixel-shifting operation with extremely precise positioning is realized by a simple structure in which the optical device abuts against the regulating portions.

Furthermore, the inclination of optical device can be controlled in a plurality of angles by changing the combination of the regulating surfaces to which the end portions of the optical device is abutted. Therefore, pixel-shifting operation can be performed with an extremely simple structure, at high speed and high precision.

In addition, by having a simple positioning mechanism where the optical device is merely abutted against regulating surfaces which regulate inclination positions of the optical device in the optical-axis direction, it is possible to attain various inclination positions, obtain a high-quality image, and change direction and distance of pixel-shifting in various manner.

Furthermore, on both ends of the optical device abutting against the regulating surfaces, an engaging portion which contacts with the regulating surfaces by point or line is provided. By virtue of this, even if the engaging position on the regulating surface within the engaging portion of the optical device changes, causing position deviation on the plane parallel to the image sensing surface, the inclination angle of the plate can be kept constant. As a result, the amount of pixel-shifting is kept uninfluenced.

Moreover, driving means is constructed by a plurality of electromagnets which drive the plate forward or backward with respect to the optical-axis direction, and the regulating surface against which the optical device abuts is changed by controlling the turning ON/OFF the electromagnets. By virtue of this, pixel-shifting is realized at high speed and high precision with a simple structure.

Fifth Embodiment

Next, the fifth embodiment of the pixel-shifting system according to the present invention will be described.

The fifth embodiment is characterized in that, compared to the above-described first embodiment, the pixel-shifting steps are increased and pixel-shifting that enables high-speed image processing is realized for a color (pixel arrays) image.

Figure 65:
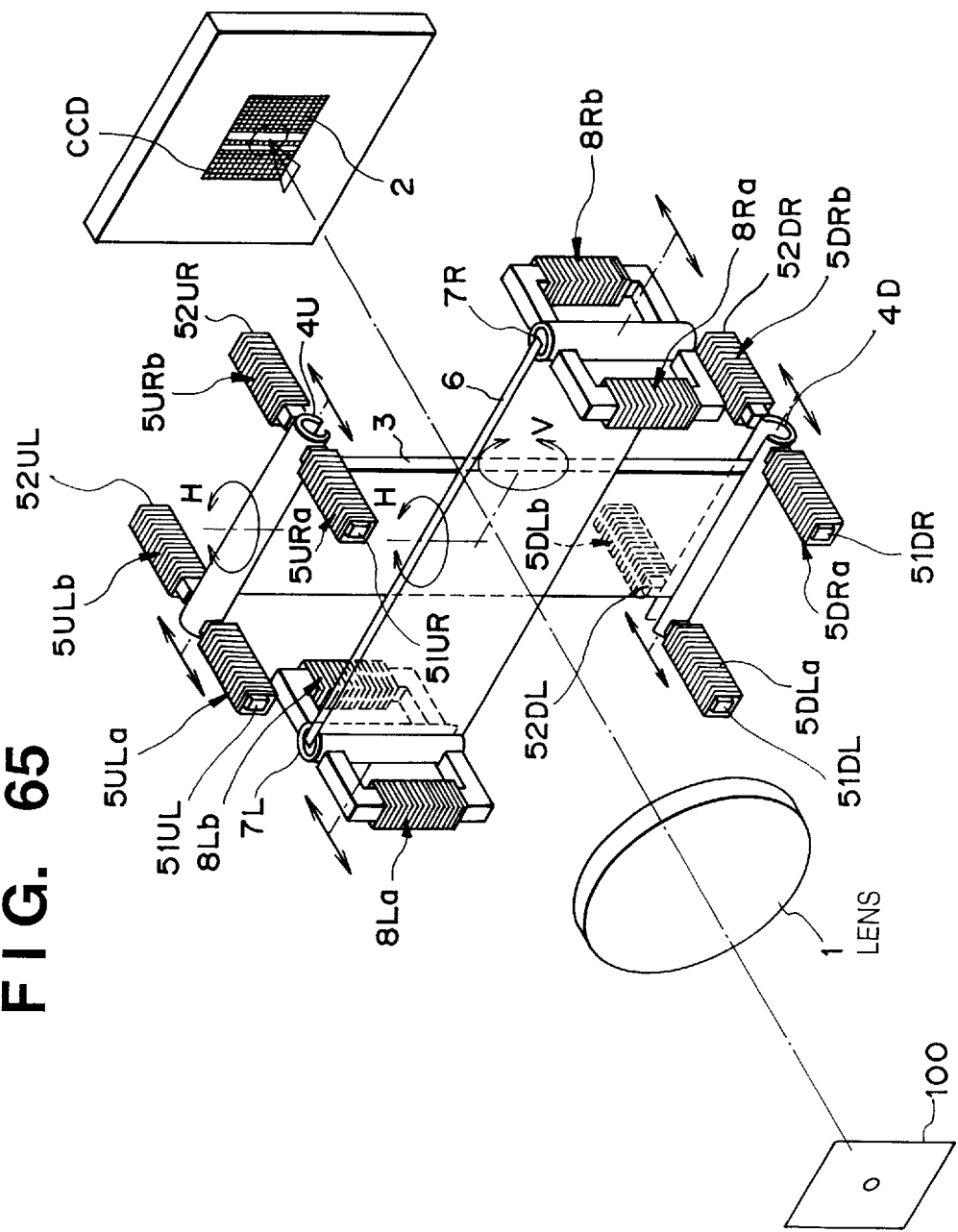
FIG. 65 is a perspective view explaining a structure of a pixel-shifting system according to a fifth embodiment of the present invention.
Figure 66A:
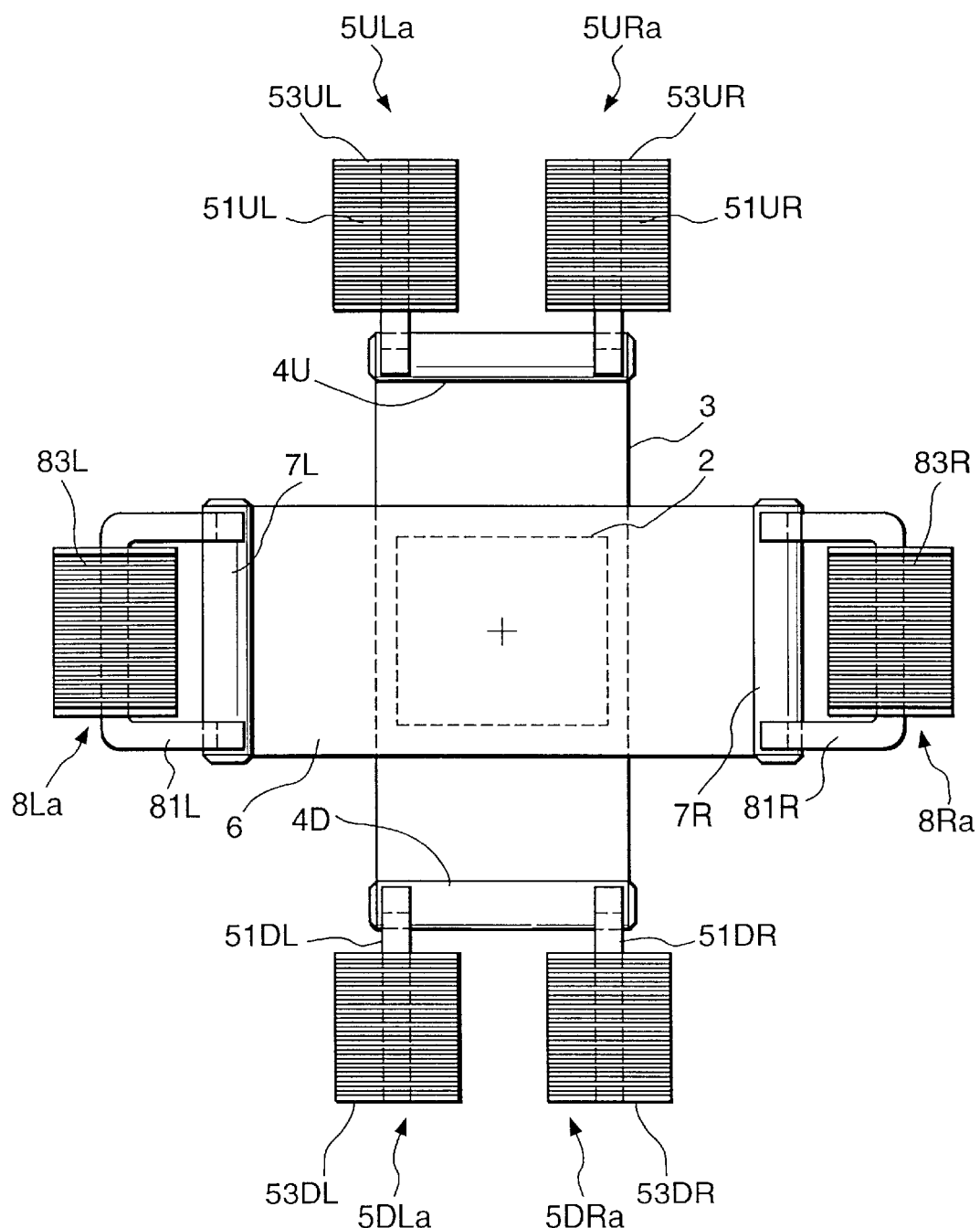
FIGS. 66A, a front view and 66B, a top view of the pixel-shifting system according to the fifth embodiment.
Figure 66B:
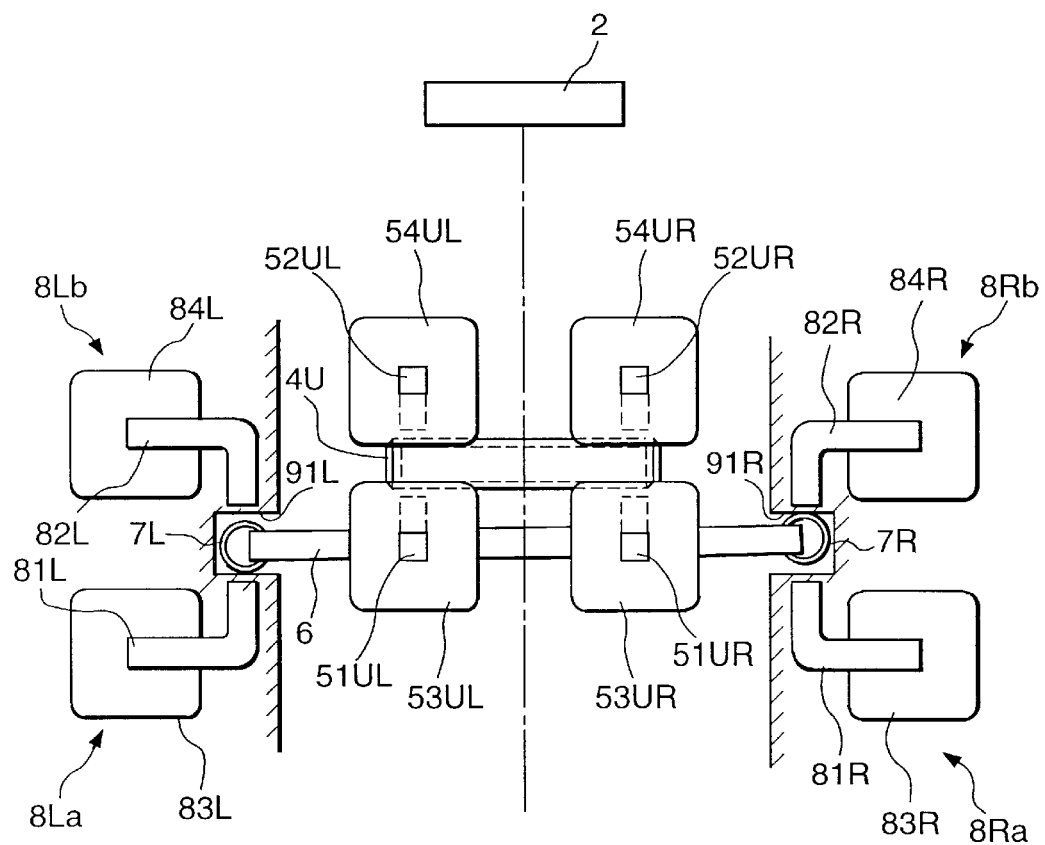
Figure 67A:
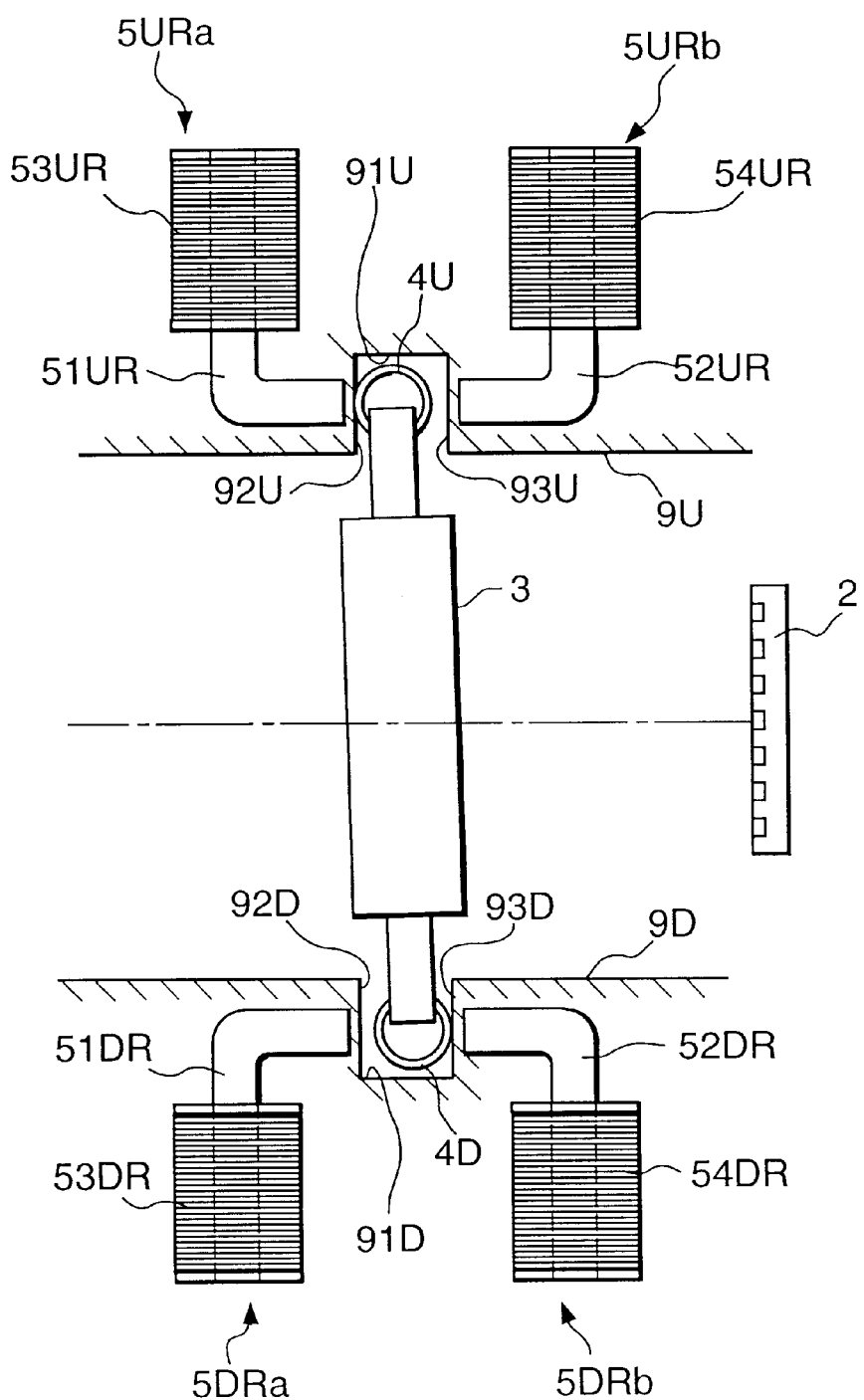
FIGS. 67A and 68B are explanatory views for explaining an example of a structure and operation of the pixel-shifting system according to the fifth embodiment.

FIG. 65 is a perspective view of a pixel-shifting unit according to the fifth embodiment. FIGS. 66A, 66B, 67A and 67B show the main portion of the pixel-shifting unit, where FIG. 66A is a front view seen from the front (object side) of the optical axis; FIG. 66B, a top view; FIG. 67A, a side view seen from the right side of the unit; and FIG. 67B, a side view seen from the left side of the unit.

Referring to each of FIGS. 66 to 67, the fifth embodiment differs from the above-described first embodiment in that a part of the electromagnets, i.e., electromagnets provided for shifting the plate 3 (electromagnets 5Ua and 5Ub provided on the upper side and 5Da and 5Db provided on the lower side in the first embodiment), are divided into two.

Dividing one electromagnet into two and generating "twist" state in the plate has already been proposed by the above-described second embodiment (FIGS. 14 to 21). However, while yokes of each of the electromagnets have U-shape in the second embodiment, yokes of a part of electromagnets have a substantial cylindrical (linear) shape in the fifth embodiment.

By virtue of making the yokes of a part of electromagnets into substantial cylindrical shape (linear), when armatures 4U and 4D of the plate 3 is pulled toward the regulating surfaces facing the armatures by energizing the electromagnets, always two electromagnets are energized such that the yokes of the energized electromagnets have opposite magnetic polarity (the north and south poles), thereby generating always one magnetic circuit for the armature.

In a case where electromagnets having U-shape yokes as described in the first to fourth embodiments are used into the fifth embodiment, generating the "twist" state of the plate 3 brings each armature pulled at two positions of the electromagnets having a distance. In other words, each of four yokes contacts the armature (4U or 4D) by one point (four points in total). Because of this, twisting cannot be performed satisfactorily.

In order to solve the above problem, in the fifth embodiment, yokes provided for pulling the plate contact the respective electromagnets by one point. When it is necessary to generate the "twist" state of the plate, electric current of opposite polarity is supplied to two electromagnets diagonally facing each other so as to energize the electromagnets in opposite polarity. As a result, the armature is always controlled by one magnetic circuit.

In the fifth embodiment, the above description of the second embodiment (FIGS. 14 to 21) regarding shifting position of the plate 3 for pixel-shifting operation, can be applied. However, the fifth embodiment differs from the second embodiment in the structure of electromagnets which shift the plate 3 to each of the positions, and in its energizing state.

Accordingly, with regard to FIGS. 65 to 73, components identical to the above-described construction of the second embodiment are referred to by the same reference numerals and description thereof will be omitted.

Referring to FIGS. 65, 66A, 66B, 67A and 67B, electromagnets 5Ua, 5Ub, 5Da and 5Db mentioned in the first embodiment which controls the plate 3 in the vertical direction are divided, respectively providing 5ULa and 5URa, 5ULb and 5URb, 5DLa and 5DRa, and 5DLb and 5DRb.

More specifically in the fifth embodiment, similar to the second embodiment, these electromagnets 5ULa and 5URa, 5ULb and 5URb, 5DLa and 5DRa, and 5DLb and 5DRb are provided so that the plate 3, primarily performing pixel-shifting in the vertical direction, is made rotatable in the horizontal direction, in addition to the vertical direction, making it possible to perform pixel-shifting in the vertical and horizontal directions.

In other words, as similar to the second embodiment, the maximum of six steps of pixel shifting can be added to the total of nine steps of pixel shifting which is realized by combining three steps of pixel shifting in the vertical direction performed by the plate 3 with three steps of pixel shifting in the horizontal direction performed by the plate 6. This is realized because the horizontal rotation (twist) of the plate 3 enables to further increase the amount of pixel-shifting in the horizontal direction by a maximum of six steps for one position of the plate 3 in the vertical direction.

The operation of pixel-shifting apparatus according to the fifth embodiment will be described with reference to FIGS. 66 to 72.

FIG. 66A is a front view of the pixel-shifting unit, seen from the front (object 100 side) of the optical axis.

FIG. 66B is a top view of the pixel-shifting unit seen from the top of the plate 3 in the longitudinal direction. In particular, FIG. 66B describes the inclination state of the plate 6 by the energizing state of each of the electromagnets 8La, 8Lb, 8Ra and 8Rb, and pulling state of the armatures 7L and 7R.

FIG. 67A describes the inclination state of the plate 3 by the energizing state of each of the electromagnets 5URa, 5URb, 5DRa and 5DRb, and pulling state of the armatures 4U and 4D.

Figure 67B:
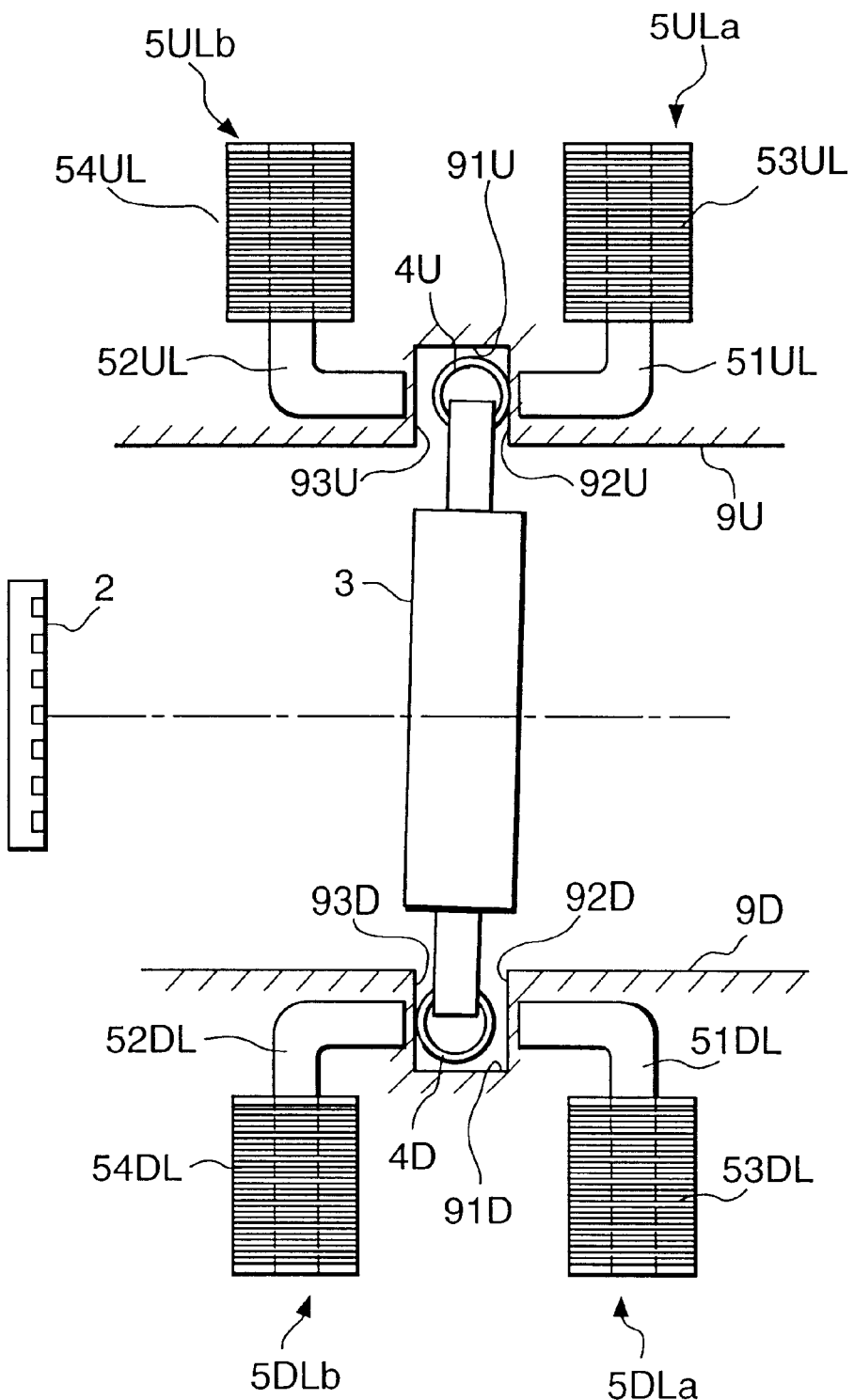

FIG. 67B describes the inclination state of the plate 3 by the energizing state of each of the electromagnets 5ULa, 5ULb, 5DLa and 5DLb, and pulling state of the armatures 4U and 4D.

All the drawings, FIGS. 68A, 68B, 69A, 69B, 70A, 70B, 71A, 71B, 72A and 72B are explanatory views for describing the energizing state of the electromagnets group 5 for obtaining a certain inclination of the plate 3.

Figure 68A:
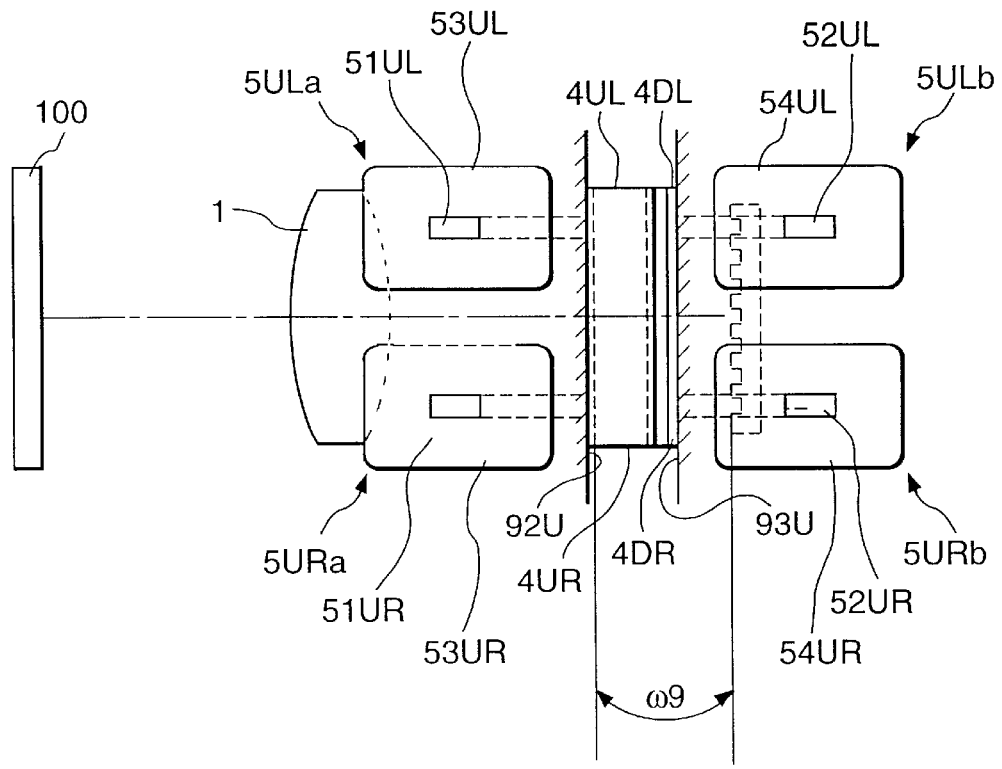
Figure 68B:
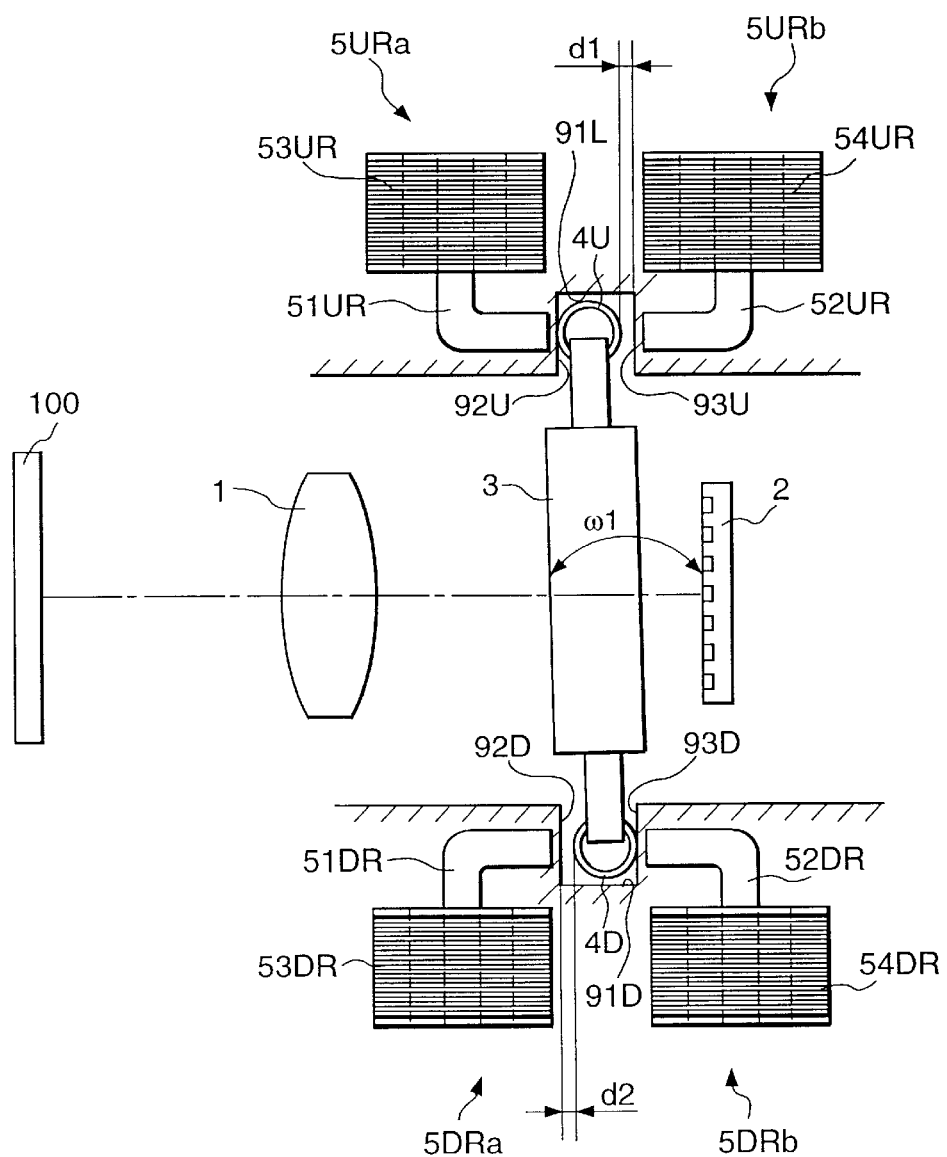

Referring to FIGS. 68A and 68B, in order to achieve an inclination state (angle $\omega_1$) of the plate 3 shown in FIG. 68B, the electromagnets 5URa and 5ULa are turned ON and the electromagnets 5ULb and 5URb are turned OFF in FIG. 68A, while the electromagnets 5URa and 5DRb are turned ON and the electromagnets 5URb and 5DRa are turned OFF in FIG. 68B.

Figure 69A:
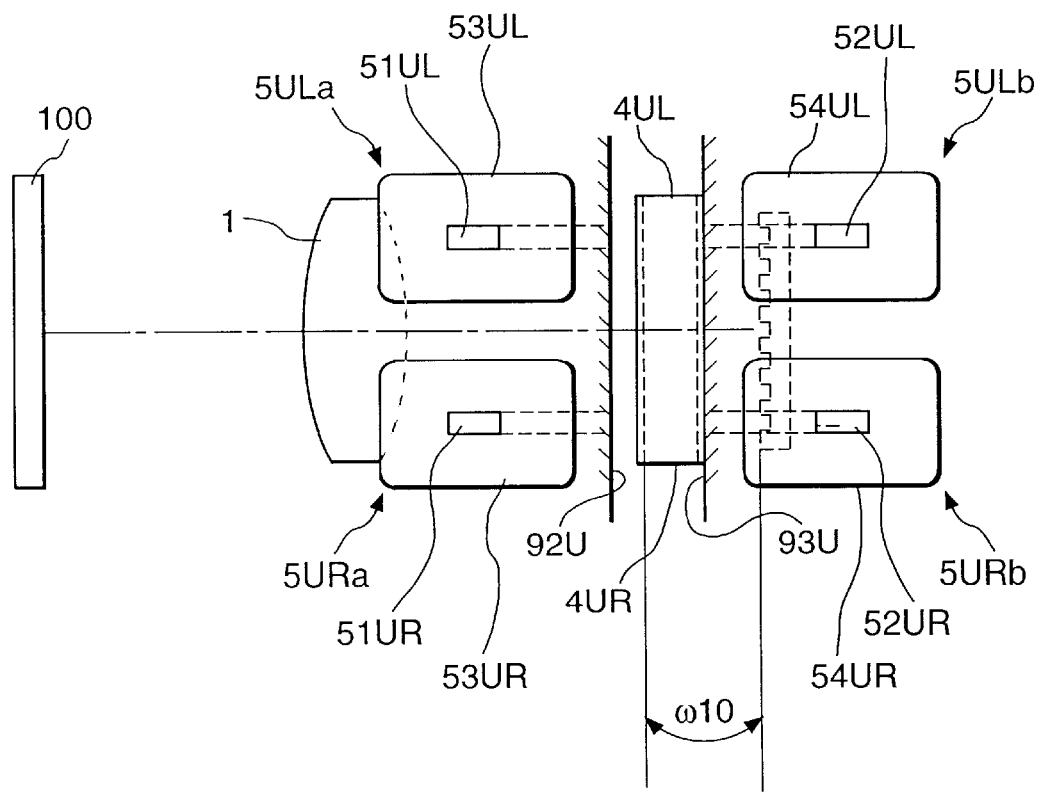
FIGS. 69A and 69B are explanatory views for explaining an example of pixel-shifting operation in the vertical direction performed by the pixel-shifting system according to the fifth embodiment.
Figure 69B:
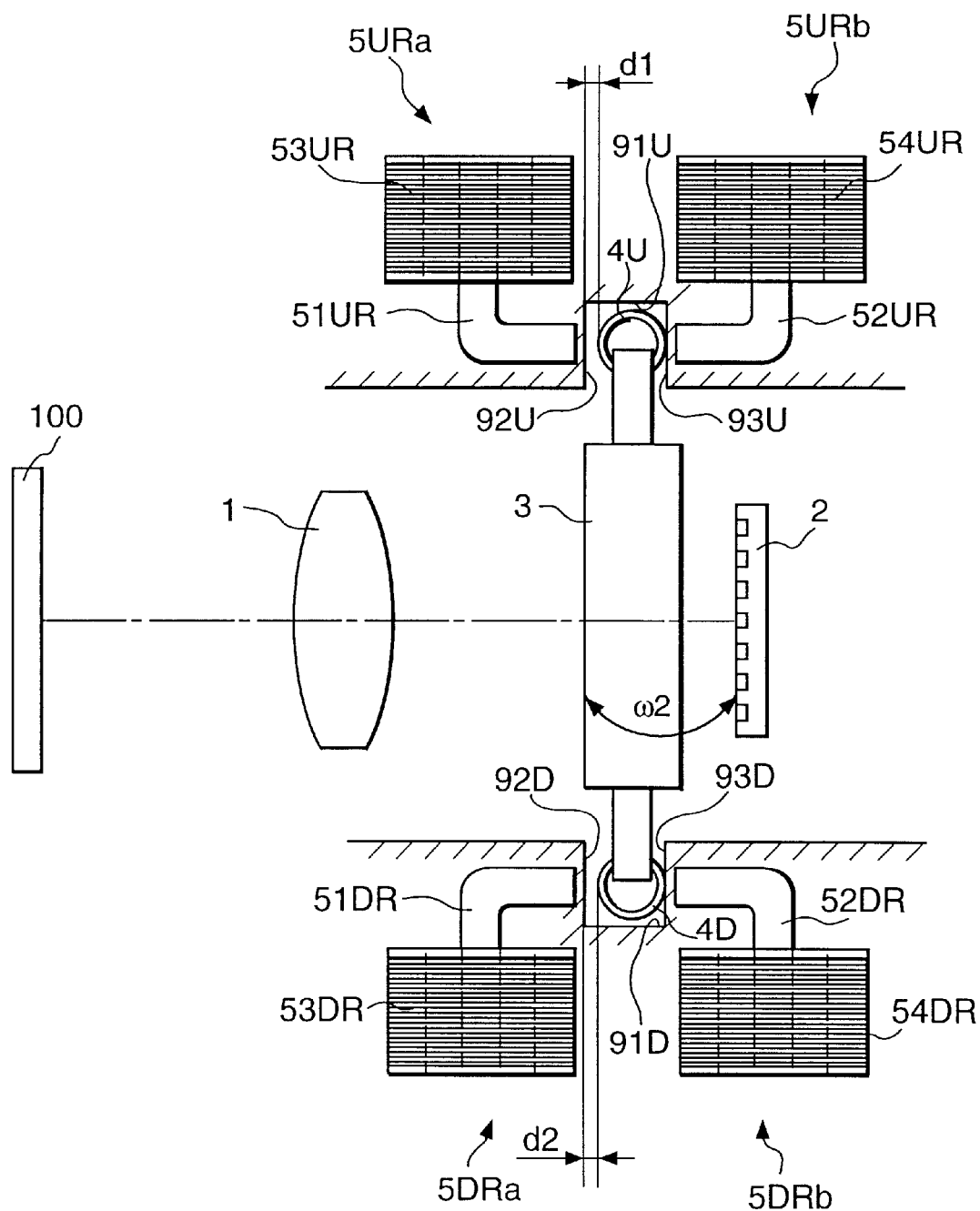

Referring to FIGS. 69A and 69B, in order to achieve inclination states (angles $\omega_2$ and $\omega_{10}$) of the plate 3 shown in FIGS. 69A and 69B, the electromagnets 5URa and 5ULa are turned OFF and the electromagnets 5ULb and 5URb are turned ON in FIG. 69A, while the electromagnets 5URb and 5DRb are turned ON and the electromagnets 5URa and 5DRa are turned OFF in FIG. 69B.

Figure 70A:
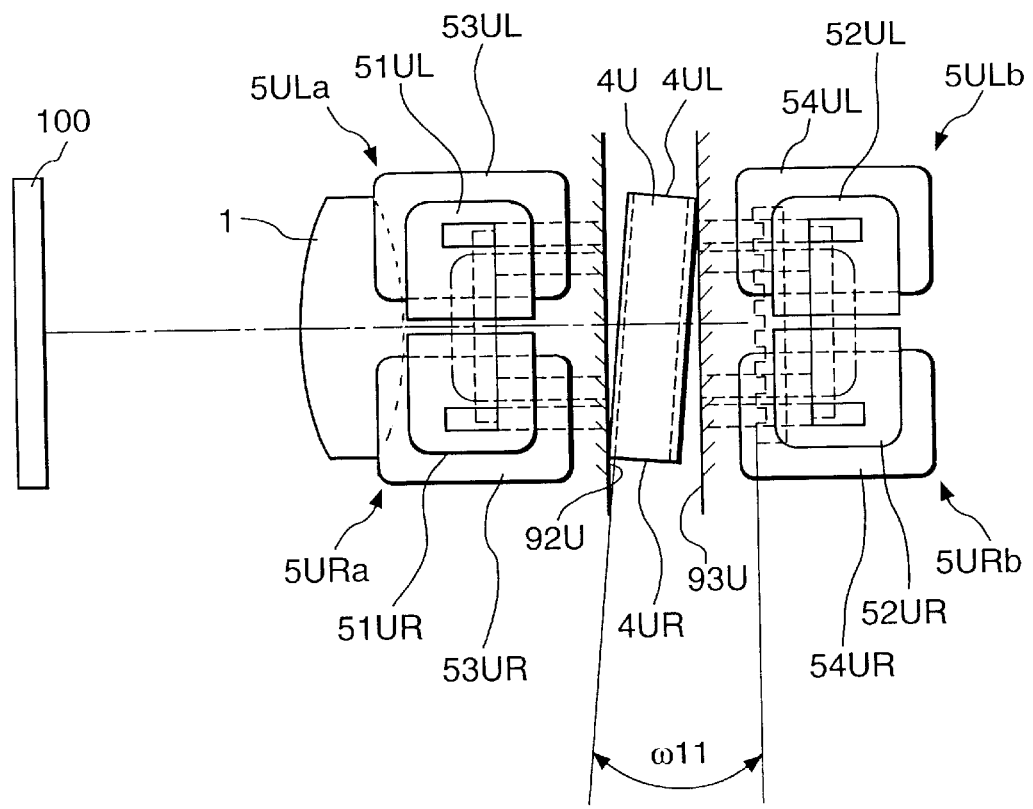
FIGS. 70A and 70B are explanatory views for explaining an example of pixel-shifting operation in the vertical direction performed by the pixel-shifting system according to the fifth embodiment.
Figure 70B:
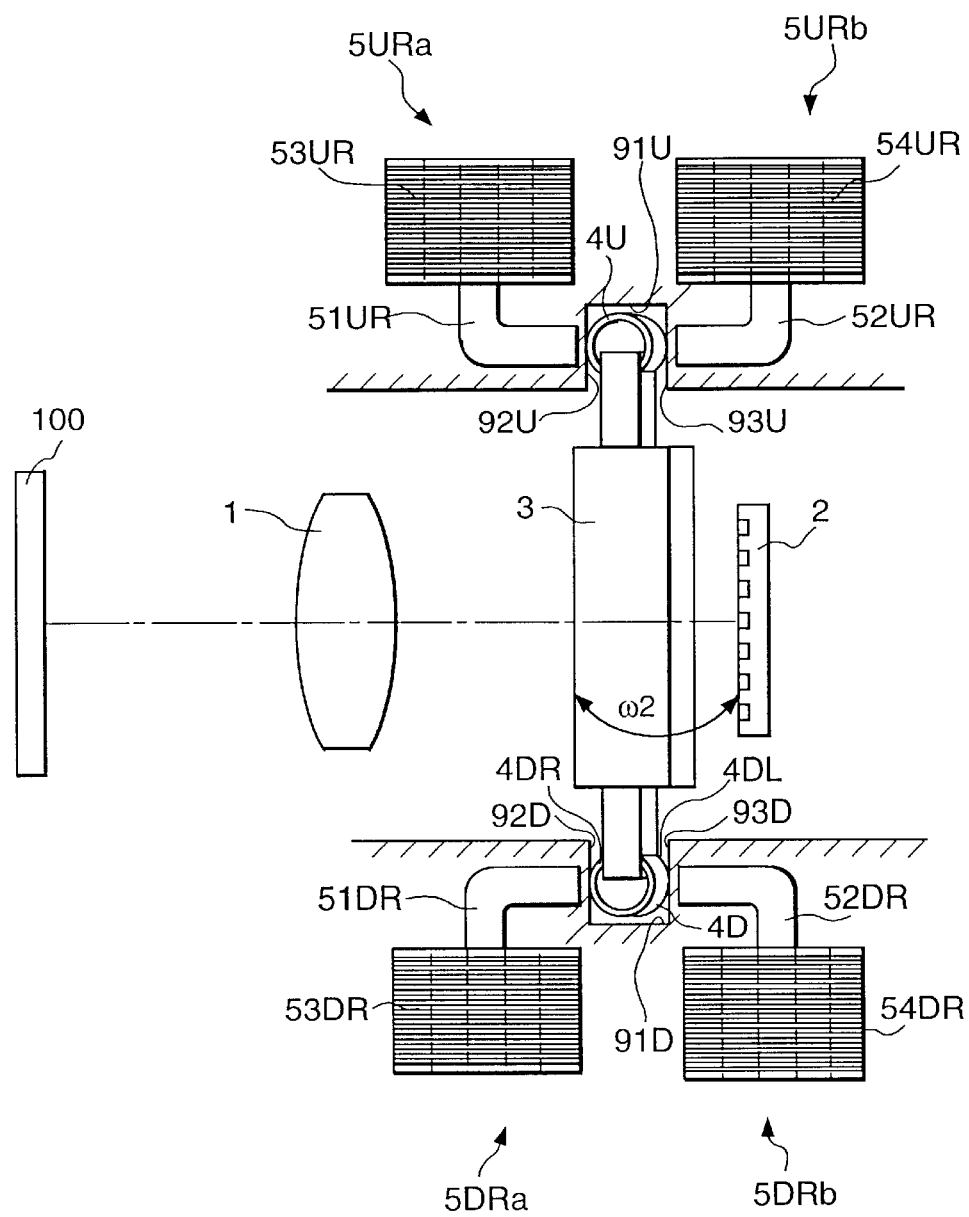

Referring to FIGS. 70A and 70B, in order to achieve inclination states (angles $\omega_2$ and $\omega_{11}$) of the plate 3 shown in FIGS. 70A and 70B, the electromagnets 5ULa and 5URb are turned OFF and the electromagnets 5ULb and 5URa are turned ON in FIG. 70A, while the electromagnets 5URa and 5DRa are turned ON and the electromagnets 5URb and 5DRb are turned OFF in FIG. 70B.

Figure 71A:
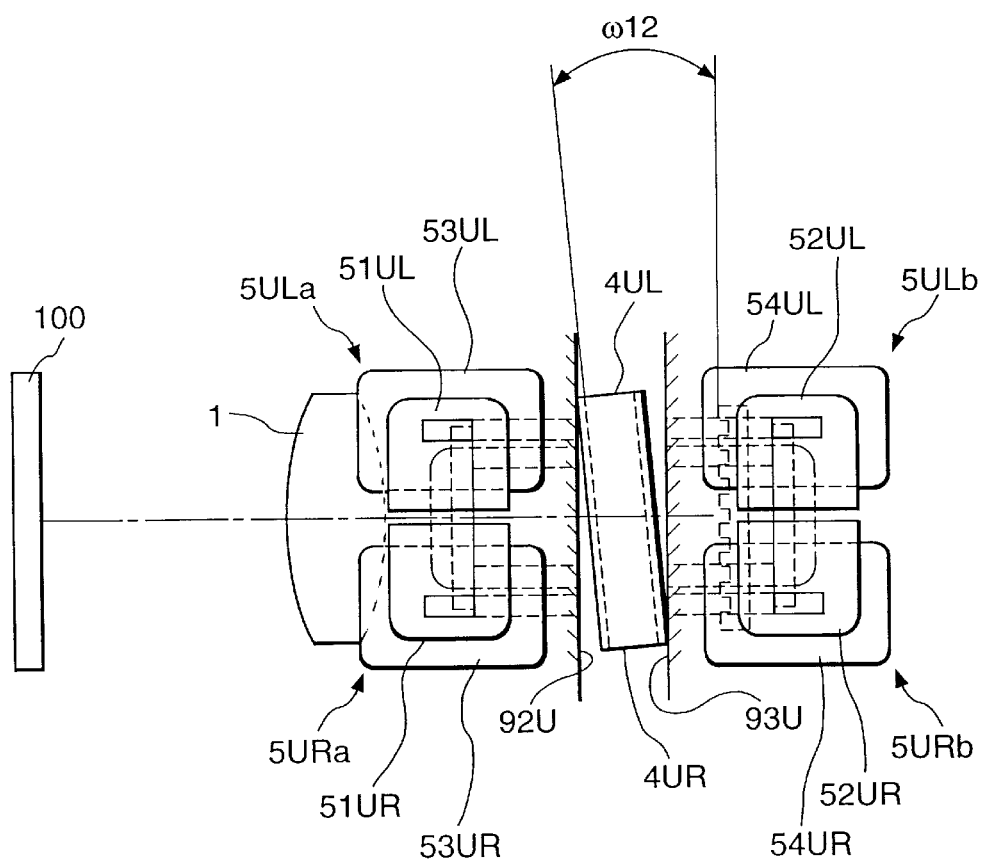
FIGS. 71A and 71B are explanatory views for explaining an example of pixel-shifting operation in the vertical direction performed by the pixel-shifting system according to the fifth embodiment.
Figure 71B:
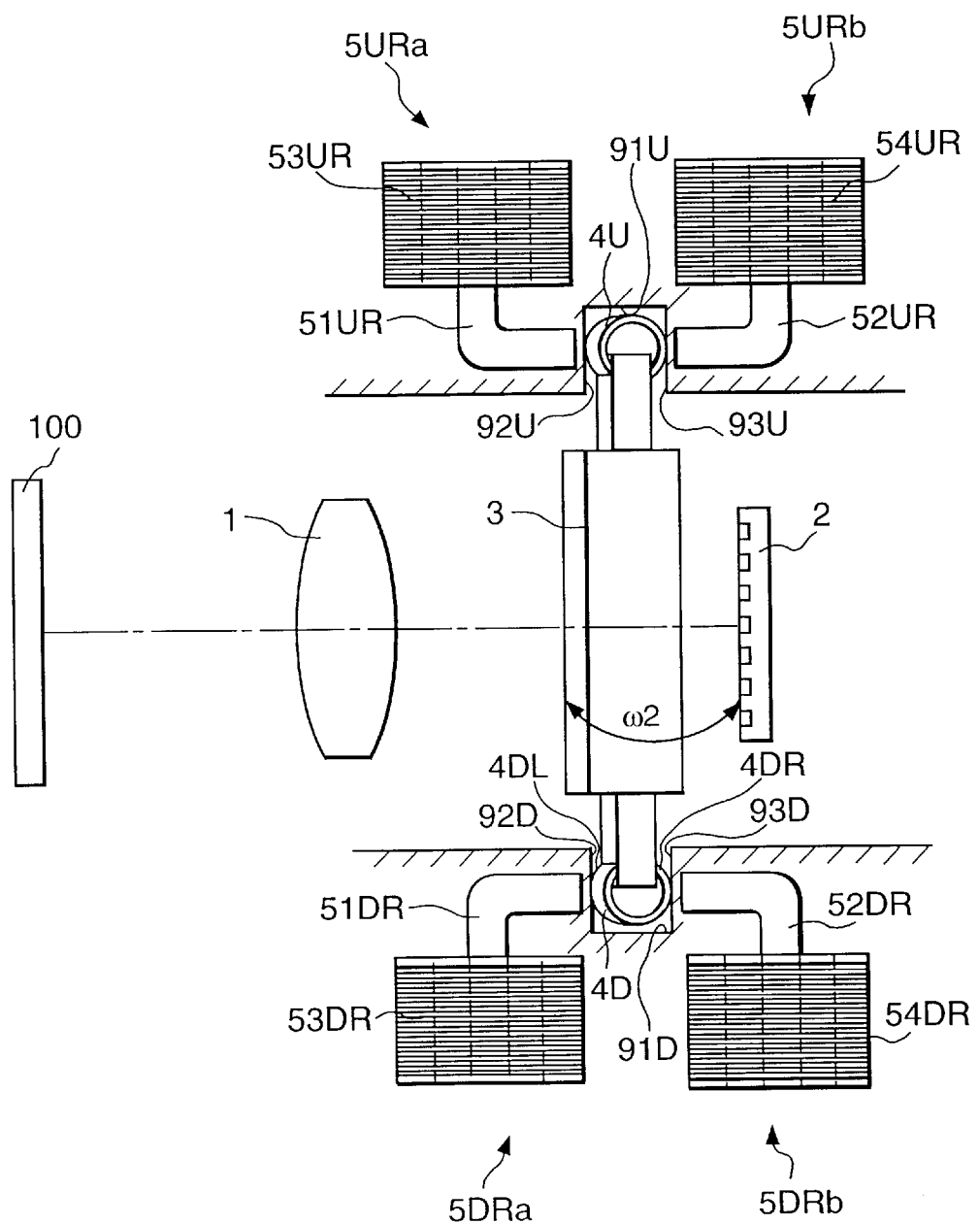

Referring to FIGS. 71A and 71B, in order to achieve inclination states (angles $\omega_2$ and $\omega_{12}$) of the plate 3 shown in FIGS. 71A and 71B, the electromagnets 5URa and 5ULb are turned OFF and the electromagnets 5ULa and 5URb are turned ON in FIG. 71A, while the electromagnets 5URa and 5DRa are turned OFF and the electromagnets 5URb and 5DRb are turned ON in FIG. 71B.

Figure 72A:
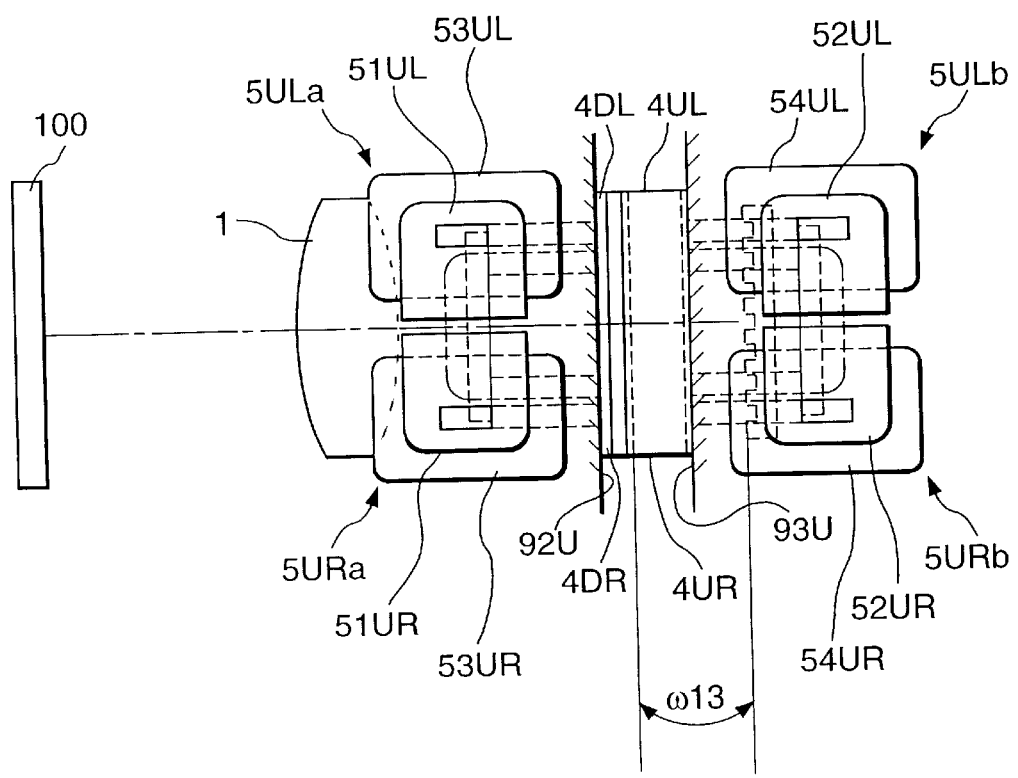
FIGS. 72A and 72B are explanatory views for explaining an example of pixel-shifting operation in the horizontal direction performed by the pixel-shifting system according to the fifth embodiment.
Figure 72B:
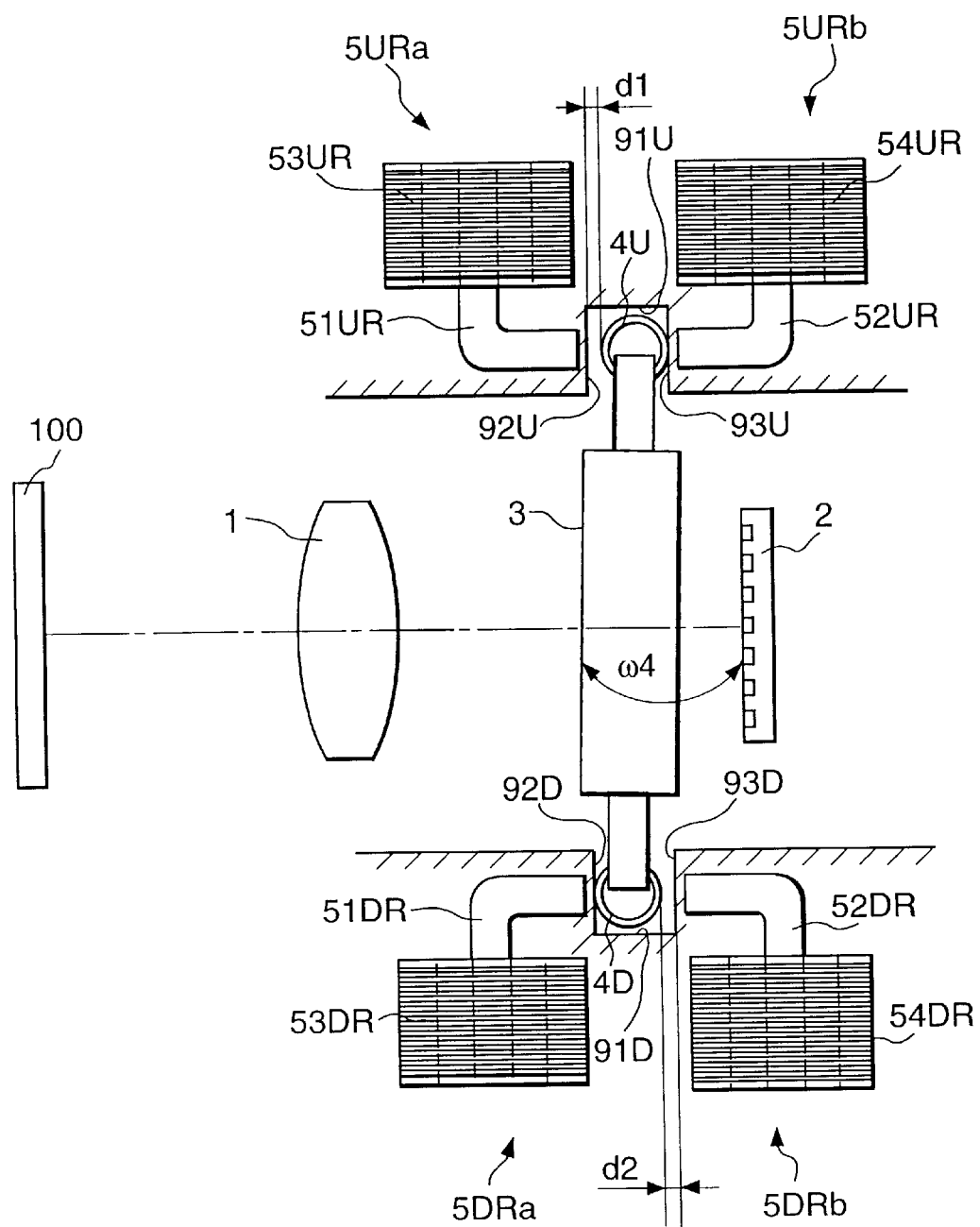

Referring to FIGS. 72A and 72B, in order to achieve inclination states (angles $\omega_4$ and $\omega_{13}$) of the plate 3 shown in FIGS. 72A and 72B, the electromagnets 5URa and 5ULa are turned OFF and the electromagnets 5ULb and 5URb are turned ON in FIG. 72A, while the electromagnets 5URa and 5DRb are turned OFF and the electromagnets 5URb and 5DRa are turned ON in FIG. 72B.

In FIGS. 68A and 68B, since the electromagnets 5URa and 5ULa are turned ON and the electromagnets 5ULb and 5URb are turned OFF, the armatures 4U is pulled toward the yokes 51UR and 51UL of the electromagnets 5URa and 5ULa in the recess 91U, is abutted against the regulating surface 92U which is at the front (object side) of the optical-axis direction, and positioned. Moreover, since the electromagnets 5DRa and 5DLa are turned OFF and the electromagnets 5DRb and 5DLb are turned ON, the armature 4D is pulled toward the yokes 52DR and 52DL of the electromagnets 5DRb and 5DLb, is abutted against the regulating surface 93D which is at the end (image sensor side) of the optical-axis direction, and positioned (same position as shown in FIG. 17B described in the second embodiment).

In order to attain the state shown in FIGS. 68A and 68B, the electromagnet 5URa is supplied with current such that the end portion of the yoke 51UR facing the armature 4U becomes e.g., the south pole, and the electromagnet 5ULa is supplied with current such that the end portion of the yoke 51UL facing the armature 4U becomes e.g., the north pole. Moreover, the electromagnet 5DRb is supplied with current such that the end portion of the yoke 51DR facing the armature 4D becomes e.g., the north pole, and the electromagnet 5DRa is supplied with current such that the end portion of the yoke 51DL facing the armature 4D becomes e.g., the south pole.

Figure 73A:
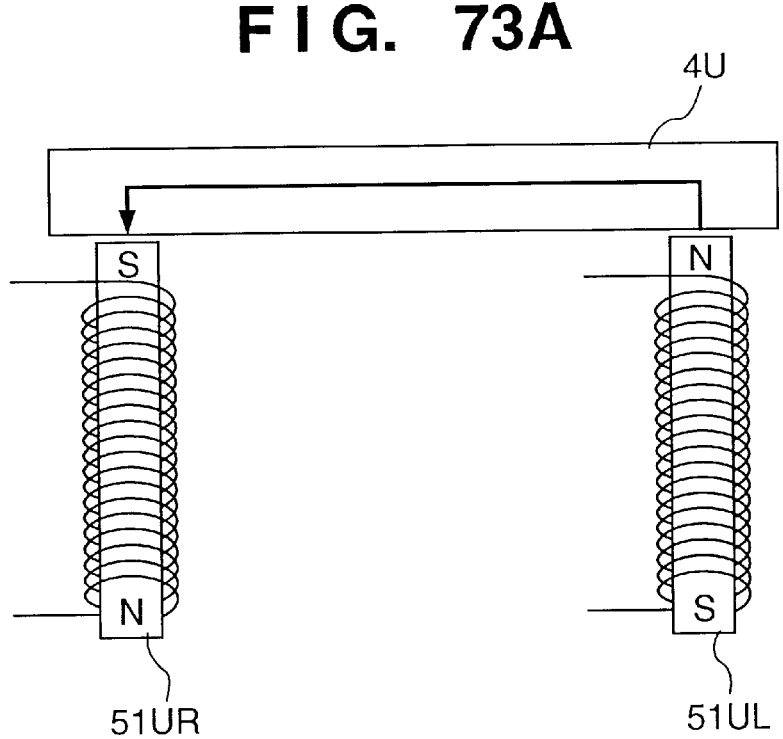
FIGS. 73A and 73B are explanatory views showing a state where one magnetic circuit is formed for an armature in the pixel-shifting system according to the fifth embodiment.
Figure 73B:
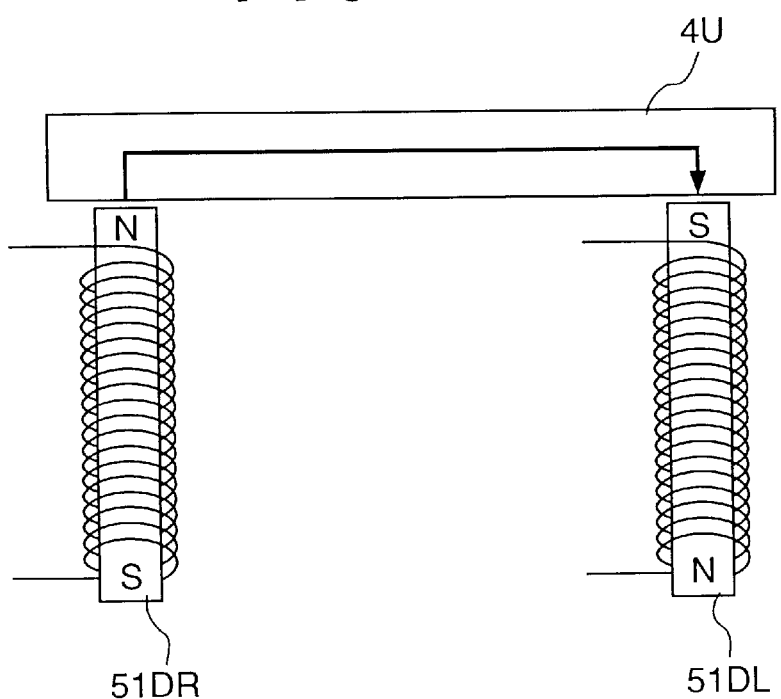

As described above, by virtue of energizing each of the electromagnets as shown in FIGS. 68A and 68B, when one armature (4U or 4D) is pulled by two electromagnets, one magnetic circuit is formed for the armature (4U or 4D) as shown in FIGS. 73A and 73B.

In the state shown in FIGS. 68A and 68B, if the electromagnets 5URa and 5ULa are turned OFF and the electromagnets 5URb and 5ULb are turned ON, the S-pole energized state at the end portion of the yoke 51UR facing the armature 4U is canceled, and the N-pole energized state at the end portion of the yoke 51UL facing the armature 4U is canceled, while the end portion of the yoke 52UR facing the armature 4U becomes e.g., the south pole, and the end portion of the yoke 52UL facing the armature 4U becomes e.g., the north pole. As a result, the inclination position of the plate 3 is regulated by the armatures 4U and 4D on both ends of the plate 3, respectively abutting against the regulating surfaces 93U in the recess 91U and regulating surface 93D in the recess 91D. In other words, from the state shown in FIG. 68B, the plate 3 shifts by one increment to the right in the drawing, so as to attain the positioning shown in FIG. 69B (same position as shown in FIG. 18B described in the second embodiment).

In the state shown in FIGS. 69A and 69B, if the electromagnet 5URb is turned OFF and the electromagnet 5URa is turned ON in the recess 91U, the S-pole energized state at the end portion of the yoke 52UR facing the armature 4U is canceled while maintaining the N-pole energized state at the end portion of the yoke 52UL facing the armature 4U, and the end portion of the yoke 51UR facing the armature 4U becomes e.g., the south pole. As a result, the left abutting portion 4UL of the armature 4U separates from the regulating surface 93U of the recess 91U, is pulled toward the regulating surface 92U to abut thereto and positioned.

As described above, if the electromagnet 5DRb is turned OFF and the electromagnet 5DRa is turned ON in the recess 91D, the N-pole energized state at the end portion of the yoke 52DR facing the armature 4D is canceled while maintaining the S-pole energized state at the end portion of the yoke 52DL facing the armature 4D, and the end portion of the yoke 51DR facing the armature 4D becomes e.g., the north pole. As a result, the left abutting portion 4DL of the armature 4D of the plate 3 separates from the regulating surface 93D of the recess 91D, is pulled toward the regulating surface 92D to abut thereto and positioned. Accordingly, the plate 3 holds the state shown in FIGS. 70A and 70B where the plate 3 is rotated (twisted) clockwise direction when seen from the top of the plate 3, i.e., in the horizontal direction (same position as shown in FIGS. 19A and 19B described in the second embodiment).

By this, the inclination position of the plate 3 is regulated by the armatures 4U and 4D on both ends of the plate 3, respectively abutting against the regulating surfaces 92U and 93U in the recess 91U and the regulating surfaces 92D and 93D in the recess 91D.

Thus, compared to the state shown in FIGS. 69A and 69B, the plate 3 in FIGS. 70A and 70B has substantially the same inclination with respect to the vertical direction, but is changed to have a certain inclination with respect to the horizontal direction. Therefore, the position of light incident upon the image sensing surface of the image sensing device 2 is substantially unchanged with respect to the vertical direction, but is changed with respect to the horizontal direction.

Furthermore, in the state shown in FIGS. 69A and 69B, if the electromagnet 5ULb in the recess 91U and the electromagnet 5DLb in the recess 91D are turned OFF and the electromagnet 5ULa in the recess 91U and the electromagnet 5DLa in the recess 91D are turned ON, the N-pole energized state at the end portion of the yoke 52UL facing the armature 4U as well as the S-pole energized state at the end portion of the yoke 52DL facing the armature 4D are canceled, while maintaining the S-pole energized state at the end portion of the yoke 52UR facing the armature 4U and the N-pole energized state at the end portion of the yoke 52DR facing the armature 4D, and the end portion of the yoke 51UL facing the armature 4U becomes e.g., the north pole, and the end portion of the yoke 51DL facing the armature 4D becomes e.g., the south pole. As a result, the abutting portion 4UL of the armature 4U separates from the regulating surface 93U of the recess 91U, is pulled toward the regulating surface 92U to abut thereto and positioned. Meanwhile, the abutting portion 4DL of the armature 4D separates from the regulating surface 93D of the recess 91D, is pulled toward the regulating surface 92D to abut thereto and positioned. Accordingly, the plate 3 holds the state shown in FIGS. 71A and 71B (same position as shown in FIGS. 20A and 20B described in the second embodiment).

By this, the inclination position of the plate 3 with respect to the horizontal direction is regulated by the armatures 4U and 4D on both ends of the plate 3, respectively abutting against the regulating surfaces 92U and 93U in the recess 91U and the regulating surfaces 92D and 93D in the recess 91D.

Thus, as compared to the state shown in FIGS. 69A and 69B, the plate 3 in FIGS. 71A and 71B has substantially the same inclination with respect to the vertical direction, but is changed to have a certain inclination with respect to the horizontal direction. Therefore, the position of light incident upon the image sensing surface of the image sensing device is substantially unchanged with respect to the vertical direction, but is changed with respect to the horizontal direction.

By changing the inclination of the plate 3 from the state shown in FIGS. 69A and 69B to FIGS. 70A and 70B or to FIGS. 71A and 71B, pixel-shifting in the horizontal direction is realized.

Furthermore, in the state shown in FIGS. 71A and 71B, if the electromagnet 5ULa is turned OFF, 5ULb turned ON, 5DRb turned OFF and 5DRa turned ON, the N-pole energized state at the end portion of the yoke 51UL facing the armature 4U, the N-pole energized state at the end portion of the yoke 52DR facing the armature 4D are canceled, while maintaining the S-pole energized state at the end portion of the yoke 52UR facing the armature 4U and the S-pole energized state at the end portion of the yoke 51DL facing the armature 4D, and the end portion of the yoke 52UL facing the armature 4U becomes the north pole, and the end portion of the yoke 51DR facing the armature 4D becomes the north pole. As a result, the abutting portion 4UL of the armature 4U of the plate 3 separates from the regulating surface 92U of the recess 91U, is pulled toward the regulating surface 93U to abut thereto and positioned. Meanwhile, the abutting portion 4DR of the armature 4D separates from the regulating surface 93D of the recess 91D, is pulled toward the regulating surface 92D to abut thereto and positioned. Accordingly, the plate 3 holds the state shown in FIGS. 72A and 72B (same position as shown in FIGS. 21A and 21B described in the second embodiment).

Figure 74:
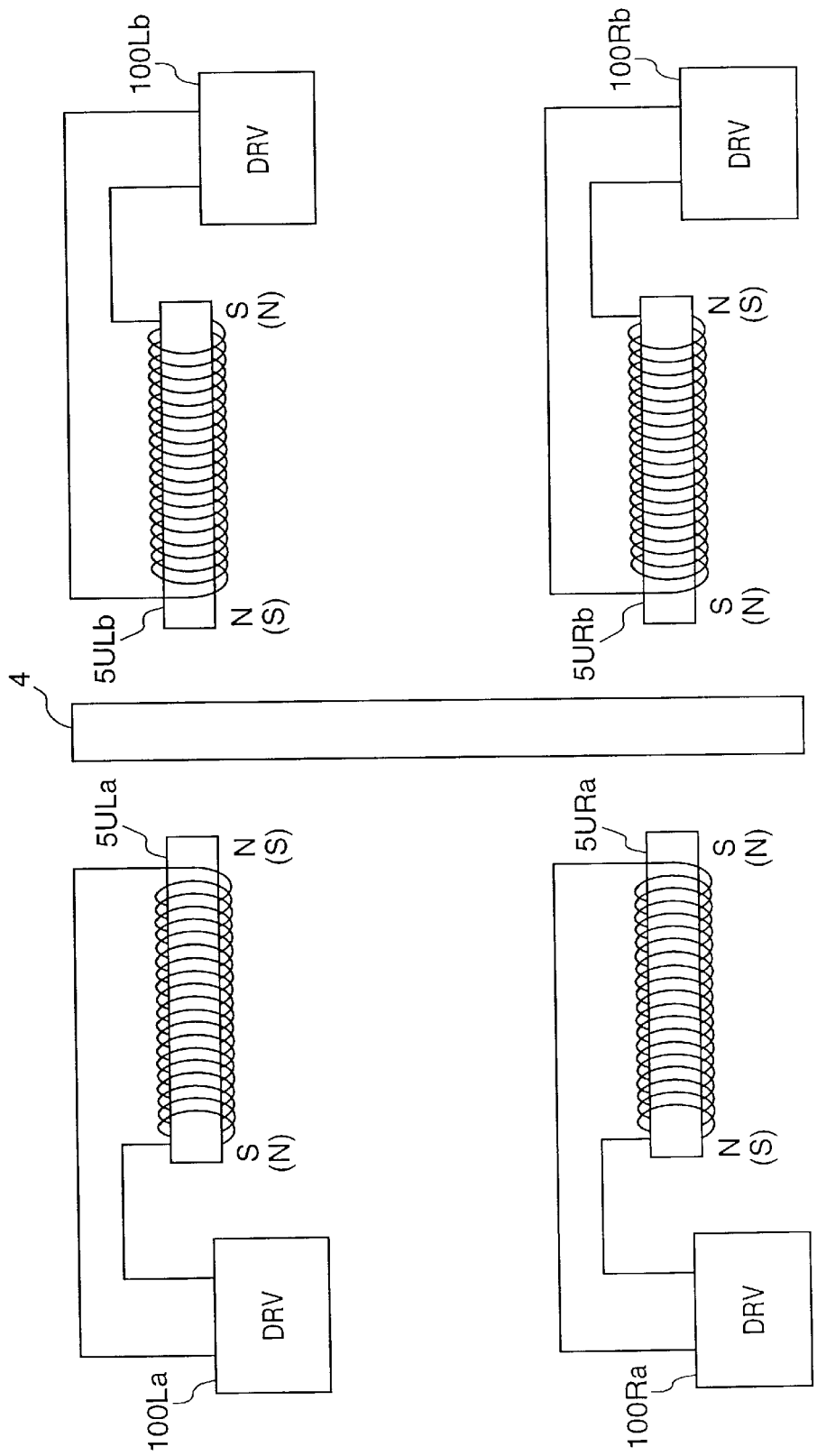
FIG. 74 is an explanatory view showing a structure of a driving circuit driving each electromagnet in the pixel-shifting system according to the fifth embodiment.

In the fifth embodiment, as long as one magnetic circuit is formed for an armature, the directions of current provided to each of the electromagnets related to the armature is arbitrary. FIG. 74 shows an example of current directions of a driving circuit (100La, 100Ra, 100Lb and 100Rb) driving electromagnets group (5ULa, 5URa, 5ULb and 5URb) which control the upper armature 4U.

Referring to the example in FIG. 74, the directions of current flow of the four driving circuits are fixed. More specifically, in the arrangement shown in FIG. 74, current is supplied to two electromagnets (5ULa and 5URb or 5URa and 5ULb), diagonally facing each other across the armature, such that a polarity of magnetic field in the yoke of one of the electromagnets is opposite to that in the yoke of the other electromagnet. Therefore, the arrangement shown in FIG. 74 enables to obtain the pulling state of yoke as shown in FIG. 70A or FIG. 71A, while allowing to generate only one magnetic circuit on the yokes.

Furthermore, in the arrangement in FIG. 74, current is supplied to two electromagnets (5ULa and 5URa or 5URb and 5ULb), situated on the same side across the armature, such that a polarity of magnetic field in the yoke of one of the electromagnets is opposite to that in the yoke of the other electromagnet. Therefore, the arrangement shown in FIG. 74 enables to obtain the pulling state of yoke as shown in FIG. 69A or FIG. 72A, while allowing to generate only one magnetic circuit on the yokes.

As described above, by controlling each of the electromagnets, the position of plate 3 can be controlled similar to the above-described second embodiment.

Particularly noted in the fifth embodiment is that the number of yokes abutting against one armature is two. Therefore, since there is no similar case as the second embodiment where four yokes abut against one armature, the pulling state of yoke as shown in FIG. 70A or FIG. 71A (i.e., "twist" state) can be stably obtained.

Moreover, in the fifth embodiment, since only one magnetic circuit is formed on the armature, a magnetic flux density generated by the same current at a contact point between yoke and armature is higher than the second embodiment. Therefore, efficient current driving can be realized. Particularly in a case where the pixel-shifting circuit according to the present invention is applied to a camera, battery exhaustion can be delayed.

Note that the pixel-shifting apparatus according to the fifth embodiment can be assembled into a single unit similar to the other embodiments. Also, the pixel-shifting apparatus according to the fifth embodiment can be incorporated into a camera or the like.

The present invention is not limited to the above embodiments and various changes and modifications can be made within the spirit and scope of the present invention. Therefore, to appraise the public of the scope of the present invention, the following claims are made.

What is claimed is:

1. An optical apparatus comprising:

an optical device for shifting an incident position of light incident upon an image sensing surface;

a plurality of regulating members, abutting against a plurality of ends of said optical device, for regulating a position of each of the ends in respective optical axis directions, thereby controlling an inclination position of said optical device; and driving means for driving said optical device in order to have said optical device abut against said plurality of regulating members;

wherein said plurality of regulating members comprise a plurality of regulating surfaces which abut against respective ends to regulate a position of the ends, an inclination position of said optical device is determined by changing a combination of an end of said optical device and a regulating surface being abutted thereto, thereby controlling said optical device in a plurality of inclination angles, and a number of regulating surfaces provided in one end of the plurality of ends of said optical device is different from that provided in the other end of said optical device.

2. The optical apparatus according to claim 1, wherein said optical device is constructed such that a shift range with respect to the optical axis direction at one end of said optical device is different from a shift range with respect to the optical axis direction at the other end of said optical device, and a number of regulating surfaces of a second regulating member having a large shift range is set larger than a number of regulating surfaces of a first regulating member having a small shift range.

3. The optical apparatus according to claim 2, wherein the second regulating member having a large shift range has at least three regulating surfaces, so that an inclination angle of said optical device can be equally divided between a maximum inclination position and a minimum inclination position.

4. The optical apparatus according to claim 3,
wherein the first regulating member having a small shift range has a pair of first and second position regulating surfaces formed in different positions along the optical axis, while sandwiching one end of said optical device, said first and second position regulating surfaces controlling an inclination position of said optical device in two steps, and the second regulating member having a large shift range has a pair of third and fourth position regulating surfaces formed in different positions along the optical axis, while sandwiching the other end of said optical device, and a fifth position regulating surface formed between the third and fourth position regulating surfaces, said third, fourth, and fifth position regulating surfaces controlling an inclination position of said optical device in three steps, thereby enabling said plurality of regulating members to control an inclination position of said optical device in six steps in total.

5. The optical apparatus according to claim 4, wherein a ratio of a shift range of the first regulating member having a small shift range to a shift range of the second regulating member having a large shift range has 1:4 relationship.

6. The optical apparatus according to claim 4, wherein said optical device is a plane parallel plate oriented in horizontal direction for performing pixel-shifting in horizontal direction of the image sensing surface.

7. The optical apparatus according to claim 4, wherein said optical device is a plane parallel plate oriented in horizontal direction for performing pixel-shifting in vertical direction of the image sensing surface.

8. The optical apparatus according to claim 1, wherein said optical device is a plane parallel plate provided on an optical path of the image sensing means, and shifts and incident position of light incident upon the image sensing surface by utilizing said regulating member to control an inclination angle of said plane parallel plate with respect to the optical axis.

9. The optical apparatus according to claim 1, wherein both ends of said optical device respectively include engaging portions, each of which contacts the respective position regulating surfaces by a line or point, said engaging portion abutting against the regulating surface.

10. The optical apparatus according to claim 1, wherein the engaging portion is a cylindrical member linearly contacting the regulating surface.

11. The optical apparatus according to claim 1, wherein said driving means comprises a plurality of electromagnets provided for each of the regulating surfaces, and
an inclination position of said optical device is changed by controlling turning on/off each of the electromagnets and determining a regulating surface to which said optical device abuts.

12. The optical apparatus according to claim 1, wherein both ends of each of said horizontally shifting optical device and vertically shifting optical device, abutting against the plurality of regulating members, respectively include engaging portions respectively contacting the plurality of regulating members by a line or point.

13. The optical apparatus according to claim 12, wherein the engaging portion is a cylindrical member linearly contacting the regulating surface.

14. The image sensing apparatus according to claim 1, wherein said optical apparatus is incorporated as a unit.

15. An optical apparatus comprising:
an optical device for shifting an incident position of light incident upon an image sensing surface;
a regulating member for controlling an inclination position of said optical device by abutting against an end of said optical device and regulating a position of the end in an optical axis direction; and
shifting means for shifting said optical device in order to have said optical device abut against the regulating member,
wherein said shifting means comprises:
first driving means for reciprocally driving an end of said optical device in the optical axis direction; and
second driving means for driving the other end of said optical device in a direction substantially perpendicular to the optical axis direction, and
said regulating member comprises:
a first position regulating surface for regulating a shift position of the end of said optical device by abutting against the end, when the end is driven by said first driving means in the optical axis direction; and
a second position regulating surface for regulating a position of the end of said optical device with respect to the optical direction by abutting against the end, when the end is driven by said second driving means in a direction perpendicular to the optical axis direction.

16. The optical apparatus according to claim 15, wherein said regulating member has a recess into which an end of said optical device can be inserted with a play, said first position regulating surface being formed on an inner surface of the recess and said second position regulating surface being formed on a bottom surface of the recess.

17. The optical apparatus according to claim 16, wherein said second position regulating surface is a recess groove which regulates shifting the end of said optical device in the optical axis direction by latching the end of said optical device.

18. The optical apparatus according to claim 15, wherein said regulating member is provided at both end sides of said optical device, and
a shift range at one end side of said optical device with respect to the optical axis direction is different from a shift range at the other end side of said optical device with respect to the optical axis direction.

19. The optical apparatus according to claim 18, wherein the shift range of said optical device with respect to the optical axis direction at one end side and the shift range of said optical device with respect to the optical axis direction at the other end side are set at 1:4 relationship.

20. The optical apparatus according to claim 19, wherein the shift range of said optical device with respect to the optical axis direction at one end side and the shift range of said optical device with respect to the optical axis direction at the other end side are set at 1:4 relationship.

21. The optical apparatus according to claim 15, wherein a pair of said first position regulating surface is formed in two positions having different optical axis directions, while sandwiching an end of said optical device,
said second position regulating surface is formed between the pair of first position regulating surfaces provided in two positions, and
an inclination position of said optical device can be controlled in three steps by determining a regulating surface to which the end of said optical device abuts.

22. The optical apparatus according to claim 21, wherein said regulating member comprises:
a regulating surface formed at one end of said optical device; and a pair of said first regulating surfaces, formed at the other end of said optical device, and formed at two different positions having different optical axis directions at the other end, wherein said regulating member can set an inclination position of said optical device in two steps, enabling these regulating surfaces to control an inclination position of said optical device in six steps.

23. The optical apparatus according to claim 15, said optical device comprising:
a vertical optical device for shifting an incident position of light incident upon the image sensing surface in the vertical direction on the image sensing surface; and
a horizontal optical device for shifting an incident position of light incident upon the image sensing surface in the horizontal direction on the image sensing surface.

24. The image sensing apparatus according to 15, wherein said optical apparatus is incorporated as unit.

25. The optical apparatus according to claim 15, wherein said optical device is a plane parallel plate provided on an optical path of the image sensing means, and shifts an incident position of light incident upon the image sensing surface by utilizing said regulating member to control an inclination angle of said plane parallel plate with respect to the optical axis.

26. The optical apparatus according to claim 15, wherein both ends of said optical device respectively include engaging portions each contacting the regulating surface by a line or point, said engaging portion abutting against the regulating surface.

27. The optical apparatus according to claim 15, wherein said driving means comprises a plurality of electromagnets provided for each of the regulating surfaces, and
an inclination position of said optical device is changed by controlling turning on/off each of the electromagnets and determining a regulating surface to which said optical device abuts.

28. The optical apparatus according to claim 15, wherein both ends of each of said horizontally shifting optical device and vertically shifting optical device, abutting against the plurality of regulating members, respectively include engaging portions respectively contacting the plurality of regulating members by a line or point.

29. An optical apparatus comprising:
a horizontally shifting optical device for shifting an incident position of light incident upon an image sensing surface in horizontal direction of the image sensing surface;
a vertically shifting optical device for shifting an incident position of light incident upon an image sensing surface in vertical direction of the image sensing surface;
a plurality of regulating members, abutting against each of a plurality of ends of said horizontally shifting optical device and vertically shifting optical device, for regulating a position of each of the ends in respective optical axis directions, thereby controlling an inclination position of said optical device; and
driving means for driving said horizontally shifting optical device and said vertically shifting optical device so that said horizontally shifting optical device and vertically shifting optical device abut against said plurality of regulating members,
wherein said plurality of regulating members regulate an inclination position of said horizontally shifting optical device in six steps in the horizontal direction, and regulate an inclination position of said vertically shifting optical device in three steps in the vertical direction.

30. The optical apparatus according to claim 29, wherein, by changing an inclination of each of said optical devices, said regulating members shift an incident position of light incident upon the image sensing surface at $\frac{2}{3}$ pixel pitch, 1 pixel pitch being equivalent to a pixel pitch of the image sensing surface.

31. The optical apparatus according to claim 30, wherein a color filter in a form of complementary-color checkers pattern is provided on the image sensing surface.

32. The optical apparatus according to claim 31, further comprising:
image sensing means for photoelectrically converting an image formed on the image sensing surface into an image signal;
a memory for storing image signals, obtained when the image signal outputted by said image sensing means is sensed at each of eighteen steps of regulated pixel shifting positions determined by a combination of the six steps of regulated inclination positions of said optical device with respect to the horizontal direction and the three steps of regulated inclination positions of said optical device with respect to the vertical direction; and
control means for combining respective image signals stored in said memory and outputting a high-quality image signal.

33. The optical apparatus according to claim 32, wherein each of said horizontally shifting optical device and said vertically shifting optical device is a plane parallel plate provided on an optical path of the image sensing means, and shifts an incident position of light incident upon the image sensing surface by utilizing said regulating member to control an inclination angle of said plane parallel plate with respect to the optical axis.

34. The optical apparatus according to claim 29, wherein each of said plurality of regulating members comprises a plurality of regulating surfaces,
said driving means comprises a plurality of electromagnets provided for each of the plurality of regulating members, and
an inclination position of said optical device is changed by controlling turning on/off each of the electromagnets and determining a regulating surface to which said optical device abuts.

35. The image sensing apparatus according to claim 29, wherein said optical apparatus is incorporated as a unit.

36. An optical apparatus comprising:
an optical device for shifting an incident position of light incident upon an image sensing surface;
a plurality of regulating members, abutting against said optical device, for regulating a position with respect to the optical axis direction, thereby controlling an inclination position of said optical device with respect to an optical axis direction; and
driving means for driving said optical device to regulate said optical device at a position of said regulating members,
said plurality of regulating members comprising:
first and second regulating members for positioning said optical device by engaging with said optical device in the optical axis direction; and
a third regulating member, situated between the first and second regulating members, for positioning said optical device by engaging with said optical device in a direction substantially perpendicular to said optical axis direction, wherein said optical device is regulated in the optical axis direction at least in three inclination positions.

37. The optical apparatus according to claim 36, wherein the third regulating member equally divides an inclination angle of said optical device, between an inclination position formed by the first regulating member and an inclination position formed by the second regulating member.

38. The optical apparatus according to claim 36, wherein each of said plurality of regulating members has a recess into which an end of said optical device is inserted with a play, and the first and second regulating members are formed on an inner surface of the recess, and the third regulating member is formed on a bottom surface of the recess.

39. The optical apparatus according to claim 38, wherein said driving means comprises an electromagnet provided for each of the regulating members, and an armature, serving as a magnetic engaging portion which can be pulled by the electromagnet, is provided in the optical device side.

40. The optical apparatus according to claim 38, wherein said driving means comprises an electromagnet provided for each of the regulating members, and an armature, serving as a magnetic engaging portion which can be pulled by the electromagnet, is provided in the optical device side.

41. The optical apparatus according to claim 36, wherein said driving means comprises an electromagnet provided for each of the regulating members, and an armature, serving as a magnetic engaging portion which can be pulled by the electromagnet, is provided in the optical device side.

42. The image sensing apparatus according to claim 36, wherein said optical apparatus is incorporated as a unit.

43. An optical apparatus comprising:

image sensing means for photoelectrically converting an optical image formed on an image sensing surface and outputting a sensed image signal;

an optical device for shifting an incident position of light incident upon the image sensing surface;

a plurality of regulating members, provided on both ends of said optical device opposite to each other, for regulating a position of each of the ends in an optical axis direction, thereby controlling an inclination angle of said optical device in a first direction with respect to an optical axis of said optical device and an inclination angle of said optical device in a second direction which is perpendicular to the first direction;

a plurality of electromagnetic driving means for driving said optical device to have said optical device abut against said plurality of regulating members; and control means for shifting in vertical direction of the image sensing surface an incident position of light by operating said electromagnetic driving means to change an inclination angle of said optical device with respect to the first direction, and shifting in horizontal direction of the image sensing surface an incident position of light by operating said electromagnetic driving means to change an inclination angle of said optical device with respect to the second direction, wherein said control means controls said electromagnetic driving means such that said electromagnetic means generates one magnetic circuit in each of the ends of said optical device, and that regulating surfaces to which the ends abut respectively are determined by the magnetic circuit.

44. The optical apparatus according to claim 43, wherein said optical device is a plane parallel plate provided on an optical path of the image sensing means, and shifts an incident position of light incident upon the image sensing surface by utilizing said regulating member to control an inclination angle of said plane parallel plate with respect to the optical axis.

45. The optical apparatus according to claim 44, wherein the both ends of said optical device, abutting against the regulating surfaces, respectively include engaging portions each contacting a regulating surface by a line or point.

46. The optical apparatus according to claim 43, wherein regulating surfaces for each end of said optical device are formed at back and forth positions in the optical axis direction with respect to the end of said optical device, and said optical device is controlled in a plurality of inclination angles by changing combinations of the regulating surfaces to which the ends of said optical device abut.

47. The optical apparatus according to claim 46, wherein a shift range with respect to the optical axis direction at one end of said optical device and a shift range with respect to the optical axis direction at the other end of said optical device have 1:1 relationship so that the inclination angle of said optical device can be equally divided between a maximum inclination position and a minimum inclination position.

48. The optical apparatus according to claim 47, wherein the both ends of said optical device, abutting against the regulating surfaces, respectively include engaging portions each contacting a regulating surface by a line or point.

49. The optical apparatus according to claim 43, wherein the both ends of said optical device, abutting against the regulating surfaces, respectively include engaging portions each contacting a regulating surface by a line or point.

50. The optical apparatus according to claim 49, wherein the engaging portion is a cylindrical member linearly contacting the regulating surface.

51. The optical apparatus according to claim 43, wherein said electromagnetic driving means comprises a plurality of electromagnets provided for each of the regulating surfaces, and an inclination position of said optical device is changed by controlling turning on/off each of the electromagnets and selecting a regulating surface to which said optical device abuts.

52. The optical apparatus according to claim 51, wherein a plurality of said electromagnets are provided respectively in the positions having different optical axis directions at each of the ends of said optical device, and two of the electromagnets are turned on to generate one magnetic circuit at each shift position of said optical device.

53. The optical apparatus according to claim 52, wherein each of the plurality of electromagnets comprises an electromagnetic coil and an electromagnetic yoke, and only one end of the electromagnetic yoke for an electromagnet is situated opposite to an end of said optical device.

54. The optical apparatus according to claim 53, wherein a predetermined current direction supplied to two simultaneously-turned-on electromagnets of said plurality of electromagnets situated opposite to one end of said optical device, is controlled such that an end of one electromagnetic yoke becomes south pole and an end of the other electromagnetic yoke becomes north pole, thereby forming one magnetic circuit by both electromagnets.

55. The optical apparatus according to claim 54, said optical device comprising:
- a vertically shifting optical device for shifting an incident position of light incident upon the image sensing surface mainly in the vertical direction of the image sensing surface; and
- a horizontally shifting optical device for shifting an incident position of light incident upon the image sensing surface mainly in the horizontal direction of the image sensing surface,
- wherein said vertically shifting optical device has one to three horizontal inclination positions for a predetermined vertical inclination position, and said horizontally shifting optical device has one to three vertical inclination positions for a predetermined horizontal inclination position.

56. The optical apparatus according to claim 55, said optical device comprising:
- a vertically shifting optical device for shifting an incident position of light incident upon the image sensing surface mainly in the vertical direction of the image sensing surface; and
- a horizontally shifting optical device for shifting an incident position of light incident upon the image sensing surface mainly in the horizontal direction of the image sensing surface,
- wherein said vertically shifting optical device has one to three horizontal inclination positions for a predetermined vertical inclination position, and said horizontally shifting optical device has one to three vertical inclination positions for a predetermined horizontal inclination position.

57. The optical apparatus according to claim 51, wherein said electromagnetic driving means comprises a plurality of electromagnets provided for each of the regulating surfaces, and
- an inclination position of said optical device is changed by controlling turning on/off each of the electromagnets and selecting a regulating surface to which said optical device abuts.

* * * * *

UNITED STATES PATENT AND TRADEMARK OFFICE
CERTIFICATE OF CORRECTION

PATENT NO. : 6,753,906 B2
DATED : June 22, 2004
INVENTOR(S) : Koichi Shimada

It is certified that error appears in the above-identified patent and that said Letters Patent is hereby corrected as shown below:

<u>Title page</u>,
Insert Item:
-- [63] Related U.S. Application Data
Continued Prosecution Application of application 09/140,440 filed August 26, 1998 --

<u>Column 48</u>,
Lines 60 and 63, please delete "A" and insert therefore -- <u>A</u> --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,753,906 B2 Page 1 of 1
DATED : June 22, 2004
INVENTOR(S) : Koichi Shimada It is certified that error appears in the above-identified patent and that said Letters Patent is hereby corrected as shown below:

<u>Title page,</u>
Item [73], Assignee, should read as follows:

-- [73] Assignee: Canon Denshi Kabushiki Kaisha, Saitama (JP) --.

Signed and Sealed this

Fifth Day of April, 2005

JON W. DUDAS
*Director of the United States Patent and Trademark Office*